(12) United States Patent
Kondoh et al.

(10) Patent No.: US 8,688,312 B2
(45) Date of Patent: Apr. 1, 2014

(54) DRIVING ASSISTANCE SYSTEM FOR VEHICLE AND VEHICLE EQUIPPED WITH DRIVING ASSISTANCE SYSTEM FOR VEHICLE

(75) Inventors: Takayuki Kondoh, Yokohama (JP); Tomohiro Yamamura, Yokohama (JP); Nobuyuki Kuge, Zushi (JP); Yasuhiko Takae, Atsugi (JP); Kenji Komori, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 409 days.

(21) Appl. No.: 12/670,225

(22) PCT Filed: Jul. 24, 2007

(86) PCT No.: PCT/JP2007/064529
§ 371 (c)(1),
(2), (4) Date: Jan. 22, 2010

(87) PCT Pub. No.: WO2009/013816
PCT Pub. Date: Jan. 29, 2009

(65) Prior Publication Data
US 2010/0274435 A1    Oct. 28, 2010

(51) Int. Cl.
*G06F 7/00*    (2006.01)
(52) U.S. Cl.
USPC .......................................... 701/31.4; 340/576
(58) Field of Classification Search
USPC .............. 701/29.1, 31.4, 1, 70; 340/439, 936, 340/576, 903
See application file for complete search history.

(56) References Cited

U.S. PATENT DOCUMENTS

| 5,157,609 | A | | 10/1992 | Stehle et al. |
| 5,465,079 | A | * | 11/1995 | Bouchard et al. ............. 340/576 |
| 5,485,892 | A | | 1/1996 | Fujita |
| 6,154,123 | A | * | 11/2000 | Kleinberg ..................... 340/436 |
| 6,526,335 | B1 | * | 2/2003 | Treyz et al. ....................... 701/1 |
| 7,974,748 | B2 | * | 7/2011 | Goerick et al. ................. 701/28 |
| 2004/0059482 | A1 | | 3/2004 | Hijikata |
| 2004/0143378 | A1 | * | 7/2004 | Vogelsang ..................... 701/35 |
| 2005/0065663 | A1 | | 3/2005 | Oyama |
| 2005/0128063 | A1 | * | 6/2005 | Isaji et al. ...................... 340/439 |
| 2006/0145827 | A1 | | 7/2006 | Kuge et al. |

(Continued)

FOREIGN PATENT DOCUMENTS

| EP | 0 406 615 A2 | 1/1991 |
| EP | 1 034 984 A2 | 9/2000 |

(Continued)

OTHER PUBLICATIONS

U.S. Appl. No. 12/670,228, filed Jan. 22, 2010, Kondoh et al.

(Continued)

*Primary Examiner* — Marthe Marc-Coleman
(74) *Attorney, Agent, or Firm* — Foley & Lardner LLP

(57) ABSTRACT

A driving assistance system for vehicle obtains short-duration data representing a present traveling condition and driving operation and intermediate-duration data representing a traveling condition and driving operation of that day. A drive diagnosis is carried out by comparing a distribution of the short-duration data and a distribution of the intermediate-date, and a drive diagnosis result is evaluated with two evaluation criteria so as to provide an alarm or an operation improvement suggestion.

8 Claims, 83 Drawing Sheets

(56) References Cited

U.S. PATENT DOCUMENTS

| | | | |
|---|---|---|---|
| 2006/0178789 A1* | 8/2006 | Kuge | 701/1 |
| 2007/0239322 A1* | 10/2007 | McQuade et al. | 701/1 |
| 2008/0122603 A1* | 5/2008 | Plante et al. | 340/439 |
| 2011/0267205 A1* | 11/2011 | McClellan et al. | 340/936 |

FOREIGN PATENT DOCUMENTS

| | | |
|---|---|---|
| EP | 1 661 751 A1 | 5/2006 |
| JP | 7-159525 A | 6/1995 |
| JP | 11-227491 A | 8/1999 |
| JP | 2001-71833 A | 3/2001 |
| JP | 2001-253266 A | 9/2001 |
| JP | 2002-29282 A | 1/2002 |
| JP | 2002-319087 A | 10/2002 |
| JP | 2004-54821 A | 2/2004 |
| JP | 2004-182200 A | 7/2004 |
| JP | 2004-249846 A | 9/2004 |
| JP | 2005-71184 A | 3/2005 |
| JP | 2007-133486 A | 5/2007 |
| WO | WO 95/05649 A1 | 2/1995 |

OTHER PUBLICATIONS

Komori et al., US PTO Non-Final Office Action, U.S. Appl. No. 12/670,228, dated Apr. 17, 2012, 17 pgs.

K. Komori et al., US Final Office Action, U.S. Appl. No. 12/670,228, dated Sep. 21, 2012, 21 pgs.

Zanten Van A. T., et al., "Die Fahrdynamikregelung von Bosch", *Automatisierungstechnik*, vol. 44, No. 7, (Jul. 1, 1996), pp. 359-365.

Supplementary European Search Report dated Dec. 9, 2013, (10 pgs.).

Supplementary European Search Report from U.S. Appl. No. 12/670,228, dated Dec. 9, 2013, (8 pgs.).

K. Komori et al., U.S. Office Action, U.S. Appl. No. 12/670,228, dated Jan. 7, 2014, (20 pgs.).

\* cited by examiner

RELATIONSHIP BETWEEN TIME AND TLC

FREQUENCY DISTRIBUTION OF TLC

EXAMPLE OF CHANGE IN TLC

FIG.28
(a)
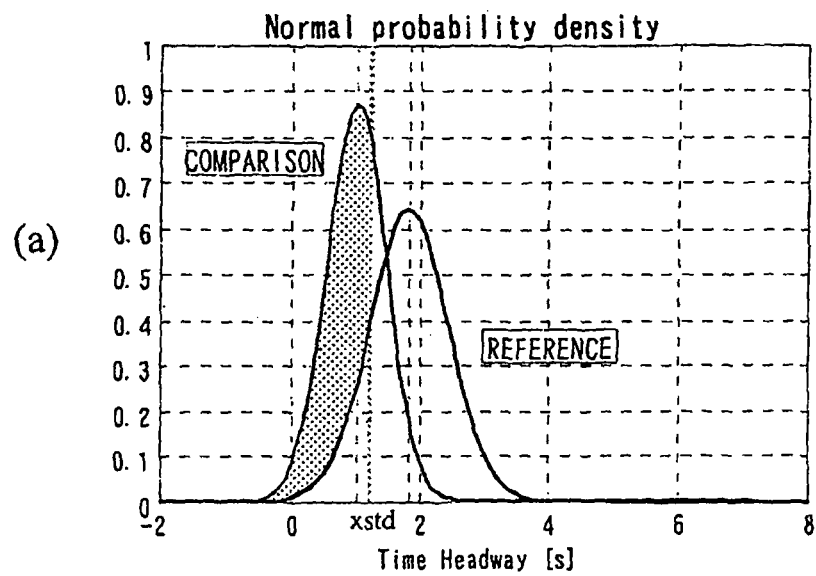
(b)
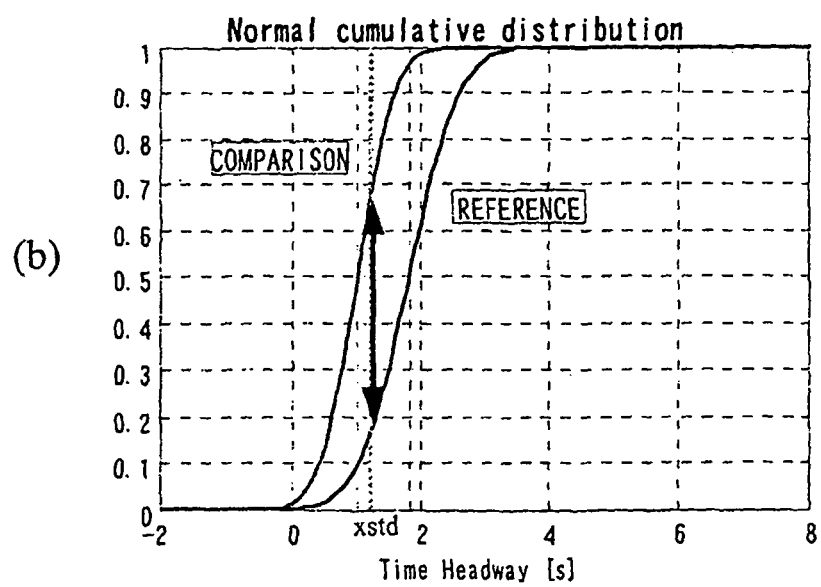

FIG.28
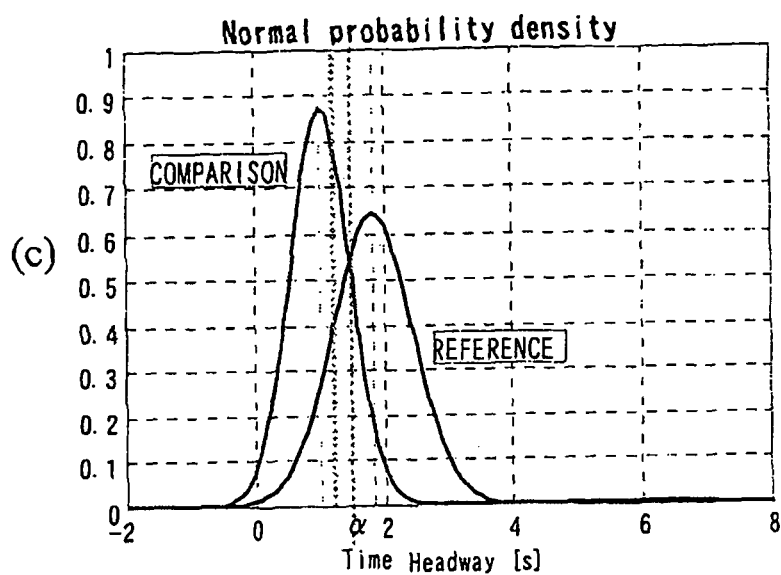
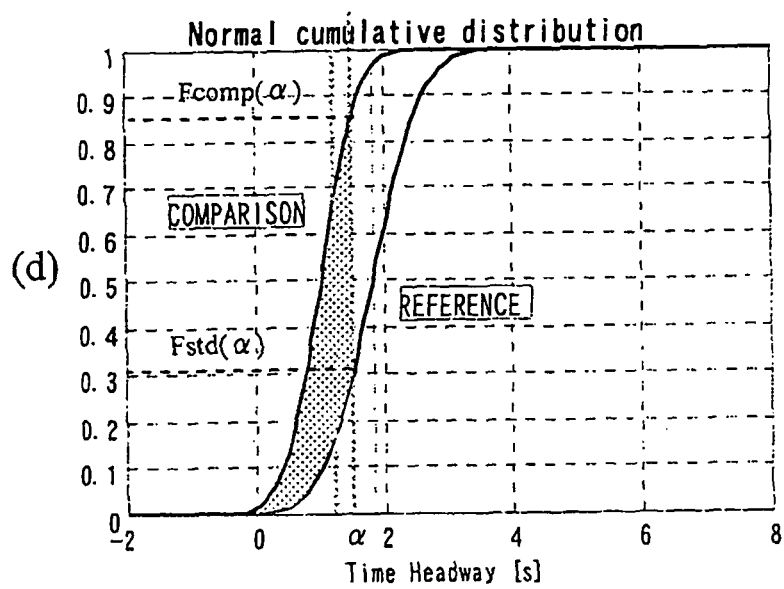

FIG. 29
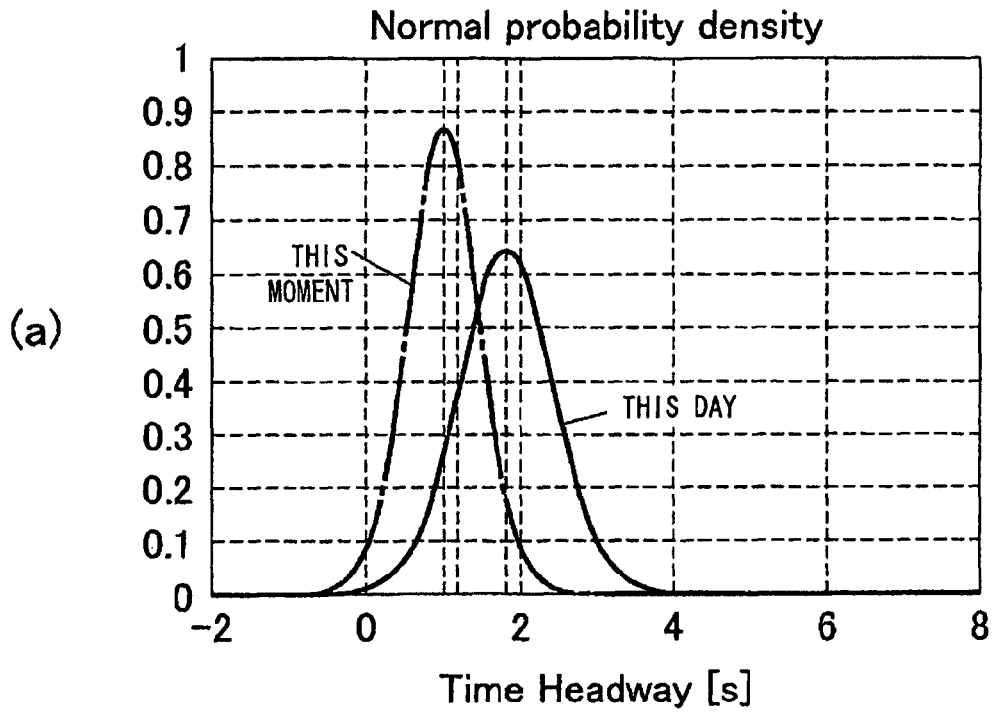
(a)
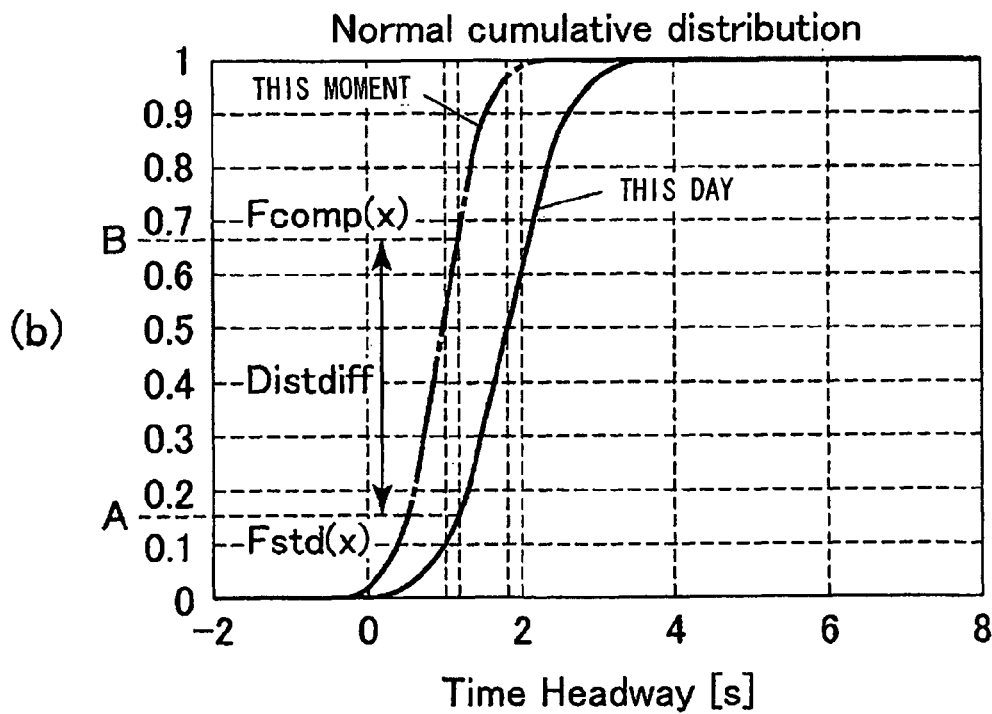
(b)

FIG. 52

| SYMBOLS | NAMES |
|---|---|
| $\tilde{\Theta}n$ | $\Theta$n-tilde STEERING ANGLE SMOOTHING VALUE |
| $\hat{\Theta}n$ | $\Theta$n-hat ESTIMATED VALUE OF STEERING ANGLE |

FIG. 54

| CATEGORY $b_i$ | RANGE OF STEERING ERRORS $e_n$ | PROBABILITY $P_i$ |
|---|---|---|
| b1 | $-\infty \sim -5\alpha$ | P1 |
| b2 | $-5\alpha \sim -2.5\alpha$ | P2 |
| b3 | $-2.5\alpha \sim -\alpha$ | P3 |
| b4 | $-\alpha \sim -0.5\alpha$ | P4 |
| b5 | $-0.5\alpha \sim 0.5\alpha$ | P5 |
| b6 | $0.5\alpha \sim \alpha$ | P6 |
| b7 | $\alpha \sim 2.5\alpha$ | P7 |
| b8 | $2.5\alpha \sim 5\alpha$ | P8 |
| b9 | $5\alpha \sim \infty$ | P9 |

FIG. 56

| CATEGORY RESULTS | CONTENTS TO BE INFORMED. |
|---|---|
| SLL | 'THE INSTABILITY OF OPERATION IS GREAT' |
| SL | 'THE INSTABILITY OF OPERATION IS SLIGHTLY GREAT' |
| SM | 'THE INSTABILITY OF OPERATION IS AVERAGE' |
| SS | 'THE INSTABILITY OF OPERATION IS SLIGHTLY SMALL' |
| SSS | 'THE INSTABILITY OF OPERATION IS SMALL' |

FIG. 60

| en | FREQUENCY |
|---|---|
| --- | --- |
| 0.004 | $T_{0.004}$ |
| 0.003 | $T_{0.003}$ |
| 0.002 | $T_{0.002}$ |
| 0.001 | $T_{0.001}$ |
| 0.000 | $T_{0.000}$ |
| -0.001 | $T_{-0.001}$ |
| -0.002 | $T_{-0.002}$ |
| -0.003 | $T_{-0.003}$ |
| -0.004 | $T_{-0.004}$ |
| --- | --- |

| CATEGORY RESULTS | CONTENTS TO BE INFORMED |
|---|---|
| D2PP | 'THE INSTABILITY OF OPERATION IS GREATER THAN IT USUALLY IS' |
| D2P | 'THE INSTABILITY OF OPERATION IS SLIGHTLY GREATER THAN IT USUALLY IS' |

| CATEGORY RESULTS | CONTENTS TO BE INFORMED |
|---|---|
| D2PM | 'THE INSTABILITY OF OPERATION IS SLIGHTLY SMALLER THAN IT WAS BEFORE' |
| D2PMM | 'THE INSTABILITY OF OPERATION IS SMALLER THAN IT WAS BEFORE' |

| CATEGORY RESULTS | CONTENTS TO BE INFORMED |
|---|---|
| $\alpha 1S$ | 'THE INSTABILITY OF OPERATION IS SLIGHTLY SMALL' |
| $\alpha 1SS$ | 'THE INSTABILITY OF OPERATION IS SMALL' |

| CATEGORY RESULTS | CONTENTS TO BE INFORMED |
|---|---|
| D3PP | 'THE INSTABILITY OF OPERATION IS GREAT' |
| D3P | 'THE INSTABILITY OF OPERATION IS SLIGHTLY GREAT' |

| CATEGORY RESULTS | CONTENTS TO BE INFORMED |
|---|---|
| SLL | 'THE INSTABILITY OF OPERATION IS GREAT' |
| SL | 'THE INSTABILITY OF OPERATION IS SLIGHTLY GREAT' |
| SM | 'THE INSTABILITY OF OPERATION IS AVERAGE' |
| SS | 'THE INSTABILITY OF OPERATION IS SLIGHTLY SMALL' |
| SSS | 'THE INSTABILITY OF OPERATION IS SMALL' |

| CATEGORY RESULTS | CONTENTS TO BE INFORMED |
|---|---|
| D2PPap | "THE INSTABILITY OF OPERATION IS GREATER THAN IT USUALLY IS" |
| D2Pap | "THE INSTABILITY OF OPERATION IS SLIGHTLY GREATER THAN IT USUALLY IS" |

| CATEGORY RESULTS | CONTENTS TO BE INFORMED |
|---|---|
| D2PMap | 'THE INSTABILITY OF OPERATION IS SLIGHTLY SMALLER THAN IT WAS BEFORE' |
| D2PMMap | 'THE INSTABILITY OF OPERATION IS SMALLER THAN IT WAS BEFORE' |

| CATEGORY RESULTS | CONTENTS TO BE INFORMED |
|---|---|
| $\alpha$ lapS | 'THE INSTABILITY OF OPERATION IS SLIGHTLY SMALL' |
| $\alpha$ lapSS | 'THE INSTABILITY OF OPERATION IS SMALL' |

| CATEGORY RESULTS | CONTENTS TO BE INFORMED |
|---|---|
| D3PPap | "THE INSTABILITY OF OPERATION IS GREAT" |
| D3Pap | "THE INSTABILITY OF OPERATION IS SLIGHTLY GREAT" |

FIG. 93

SAFETY AWARENESS PREFERENCE

CORRESPONDING EMBODIMENTS

PERCEPTION

OPERATION

| DETECTION INDICES | DETECTION SIGNALS | DETECTION TARGETS | | | |
|---|---|---|---|---|---|
| | | DETERMINATION | | | |
| | | RISK SENSITIVITY | RISK TOLERANCE | CONTROL PERFORMANCE | |
| TTC DISTRIBUTION AT ACCELERATOR PEDAL OFF TIME | VEHICLE SEPARATION | ● | | | 1 |
| TLC DISTRIBUTION AT STEERING ADJUSTMENT TIME | LANE LATERAL POSITION | ● | | | 2 |
| VEHICLE VELOCITY DISTRIBUTION AT SINGLE TRAVELING TIME | VEHICLE VELOCITY | | ● | | 3 |
| TIME HEADWAY DISTRIBUTION AT FOLLOW-UP TIME | VEHICLE SEPARATION | | ● | | 4 5 6 |
| MAXIMUM ACCELERATION AT START-UP | ACCELERATION/DECELERATION | | ● | | 7 |
| MINIMUM TTC DISTRIBUTION AT BRAKING TIME | VEHICLE SEPARATION | | | ● | 8 |
| MINIMUM VEHICLE SEPARATION AT PASSING | VEHICLE SEPARATION | | | ● | 9 |
| SMOOTHNESS OF STEERING (STEERING ENTROPY) | STEERING ANGLE | | | | ● | 10 11 |
| STABILITY OF ACCELERATOR OPERATION (ACCELERATOR PEDAL ENTROPY) | ACCELERATOR PEDAL OPERATION AMOUNT | | | | ● | 12 |

DRIVING ASSISTANCE SYSTEM FOR VEHICLE AND VEHICLE EQUIPPED WITH DRIVING ASSISTANCE SYSTEM FOR VEHICLE

TECHNICAL FIELD

The present invention relates to a driving assistance system for vehicle, which assists efforts by drivers to operate vehicles in traveling.

BACKGROUND ART

A conventional driving assistance system for vehicle learns time to contact at the start of deceleration when the vehicle is approaching a leading vehicle ahead and generates an alarm based on a learnt value (see, for example, patent reference literature 1). The system estimates a predicted time of the driver from the time to contact at the start of deceleration operation and generates an alarm when the predicted value of the vehicle separation after the predicted time becomes smaller than an alarm distance.

Patent Reference Literature 1
Japanese Laid Open Patent Publication No. H7-159525
Patent Reference Literature 2
Japanese Laid Open Patent Publication No. 2005-71184

DISCLOSURE OF THE INVENTION

Problems to be Solved by the Invention

The conventional system described above detects driving characteristics of the driver based on the time to contact at the start of deceleration operation and generates an alarm when an unsafe state is detected. However, there has been a problem that the convincingness of the driver towards the alarm is reduced if reliable detection is not assured due to noise generated by variations between drivers (interindividual difference) or variations in each driver (intraindividual difference).

Means for Solving the Problems

A driving assistance system for vehicle according to the present invention comprises: a traveling condition detection means that detects a traveling condition of a vehicle; a drive operation detection means that detects a drive operation by a driver; a drive diagnosis means that calculates an index for drive diagnosis based upon the traveling condition detected by the traveling condition detection means and the drive operation detected by the drive operation detection means, and diagnoses a drive operation of the driver from a calculated index; an information setting means that evaluates a drive diagnosis result by the drive diagnosis means in accordance with an evaluation criterion so as to set a content of information provision to the driver; and an information provision means that performs information provision to the driver with a content set by the information setting means.

A driving assistance method for vehicle according to the present invention: detects a traveling condition of a vehicle; detects a drive operation by a driver; calculates an index for drive diagnosis based upon the traveling condition and the drive operation that have been detected, and diagnosing an operation of the driver from a calculated index; evaluates a drive diagnosis result with an evaluation criterion so as to set a content of information provision to the driver; and performs information provision to the driver with the set content.

Advantageous Effect of the Invention

According to the present invention, information provision with high convincingness of the driver can be carried out accurately because drive diagnosis result is evaluated in accordance with an evaluation criterion so as to set information provision contents.

EXPLANATION OF REFERENCE NUMERALS

Figure 1:
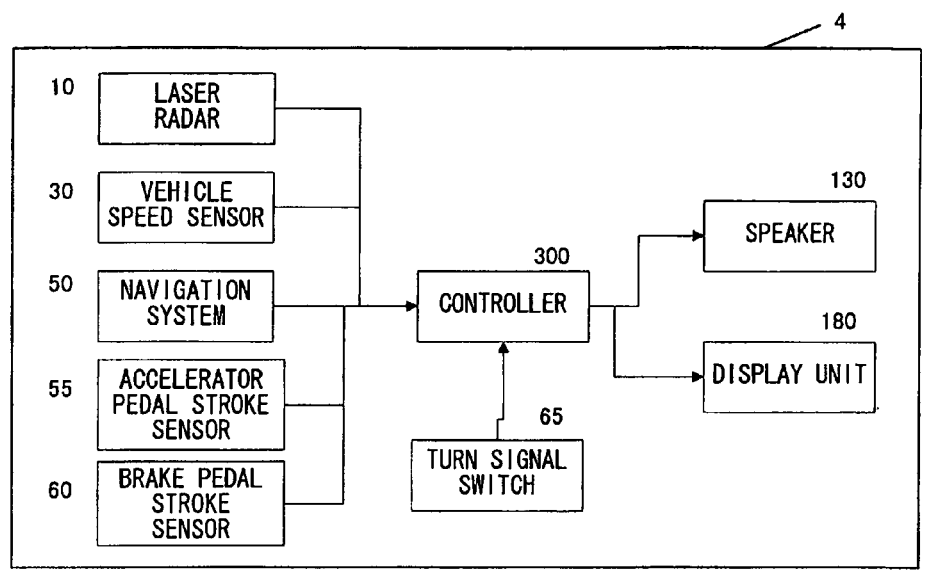
FIG. 1 A control diagram showing a driving assistance system for vehicle according to a first embodiment of the present invention FIG. 2 A view illustrating how the driving assistance system for vehicle shown in FIG. 1 is arranged on an automobile FIG. 3 A flow chart illustrating the processing procedure of a driving assistance control program achieved in the first embodiment FIG. 4 An illustration of the data structure FIG. 5 A flow chart illustrating the procedure of driver operation diagnosis processing FIGS. 6 (a) to (d) Illustrations of calculation methods of degree of deviation FIGS. 7 (a) and (b) Illustrations of calculation methods of degree of deviation using time to contact TTC FIG. 8 An illustration of one example of visual information presentation FIG. 9 An illustration of another example of visual information presentation FIG. 10 A control diagram showing the driving assistance system for vehicle according to a second embodiment of the present invention FIG. 11 A flow chart illustrating the processing procedure of driving assistance control program achieved in the second embodiment FIG. 12 A timing diagram illustrating an example of a variation curve of time to lane crossing FIG. 13 A timing diagram illustrating an example of a frequency distribution of time to lane crossing FIG. 14 A timing diagram illustrating an example of variations of time to lane crossing FIG. 15 A flow chart illustrating the procedure of driver operation diagnosis processing FIG. 16 A flow chart illustrating the processing procedure of the driving assistance control program achieved in a third embodiment FIG. 17 A flow chart illustrating the procedure of driver operation diagnosis processing FIG. 18 An illustration of one example of visual information presentation FIG. 19 An illustration of another example of visual information presentation FIGS. 20 (a) and (b) Illustrations of calculation methods of degree of deviation using vehicle velocity limits FIG. 21 A control diagram showing the driving assistance system for vehicle according to a fourth embodiment of the present invention FIG. 22 A view illustrating how the driving assistance system for vehicle shown in FIG. 21 is arranged on an automobile FIG. 23 A flow chart illustrating the processing procedure of the driving assistance control program achieved in the fourth embodiment FIG. 24 An illustration of the structure of a traffic road database FIG. 25 An illustration of the data structure FIG. 26 A flow chart illustrating the procedure of driver operation diagnosis processing FIGS. 27 (a) and (b) Illustrations of distribution and normal distribution of time headway THW FIGS. 28 (a) to (d) Illustrations of calculation methods of degree of deviation FIGS. 29 (a) and (b) Illustrations of calculation methods of degree of deviation of "this moment" relative to "this day"

8: steering angle sensor
10: laser radar
15: front camera
30: vehicle speed sensor
35: acceleration sensor
50: navigation system
55: accelerator pedal position sensor
60: brake pedal stroke sensor
65: turn signal switch
100, 200, 250, 300, 350, 400, and 500: controllers
130: speaker
180: display unit

BEST MODE FOR CARRYING OUT THE INVENTION

First Embodiment

Figure 2:
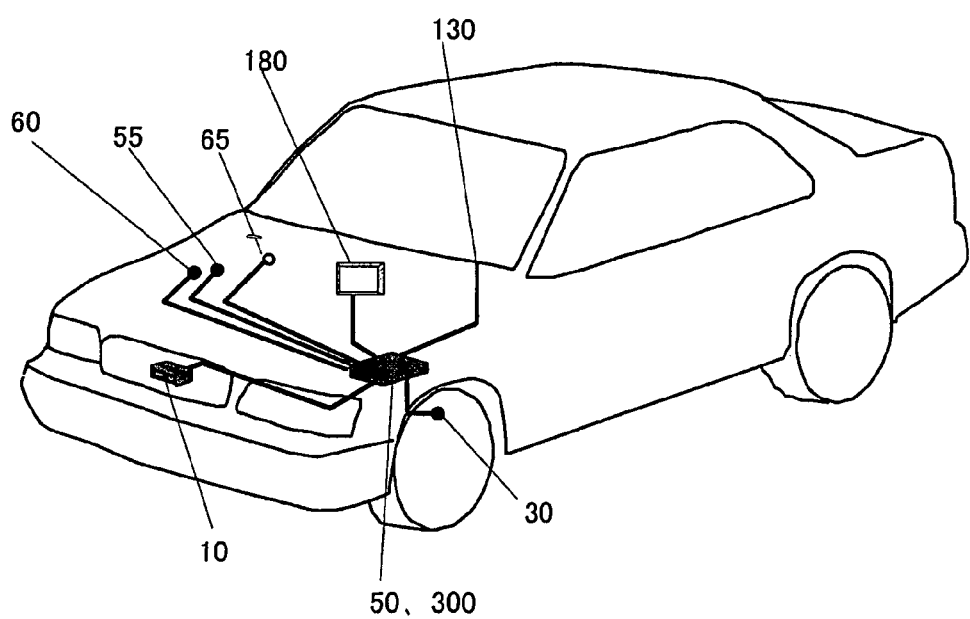

A driving assistance system for vehicle according to the first embodiment of the present invention will be now explained. FIG. 1 is a control diagram showing a driving assistance system 4 for vehicle according to the first embodiment. FIG. 2 is a view illustrating how the driving assistance system 4 for vehicle is arranged on an automobile.

At first, the structure of the driving assistance system 4 for vehicle will now be explained.

A laser radar 10, mounted to a front grille, bumper, or the like of the vehicle, propagates infrared light pulses horizontally so as to scan the region ahead of the vehicle. The laser radar 10 measures the reflected radiation of the infrared light pulses having been reflected by a plurality of obstacles ahead (usually, the rear end of a leading vehicle) and detects a vehicle separation or a distance to the plurality of obstacles and a relative velocity from arrival time of the reflected radiation. The detected vehicle separation and the relative velocity are output to a controller 300. The region ahead of the vehicle scanned by the laser radar 10 is approximately ±6 deg to each side of an axis parallel to the vehicle longitudinal centerline, and the objects existing in the range are detected.

A vehicle speed sensor 30 measures the number of wheel revolutions or the number of revolutions of the output side of the transmission so as to detect the vehicle speed of the vehicle, and outputs the detected speed thereof to the controller 300.

A navigation system 50, including a GPS (Global Positioning System) receiver, a map database, a display monitor, and the like, is a system to perform a path search, a routing assistance, and the like. Based on current location of the vehicle obtained via the GPS receiver and road information stored in the map database, the navigation system 50 obtains information on the class, the width, and the like of the road along which the vehicle travels.

An accelerator pedal stroke sensor 55 detects stroke amount of the accelerator pedal (accelerator pedal operation amount), for instance, having been converted to angle of rotation of servomotor through a link mechanism and outputs it to the controller 300. The brake pedal stroke sensor 60 detects the depression amount of the brake pedal by the driver (degree of operation of the brake pedal). The brake pedal stroke sensor 60 outputs the detected brake pedal operation amount to the controller 300. A turn signal switch 65 detects whether or not the driver has operated a turn signal lever and outputs a detection signal to the controller 300.

The controller 300, which is an electronic control unit constituted by a CPU and CPU peripheral components such as a ROM and a RAM, controls the overall driving assistance system 4 for vehicle. Based on signals received from the laser radar 10, the vehicle speed sensor 30, the navigation system 50, the accelerator pedal stroke sensor 55, the brake pedal stroke sensor 60, the turn signal switch 65, and the like, the controller 300 analyzes driving characteristics of the driver and carries out drive diagnosis. Then, based on the drive diagnosis result, the controller 300 provides the driver with information. Information provided to the driver includes alarm to the driver, improvement suggestion of the drive operation, and the like. Control contents of the controller 300 are described in detail later.

A speaker 130 is used to provide the driver with information in a beep sound or in a voice, in response to a signal from the controller 300. A display unit 180 is used to display an alarm or improvement suggestion to operation of the driver, in response to a signal from the controller 300. For example, the display monitor of the navigation system 50, a combination meter, and the like can be used as the display unit 180.

Next, the behavior of the driving assistance system 4 for vehicle according to the first embodiment will be explained, beginning with the outline thereof.

Based on traveling conditions of the vehicle and drive operation of the driver, the controller 300 carries out drive diagnosis of the driver, and, in response to the drive diagnosis result, alerts the driver and suggests the driver to improve the drive operation. More specifically, the controller 300 detects driving characteristics when the driver lifts his foot off the accelerator pedal in a state where the vehicle is following the leading vehicle, and carries out drive diagnosis using the detected driving characteristics as an index. Then, if the drive diagnosis result indicates that the driver is engaging in risky driving more than he usually is, i.e., if the drive operation of the driver is deviated into a riskier state, the controller 300 alerts the driver so as to inform the driver thereof before the drive operation of the driver goes into a high-risk state. On the other hand, if the drive diagnosis result indicates that the drive operation of the driver is better than the standard of general public, the controller 300 provides the driver with information so as to encourage safer driving or suggest improvement.

Thus, the driving assistance system 4 for vehicle achieved in the first embodiment includes three functions, i.e., a function to detect the drive operation of the driver by drive diagnosis, a function to alert the driver in response to the detected result, and a function to give an improvement suggestion to the driver in response to the detected result. Accordingly, the driving assistance system 4 for vehicle allows and encourages the driver to see his own driving characteristics objectively, and provides the driver with an advice depending upon the driving characteristics so that the driver can learn a driving method to reduce the risk. In the first embodiment, drive diagnosis is carried out in particular with respect to longitudinal drive operation of the driver.

Figure 3:
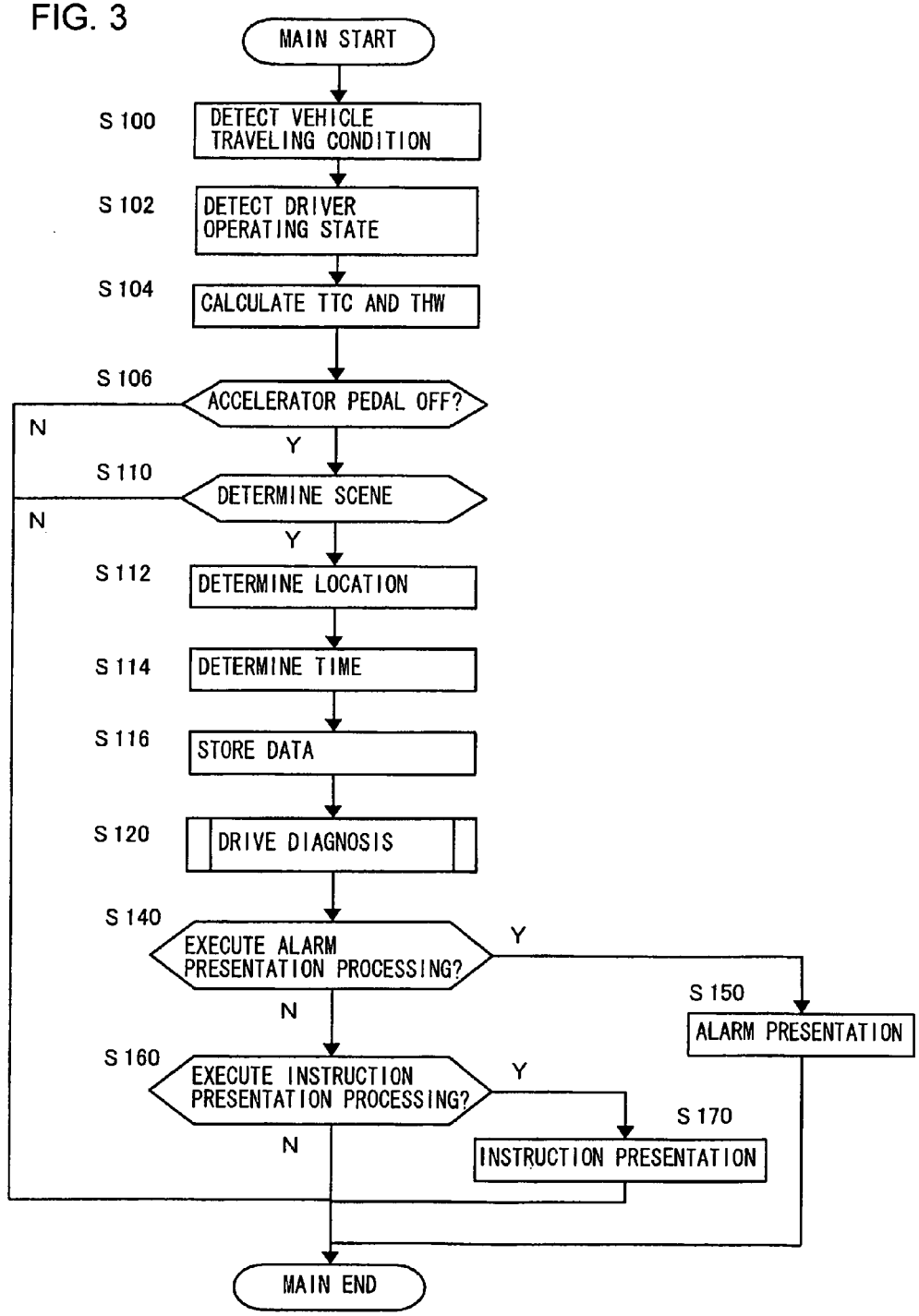

The behavior of the driving assistance system 4 for vehicle according to the first embodiment will be explained in detail with reference to FIG. 3. FIG. 3 is a flow chart illustrating the procedure of driving assistance control processing performed by the controller 300 achieved in the first embodiment. The processing is performed continuously at regular intervals, e.g., for every 50 msec.

At first, traveling conditions of the vehicle are detected in step S100. Here, as the traveling conditions of the vehicle, the controller 300 obtains velocity V of the vehicle detected by the vehicle speed sensor 30, and vehicle separation D and relative vehicle velocity Vr between the vehicle and the leading vehicle detected by the laser radar 10. Operating states of the driver are detected in step S102. Here, as the operating states of the driver, the controller 300 obtains accelerator pedal operation amount detected by the accelerator pedal stroke sensor 55, brake pedal operation amount detected by the brake pedal stroke sensor 60, and whether or not the turn signal lever has been operated detected by the turn signal switch 65.

In step S104, in order to determine traffic scene of the vehicle described later, the controller 300 calculates time to contact TTC and time headway THW between the vehicle and the leading vehicle. Time to contact TTC is a physical quantity representing a current degree of closeness of the vehicle to the leading vehicle. Time to contact TTC indicates the number of seconds before the vehicle separation D becomes zero and the vehicle and the leading vehicle contact with each other if the current traveling condition remains, i.e., if the velocity V of the vehicle and the relative vehicle velocity Vr are constant. Time to contact TTC is expressed by the following equation (1).

$$TTC=D/Vr \quad \text{(Equation 1)}$$

Time headway THW is a physical quantity representing a degree of influence on time to contact TTC by a predicted future change in velocity of the leading vehicle when the vehicle is following the leading vehicle, i.e., a degree of influence on the assumption that the relative vehicle velocity Vr changes. Time headway THW, which is the quotient of vehicle separation D divided by the velocity V of the vehicle, represents time until the vehicle reaches the current position of the leading vehicle. Time headway THW is expressed by the following equation (2).

$$THW=D/V \quad \text{(Equation 2)}$$

In step S106, a decision is made as to whether or not an accelerator pedal off operation has been performed. For example, if the controller 300 detects that the current accelerator pedal operation amount detected in step S102 becomes substantially zero and the accelerator pedal is released from a state in which the accelerator pedal is depressed, the flow of control proceeds to step S110. If the accelerator pedal is depressed, the controller 300 terminates the processing. It is to be noted that in the explanations given below, an operation of releasing the accelerator pedal which has been depressed is referred to as the accelerator pedal off operation, and a point of time at which the accelerator pedal is released is referred to as the accelerator pedal off time.

In step S110, the traffic scene of the vehicle is determined. The accuracy of drive diagnosis is improved by limiting conditions to vehicle traveling conditions and operating states of the driver, and, in order to reduce discomfort to the driver when information is provided to the driver in response to the drive diagnosis result, traffic scene of the vehicle is determined so that drive diagnosis is carried out solely in a particular traffic scene. More specifically, drive diagnosis is carried out exclusively in a traffic scene in which the accelerator pedal is released from a state in which the vehicle is stably following the same leading vehicle.

Examples of conditions of stable follow-up travel scenes are as follows.

(a) The vehicle is following the same leading vehicle (For example, the difference between the current vehicle separation and the previously measured vehicle separation is less than 4 meters)

(b) The vehicle is not approaching rapidly (For example, time to contact TTC is more than 10 seconds)

(c) Time headway THW is equal to or less than a predetermined value (For example, time headway THW is less than four seconds)

(d) There is no brake operation performed by the driver (For example, the brake pedal operation amount is substantially zero)

(e) There is no turn signal lever operation performed by the driver (For example, there is no ON signal received from the turn signal switch 65)

(f) The above states (a) to (e) remain (For example, for five seconds or more)

When the conditions (a) to (f) are all satisfied, the controller 300 determines that the traffic scene of the vehicle is a stable follow-up travel scene, and the flow of control proceeds to step S112 for the controller 300 to carry out drive diagnosis. On the other hand, in the case where any of the conditions (a) to (f) is not satisfied, the controller 300 determines that the traffic scene of the vehicle does not correspond to a particular traffic scene, does not carry out drive diagnosis, and terminates the processing. It is to be noted that conditions in which the controller 300 determines whether or not the traffic scene of the vehicle is a stable follow-up travel scene are not limited to the above conditions (a) to (f). In addition, another detection means may detect whether or not the brake has been operated and whether or not the turn signal lever has been operated.

In step S112, the controller 300 determines travel location. More specifically, based on database, the controller 300 labels index numbers to link IDs described in map information of the navigation system 50. A link ID is an ID assigned to a link that connects together nodes, which are attribution change points at which lane attribution is changed. Each link has data of lane category, link length (distance between nodes), and so on. In step S114, the controller 300 records the present time.

In step S116, based on the labeling results in steps S112 and S114, the controller 300 stores data used to carry out drive diagnosis of the driver. Here, for example, the present time, i.e., the time at which the vehicle traveled in the link, the travel distance, a driving characteristic index in the link, the number of travels in the link, and the like are written in the structure for each link ID so as to create traffic road database. In the first embodiment, time to contact TTC when the accelerator pedal is released is used as a physical quantity that represents driving characteristics of the driver. Calculation methods of the driving characteristics and the driving characteristic index will be explained in detail in drive diagnosis processing.

In the following step S120, the data stored in step S116 are used to carry out drive diagnosis of the driver. Drive diagnosis is carried out based on driving characteristics of the driver when the accelerator pedal is released from a state in which the vehicle is stably following the leading vehicle. Driving characteristics when the vehicle is following the leading vehicle include, for instance, time headway THW of the vehicle and the leading vehicle, inverse of time headway THW, time to contact TTC of the vehicle and the leading vehicle, vehicle separation, inverse of vehicle separation, and so on. In the first embodiment, a case in which time to contact TTC at the point of time when the accelerator pedal is released is used is explained as an example.

It is to be noted that time to contact TTC when the accelerator pedal is released is robustly calculated using a filter of the longitudinal direction from data of the vehicle separation D and the relative vehicle velocity Vr before and after the point of time of the accelerator pedal off operation.

Figure 4:
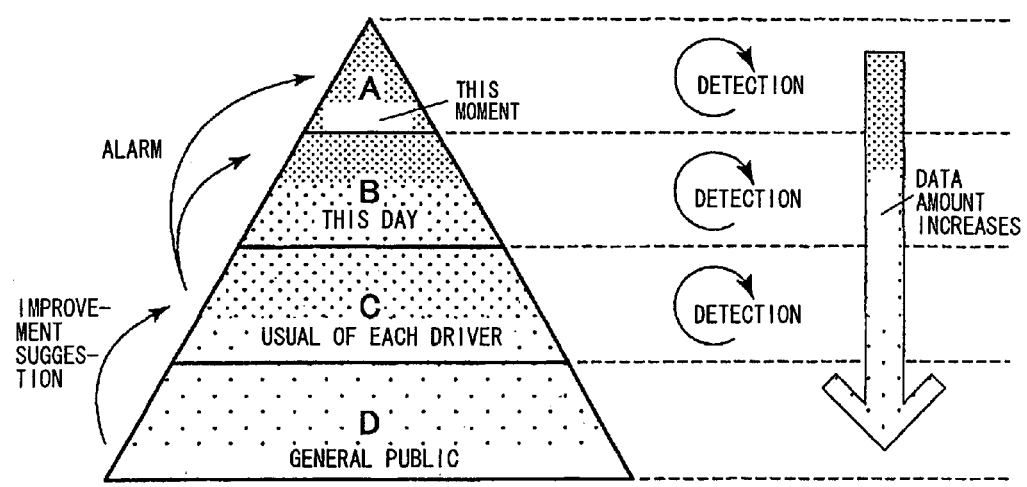

FIG. 4 illustrates the data structure of the driving assistance system 4 for vehicle. A layer A represents the amount of data of relatively short-duration "this moment", which indicates the current operating condition of the driver. A layer B represents the amount of data of "this day", indicating the operating condition of the day of the driver, which is longer than "this moment". A layer C represents the amount of data of "usual" indicating the usual operating condition of the driver, which is longer than "this day", i.e., personal characteristics. A layer D represents the amount of data of driving characteristics of "general public", which is used to compare operation of each driver with that of general driver and to diagnose the operation of each driver.

A lower layer has a larger amount of data. The amount of data included in each of the layers corresponds to the number of samples used to calculate the mean values of time headway THW in "this moment", "this day", and "usual". The data structure shown in FIG. 4 is achieved by varying the number of the samples. The values of data included in each of the layers are continually updated by real-time calculations explained below.

Figure 5:
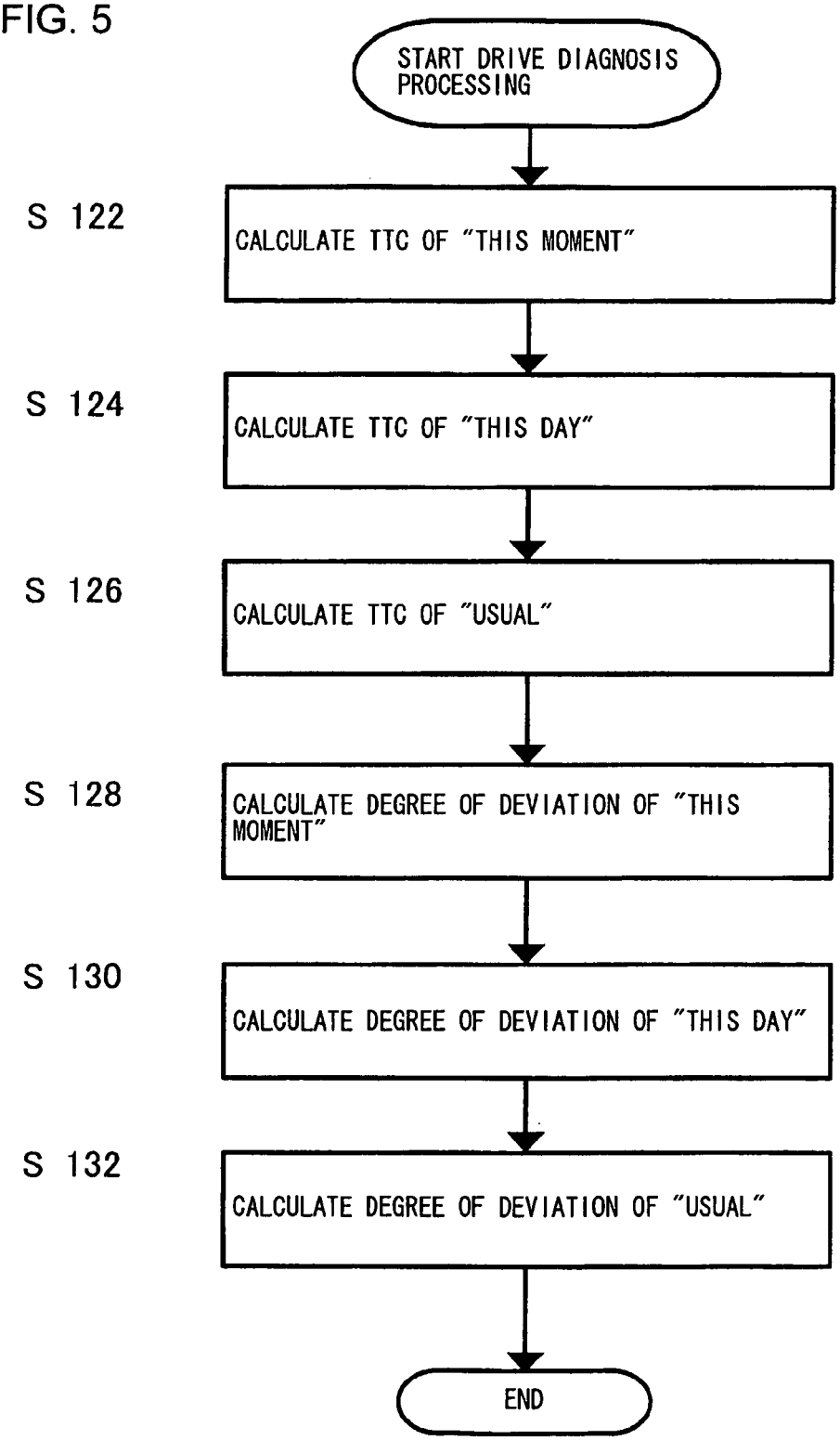

In drive diagnosis processing, the controller 300 uses the data of each of the layer A to the layer D so as to detect operation of the driver in different time spans, i.e., in "this moment", "this day", and "usual". The drive diagnosis processing executed in step S120 will, be explained in detail with reference to the flow chart of FIG. 5.

In step S122, a driving characteristic value of the driver of "this moment" is calculated so as to carry out drive diagnosis of "this moment" of the driver. As driving characteristic values of the driver, the controller 300 calculates the mean value Mean_x(n) and the standard deviation Stdev_x(n) of time to contact TTC at the accelerator pedal off time in a predetermined period of time that defines "this moment". Here, the predetermined period of time that defines "this moment" is, for example, 60 seconds, and, the mean value Mean_x(n) and the standard deviation Stdev_x(n) of time headway THW are calculated using data for 60 seconds from the past to the present detected at the accelerator pedal off time in the stable follow-up travel scene determined in step S110. The mean value Mean_x(n) and the standard deviation Stdev_x(n) are calculated using the following parameters.

x(n): Data obtained at this time, i.e., time to contact TTC at the accelerator pedal off time calculated in step S106

K: The number of data of TTC calculated in a predetermined period of time $M_1(n)$: The sum of TTC in a predetermined period of time to be calculated this time $M_2(n)$: The sum of squares of TTC in a predetermined period of time to be calculated this time $M_1(n-1)$: The sum of TTC in a predetermined period of time calculated in the previous time $M_2(n-1)$: The sum of squares of TTC in a predetermined period of time calculated in the previous time Mean_x(n): The mean value of the data of this time, i.e., the mean value of TTC Var_x(n): The variance of the data of this time, i.e., the variance of TTC Stdev_x(n): The standard deviation of the data of this time, i.e., the standard deviation of TTC Here, the number of data K is determined by the product of a predetermined period of time multiplied by the number of samplings per second. For instance, when the predetermined time for "this moment" is 60 seconds and the number of samplings is 5 Hz, the number of data K=300.

The sum $M_1(n)$ and the sum of squares $M_2(n)$ are each calculated using the following equations (3) and (4) with these parameters.

$$M_1(n)=M_1(n-1)+x(n)-M_1(n-1)/K \qquad \text{(Equation 3)}$$

$$M_2(n)=M_2(n-1)+(x(n))^2-M_2(n-1)/K \qquad \text{(Equation 4)}$$

The mean value Mean_x(n), the variance Var_x(n), and the standard deviation Stdev_x(n) of time to contact TTC at the accelerator pedal off time at "this moment" are calculated using the following equations (5), (6), and (7), respectively.

$$\text{Mean\_}x(n)=M_1(n)/K \qquad \text{(Equation 5)}$$

$$\text{Var\_}x(n)=M_2(n)/K-(M_1(n))^2/K^2 \qquad \text{(Equation 6)}$$

$$\text{Stdev\_}x(n)=\sqrt{(\text{Var\_}x(n))} \qquad \text{(Equation 7)}$$

In step S124, in order to carry out drive diagnosis of "this day" of the driver, the controller 300 calculates follow-up characteristic values of the driver of "this day", i.e., the mean value Mean_x(n) and the standard deviation Stdev_x(n) of time to contact TTC at the accelerator pedal off time in a predetermined period of time which defines "this day". Here, the predetermined period of time that defines "this day" is, for instance, 360 seconds, and the mean value Mean_x(n) and the standard deviation Stdev_x(n) of time to contact TTC at the accelerator pedal off time are calculated using data for 360 seconds from the past to the present detected at the accelerator pedal off time in the stable follow-up travel scene determined in step S110.

More specifically, as is the case with "this moment", the equations (5) and (7) are used to calculate the mean value Mean_x(n) and the standard deviation Stdev_x(n). Here, the number of data K=1800, where the predetermined time for "this day" is 360 seconds and the number of samplings is 5 Hz.

In step S126, in order to carry out drive diagnosis of "usual" of the driver, the controller 300 calculates follow-up characteristic values of the driver of "usual", i.e., the mean value Mean_x(n) and the standard deviation Stdev_x(n) of time to contact TTC at the accelerator pedal off time in a predetermined period of time which defines "usual". Here, a predetermined period of time that defines "usual" is, for instance, 2160 seconds, and the mean value Mean_x(n) and the standard deviation Stdev_x(n) of time to contact TTC at the accelerator pedal off time are calculated using data for 2160 seconds from the past to the present detected at the accelerator pedal off time in the stable follow-up travel scene determined in step S110.

More specifically, as is the case with "this moment", the equations (5) and (7) are used to calculate the mean value Mean_x(n) and the standard deviation Stdev_x(n). Here, the number of data K=10800, where the predetermined time for "usual" is 2160 seconds and the number of samplings is 5 Hz.

In processing after the following step S128, drive diagnosis of the driver is carried out using the driving characteristic values calculated in steps S122, S124, and S126. Here, the driving characteristics of the driver based on data obtained in different time spans are each compared so as to diagnose the drive operation of the driver based on how much both of the driving characteristics deviate. In other words, in the data structure shown in FIG. 4, an upper layer (e.g., the layer A) is compared with a lower layer (e.g., the layer B) so as to carry out the drive diagnosis.

At first, in step S128, the controller 300 calculates the degree of deviation that indicates how much the follow-up characteristics of the driver of "this moment" deviate from those of "this day". Here, the degree of deviation of "this moment" relative to "this day" indicates the difference between the distribution of time to contact TTC at the accelerator pedal off time of "this day" and that of "this moment". In order to calculate the degree of deviation of "this moment" relative to "this day", the distribution of time to contact TTC at the accelerator pedal off time of "this day" is used as a reference distribution which represents a long-duration action distribution, and the distribution of time to contact TTC at the accelerator pedal off time of "this moment" is used as a distribution of comparison target which represents a short-duration action distribution.

As a calculation method of degree of deviation, a method in which distribution functions of short-duration (e.g., "this moment") and long-duration (e.g., "this day") are compared at a position (referred to as a comparison value $x_{std}$) of "mean value minus standard deviation" of the action distribution of long-duration (e.g., "this day") is adopted.

For calculating degree of deviation, the mean value Mean_x(n) and the standard deviation Stdev_x(n) of time to contact TTC at the accelerator pedal off time calculated in steps S122 and S124 are used to calculate a probability density function on the assumption that time to contact TTC at the accelerator pedal off time is normally-distributed.

As FIGS. 6(a) and (b) show, the controller 300 calculates degree of deviation $Dist_{diff}$, which indicates how much the short-duration normal distribution of comparison target deviates from the reference long-duration normal distribution, in the region of comparison target that is set based on a predetermined value (comparison value $x_{std}$). More specifically, the difference (area of the hatched region in FIG. 6(a) and the length of the arrow in FIG. 6(b)) between comparison distribution and reference distribution in the region where time to contact TTC is shorter than the comparison value $x_{std}$ corresponds to the degree of deviation $Dist_{diff}$. Calculation methods shown in FIGS. 6(c) and (d) will be described later.

Figure 7:
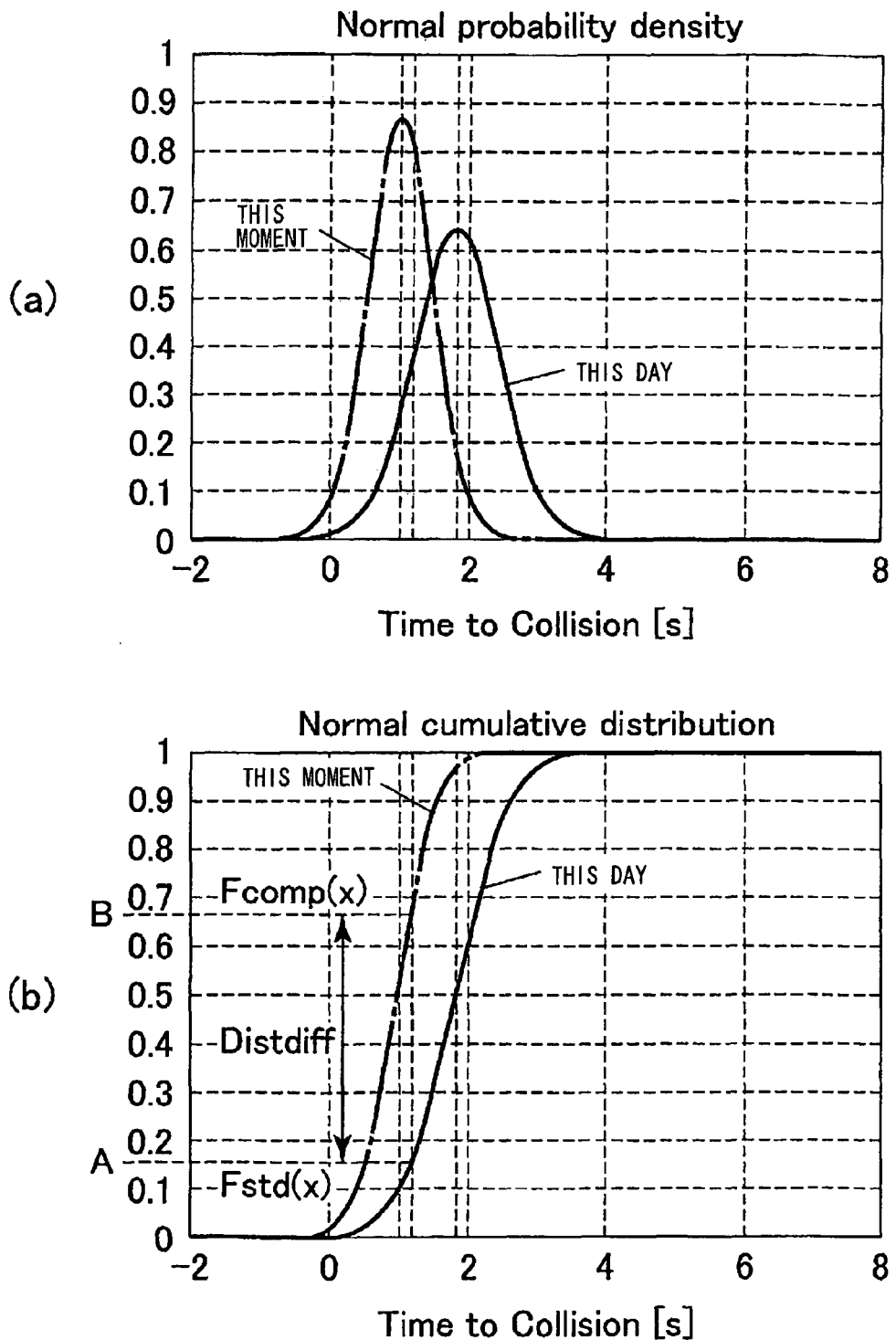

FIGS. 7(a) and (b) show probability density distribution and cumulative distribution calculated based on the results obtained through actual experiments on the public roads. In FIG. 7(a), probability density distribution of time to contact TTC at the accelerator pedal off time approximated by normal distribution is shown in dashed-dotted line using the mean value Mean_x(n) and the standard deviation Stdev_x(n) of "this moment", and probability density distribution of time to contact TTC at the accelerator pedal off time approximated by normal distribution is shown in solid line using the mean value Mean_x(n) and the standard deviation Stdev_x(n) of "this day". In FIG. 7(b), cumulative distribution of "this moment" is shown in dashed-dotted line, and that of "this day" is shown in solid line. In FIGS. 7(a) and (b), the mean value Mean_x(n) of time to contact TTC at the accelerator pedal off time of "this moment"=1.22, the standard deviation Stdev_x(n) thereof=0.80, the mean value Mean_x(n) of time to contact TTC at the accelerator pedal off time of "this day"=1.63, and the standard deviation Stdev_x(n) thereof=1.00.

At first, the comparison value $x_{std}$ is calculated using the following equation (8) from mean value Mean_std and standard deviation Stdev_std of reference distribution.

$$x_{std} = \text{Mean\_std} - \text{Stdev\_std} \quad \text{(Equation 8)}$$

The comparison value $x_{std}$ is a value of time to contact TTC that indicates the point in which reference distribution and comparison distribution are compared, which corresponds to the positions shown in dashed line in FIGS. 7(a) and (b).

Next, the value of cumulative distribution at the comparison value $x_{std}$ of reference distribution is calculated. A probability density function f(x) of normal distribution is calculated using the following equation (9), where the mean value is denoted by μ and the standard deviation is denoted by σ (refer to FIG. 7(a)).

$$f(x) = \frac{1}{\sigma\sqrt{2\pi}} e^{\left(-\frac{(x-\mu)^2}{2\sigma^2}\right)} \quad \text{(Equation 9)}$$

The probability density function f(x) calculated using equation (9) is integrated to give a cumulative distribution function F(x) as expressed in the following equation (10) (refer to FIG. 7(b)).

$$F(x) = \int \frac{1}{\sigma\sqrt{2\pi}} e^{\left(-\frac{(x-\mu)^2}{2\sigma^2}\right)} dx \quad \text{(Equation 10)}$$

Probability $F_{std}(x)$ of cumulative distribution in comparison value $x_{std}$ is calculated using the following equation (11), where the mean value of the reference distribution is denoted by $\mu_{std}$ and the standard deviation thereof is denoted by $\sigma_{std}$.

$$F_{std}(x) = \int \frac{1}{\sigma_{std}\sqrt{2\pi}} e^{\left(-\frac{(x-\mu_{std})^2}{2\sigma_{std}^2}\right)} dx \quad \text{(Equation 11)}$$

Next, the value of cumulative distribution in the comparison value $x_{std}$ of comparison distribution is calculated. A probability $F_{comp}(x)$ of cumulative distribution in comparison value $x_{std}$ is calculated using the following equation (12), where the mean value of the comparison distribution is denoted by $\mu_{comp}$ and the standard deviation thereof is denoted by $\sigma_{comp}$.

$$F_{comp}(x) = \int \frac{1}{\sigma_{comp}\sqrt{2\pi}} e^{\left(-\frac{(x-\mu_{comp})^2}{2\sigma_{comp}^2}\right)} dx \quad \text{(Equation 12)}$$

The difference between the probability $F_{std}(x)$ of cumulative distribution of the reference and the probability $F_{comp}(x)$ of cumulative distribution of the comparison target is calculated using the following equation (13) as the degree of deviation $\text{Dist}_{diff}$ of "this moment" relative to "this day".

$$\text{Dist}_{diff} = F_{comp}(x) - F_{std}(x) \quad \text{(Equation 13)}$$

It is indicated that as degree of deviation $\text{Dist}_{diff}$ increases in a positive direction, the operation of the driver of "this moment" is biased in the direction in which time to contact TTC is short more than that of "this day" is, i.e., in a more risky direction. It is indicated that as degree of deviation $\text{Dist}_{diff}$ increases in a negative direction, the operation of the driver of "this moment" is biased in the direction in which time to contact TTC is long more than that of "this day" is, i.e., in a less risky direction. Degree of deviation $\text{Dist}_{diff}$ becomes zero when the driver is always engaged in an operation with the same follow-up characteristics.

In step S128, the controller 300 also calculates degree of deviation $\text{Dsit}_{diff}$ of "this moment" relative to "usual". In this case, distribution of TTC at the accelerator pedal off time of "usual" is used as a distribution of reference indicating long-duration action distribution, and distribution of time to contact TTC at the accelerator pedal off time of "this moment" is used as a distribution of comparison target indicating short-duration action distribution. Then, the probability $F_{std}(x)$ of cumulative distribution of "usual" and the probability $F_{comp}(x)$ of cumulative distribution of "this moment" are used to calculate the degree of deviation $\text{Dist}_{diff}$ of "this moment" relative to "usual" using the above described equation (13).

Thus, in step S128, the controller 300 calculates each of the degrees of deviation $\text{Dist}_{diff}$ of "this moment" relative to "this day" and of "this moment" relative to "usual", and then the flow of control proceeds to step S130. In step S130, as is the case with the processing executed in step S128, the controller 300 calculates degree of deviation $\text{Dist}_{diff}$ of "this day" relative to "usual". It is to be noted that here distribution of time to contact TTC at the accelerator pedal off time of "usual" is used as a distribution of reference indicating a long-duration action distribution, and distribution of time to contact TTC at the accelerator pedal off time of "this day" is used as a distribution of comparison target indicating a short-duration action distribution.

In the following step S132, as is the case with the processing executed in step S128, the controller 300 calculates degree of deviation $\text{Dist}_{diff}$ of "usual" relative to "general public". It is to be noted that here distribution of time to contact TTC at the accelerator pedal off time of "general public" is used as a distribution of reference indicating a long-duration action distribution, and distribution of time to contact TTC at the accelerator pedal off time of "usual" is used as a distribution of comparison target indicating a short-duration action distribution. An appropriate value is set in advance as a fixed value for the driving characteristic value of "general public", i.e., the mean value and the standard deviation of time to contact TTC at the accelerator pedal off time.

Thus, after drive diagnosis of the driver is carried out in step S120 using data obtained in a plurality of different time spans, the flow of control proceeds to step S140. It is to be noted that for the sake of simplicity, degree of deviation $\text{Dist}_{diff}$ of "this moment" relative to "usual" will be denoted by Dist_1a, degree of deviation $\text{Dist}_{diff}$ of "this moment" relative to "this day" will be denoted by Dist_1b, degree of deviation $\text{Dist}_{diff}$ of "this day" relative to "usual" will be denoted by Dist_2, and degree of deviation $\text{Dist}_{diff}$ of "usual" relative to "general public" will be denoted by Dist_3.

In step S140, the controller 300 determines whether or not to execute alarm presentation processing based on the drive diagnosis result in step S120. Here, the controller 300 makes a decision as to whether or not degree of deviation Dist_1a of "this moment" relative to "usual", degree of deviation Dist_1b of "this moment" relative to "this day" calculated in step S128, or degree of deviation Dist_2 of "this day" relative to "usual" calculated in step S130 is greater than a threshold value (for example, 0.30) to present an alarm. When degree of deviation Dist_1a, Dist_1b, or Dist_2 is greater than the threshold value, the flow of control proceeds to step S150 so that the controller 300 presents the alarm to the driver. After presenting the alarm, the controller 300 terminates the processing.

For example, in the case where degree of deviation Dist_2 of "this day" relative to "usual" is greater than the threshold value, a voice "You are apt to get too close to the leading vehicle ahead" comes out of the speaker 130 together with a beep sound. The voice information contents are set so as to inform the driver that the driver is presently having a vehicle separation shorter than a usual vehicle separation, or so as to encourage the driver to have a vehicle separation longer than the present vehicle separation. It is to be noted that actual voice information is not limited to that. When degree of deviation Dist_1a of "this moment" relative to "usual" or degree of deviation Dist_1b of "this moment" relative to "this day" is greater than the threshold value, too, pre-set appropriate voice information comes out.

If a negative decision is made in step S140 and the alarm is not presented, the flow of control proceeds to step S160 and the controller 300 determines whether or not to execute instruction presentation processing based on the drive diagnosis result in step S120. Here, the controller 300 makes a decision as to whether or not degree of deviation Dist_3 of "usual" relative to "general public" calculated in step S132 is smaller than a threshold value (for example, 0.07) used to determine whether or not to present an instruction (improvement suggestion). The threshold value used to determine whether or not to present an instruction is an appropriately pre-set value within whose range the degree of deviation of the same driver substantially always falls. The above-described value "0.07" has been set based on the results of experiments using a real vehicle and 15 test objects. According to the experiment results, the degree of deviation calculated per test object is always equal to or less than 0.07.

If Dist_3 is smaller than the threshold value, the flow of control proceeds to step S170 and the controller 300 presents an instruction to the driver (improvement suggestion). After presenting the instruction, the controller 300 terminates the processing.

For instance, as instruction presentation contents, the controller 300 outputs a display and a voice that praise the drive operation of the driver. For example, degree of deviation Dist_3 of "usual" is converted into a score and displayed. More specifically, a value having been obtained by reversing the sign of degree of deviation Dist_3 and by adding 50 thereto is displayed on the display unit 180 as a score of usual drive operation of the driver. In other words, a driver who tends to have a higher risk scores 50 points or less, while a driver who drives safely scores 50 points or more. It is to be noted that the score is expressed in a range from 0 to 100: if a score obtained by converting degree of deviation Dist_3 is greater than 100, the score displayed to the driver is 100 points, while a score obtained by converting degree of deviation Dist_3 is smaller than 0, the score displayed to the driver is 0 points.

Figure 8:
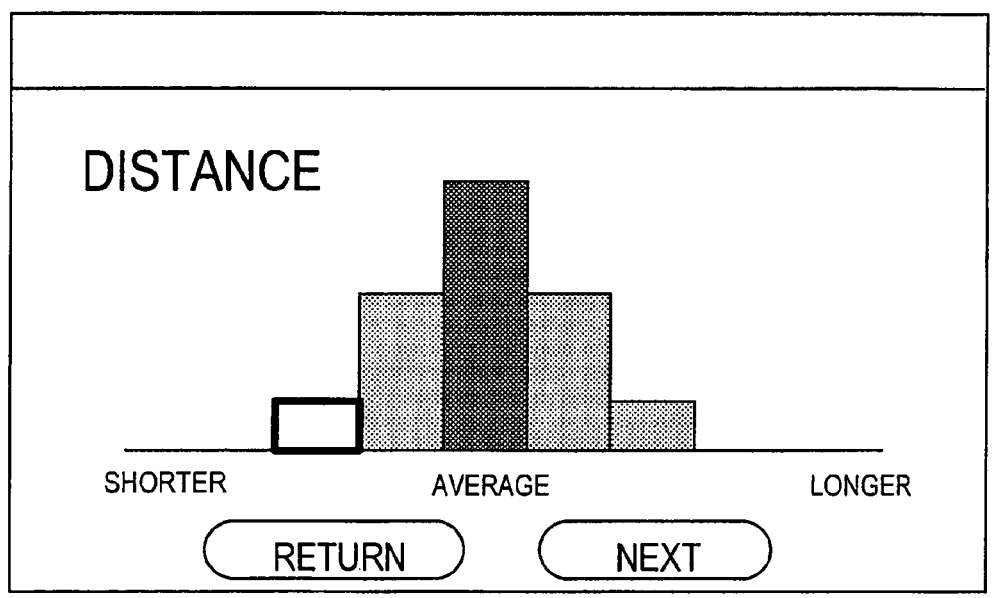

As shown in FIG. 8, distribution of vehicle separation of general public is schematically displayed on the display unit 180 so as to inform the driver of the vehicle separation of "usual" of the driver in comparison with that of general public. FIG. 8 indicates that vehicle separation of the driver is longer than the mean value of vehicle separation of general public by two grades, informing the driver of visual information that the driver has more safety-oriented driving characteristics than general public has.

In addition, through a voice coming out of the speaker 130, the controller 300 informs the driver that usual vehicle separation of the driver is a longer than that of general public, therefore the driver is an excellent driver who performs follow-up traveling safely. For example, a voice "You are driving carefully. Keep it up!" comes out. Thus, the controller 300 outputs a display and a voice so as to inform the driver that the follow-up driving characteristics of the driver is better than those of general public driver and encourage the driver to keep up the good operation or improve his operation.

It is to be noted that although the above examples of displays and voices include an expression "vehicle separation", with which the driver is familiar, displays and voices may include an expression "time headway". Contents of displays and voices are not limited to the above examples as long as displays and voices effectively convey operational characteristics to the driver so as to alert the driver to prevent the operation from being in a risky state and so as to suggest further improvement in operation.

Figure 9:
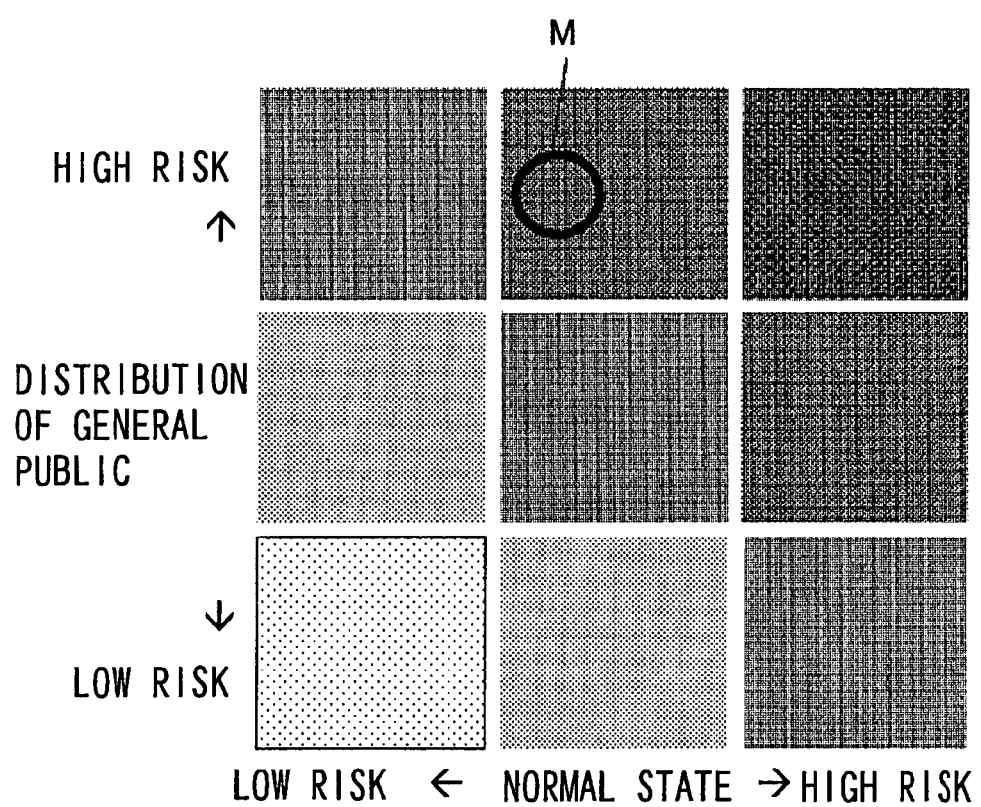

Another example of display based on drive diagnosis result is shown in FIG. 9. In FIG. 9, the vertical axis represents personal characteristics of the driver relative to driving characteristics of general public, and the horizontal axis represents the current state of the driver relative to usual driving characteristics of the driver. Here, as described earlier, time to contact TTC at the point of time of the accelerator pedal off operation from follow-up traveling may be used as driving characteristics. When degree of deviation of "this day" relative to "usual" calculated in step S130 is great, a marker M shifts rightward, i.e., in a direction of high risk. When degree of deviation of "usual" relative to "general public" calculated in step S132 is great, the marker M shifts upward, i.e., in a direction of high risk.

Thus, in the display example shown in FIG. 9, the drive diagnosis result on the basis of "general public" and that of "usual", i.e., the drive diagnosis result on the basis of personal characteristics of the driver are plotted on a two-dimensional map configured with two axes. It is to be noted that the horizontal axis may represent degree of deviation of "this moment" relative to "this day" or that of "this moment" relative to "usual". In addition, the vertical axis and the horizontal axis may be switched with each other and displayed.

Furthermore, as shown in FIG. 9, the two-dimensional map may be divided into a plurality of blocks in different colors for each of them so that the driver easily understands where the driving characteristics of the driver is plotted. For example, the top-right block of FIG. 9 may be displayed in dark color, e.g. dark red, and the bottom-left block may be displayed in subtle color, e.g. pastel blue, using color gradation therebetween.

The following operations and advantageous effects can be achieved in the first embodiment explained above.

(1) The driving assistance system 4 for vehicle calculates an index for drive diagnosis based on traveling condition of the vehicle and drive operation by the driver and diagnoses drive operation of the driver from the calculated index. In addition, the driving assistance system 4 for vehicle evaluates drive diagnosis result in accordance with an evaluation criterion so as to set information provision contents and perform information provision to the driver with the set contents. This enables provision of drive diagnosis result that improves the convincingness of the driver.

(2) Information provision contents that convince the driver well can be set by evaluating drive diagnosis result in accordance with at least two evaluation criteria and setting the contents of information provision.

(3) The driving assistance system 4 for vehicle uses a single index so as to carry out drive diagnosis and compares the drive diagnosis using the single index with at least two evaluation criterion values so as to set the contents of information provision. This enables setting of information provision contents that convince the driver well.

(4) At least two evaluation criterion values are set from an evaluation criterion value based on operating condition of a general driver, an evaluation criterion value based on usual operating condition of the driver, and an evaluation criterion value based on driver's operating condition of the day. Thus, since drive diagnosis result is evaluated based on a driver of general public or the driver himself, the driving assistance system 4 for vehicle can set information provision contents that convince the driver well.

(5) Since an alarm is set as a content of information provision when drive diagnosis result falls below a predetermined evaluation criterion value, the driving assistance system 4 for vehicle can alert the driver to prevent the operation from being in a risky state.

(6) Since an operation improvement suggestion is set as a content of information provision when drive diagnosis result exceeds the predetermined evaluation criterion value, the driving assistance system 4 for vehicle can encourage the driver to keep up the good operation or improve it.

(7) Drive diagnosis result is evaluated in accordance with two evaluation criteria and, in response to the evaluation result, the alarm or the operation improvement suggestion is set as a content of information provision. Therefore, the driving assistance system 4 for vehicle can alert the driver to prevent the operation from being in a risky state or encourage the driver to keep up the good operation or improve it appropriately. In this case, the alarm is set when drive diagnosis result falls below a first evaluation criterion value, and the operation improvement suggestion is set when drive diagnosis result exceeds a second evaluation criterion value.

(8) Risk perception characteristics of the driver are detected as an index for drive diagnosis. More specifically, the driving assistance system 4 for vehicle calculates time to contact TTC of the vehicle and the leading vehicle at the time when the accelerator pedal is released. Since time to contact TTC represents period of time until the vehicle and the leading vehicle contact together when the velocity V of the vehicle and the relative vehicle velocity Vr are constant, accurate drive diagnosis is carried out in a follow-up travel scene by using the time to contact TTC as an index indicating characteristics of the driver when the vehicle follows the leading vehicle.

Variation of the First Embodiment

Another calculation method for degree of deviation $\text{Dist}_{\textit{diff}}$ will now be explained. Here, action distribution of long period of time (e.g., "this day") and that of short period of time (e.g., "this moment") are each approximated by normal distribution so as to calculate the size of area of a region in which two normal distributions do not overlap as the degree of deviation $\text{Dist}_{\textit{diff}}$.

Figure 6:
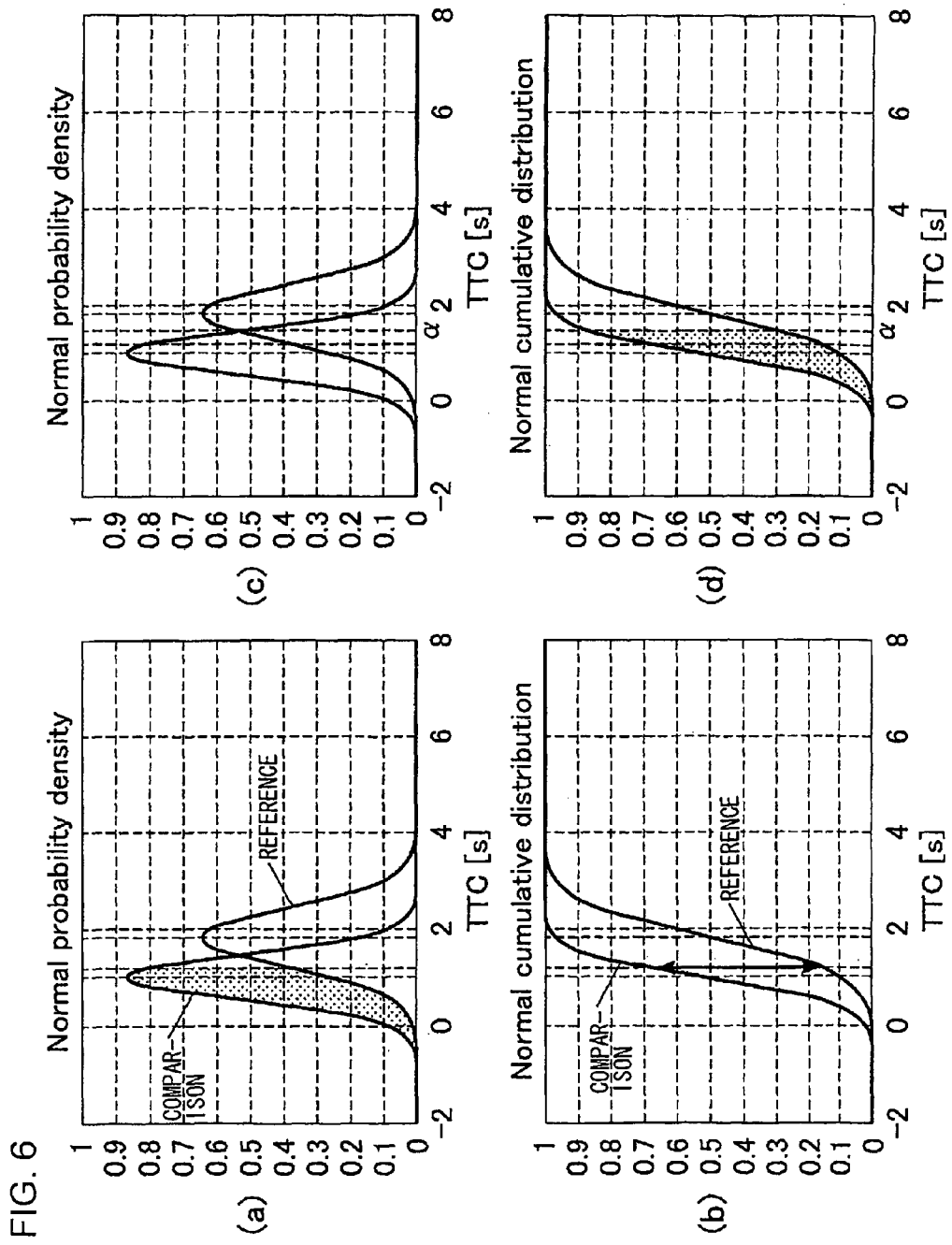

More specifically, as shown in FIGS. 6(*c*) and (*d*), the difference between comparison distribution and reference distribution in a region where time to contact TTC is shorter than an intersection point α of reference distribution and comparison distribution, i.e., the size of area of the comparison distribution running off of the reference distribution, is calculated as the degree of deviation $\text{Dist}_{\textit{diff}}$.

Substituting the mean value $\mu_{std}$ and the standard deviation $\sigma_{std}$ of the reference distribution and the mean value $\mu_{comp}$ and the standard deviation $\rho_{comp}$ of the comparison distribution into equation (10), probability density function $f_{std}(x)$ of the reference distribution and probability density function $f_{comp}(x)$ of the comparison distribution are expressed by the following equations (14) and (15), respectively.

$$f_{std}(x) = \frac{1}{\sigma_{std}\sqrt{2\pi}} e^{\left(-\frac{(x-\mu_{std})^2}{2\sigma_{std}^2}\right)} \quad \text{(Equation 14)}$$

$$f_{comp}(x) = \frac{1}{\sigma_{comp}\sqrt{2\pi}} e^{\left(-\frac{(x-\mu_{comp})^2}{2\sigma_{comp}^2}\right)} \quad \text{(Equation 15)}$$

Calculating simultaneous equations of those equations (14) and (15), frequencies of distributions conform at two points α and β (α<β). In order to obtain the area of the range in which two normal distributions do not overlap in a region where time to contact TTC is shorter than the intersection point α, the intersection point α is substituted into the above equation (11) used to calculate the cumulative distribution function of the reference distribution and the above equation (12) used to calculate the cumulative distribution function of the comparison distribution. Then, the probability $F_{std}(\alpha)$ of the cumulative distribution of the reference distribution is subtracted from the probability $F_{comp}(\alpha)$ of the cumulative distribution of the comparison distribution at the intersection point α.

Degree of deviation $\text{Dist}_{\textit{diff}}$ is calculated using the following equation (16).

$$\text{Dist}_{\textit{diff}} = F_{comp}(\alpha) - F_{std}(\alpha) \quad \text{(Equation 16)}$$

It is to be noted that the area $\text{Dist}_{corr}$ in which the two normal distributions are overlapping is calculated using the following equation (17).

$$\text{Dist}_{corr} = 1 - \text{Dist}_{\textit{diff}} \quad \text{(Equation 17)}$$

Second Embodiment

Figure 10:
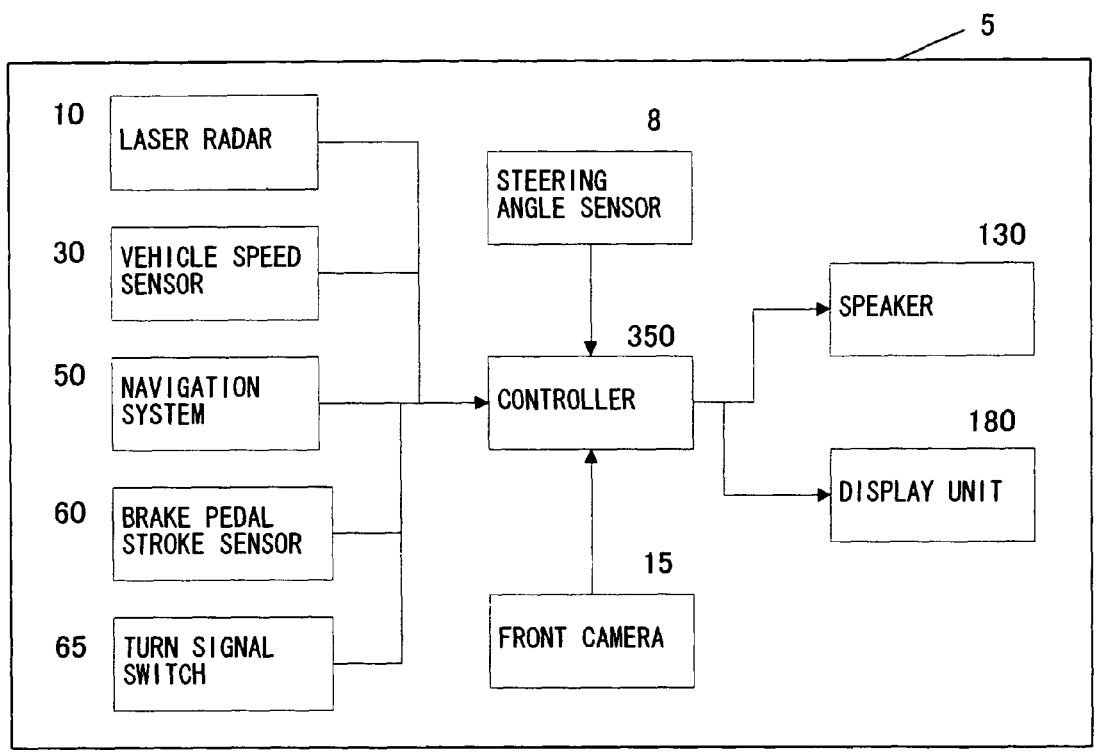

A driving assistance system for vehicle according to the second embodiment of the present invention will now be explained. FIG. 10 shows a control diagram showing the structure of the driving assistance system 5 for vehicle according to the second embodiment. In the second embodiment, the same reference numerals are assigned to units having functions identical to those in the above-described first embodiment, and explanations thereof will be omitted. Therefore, the difference from the first embodiment will now be explained mainly.

As shown in FIG. 10, the driving assistance system 5 for vehicle includes the steering angle sensor 8, the laser radar 10, the front camera 15, the vehicle speed sensor 30, the navigation system 50, the brake pedal stroke sensor 60, the turn signal switch 65, a controller 350, the speaker 130, and the display unit 180.

The steering angle sensor 8 is an angle sensor mounted in the vicinity of, for example, a steering column or a steering wheel (not shown), which detects steering angle by steering of the driver from rotation of a steering shaft. The detected steering angle is output to the controller 350.

The front camera 15 is a small CCD camera, a CMOS camera, or the like mounted on top of the front window, which detects the traffic situation ahead as an image. The controller 350 performs image processing on an image signal received from the front camera 15 and detects lane markings and the like in a region in front of the vehicle. It is to be noted that the region detected by the front camera 15 is approximately ±30 deg horizontally with respect to the vehicle longitudinal centerline, and the front view of the road included in the region is loaded as an image.

The controller 350, which is an electronic control unit constituted by a CPU and CPU peripheral components such as a ROM and a RAM, controls the overall driving assistance system 5 for vehicle. Based on signals received from the steering angle sensor 8, the laser radar 10, the front camera 15, the vehicle speed sensor 30, the navigation system 50, the brake pedal stroke sensor 60, the turn signal switch 65, and the like, the controller 350 analyzes driving characteristics of the driver and carries out drive diagnosis. Then, based on the drive diagnosis result, the controller 350 provides the driver with information. Information provided to the driver includes alarm to the driver, improvement suggestion of the drive operation, and the like. Control contents of the controller 350 are described in detail later.

In the second embodiment, based on traveling conditions of the vehicle and drive operation of the driver, the controller 350 carries out drive diagnosis of the driver, and, in response to the drive diagnosis results, alerts the driver and suggests the driver to improve the drive operation. More specifically, as driving characteristics of the driver, the controller 350 detects period of time (time to lane crossing) until the vehicle deviates from a travel lane along which the vehicle is traveling, and carries out drive diagnosis using the detected driving characteristics as an index. In other words, drive diagnosis is carried out with respect to lateral drive operation of the driver.

Figure 11:
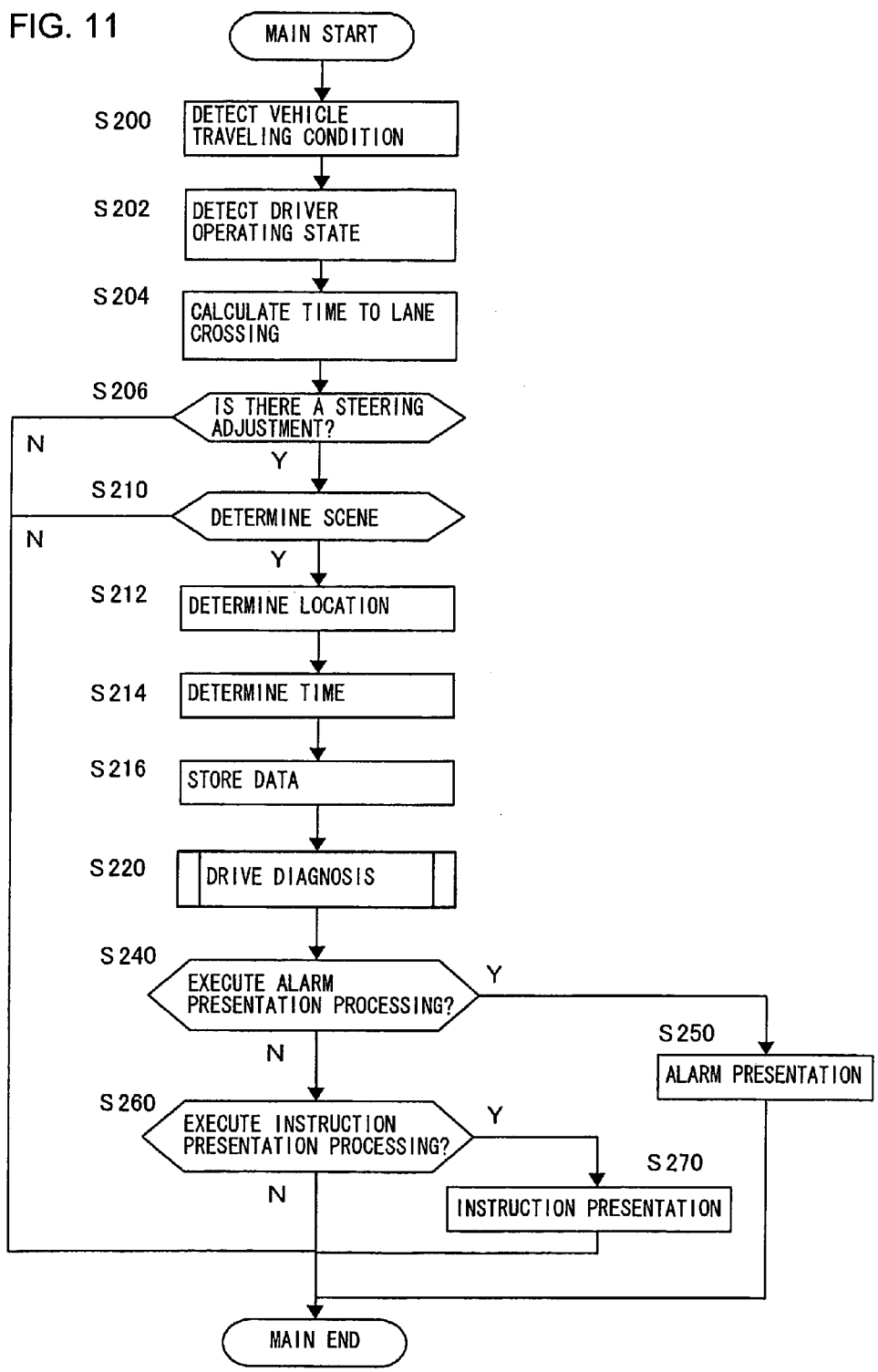

The behavior of the driving assistance system 5 for vehicle according to the second embodiment will now be explained in detail with reference to FIG. 11. FIG. 11 is a flow chart illustrating the procedure of driving assistance control processing performed by the controller 350 achieved in the second embodiment. The processing is performed continuously at regular intervals, e.g., for every 50 msec.

At first, traveling conditions of the vehicle are detected in step S200. Here, as traveling conditions of the vehicle, the controller 350 obtains velocity V of the vehicle detected by the vehicle speed sensor 30, and vehicle separation D and relative vehicle velocity Vr between the vehicle and the leading vehicle detected by the laser radar 10. In addition, the controller 350 performs image processing on an image region in front of the vehicle captured by the front camera 15, and detects the travel lane of the vehicle.

In step S202, the controller 350 detects operating states of the driver. Here, as operating states of the driver, the controller 350 obtains brake pedal operation amount detected by the brake pedal stroke sensor 60 and whether or not the turn signal lever has been operated detected by the turn signal switch 65. In addition, the controller 350 obtains steering angle θ detected by the steering angle sensor 8.

In step S204, the controller 350 calculates time to lane crossing TLC used as lateral driving characteristics of the vehicle of the driver in drive diagnosis described later. Time to lace crossing TLC is a physical quantity representing a period of time until the vehicle deviates from the travel lane in which the vehicle is traveling, and is calculated from the following equation (18) using lateral distance DL from the present position of the vehicle to the lane marking and the velocity V of the vehicle.

$$TLC = DL/V \qquad \text{(Equation 18)}$$

In step S206, a decision is made as to whether or not a steering adjustment has been performed. More specifically, the controller 350 determines that a steering adjustment has been performed in the case where a steering operation has been performed at a steering angle equal to or more than a predetermined value from a steering operation state that has been kept at a substantially constant steering angle. Here, the threshold value used to determine whether or not a steering adjustment has been performed is set in advance according to the width of the road, the number of the lanes, and the like. When determining whether or not a steering adjustment has been performed, the controller 350 selects the threshold value according to the width and the number of the travel lanes and the like obtained by the navigation system 50 and the front camera 15. If the controller 350 makes a decision that a steering adjustment has been performed, the flow of control proceeds to step S210, whilst if any steering adjustment has not been performed, the controller 350 terminates the processing.

In step S210, the traffic scene of the vehicle is determined. The accuracy of drive diagnosis is improved by limiting conditions to vehicle traveling conditions and operating states of the driver, and, in order to reduce discomfort to the driver when information is provided to the driver in response to the drive diagnosis result, traffic scene of the vehicle is determined so that drive diagnosis is carried out solely in a particular traffic scene. More specifically, drive diagnosis is carried out exclusively in a traffic scene in which steering adjustment is performed from a state in which the vehicle is stably traveling.

Examples of conditions of stable traveling conditions are as follows.

(a) There is no brake operation performed by the driver (For example, the brake pedal operation amount is substantially zero)

(b) There is no turn signal lever operation performed by the driver (For example, there is no ON signal received from the turn signal switch 65)

(c) There is little vehicle velocity fluctuation (For example, change in the velocity V of the vehicle is equal to or less than ±10 km/h)

(d) The above states (a) to (c) remain (For example, for five seconds or more)

When the conditions (a) to (d) are all satisfied, the controller 350 determines that the vehicle is in a stable traveling condition, and the flow of control proceeds to step S212 for the controller 350 to carry out drive diagnosis. On the other hand, in the case where any of the conditions (a) to (d) is not satisfied, the controller 350 determines that the traffic scene of the vehicle does not correspond to a particular traffic scene, does not carry out drive diagnosis, and terminates the processing. It is to be noted that conditions in which the controller 350 determines whether or not the vehicle is in a stable traveling condition are not limited to the above conditions (a) to (d). In addition, another detection means may detect whether or not the brake has been operated and whether or not the turn signal lever has been operated.

In step S212, the travel location is determined. In step S214, the present time is recorded. In step S216, based on the rabelling results in steps S212 and S214, the controller 350 stores data used to carry out drive diagnosis of the driver. Here, for example, the present time, i.e., the time at which the vehicle traveled in the link, the travel distance, a driving characteristic index in the link, the number of travels in the link, and the like are written in the structure for each link ID so as to create traffic road database.

In the second embodiment, as a physical quantity representing the driving characteristics of the driver, time to lane crossing TLC when the steering adjustment is performed is used. More specifically, the time until the vehicle deviates from the lane marking present in the direction of steering is used. Calculation methods of driving characteristics and driving characteristic index will be explained in detail in drive diagnosis processing.

In the following step S220, the controller 100 uses the data stored in step S216 so as to carry out drive diagnosis of the driver. Drive diagnosis is carried out based on driving characteristics of the driver when the driver performs steering adjustment from a stable traveling condition. As driving characteristics at steering adjustment, a case in which time to lane crossing TLC when the driver performs steering adjustment is used is explained here as an example.

Figure 12:
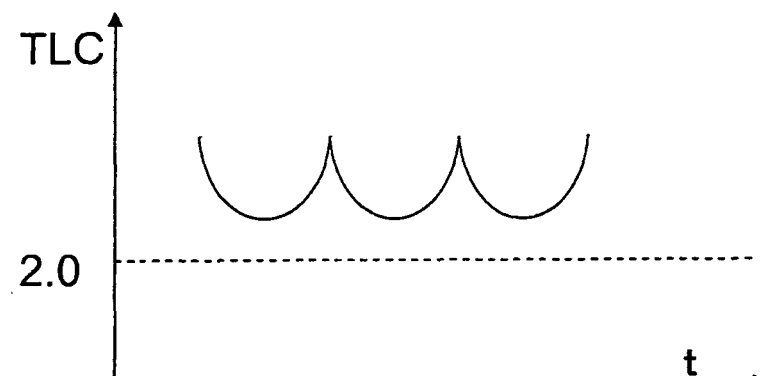
Figure 13:
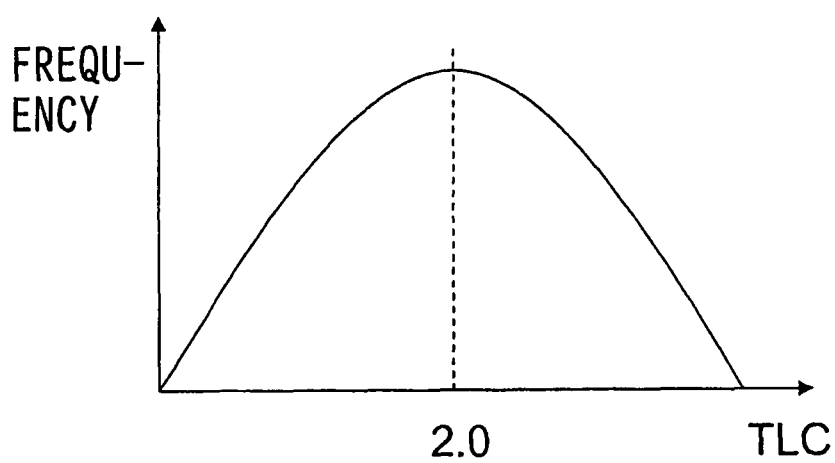
Figure 14:
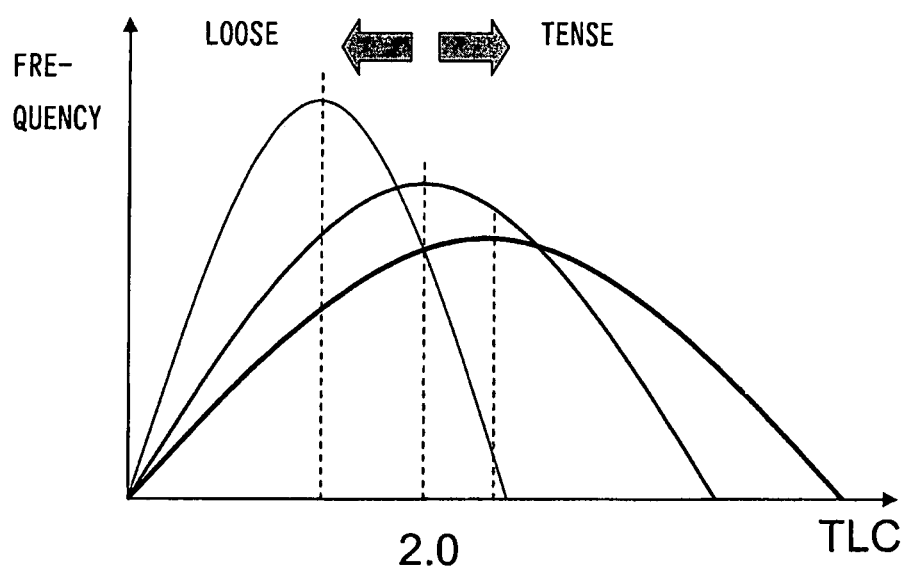

FIG. 12 presents an example of temporal change in time to lane crossing TLC. FIG. 13 presents an example of frequency distribution of time to lane crossing TLC. As shown in FIG. 13, when the vehicle is in a stable traveling condition, distribution of time to lane crossing TLC usually reaches the peak at 2.0 seconds. FIG. 14 presents an example of change in time to lane crossing TLC at the time of steering adjustment. As shown in FIG. 14, time to lane crossing TLC is apt to be short because steering adjustment is delayed when the driver is being engaged in a loose drive operation, on the other hand, time to lane crossing TLC is apt to be long because steering adjustment is prompt when the driver is being engaged in a tense drive operation.

Figure 15:
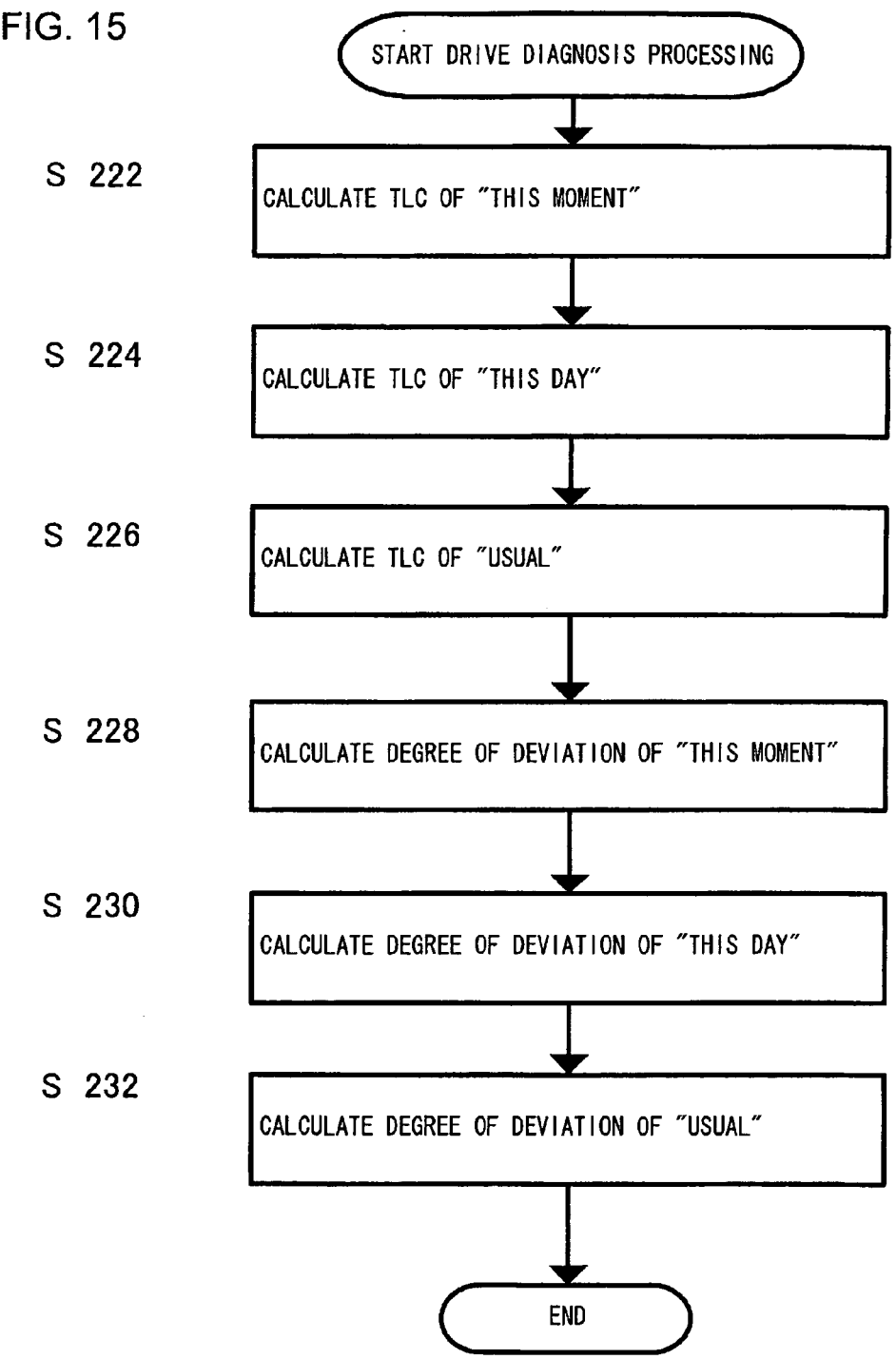

In drive diagnosis processing, the data of each of the layer A to the layer D of the data structure shown in FIG. 4 are used to determine drive operation of the driver in different time spans, i.e., in "this moment", "this day", and "usual". The drive diagnosis processing executed in step S220 will be explained in detail with reference to the flow chart of FIG. 15.

In step S222, driving characteristic values of the driver of "this moment" are calculated so as to carry out drive diagnosis of "this moment" of the driver. As driving characteristic values of the driver, the controller 350 calculates the mean value Mean_x(n) and the standard deviation Stdev_x(n) of time to lane crossing TLC at the time of steering adjustment in a predetermined period of time that defines "this moment". Here, the predetermined period of time that defines "this moment" is, for example, 60 seconds, and, the mean value Mean_x(n) and the standard deviation Stdev_x(n) of time to lane crossing TLC are calculated using data for 60 seconds from the past to the present detected at the time of steering adjustment in the stable traffic scene determined in step S210. The mean value Mean_x(n) and the standard deviation Stdev_x(n) are calculated using equations (5) and (7), respectively, as is the case with the first embodiment.

In step S224, in order to carry out drive diagnosis of "this day" of the driver, the controller 350 calculates follow-up characteristic values of the driver of "this day", i.e., the mean value Mean_x(n) and the standard deviation Stdev_x(n) of time to lane crossing TLC at the time of steering adjustment in a predetermined period of time which defines "this day". Here, the predetermined period of time that defines "this day" is, for instance, 360 seconds, and the mean value Mean_x(n) and the standard deviation Stdev_x(n) of time to lane crossing TLC are calculated using data for 360 seconds from the past to the present detected at the time of steering adjustment in the stable traveling condition determined in step S210.

More specifically, as is the case with "this moment", the equations (5) and (7) are used to calculate the mean value Mean_x(n) and the standard deviation Stdev_x(n). Here, the number of data K=1800, where the predetermined time for "this day" is 360 seconds and the number of samplings is 5 Hz.

In step S226, in order to carry out drive diagnosis of "usual" of the driver, the controller 350 calculates follow-up characteristic values of the driver of "usual", i.e., the mean value Mean_x(n) and the standard deviation Stdev_x(n) of time to lane crossing TLC at the time of steering adjustment in a predetermined period of time which defines "usual". Here, the predetermined period of time that defines "usual" is, for instance, 2160 seconds, and the mean value Mean_x(n) and the standard deviation Stdev_x(n) of time to lane crossing TLC are calculated using data for 2160 seconds from the past to the present detected at the time of steering adjustment in the stable traffic scene determined in step S210.

More specifically, as is the case with "this moment", the equations (5) and (7) are used to calculate the mean value Mean_x(n) and the standard deviation Stdev_x(n). Here, the number of data K=10800, where the predetermined time for "usual" is 2160 seconds and the number of samplings is 5 Hz.

In processing after the following step S228, drive diagnosis of the driver is carried out using the driving characteristic values calculated in steps S222, S224, and S226. Here, the driving characteristics of the driver based on data obtained in different time spans are each compared so as to diagnose the drive operation of the driver based on how much both of the driving characteristics deviate. In other words, in the data structure shown in FIG. 4, an upper layer (e.g., the layer A) is compared with a lower layer (e.g., the layer B) so as to carry out the drive diagnosis.

At first, in step S228, the controller 350 calculates the degree of deviation that indicates how much the driving characteristics of the driver of "this moment" deviate from those of "this day". Here, the degree of deviation of "this moment" relative to "this day" indicates the difference between the distribution of time to lane crossing TLC at the time of steering adjustment of "this day" and that of "this moment". In order to calculate the degree of deviation of "this moment" relative to "this day", the distribution of time to lane crossing TLC at the time of steering adjustment of "this day" is used as a reference distribution which represents a long-duration action distribution, and the distribution of time to lane crossing TLC at the time of steering adjustment of "this moment" is used as a distribution of comparison target which represents a short-duration action distribution.

Here, as is the case with the first embodiment, the above-described equation (13) or equation (16) is used to calculate degree of deviation $Dist_{diff}$. In addition, degree of deviation $Dsit_{diff}$ of "this moment" relative to "usual" is calculated. In this case, distribution of TLC at the time of steering adjustment of "usual" is used as a reference distribution that represents long-duration action distribution, while distribution of TLC at the time of steering adjustment of "this moment" is used as a distribution of comparison target that represents short-duration action distribution. Then, probability $F_{std}(x)$ of cumulative distribution of "usual" and probability $F_{comp}(x)$ of cumulative distribution of "this moment" are used to calculate degree of deviation $Dist_{diff}$ of "this moment" relative to "usual" using the above-described equation (13) or equation (16).

Thus, after the degrees of deviation $Dist_{diff}$ of "this moment" relative to "this day" and "this moment" relative to "usual" are each calculated in step S228, the flow of control proceeds to step S230. In step S230, as is the case with processing executed in step S228, the degree of deviation $Dist_{diff}$ of "this day" relative to "usual" is calculated. It is to be noted that here, the distribution of time to lane crossing TLC at the time of steering adjustment of "usual" is used as a reference distribution that represents long-duration action distribution, whilst the distribution of time to lane crossing TLC at the time of steering adjustment of "this day" is used as a distribution of comparison target that represents short-duration action distribution.

In the following step S232, as is the case with processing executed in step S228, degree of deviation $Dist_{diff}$ of "usual" relative to "general public" is calculated. It is to be noted that here, the distribution of time to lane crossing TLC at the time of steering adjustment of "general public" is used as a reference distribution that represents long-duration action distribution, whilst the distribution of time to lane crossing TLC at the time of steering adjustment of "usual" is used as a distribution of comparison target that represents short-duration action distribution. An appropriate value is set in advance as a fixed value for the driving characteristic values of "general public", i.e., the mean value and the standard deviation of time to lane crossing TLC at the time of steering adjustment.

Thus, after drive diagnosis of the driver is carried out in step S220 using data obtained in a plurality of different time spans, the flow of control proceeds to step S240. It is to be noted that for the sake of simplicity, degree of deviation $Dist_{diff}$ of "this moment" relative to "usual" will be denoted by Dist_1a, degree of deviation $Dist_{diff}$ of "this moment" relative to "this day" will be denoted by Dist_1b, degree of deviation $Dist_{diff}$ of "this day" relative to "usual" will be denoted by Dist_2, and degree of deviation $Dist_{diff}$ of "usual" relative to "general public" will be denoted by Dist_3.

In step S240, the controller 350 determines whether or not to execute alarm presentation processing based on the drive diagnosis result in step S220. Here, a decision is made as to whether or not degree of deviation Dist_1a of "this moment" relative to "usual" or degree of deviation Dist_1b of "this moment" relative to "this day" calculated in step S228 or degree of deviation Dist_2 of "this day" relative to "usual" calculated in step S230 is greater than a threshold value (for instance 0.30) used to determine whether or not to execute an alarm presentation. In the case where degree of deviation Dist_1a, Dist_1b, or Dist_2 is greater than the threshold value, the flow of control proceeds to step S250, and the controller 350 performs an alarm presentation to the driver. After performing the alarm presentation, the controller 350 terminates the processing.

For example, in the case where degree of deviation Dist_2 of "this day" relative to "usual" is greater than the threshold value, a voice "Be aware of lane crossing" comes out of the speaker 130 together with a beep sound. The voice information contents are set so as to inform the driver that the driver presently has some delay in starting a steering adjustment, or so as to encourage the driver to have a stable steering operation. It is to be noted that the actual voice information is not limited to that. In the case where degree of deviation Dist_1a of "this moment" relative to "usual" or degree of deviation Dist_1b of "this moment" relative to "this day" is greater than the threshold value, too, pre-set appropriate voice information comes out.

If a negative decision is made in step S240 and the alarm is not presented, the flow of control proceeds to step S260 and the controller 350 determines whether or not to execute instruction presentation processing based on the drive diagnosis result in step S220. Here, a decision is made as to whether or not degree of deviation Dist_3 of "usual" relative to "general public" calculated in step S232 is smaller than a threshold value (for example, 0.07) used to determine whether or not to present an instruction (improvement suggestion). The threshold value used to determine whether or not to present an instruction is an appropriately pre-set value within whose range the degree of deviation of the same driver substantially always falls. The above-described value "0.07" has been set based on the results of experiments using a real vehicle and 15 test objects. According to the experiment results, the degree of deviation calculated per test object is always equal to or less than 0.07.

If Dist_3 is smaller than the threshold value, the flow of control proceeds to step S270, and the controller 350 presents an instruction to the driver (improvement suggestion). After presenting the instruction, the controller 350 terminates the processing.

For instance, as instruction presentation contents, the controller 350 outputs a display and a voice that praise the drive operation of the driver. For example, degree of deviation Dist_3 of "usual" is converted into a score and displayed. More specifically, a value having been obtained by reversing the sign of degree of deviation Dist_3 and by adding 50 thereto is displayed on the display unit 180 as a score of usual drive operation of the driver. In other words, a driver who has some delay in steering adjustment scores 50 points or less, whilst a good driver who is engaged in a prompt, stable steering operation scores 50 points or more. It is to be noted that the score is expressed in a range from 0 to 100: if a score obtained by converting degree of deviation Dist_3 is greater than 100, the score displayed is 100 points, while a score obtained by converting degree of deviation Dist_3 is smaller than 0, the score displayed is 0 points.

It is to be noted that the improvement may be suggested in voice. Thus, a display and a voice are output so as to inform the driver that the follow-up driving characteristics of the driver is better than those of general public driver and encourage the driver to keep up the good operation or improve his operation. In addition, a two-dimensional map shown in FIG. 9 may be used to display the drive diagnosis result.

Thus, in the second embodiment explained above, in addition to the advantageous effects according to the first embodiment described above, the following operations and advantageous effects can be achieved.

Risk perception characteristics of the driver are detected as an index for drive diagnosis. More specifically, the driving assistance system 5 for vehicle calculates time to lane crossing TLC until the vehicle deviates from the travel lane when a steering adjustment is performed. Since time to lane crossing TLC represents the period of time from when the vehicle reaches a lane boundary and deviates from its own lane, time to lane crossing TLC is used as an index to represent characteristics of the driver so as to precisely carry out drive diagnosis in terms of whether the driver is being engaged in a loose drive operation or a tense drive operation.

Third Embodiment

A driving assistance system for vehicle according to the third embodiment of the present invention will now be explained. The basic structure of the driving assistance system for vehicle according to the third embodiment is the same as that of the first embodiment presented in FIG. 1. Therefore, the difference from the first embodiment will now be explained mainly.

In the third embodiment, driving characteristics are detected in a state where the vehicle is being engaged in a stable, single travel, and drive diagnosis is carried out using the detected driving characteristics as an index.

Figure 16:
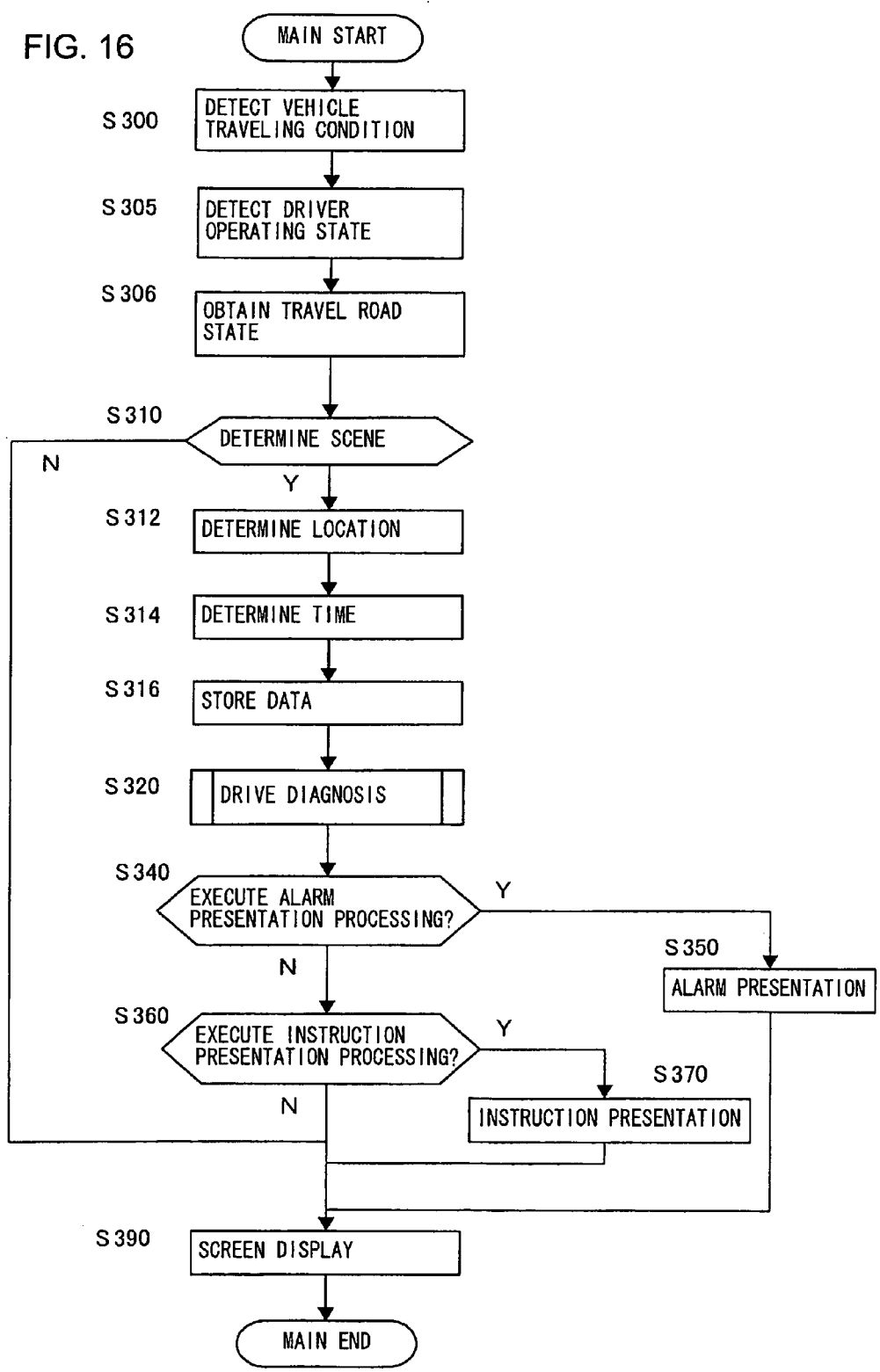

The behavior of the driving assistance system 4 for vehicle according to the third embodiment will now be explained in detail with reference to FIG. 16. FIG. 16 is a flow chart illustrating the procedure of driving assistance control processing performed by the controller 300 achieved in the third embodiment. The processing is performed continuously at regular intervals, e.g., for every 50 msec.

At first, in step S300, traveling conditions of the vehicle are detected. Here, as the traveling conditions of the vehicle, the controller 300 obtains velocity V of the vehicle detected by the vehicle speed sensor 30 and the presence of a leading vehicle detected by the laser radar 10. In step S305, operating states of the driver are detected. Here, as the operating states of the driver, the controller 300 obtains accelerator pedal operation amount detected by the accelerator pedal stroke sensor 55, brake pedal operation amount detected by the brake pedal stroke sensor 60, and whether or not the turn signal lever has been operated detected by the turn signal switch 65.

In step S306, the controller 300 obtains the state of the road along which the vehicle travels. More specifically, as parameters that represent traffic road state, the controller 300 obtains from the navigation system 50 information such as road category (high-standard highway or public road) of the road along which the vehicle travels and velocity limit of the road along which the vehicle is traveling at present.

In step S310, the traffic scene of the vehicle is determined. The accuracy of drive diagnosis is improved by limiting conditions to vehicle traveling conditions and operating states of the driver, and, in order to reduce discomfort to the driver when information is provided to the driver in response to the drive diagnosis result, traffic scene of the vehicle is determined so that drive diagnosis is carried out solely in a particular traffic scene. More specifically, drive diagnosis is carried out exclusively in a traffic scene in which the vehicle is being stably engaged in a single travel.

Examples of conditions of stable, single traveling conditions are as follows.

(a) There is no leading vehicle in the detection region of the laser radar 10

(b) The vehicle is traveling along a road of the same category (c) The vehicle is traveling under the same velocity limit (d) There is no major accelerator pedal operation nor brake pedal operation performed by the driver (For example, operation amount is less than 30% relative to the full operation amount)

(e) There is no turn signal lever operation performed by the driver (For example, there is no ON signal received from the turn signal switch 65)

(f) The above states (a) to (e) remain (For example, for five seconds or more)

When the conditions (a) to (f) are all satisfied, the controller 300 determines that the vehicle is in a stable single traveling condition, and the flow of control proceeds to step S312 for the controller 300 to carry out drive diagnosis. On the other hand, in the case where any of the conditions (a) to (f) is not satisfied, the controller 300 determines that the traffic scene of the vehicle does not correspond to a particular traffic scene, does not carry out drive diagnosis, and terminates the processing. It is to be noted that conditions in which the controller 300 determines whether or not the vehicle is in a stable single traveling condition are not limited to the above conditions (a) to (f). In addition, another detection means may detect whether or not the brake has been operated and whether or not the turn signal lever has been operated.

In step S312, travel location is determined. In step S314, the present time is recorded. In step S316, based on the labeling results in steps S312 and S314, the controller 300 stores data used to carry out drive diagnosis of the driver. Here, for example, the present time, i.e., the time at which the vehicle traveled in the link, the travel distance, a driving characteristic index in the link, the number of travels in the link, and the like are written in the structure for each link ID so as to create traffic road database. In the third embodiment, velocity V of the vehicle detected at the time of single traveling is used as a physical quantity that represents driving characteristics of the driver.

Figure 17:
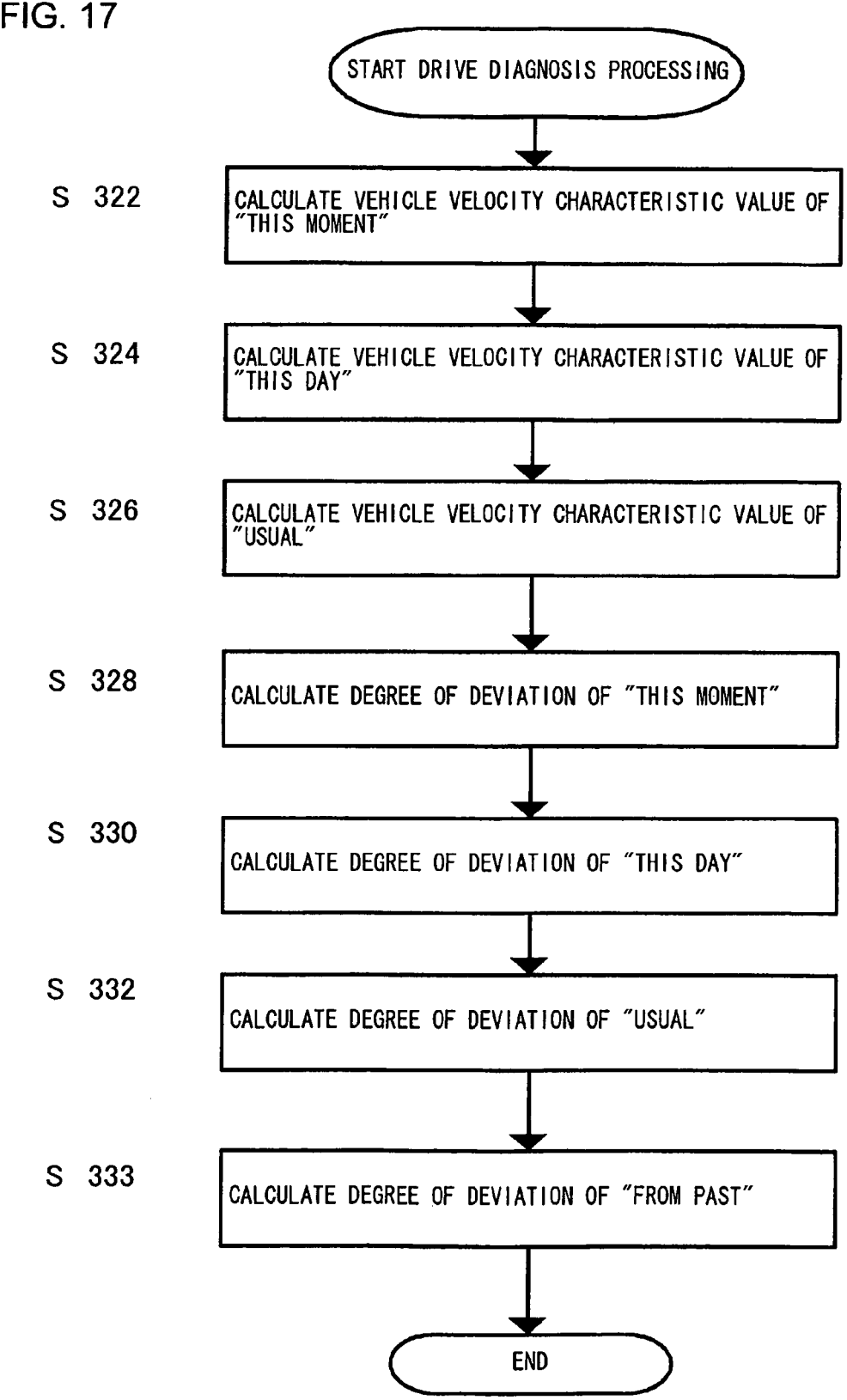

In the following step S320, the data stored in step S316 are used to carry out drive diagnosis of the driver. Drive diagnosis is carried out based on vehicle velocity characteristics in a stable, single traveling condition. In drive diagnosis processing, the data of each of the layer A to the layer D of the data structure shown in FIG. 4 are used to determine drive operation of the driver in different time spans, i.e., in "this moment", "this day", and "usual". The drive diagnosis processing executed in step S320 will be explained in detail with reference to the flow chart of FIG. 17.

In step S322, single traveling vehicle velocity characteristic values of the driver of "this moment" are calculated so as to carry out drive diagnosis of "this moment" of the driver. As vehicle velocity characteristic values of the driver, the controller 300 calculates the mean value Mean_x(n) and the standard deviation Stdev_x(n) of the velocity V of the vehicle in a predetermined period of time that defines "this moment". Here, the predetermined period of time that defines "this moment" is, for example, 60 seconds, and, the mean value Mean_x(n) and the standard deviation Stdev_x(n) of the velocity V of the vehicle are calculated using data for 60 seconds from the past to the present detected in the stable single traveling condition determined in step S310. The mean value Mean_x(n) and the standard deviation Stdev_x(n) are calculated using equations (5) and (7), respectively, as is the case with the seventh embodiment.

In step S324, in order to carry out drive diagnosis of "this day" of the driver, the controller 300 calculates single traveling vehicle velocity characteristic values of the driver of "this day", i.e., the mean value Mean_x(n) and the standard deviation Stdev_x(n) of the velocity V of the vehicle in a predetermined period of time which defines "this day". Here, the predetermined period of time that defines "this day" is, for instance, 360 seconds, and the mean value Mean_x(n) and the standard deviation Stdev_x(n) of the velocity V of the vehicle are calculated using data for 360 seconds from the past to the present detected in the stable single traveling condition determined in step S310.

More specifically, as is the case with "this moment", the equations (5) and (7) are used to calculate the mean value Mean_x(n) and the standard deviation Stdev_x(n). Here, the number of data K=1800, where the predetermined time for "this day" is 360 seconds and the number of samplings is 5 Hz.

In step S326, in order to carry out drive diagnosis of "usual" of the driver, the controller 300 calculates single traveling vehicle velocity characteristic values of the driver of "usual", i.e., the mean value Mean_x(n) and the standard deviation Stdev_x(n) of the velocity V of the vehicle in a predetermined period of time which defines "usual". Here, the predetermined period of time that defines "usual" is, for instance, 2160 seconds, and the mean value Mean_x(n) and the standard deviation Stdev_x(n) of the velocity V of the vehicle are calculated using data for 2160 seconds from the past to the present detected in the stable single traveling condition determined in step S310.

More specifically, as is the case with "this moment", the equations (5) and (7) are used to calculate the mean value Mean_x(n) and the standard deviation Stdev_x(n). Here, the number of data K=10800, where the predetermined time for "usual" is 2160 seconds and the number of samplings is 5 Hz.

In processing after the following step S328, drive diagnosis of the driver is carried out using the driving characteristic values calculated in steps S322, S324, and S326. Here, the driving characteristics of the driver based on data obtained in different time spans are each compared so as to diagnose the drive operation of the driver based on how much both of the driving characteristics deviate. In other words, in the data structure shown in FIG. 4, an upper layer (e.g., the layer A) is compared with a lower layer (e.g., the layer B) so as to carry out the drive diagnosis.

At first, in step S328, the controller 300 calculates the degree of deviation that indicates how much the driving characteristics of the driver of "this moment" deviate from those of "this day". Here, the degree of deviation of "this moment" relative to "this day" indicates the difference between the distribution of the velocity V of the vehicle of "this day" and that of "this moment". In order to calculate the degree of deviation of "this moment" relative to "this day", the distribution of the velocity V of the vehicle of "this day" is used as a reference distribution which represents a long-duration action distribution, and the distribution of the velocity V of the vehicle of "this moment" is used as a distribution of comparison target which represents a short-duration action distribution. Here, as is the case with the seventh embodiment, the above-described equation (13) or equation (16) is used to calculate degree of deviation $Dist_{diff}$.

Thus, after the degrees of deviation $Dist_{diff}$ of "this moment" relative to "this day" and "this moment" relative to "usual" are each calculated in step S328, the flow of control proceeds to step S330. In step S330, as is the case with processing executed in step S328, the degree of deviation $Dist_{diff}$ of "this day" relative to "usual" is calculated. It is to be noted that here, the distribution of the velocity V of the vehicle of "usual" is used as a reference distribution that represents long-duration action distribution, whilst the distribution of the velocity V of the vehicle of "this day" is used as a distribution of comparison target that represents short-duration action distribution.

In the following step S332, as is the case with processing executed in step S328, degree of deviation $Dist_{diff}$ of "usual" relative to "general public" is calculated. It is to be noted that here, the distribution of the velocity V of the vehicle of "general public" is used as a reference distribution that represents long-duration action distribution, whilst the distribution of the velocity V of the vehicle of "usual" is used as a distribution of comparison target that represents short-duration action distribution. An appropriate value is set in advance as a fixed value for the single traveling vehicle velocity characteristic values of "general public", i.e., the mean value and the standard deviation of the velocity V of the vehicle at the time of single traveling.

In step S333, the single vehicle velocity characteristics of "this day" detected in the past are compared with those of this time so as to calculate degree of deviation $\text{Dist}_{diff}$ of "this time" relative to "the past". More specifically, the distribution of the velocity V of the vehicle of "this day" detected in the latest period (for instance, the previous day) is used as a reference distribution that represents long-duration action distribution, whilst the distribution of the velocity V of the vehicle of "this day" detected this time is used as a distribution of comparison target that represents short-duration action distribution, and the above-described equation (13) or equation (16) is used to calculate the degree of deviation $\text{Dist}_{diff}$.

Thus, after drive diagnosis of the driver is carried out in step S320 using data obtained in a plurality of different time spans, the flow of control proceeds to step S340. It is to be noted that for the sake of simplicity, degree of deviation $\text{Dist}_{diff}$ of "this moment" relative to "this day" will be denoted by Dist_1, degree of deviation $\text{Dist}_{diff}$ of "this day" relative to "usual" will be denoted by Dist_2, degree of deviation $\text{Dist}_{diff}$ of "usual" relative to "general public" will be denoted by Dist_3, and degree of deviation $\text{Dist}_{diff}$ of "this day of this time" relative to "this day in the past" will be denoted by Dist_4.

In step S340, the controller 300 determines whether or not to execute alarm presentation processing based on the drive diagnosis result in step S320. Here, a decision is made as to whether or not degree of deviation Dist_1 of "this moment" relative to "this day" calculated in step S328, degree of deviation Dist_2 of "this day" relative to "usual" calculated in step S330, or degree of deviation Dist_4 of "this day of this time" relative to "this day of the past" calculated in step S333 is greater than a threshold value (for instance 0.30) used to determine whether or not to execute an alarm presentation. In the case where degree of deviation Dist_1, Dist_2, or Dist_4 is greater than the threshold value, the flow of control proceeds to step S350, and the controller 300 performs an alarm presentation to the driver. After performing the alarm presentation, the controller 300 terminates the processing.

Figure 18:
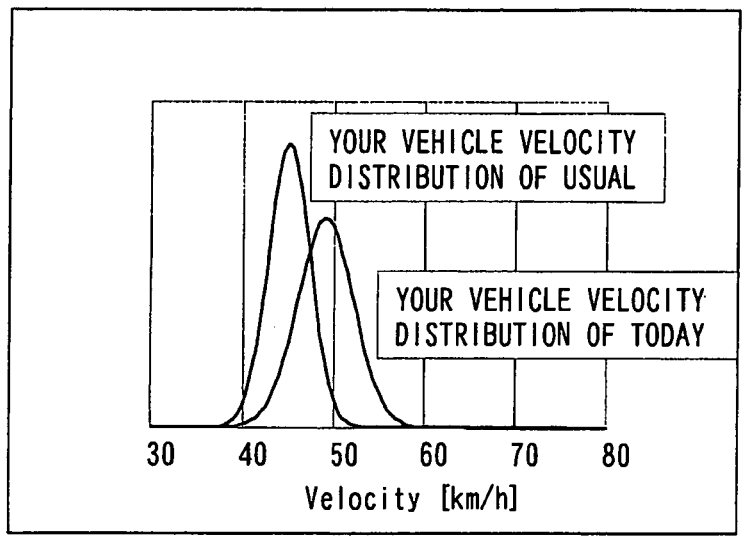

FIG. 18 shows an example of display of alarm presentation in visual information. This display enables the tendency of single traveling vehicle velocity of this day (obtained data result of intermediate-duration) to be compared with that of usual (obtained data result of long-duration). FIG. 18 indicates that vehicle velocity of today tends to be higher than that of usual.

In the case where alarm presentation is performed in audio information, audio information is output from the speaker 130 according to degree of deviation. For instance, in the case where the degree of deviation Dist_2 of "this day" relative to "usual" is greater than the threshold value, a voice "Travel vehicle velocity is higher than usual" is output. In the case where the degree of deviation Dist_1 of "this moment" relative to "this day" is greater than the threshold value, a voice "Travel vehicle velocity is high" is output. In the case where the degree of deviation Dist_4 of "this day of this time" relative to "this day of the past" is greater than the threshold value, a voice "Travel vehicle velocity is higher than before" is output.

If a negative decision is made in step S340 and the alarm is not presented, the flow of control proceeds to step S360 and the controller 300 determines whether or not to execute instruction presentation processing based on the drive diagnosis result in step S320. Here, a decision is made as to whether or not degree of deviation Dist_3 of "usual" relative to "general public" calculated in step S332 is smaller than a threshold value (for example, 0.07) used to determine whether or not to present an instruction (improvement suggestion).

Figure 19:
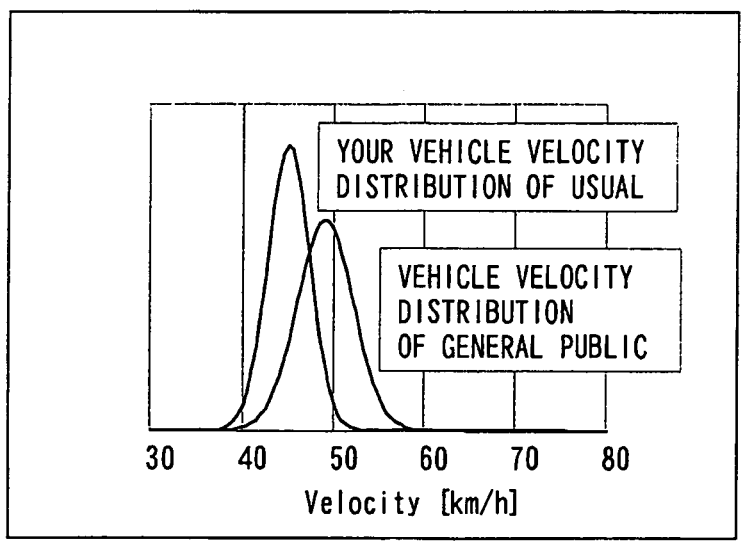

If Dist_3 is smaller than the threshold value, the flow of control proceeds to step S370, and the controller 300 presents an instruction to the driver (improvement suggestion). After presenting the instruction, the controller 300 terminates the processing. FIG. 19 shows an example of display of instruction presentation in visual information. This display enables the vehicle velocity characteristics of single traveling of usual of the driver to be compared with those of general public. FIG. 19 indicates that vehicle velocity of the driver has characteristics lower than those of general public. In addition, degree of deviation Dist_3 of "usual" may be converted into a score and displayed. More specifically, a value having been obtained by reversing the sign of degree of deviation Dist_3 and by adding 50 thereto is displayed on the display unit 180 as a score of usual drive operation of the driver.

In the case where instruction presentation is performed in audio information, for example, a voice "As a result of analysis, your vehicle velocity operation is lower than that of general public" is output so as to inform the driver that the driver is apt to be engaged in traveling at low vehicle velocity habitually and praise drive operation of the driver. In addition, a two-dimensional map shown in FIG. 9 may be used to display the drive diagnosis result.

Thus, in the third embodiment explained above, in addition to the advantageous effects according to the first and the second embodiments described above, the following operations and advantageous effects can be achieved.

Safety awareness and operation preference characteristics of the driver are detected as an index for drive diagnosis. More specifically, since the controller 300 uses the velocity V of the vehicle at the time of single traveling, accurate drive diagnosis is carried out in a traffic scene where vehicle velocity can be set of the driver's own volition when there is no leading vehicle ahead.

Variation of the Third Embodiment

Figure 20:
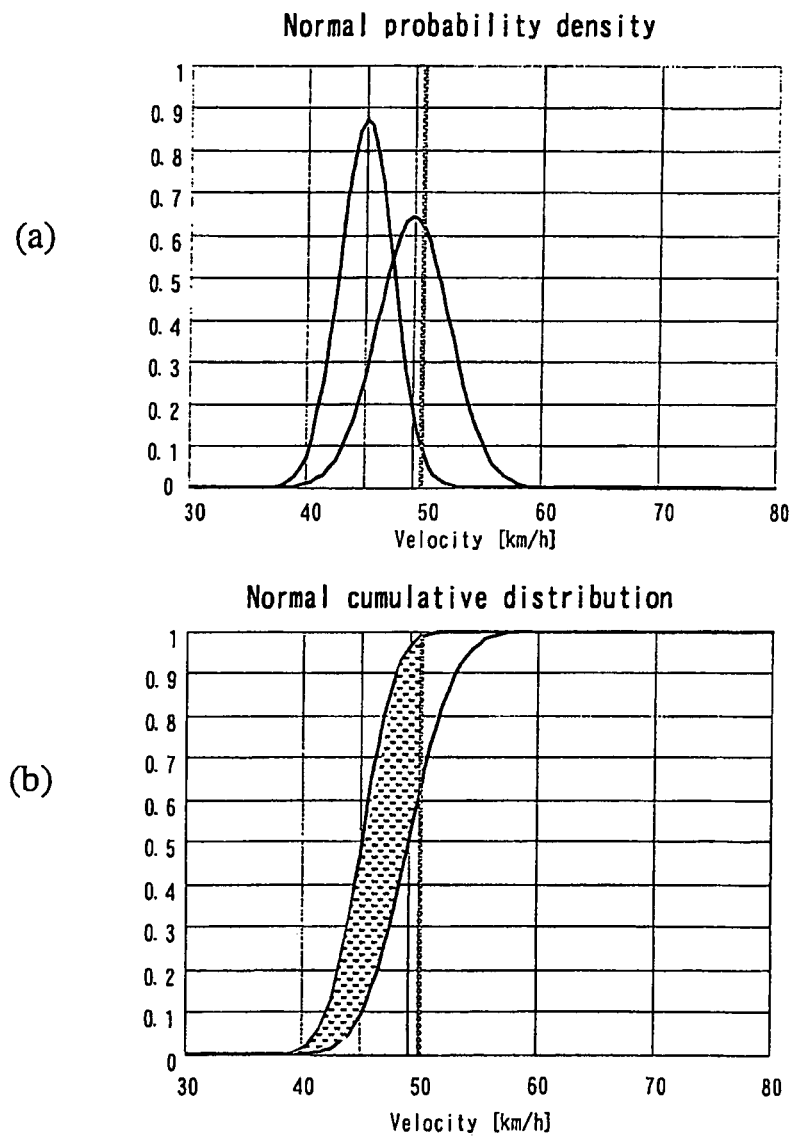

Another calculation method of degree of deviation $\text{Dist}_{diff}$ will be explained now. Here, the difference at the position of "velocity limit" between the reference distribution and the distribution of comparison target is calculated as degree of deviation $\text{Dist}_{diff}$. More specifically, as shown in FIGS. 20(a) and (b), the difference between the comparison distribution and the reference distribution in a region where velocity V of the vehicle is smaller than a velocity limit Vlmt is calculated as the degree of deviation $\text{Dist}_{diff}$.

Probability $F_{std}(x)$ of cumulative distribution in the velocity limit Vlmt is calculated using the following equation (19), where the mean value of the reference distribution is denoted by $\mu_{std}$ and the standard deviation thereof is denoted by $\sigma_{std}$.

$$F_{std}(v_{lmt}) = \int_0^{v_{lmt}} \frac{1}{\sigma_{std}\sqrt{2\pi}} e^{\left(-\frac{(v-\mu_{std})^2}{2\sigma_{std}^2}\right)} dv \quad \text{(Equation 19)}$$

Next, the controller 300 calculates the value of cumulative distribution in the velocity limit Vlmt of comparison distribution. Probability $F_{comp}(x)$ of cumulative distribution in the velocity limit Vlmt is calculated using the following equation (20), where the mean value of the comparison distribution is denoted by $\mu_{comp}$ and the standard deviation thereof is denoted by $\sigma_{comp}$.

$$F_{comp}(v_{lmt}) = \int_0^{v_{lmt}} \frac{1}{\sigma_{comp}\sqrt{2\pi}} e^{\left(-\frac{(v-\mu_{comp})^2}{2\sigma_{comp}^2}\right)} dv \quad \text{(Equation 20)}$$

As the degree of deviation $Dist_{diff}$, the difference between probability $F_{std}(v_{lmt})$ of reference cumulative distribution and probability $F_{comp}(v_{lmt})$ of cumulative distribution of the comparison target is calculated using the following equation (21).

$$Dist_{diff} = F_{comp}(v_{lmt}) - F_{std}(v_{lmt}) \quad \text{(Equation 21)}$$

Fourth Embodiment

Figure 21:
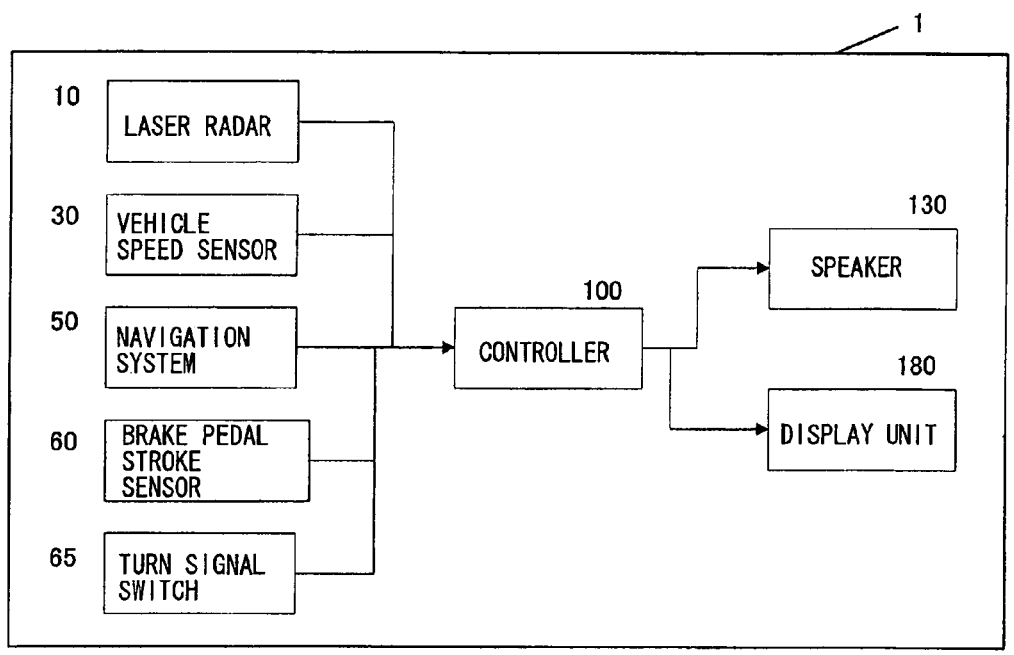
Figure 22:
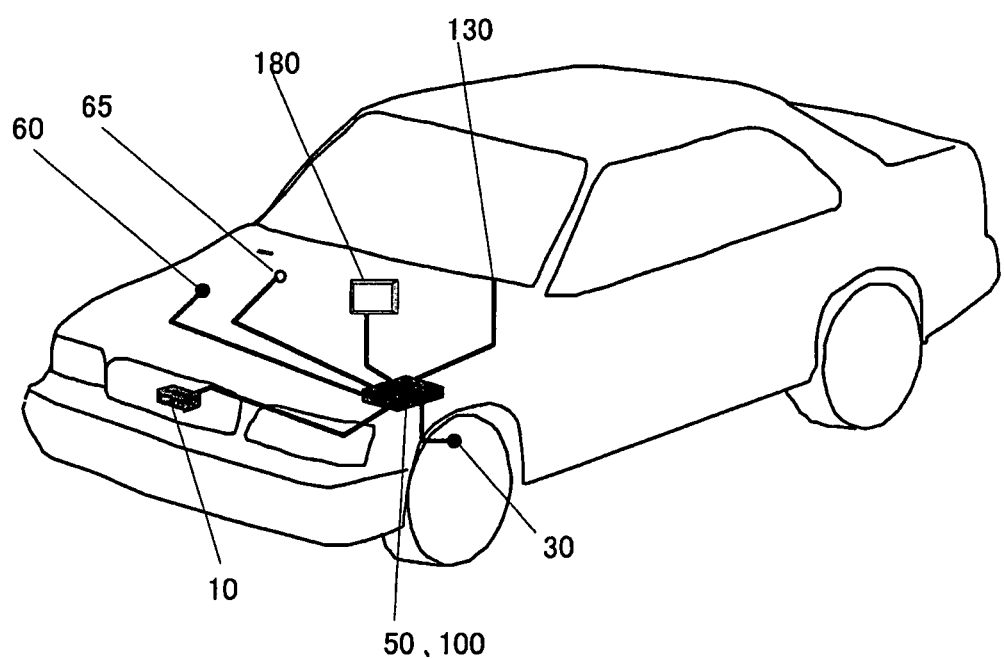

A driving assistance system for vehicle according to the fourth embodiment of the present invention will now be explained with reference to the drawings. FIG. 21 is a control diagram showing the structure of the driving assistance system 1 for vehicle according to the fourth embodiment of the present invention. FIG. 22 is a view illustrating how the driving assistance system 1 for vehicle is arranged on an automobile.

At first, the structure of the driving assistance system 1 for vehicle will now be explained.

A laser radar 10, mounted to a front grille, bumper, or the like of the vehicle, propagates infrared light pulses horizontally so as to scan the region ahead of the vehicle. The laser radar 10 measures the reflected radiation of the infrared light pulses having been reflected by a plurality of obstacles ahead (usually, the rear end of a leading vehicle) and detects a vehicle separation or a distance to the plurality of obstacles and a relative velocity from arrival time of the reflected radiation. The detected vehicle separation and the relative velocity are output to a controller 100. The region ahead of the vehicle scanned by the laser radar 10 is approximately ±6 deg to each side of an axis parallel to the vehicle longitudinal centerline, and the objects existing in the range are detected.

A vehicle speed sensor 30 measures the number of wheel revolutions or the number of revolutions of the output side of the transmission so as to detect the vehicle speed of the vehicle, and outputs the detected speed thereof to the controller 100.

A navigation system 50, including a GPS (Global Positioning System) receiver, a map database, a display monitor, and the like, is a system to perform a path search, a routing assistance, and the like. Based on current location of the vehicle obtained via the GPS receiver and road information stored in the map database, the navigation system 50 obtains information on the class, the width, and the like of the road along which the vehicle travels.

A brake pedal stroke sensor 60 detects the depression amount of the brake pedal by the driver (degree of operation of the brake pedal). The brake pedal stroke sensor 60 outputs the detected brake pedal operation amount to the controller 100. A turn signal switch 65 detects whether or not the driver has operated a turn signal lever and outputs a detection signal to the controller 100.

The controller 100, constituted by a CPU and CPU peripheral components such as a ROM and a RAM, controls the overall driving assistance system 1 for vehicle. Based on signals received from the laser radar 10, the vehicle speed sensor 30, the brake pedal stroke sensor 60, the turn signal switch 65, and the like, the controller 100 analyzes driving characteristics of the driver and carries out drive diagnosis. Then, based on the drive diagnosis result, the controller 100 provides the driver with information. Information provided to the driver includes alarm to the driver, suggestion to improve the drive operation, and the like. Control contents of the controller 100 are described in detail later.

A speaker 130 is used to provide the driver with information in a beep sound or in a voice, in response to a signal from the controller 100. A display unit 180 is used to display an alarm or improvement suggestion to operation of the driver, in response to a signal from the controller 100. For example, the display monitor of the navigation system 50, a combination meter, and the like can be used as the display unit 180.

Next, the behavior of the driving assistance system 1 for vehicle according to the fourth embodiment will be explained, beginning with the outline thereof.

Based on traveling conditions of the vehicle and drive operation of the driver, the controller 100 carries out drive diagnosis of the driver, and, in response to the drive diagnosis result, alerts the driver and suggests the driver to improve the drive operation. More specifically, the controller 100 detects driving characteristics in the case where the vehicle is following a leading vehicle and carries out drive diagnosis using the detected driving characteristics as an index. Then, if the drive diagnosis result indicates that the driver is driving riskier than he usually is, i.e., if the drive operation of the driver is deviated into a riskier state, the controller 100 alerts the driver so as to inform the driver thereof before the drive operation of the driver goes into a high-risk state. On the other hand, if the drive diagnosis result indicates that the drive operation of the driver is better than the standard of drive operation of general public, the controller 100 provides the driver with information so as to encourage safer driving or suggest improvement.

Thus, the driving assistance system 1 for vehicle achieved in the fourth embodiment includes three functions, i.e., a function to detect the drive operation of the driver through drive diagnosis, a function to alert the driver in response to the detected result, and a function to give an improvement suggestion to the driver in response to the detected result. Accordingly, the driving assistance system 1 for vehicle allows and encourages the driver to see his own driving characteristics objectively, and provides the driver with an advice depending upon the driving characteristics so that the driver can learn a driving method to reduce the risk.

Figure 23:
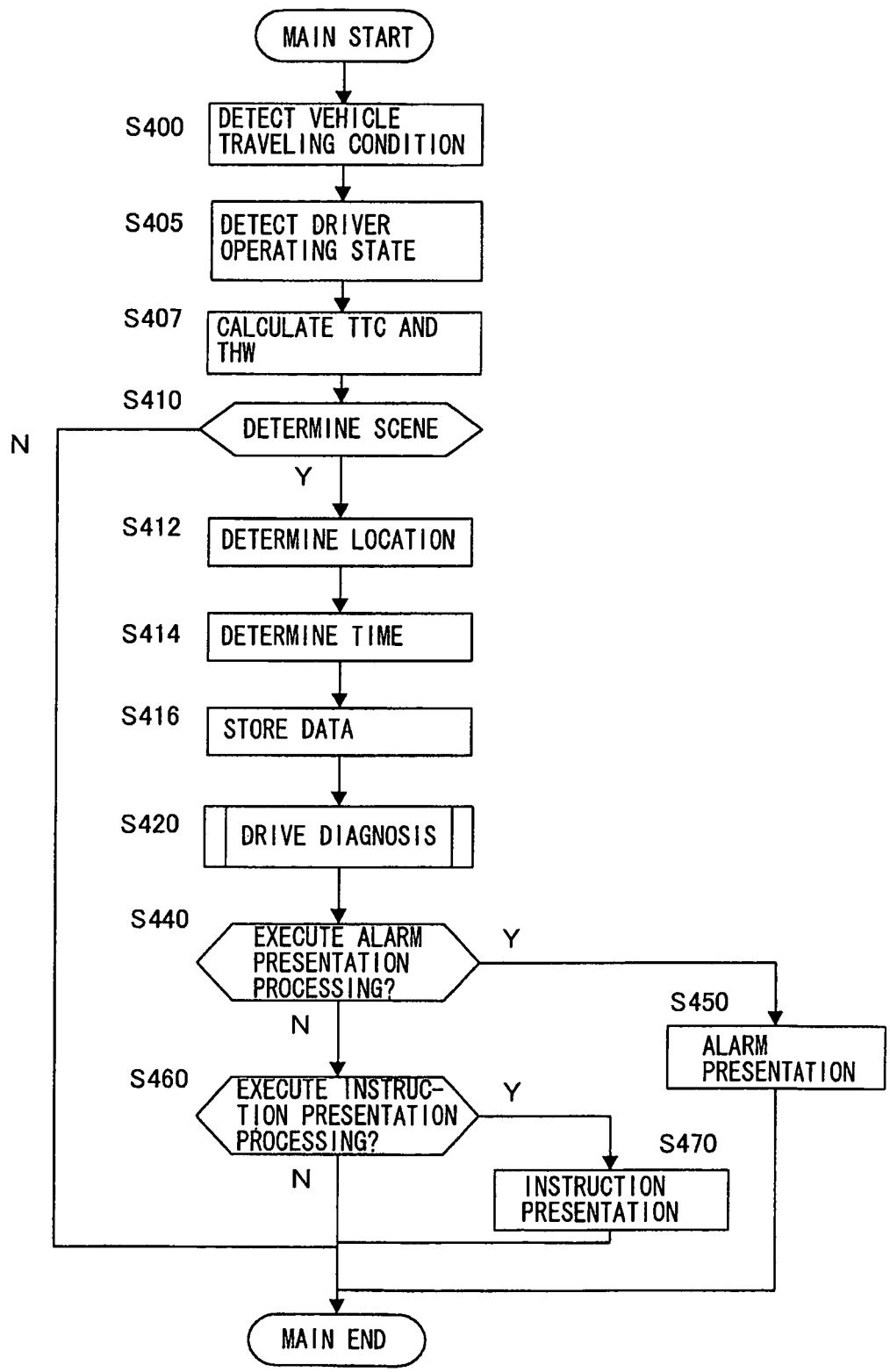

The behavior of the driving assistance system 1 for vehicle according to the fourth embodiment will be explained in detail with reference to FIG. 23. FIG. 23 is a flow chart of the procedure of driving assistance control processing performed by the controller 100 achieved in the fourth embodiment. The processing is performed continuously at regular intervals, e.g., for every 50 msec.

At first, traveling conditions of the vehicle are detected in step S400. Here, as the traveling conditions of the vehicle, the controller 100 obtains velocity V of the vehicle detected by the vehicle speed sensor 30, and vehicle separation D and relative vehicle velocity Vr between the vehicle and the leading vehicle detected by the laser radar 10. In step S405, operating states of the driver are detected. Here, as the operating states of the driver, the controller 100 obtains a brake pedal operation amount detected by the brake pedal stroke sensor 60 and whether or not the turn signal lever has been operated detected by the turn signal switch 65.

In step S407, in order to determine traffic scene of the vehicle described later, the controller 100 calculates time to contact TTC and time headway THW between the vehicle and the leading vehicle. Time to contact TTC is a physical quantity representing a current degree of closeness of the vehicle relative to the leading vehicle. Time to contact TTC indicates the number of seconds before the vehicle separation D becomes zero and the vehicle and the leading vehicle contact with each other if the current traveling condition remains, i.e., if the velocity V of the vehicle and the relative vehicle velocity Vr are constant. Time to contact TTC is expressed by the following equation (22).

$$TTC=D/Vr \qquad \text{(Equation 22)}$$

Time headway THW is a physical quantity representing a degree of influence on time to contact TTC by a predicted future change in velocity of the leading vehicle when the vehicle is following the leading vehicle, i.e., a degree of influence on the assumption that the relative vehicle velocity Vr changes. Time headway THW, which is the quotient of vehicle separation D divided by the velocity V of the vehicle, represents time until the vehicle reaches the current position of the leading vehicle. Time headway THW is expressed by the following equation (23).

$$THW=D/V \qquad \text{(Equation 23)}$$

In step S410, the traffic scene of the vehicle is determined. The accuracy of drive diagnosis is improved by limiting conditions to vehicle traveling conditions and operating states of the driver, and, in order to reduce discomfort to the driver when information is provided to the driver in response to the drive diagnosis result, traffic scene of the vehicle is determined so that drive diagnosis is carried out solely in a particular traffic scene. More specifically, drive diagnosis is carried out exclusively in a traffic scene in which the vehicle is stably following the same leading vehicle.

Examples of conditions of stable follow-up travel scenes are as follows.

(a) The vehicle is following the same leading vehicle (For example, the difference between the current vehicle separation and the previously measured vehicle separation is less than 4 meters)

(b) The vehicle is not approaching rapidly (For example, time to contact TTC is more than 10 seconds)

(c) Time headway THW is equal to or less than a predetermined value (For example, time headway THW is less than four seconds)

(d) There is no brake operation performed by the driver (For example, the brake pedal operation amount is substantially zero)

(e) There is no turn signal lever operation performed by the driver (For example, there is no ON signal received from the turn signal switch 65)

(f) The above states (a) to (e) remain (For example, for five seconds or more)

When the conditions (a) to (f) are all satisfied, the controller 100 determines that the traffic scene of the vehicle is a stable follow-up travel scene, and the flow of control proceeds to step S412 for the controller 100 to carry out drive diagnosis. On the other hand, in the case where any of the conditions (a) to (f) is not satisfied, the controller 100 determines that the traffic scene of the vehicle does not correspond to a particular traffic scene, does not carry out drive diagnosis, and terminates the processing. It is to be noted that conditions in which the controller 100 determines whether or not the traffic scene of the vehicle is a stable follow-up travel scene are not limited to the above conditions (a) to (f). In addition, another detection means may detect whether or not the brake has been operated and whether or not the turn signal lever has been operated.

In step S412, the controller 100 determines travel location. More specifically, based on database, the controller 100 labels index numbers to link IDs described in map information of the navigation system 50. A link ID is an ID assigned to a link that connects nodes, which are attribution change points at which lane attribution is changed, together. Each link has data of road category, link length (distance between nodes), and so on. In step S414, the controller 100 records the present time.

Figure 24:
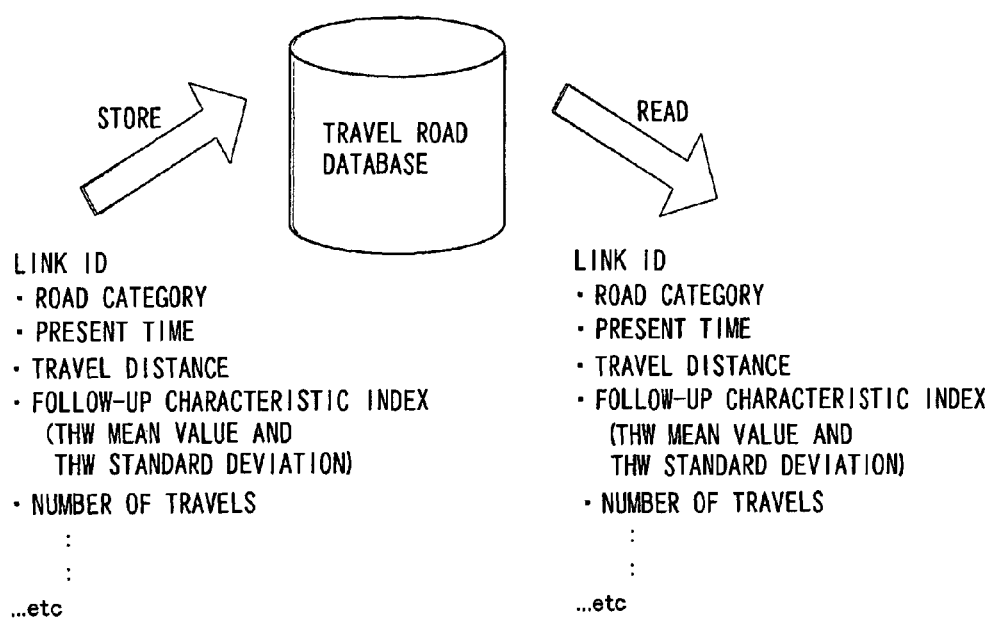

In step S416, based on the labeling results in steps S412 and S414, the controller 100 stores data used to carry out drive diagnosis of the driver. Here, for example, as FIG. 24 shows, the present time, i.e., the time at which the vehicle traveled in the link, the travel distance, a follow-up characteristic index in the link, the number of travels in the link, and the like are written in the structure for each link ID so as to create traffic road database. In the fourth embodiment, time headway THW is used as a physical quantity representing follow-up characteristics of the driver. Calculation methods of the follow-up characteristics and the follow-up characteristic index will be explained in detail in drive diagnosis processing.

In the following step S420, the data stored in step S416 are used to carry out drive diagnosis of the driver. Drive diagnosis is carried out based on driving characteristics of the driver in a traffic scene in which the vehicle is stably following the leading vehicle. Driving characteristics when the vehicle is following the leading vehicle include, for instance, time headway THW of the vehicle and the leading vehicle, inverse of time headway THW, vehicle separation, inverse of vehicle separation, and so on. In the fourth embodiment, a case in which time headway THW is used is explained as an example.

Figure 25:
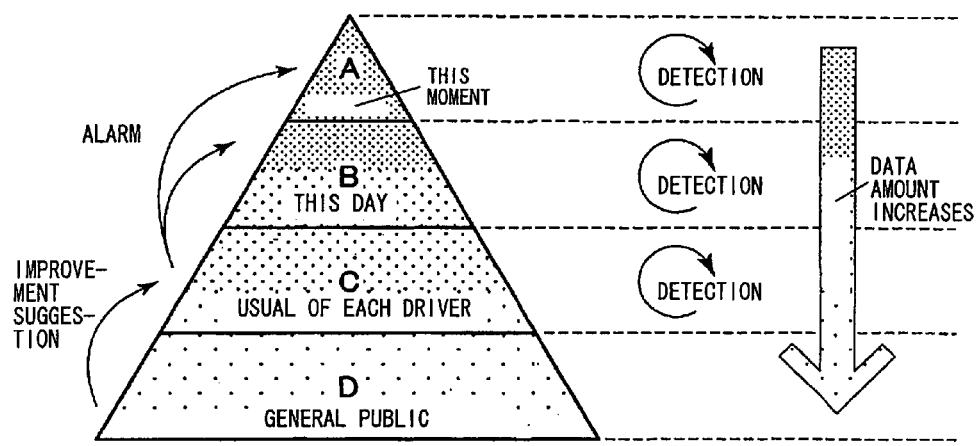

FIG. 25 illustrates the data structure of the driving assistance system 1 for vehicle. A layer A represents the amount of data of relatively short-duration "this moment", which indicates the current operating condition of the driver. A layer B represents the amount of data of "this day", indicating the operating condition of the day of the driver, which is longer than "this moment". A layer C represents the amount of data of "usual" indicating the usual operating condition of the driver, which is longer than "this day", i.e., personal characteristics. A layer D represents the amount of data of driving characteristics of "general public", which is used to compare operation of each driver with that of general driver and to diagnose the operation of each driver.

A lower layer has a larger amount of data. The amount of data included in each of the layers corresponds to the number of samples used to calculate the mean values of time headway THW in "this moment", "this day", and "usual". The data structure shown in FIG. 25 is achieved by varying the number of the samples. The values of data included in each of the layers are continually updated by real-time calculations explained below.

Figure 26:
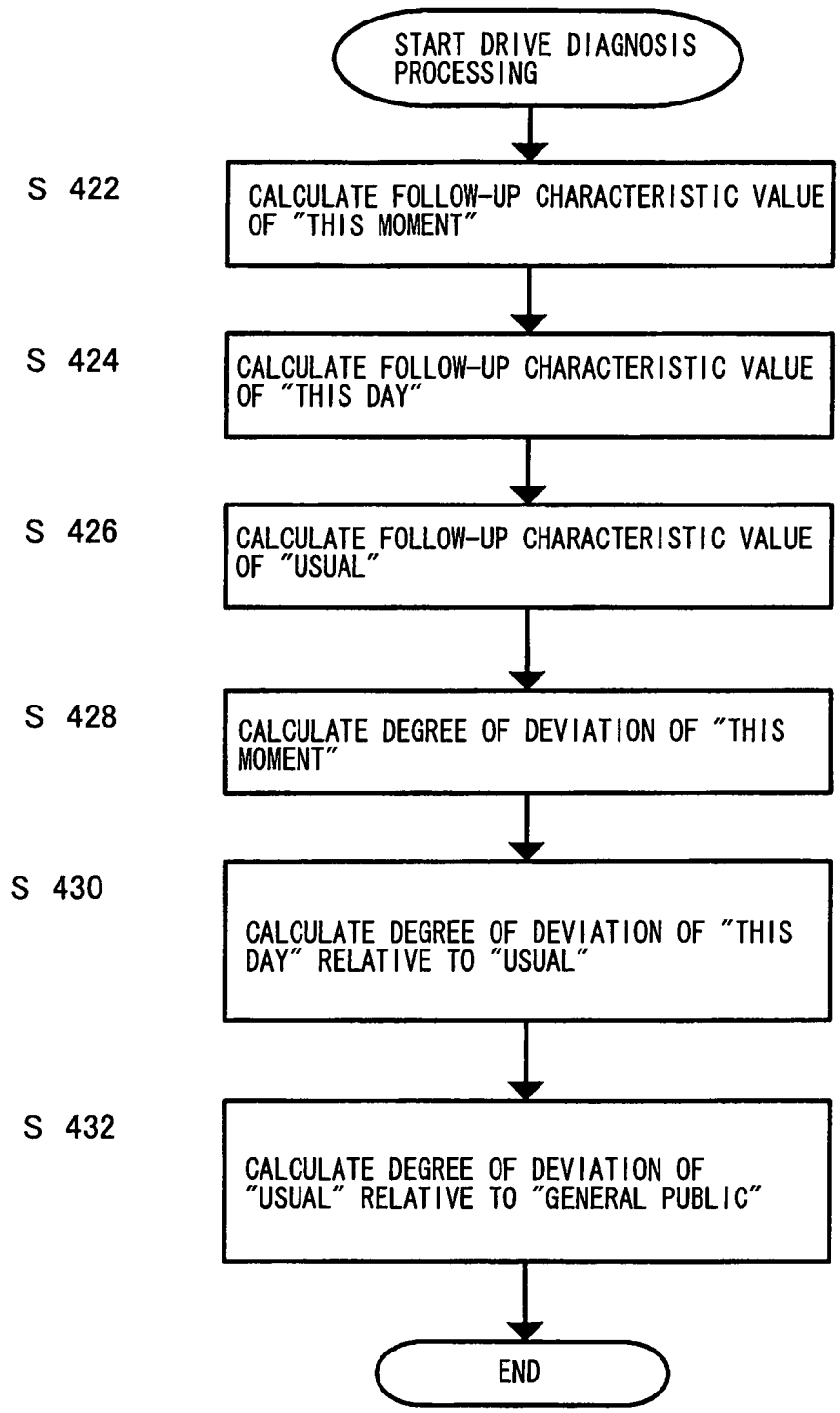

In drive diagnosis processing, the controller 100 uses the data of each of the layer A to the layer D so as to detect operation of the driver in different time spans, i.e., in "this moment", "this day", and "usual". The drive diagnosis processing executed in step S420 will be explained in detail with reference to the flow chart of FIG. 26.

In step S422, a follow-up characteristic value of the driver of "this moment" is calculated so as to carry out drive diagnosis of "this moment" of the driver. As follow-up characteristic values of the driver, the controller 100 calculates a mean value Mean_x(n) and a standard deviation Stdev_x(n) of time headway THW in a predetermined period of time that defines "this moment". Here, the predetermined period of time that defines "this moment" is, for example, 60 seconds, and, the mean value Mean_x(n) and the standard deviation Stdev_x(n) of time headway THW are calculated using data for 60 seconds from the past to the present detected in the stable follow-up travel scene determined in step S410. The mean value Mean_x(n) and the standard deviation Stdev_x(n) are calculated using the following parameters.

x(n): Data obtained at this time, i.e., time headway THW calculated in step S407

K: The number of data of THW calculated in a predetermined period of time $M_1(n)$: The sum of THW in a predetermined period of time to be calculated this time $M_2(n)$: The sum of squares of THW in a predetermined period of time to be calculated this time $M_f(n-1)$: The sum of THW in a predetermined period of time calculated in the previous time $M_2(n-1)$: The sum of squares of THW in a predetermined period of time calculated in the previous time Mean_x(n): The mean value of the data of this time, i.e., the mean value of THW Var_x(n): The variance of the data of this time, i.e., the variance of THW Stdev_x(n): The standard deviation of the data of this time, i.e., the standard deviation of THW Here, the number of data K is determined by the product of a predetermined period of time multiplied by the number of samplings per second. For instance, when the predetermined time for "this moment" is 60 seconds and the number of samplings is 5 Hz, the number of data K=300.

The sum $M_1(n)$ and the sum of squares $M_2(n)$ are each calculated using the following equations (24) and (25) with these parameters.

$$M_1(n)=M_1(n-1)+x(n)-M_1(n-1)/K \quad \text{(Equation 24)}$$

$$M_2(n)=M_2(n-1)+(x(n))^2-M_2(n-1)/K \quad \text{(Equation 25)}$$

The mean value Mean_x(n), the variance Var_x(n), and the standard deviation Stdev_x(n) of time headway THW at "this moment" are calculated using the following equations (26), (27), and (28), respectively.

$$\text{Mean}\_x(n)=M_1(n)/K \quad \text{(Equation 26)}$$

$$\text{Var}\_x(n)=M_2(n)/K-(M_1(n))^2/K^2 \quad \text{(Equation 27)}$$

$$\text{Stdev}\_x(n)=\sqrt{(\text{Var}\_x(n))} \quad \text{(Equation 28)}$$

In step S424, in order to carry out drive diagnosis of "this day" of the driver, the controller 100 calculates follow-up characteristic values of the driver of "this day", i.e., the mean value Mean_x(n) and the standard deviation Stdev_x(n) of time headway THW in a predetermined period of time which defines "this day". Here, the predetermined period of time that defines "this day" is, for instance, 360 seconds, and the mean value Mean_x(n) and the standard deviation Stdev_x(n) of time headway THW are calculated using data for 360 seconds from the past to the present detected in the stable follow-up travel scene determined in step S410.

More specifically, as is the case with "this moment", the equations (26) and (28) are used to calculate the mean value Mean_x(n) and the standard deviation Stdev_x(n). Here, the number of data K=1800, where the predetermined time for "this day" is 360 seconds and the number of samplings is 5 Hz.

In step S426, in order to carry out drive diagnosis of "usual" of the driver, the controller 100 calculates follow-up characteristic values of the driver of "usual", i.e., the mean value Mean_x(n) and the standard deviation Stdev_x(n) of time headway THW in a predetermined period of time which defines "usual". Here, the predetermined period of time that defines "usual" is, for instance, 2160 seconds, and the controller 100 calculates the mean value Mean_x(n) and the standard deviation Stdev_x(n) of time headway THW using data for 2160 seconds from the past to the present detected in the stable follow-up travel scene determined in step S410.

More specifically, as is the case with "this moment", the equations (26) and (28) are used to calculate the mean value Mean_x(n) and the standard deviation Stdev_x(n). Here, the number of data K=10800, where the predetermined time for "usual" is 2160 seconds and the number of samplings is 5 Hz.

In processing after the following step S428, drive diagnosis of the driver is carried out using the follow-up characteristic values calculated in steps S422, S424, and S426. Here, the follow-up characteristics of the driver based on data obtained in different time spans are each compared so as to diagnose the drive operation of the driver based on how much both of the follow-up characteristics deviate. In other words, in the data structure shown in FIG. 25, an upper layer (e.g., the layer A) is compared with a lower layer (e.g., the layer B) so as to carry out the drive diagnosis.

At first, in step S428, the controller 100 calculates the degree of deviation that indicates how much the follow-up characteristics of the driver of "this moment" deviate from those of "this day". Here, the degree of deviation of "this moment" relative to "this day" indicates the difference between the distribution of time headway THW of "this day" and that of "this moment". In order to calculate the degree of deviation of "this moment" relative to "this day", the distribution of time headway THW of "this day" is used as a reference distribution which represents a long-duration action distribution, and the distribution of time headway THW of "this moment" is used as a distribution of comparison target which represents a short-duration action distribution.

As a calculation method of degree of deviation, a method in which distribution functions of short-duration (e.g., "this moment") and long-duration (e.g., "this day") are compared at a position (comparison value $x_{std}$) of "mean value minus standard deviation" of the action distribution of long-duration (e.g., "this day") is adopted.

Figure 27:
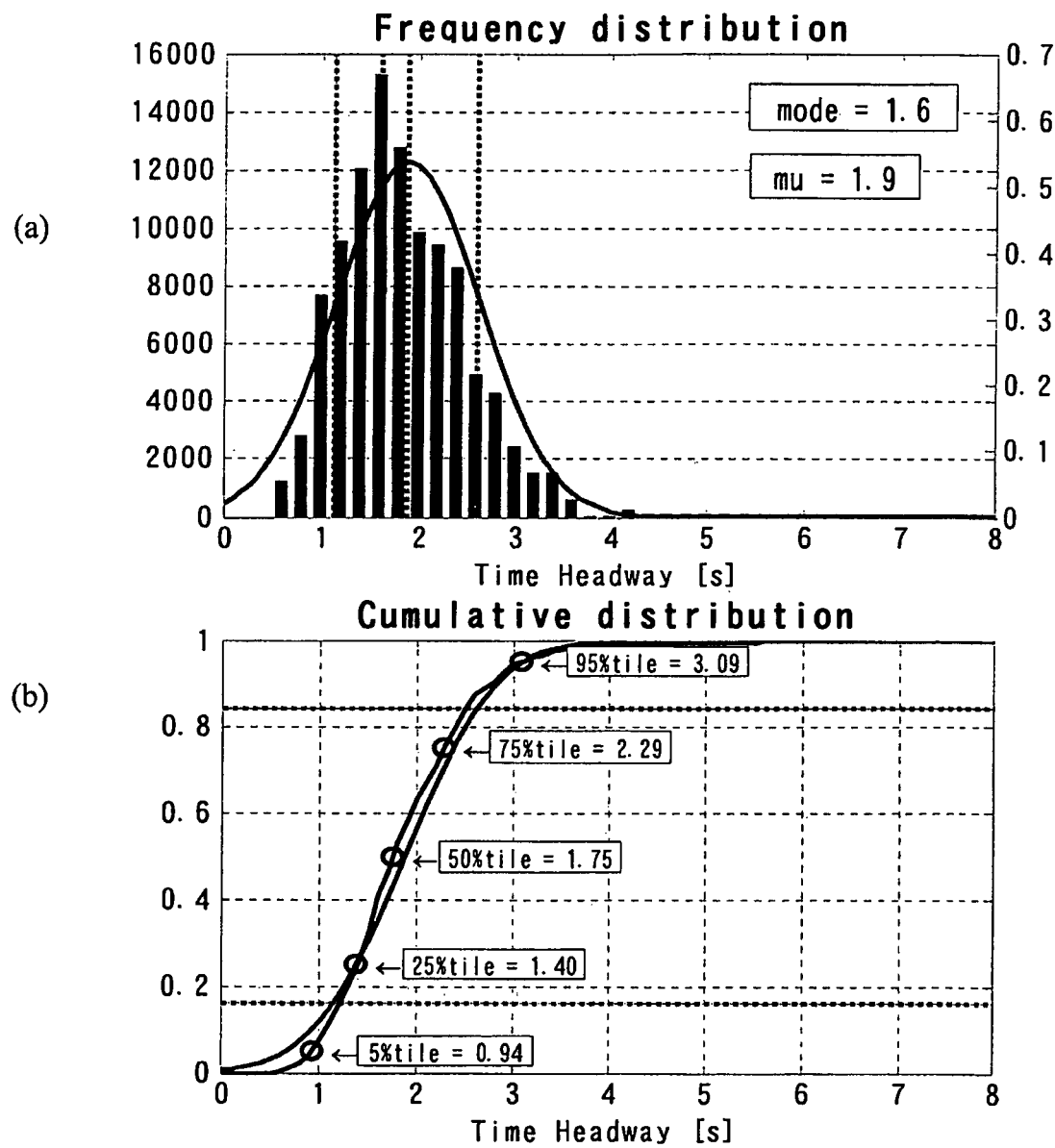

For calculating degree of deviation, the mean value Mean_x(n) and the standard deviation Stdev_x(n) of time headway THW calculated in steps S422 and S424 are used to calculate a probability density function on the assumption that time headway THW is normally-distributed. FIG. 27(a) shows a frequency distribution of time headway THW which has actually been calculated and a probability density distribution (shown in solid line) of time headway THW which is approximated by a normal distribution, while FIG. 27(b) shows cumulative distributions of them. As FIGS. 27(a) and (b) show, a distribution on the assumption that time headway THW is normally distributed and the actual distribution conform well.

As FIGS. 28(a) and (b) show, the controller 100 calculates degree of deviation $\text{Dist}_{diff}$ which indicates how much the short-duration normal distribution of comparison target deviates from the reference long-duration normal distribution, in the region of comparison target that is set based on a predetermined value (comparison value $x_{std}$). More specifically, the difference (area of the hatched region in FIG. 28(a) and the length of the arrow in FIG. 28(b)) between comparison distribution and reference distribution in the region where time headway THW is shorter than the comparison value $x_{std}$ corresponds to the degree of deviation $\text{Dist}_{diff}$. Calculation methods shown in FIGS. 28(c) and (d) will be described later.

FIGS. 29(a) and (b) show probability density distribution and cumulative distribution calculated based on the results obtained through actual experiments on the public roads. In FIG. 29(a), probability density distribution of time headway THW approximated by normal distribution is shown in dashed-dotted line using the mean value Mean_x(n) and the standard deviation Stdev_x(n) of "this moment", and probability density distribution of time headway THW approximated by normal distribution is shown in solid line using the mean value Mean_x(n) and the standard deviation Stdev_x(n) of "this day". In FIG. 29(b), cumulative distribution of "this moment" is shown in dashed-dotted line, and that of "this day" is shown in solid line. In FIGS. 29(a) and (b), the mean value Mean_x(n) of time headway THW of "this moment"=1.22, the standard deviation Stdev_x(n) thereof=0.80, the mean value Mean_x(n) of time headway THW of "this day"=1.63, and the standard deviation Stdev_x(n) thereof=1.00.

At first, the comparison value $x_{std}$ is calculated using the following equation (29) from mean value Mean_std and standard deviation Stdev_std of reference distribution.

$$x_{std} = \text{Mean\_std} - \text{Stdev\_std} \quad \text{(Equation 29)}$$

The comparison value $x_{std}$ is a value of time headway THW that indicates the point in which reference distribution and comparison distribution are compared, which corresponds to the positions shown in dashed line in FIGS. 28(a) and (b).

Next, the value of cumulative distribution at the comparison value $x_{std}$ of reference distribution is calculated. A probability density function f(x) of normal distribution is calculated using the following equation (30), where the mean value is denoted by $\mu$ and the standard deviation is denoted by $\sigma$ (refer to FIG. 28(a)).

$$f(x) = \frac{1}{\sigma\sqrt{2\pi}} e^{\left(-\frac{(x-\mu)^2}{2\sigma^2}\right)} \quad \text{(Equation 30)}$$

The probability density function f(x) calculated using equation (30) is integrated to give a cumulative distribution function F(x) as expressed in the following equation (31) (refer to FIG. 28(b)).

$$F(x) = \int \frac{1}{\sigma\sqrt{2\pi}} e^{\left(-\frac{(x-\mu)^2}{2\sigma^2}\right)} dx \quad \text{(Equation 31)}$$

Probability $F_{std}(x)$ of cumulative distribution in comparison value $x_{std}$ is calculated using the following equation (32), where the mean value of the reference distribution is denoted by $\mu_{std}$ and the standard deviation thereof is denoted by $\sigma_{std}$.

$$F_{std}(x) = \int \frac{1}{\sigma_{std}\sqrt{2\pi}} e^{\left(-\frac{(x-\mu_{std})^2}{2\sigma_{std}^2}\right)} dx \quad \text{(Equation 32)}$$

Next, the value of cumulative distribution in the comparison value $x_{std}$ of comparison distribution is calculated. A probability $F_{comp}(x)$ of cumulative distribution in comparison value $x_{std}$ is calculated using the following equation (33), where the mean value of the comparison distribution is denoted by $\mu_{comp}$ and the standard deviation thereof is denoted by $\sigma_{comp}$.

$$F_{comp}(x) = \int \frac{1}{\sigma_{comp}\sqrt{2\pi}} e^{\left(-\frac{(x-\mu_{comp})^2}{2\sigma_{comp}^2}\right)} dx \quad \text{(Equation 33)}$$

The difference between the probability $F_{std}(x)$ of cumulative distribution of the reference and the probability $F_{comp}(x)$ of cumulative distribution of the comparison target is calculated using the following equation (34) as the degree of deviation $\text{Dist}_{diff}$ of "this moment" relative to "this day".

$$\text{Dist}_{diff} = F_{comp}(x) - F_{std}(x) \quad \text{(Equation 34)}$$

It is indicated that as degree of deviation $\text{Dist}_{diff}$ increases in a positive direction, the operation of the driver of "this moment" is biased in the direction in which time headway THW is short more than that of "this day" is, i.e., in a more risky direction. It is indicated that as degree of deviation $\text{Dist}_{diff}$ increases in a negative direction, the operation of the driver of "this moment" is biased in the direction in which time headway THW is long more than that of "this day" is, i.e., in a less risky direction. Degree of deviation $\text{Dist}_{diff}$ becomes zero when the driver is always engaged in an operation with the same follow-up characteristics.

In step S428, the controller 100 calculates degree of deviation $\text{Dsit}_{diff}$ of "this moment" relative to "usual". In this case, distribution of time headway THW of "usual" is used as a distribution of reference indicating long-duration action distribution, and distribution of time headway THW of "this moment" is used as a distribution of comparison target indicating short-duration action distribution. Then, the probability $F_{std}(x)$ of cumulative distribution of "usual" and the probability $F_{comp}(x)$ of cumulative distribution of "this moment" are used to calculate the degree of deviation $\text{Dist}_{diff}$ of "this moment" relative to "usual" using the above described equation (34).

Thus, in step S428, the controller 100 calculates each of the degrees of deviation $\text{Dist}_{diff}$ of "this moment" relative to "this day" and of "this moment" relative to "usual", and then the flow of control proceeds to step S430. In step S430, as is the case with the processing executed in step S428, the controller 100 calculates degree of deviation $\text{Dist}_{diff}$ of "this day" relative to "usual". It is to be noted that here distribution of time headway THW of "usual" is used as a distribution of reference indicating a long-duration action distribution, and distribution of time headway THW of "this day" is used as a distribution of comparison target indicating a short-duration action distribution.

In the following step S432, as is the case with the processing executed in step S428, the controller 100 calculates degree of deviation $\text{Dist}_{diff}$ of "usual" relative to "general public". It is to be noted that here distribution of time headway THW of "general public" is used as a distribution of reference indicating a long-duration action distribution, and distribution of time headway THW of "usual" is used as a distribution of comparison target indicating a short-duration action distribution. An appropriate value is set in advance as a fixed value for the follow-up characteristic value of "general public", i.e., the mean value and the standard deviation of time headway THW.

Thus, after drive diagnosis of the driver is carried out in step S420 using data obtained in a plurality of different time spans, the flow of control proceeds to step S440. It is to be noted that for the sake of simplicity, degree of deviation $\text{Dist}_{diff}$ of "this moment" relative to "usual" will be denoted by Dist_1a, degree of deviation $\text{Dist}_{diff}$ of "this moment" relative to "this day" will be denoted by Dist_1b, degree of deviation $\text{Dist}_{diff}$ of "this day" relative to "usual" will be denoted by Dist_2, and degree of deviation $\text{Dist}_{diff}$ of "usual" relative to "general public" will be denoted by Dist_3.

In step S440, the controller 100 determines whether or not to execute alarm presentation processing based on the drive diagnosis result in step S420. Here, the controller 100 makes a decision as to whether or not degree of deviation Dist_1a of "this moment" relative to "usual", degree of deviation Dist_1b of "this moment" relative to "this day" calculated in step S428, or degree of deviation Dist_2 of "this day" relative to "usual" calculated in step S430 is greater than a threshold value (for example, 0.30) used to determine whether or not to present an alarm. When degree of deviation Dist_1a, Dist_1b, or Dist_2 is greater than the threshold value, the flow of control proceeds to step S450 so that the controller 100 presents the alarm to the driver. After presenting the alarm, the controller 100 terminates the processing.

For example, in the case where degree of deviation Dist_2 of "this day" relative to "usual" is greater than the threshold value, a voice "Today, you have a vehicle separation shorter than that you usually have. Drive safe" comes out of the speaker 130 together with a beep sound. The voice information contents are set so as to inform the driver that the driver is presently having a vehicle separation shorter than a usual vehicle separation, or so as to encourage the driver to have a vehicle separation longer than the present vehicle separation. When degree of deviation Dist_1a of "this moment" relative to "usual" is greater than the threshold value, a voice, for instance, "Are you in a hurry? Drive safe" comes out of the speaker 130 together with a beep sound. It is to be noted that the actual voice information is not limited to those. When degree of deviation Dist_1b of "this moment" relative to "this day" is greater than the threshold value, too, pre-set appropriate voice information comes out.

If a negative decision is made in step S440 and the alarm is not presented, the flow of control proceeds to step S460 and the controller 100 determines whether or not to execute instruction presentation processing based on the drive diagnosis result in step S420. Here, the controller 100 makes a decision as to whether or not degree of deviation Dist_3 of "usual" relative to "general public" calculated in step S432 is smaller than a threshold value (for example, 0.07) used to determine whether or not to present an instruction (improvement suggestion). The threshold value used to determine whether or not to present an instruction is an appropriately pre-set value within whose range the degree of deviation of the same driver substantially always falls. The above-described value "0.07" has been set based on the results of experiments using a real vehicle and 15 test objects. According to the experiment results, the degree of deviation calculated per test object is always equal to or less than 0.07.

If Dist_3 is smaller than the threshold value, the flow of control proceeds to step S470 and the controller 100 presents an instruction to the driver. After presenting the instruction, the controller 100 terminates the processing.

For instance, as instruction presentation contents, the controller 100 outputs a display and a voice that praise the drive operation of the driver. For example, degree of deviation Dist_3 of "usual" is converted into a score and displayed. More specifically, a value having been obtained by reversing the sign of degree of deviation Dist_3 and by adding 50 thereto is displayed on the display unit 180 as a score of usual drive operation of the driver. In other words, a driver who tends to have a higher risk scores 50 points or less, while a driver who drives safely scores 50 points or more. It is to be noted that the score is expressed in a range from 0 to 100: if a score obtained by converting degree of deviation Dist_3 is greater than 100, the score displayed is 100 points, while a score obtained by converting degree of deviation Dist_3 is smaller than 0, the score displayed is 0 points.

Figure 30:
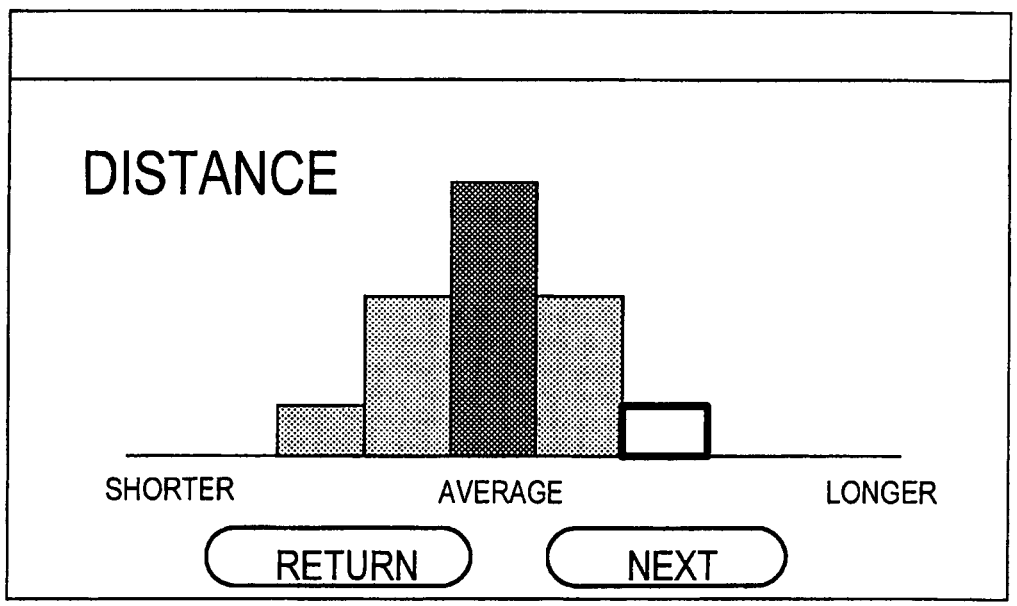
FIG. 30 An illustration of one example of visual information presentation

As shown in FIG. 30, distribution of vehicle separation of general public is schematically displayed on the display unit 180 so as to inform the driver of the vehicle separation of "usual" of the driver in comparison with that of general public. FIG. 30 indicates that vehicle separation of the driver is longer than the mean value of vehicle separation of general public by two grades, informing the driver of visual information that the driver has more safety-oriented follow-up characteristics than general public has.

In addition, through a voice coming out of the speaker 130, the controller 100 informs the driver that usual vehicle separation of the driver is a longer than that of general public, therefore the driver is an excellent driver who performs follow-up traveling safely. For example, a voice "You are driving carefully. Keep it up!" comes out. Thus, the controller 100 outputs a display and a voice so as to inform the driver that the follow-up driving characteristics of the driver is better than those of general public driver and encourage the driver to keep up the good operation or improve his operation.

It is to be noted that although the above examples of displays and voices include an expression "vehicle separation", with which the driver is familiar, displays and voices may include an expression "time headway". Contents of displays and voices are not limited to the above examples as long as displays and voices effectively convey operational characteristics to the driver so as to alert the driver to prevent the operation from being in a risky state and so as to suggest further improvement in operation.

Figure 31:
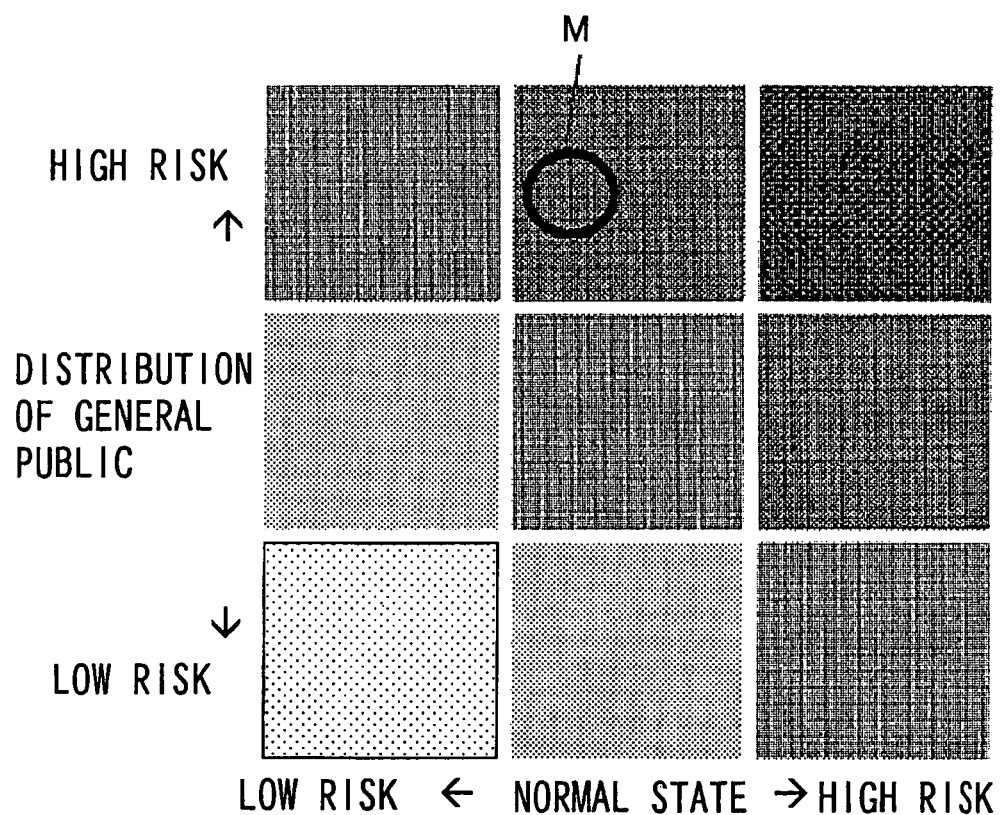
FIG. 31 An illustration of another example of visual information presentation

Another example of display based on drive diagnosis result is shown in FIG. 31. In FIG. 31, the vertical axis represents personal characteristics of the driver relative to follow-up characteristics of general public, and the horizontal axis represents the current state of the driver relative to usual follow-up characteristics of the driver. As described earlier, for instance, time headway THW and vehicle separation may be used as follow-up characteristics. When degree of deviation of "this day" relative to "usual" calculated in step S430 is great, a marker M shifts rightward, i.e., in a direction of high risk. When degree of deviation of "usual" relative to "general public" calculated in step S432 is great, the marker M shifts upward, i.e., in a direction of high risk.

Thus, in the display example shown in FIG. 31, the drive diagnosis result on the basis of "general public" and that of "usual", i.e., the drive diagnosis result on the basis of personal characteristics of the driver are plotted on a two-dimensional map configured with two axes. It is to be noted that the horizontal axis may represent degree of deviation of "this moment" relative to "this day" or that of "this moment" relative to "usual". In addition, the vertical axis and the horizontal axis may be switched with each other and displayed.

Furthermore, as shown in FIG. 31, the two-dimensional map may be divided into a plurality of blocks in different colors for each of them so that the driver easily understands where the follow-up characteristics of the driver are plotted. For example, the top-right block of FIG. 31 may be displayed in dark color, e.g. dark red, and the bottom-left block may be displayed in subtle color, e.g. pastel blue, using color gradation therebetween.

Thus, in the fourth embodiment explained above, in addition to the advantageous effects according to the first to the third embodiments described above, the following operations and advantageous effects can be achieved.

Safety awareness and operation preference characteristics of the driver are detected as an index for drive diagnosis. More specifically, time headway THW of the vehicle and the leading vehicle at the time at which the vehicle follows the leading vehicle is calculated. Since time headway THW indicates period of time until the vehicle reaches the present position of the leading vehicle, accurate drive diagnosis is assured in follow-up travel scene by using the time headway THW as an index indicating characteristics of the driver when the vehicle follows the leading vehicle.

Variation of the Fourth Embodiment

Another calculation method for degree of deviation $Dist_{diff}$ will now be explained. Here, action distribution of long period of time (e.g., "this day") and that of short period of time (e.g., "this moment") are each approximated by normal distribution so as to calculate the size of area of a region in which two normal distributions do not overlap as the degree of deviation $Dist_{diff}$.

More specifically, as shown in FIGS. 28(c) and (d), the difference between comparison distribution and reference distribution in a region where time headway THW is shorter than an intersection point α of reference distribution and comparison distribution, i.e., the size of area of the comparison distribution running off of the reference distribution, is calculated as the degree of deviation $Dist_{diff}$.

Substituting the mean value $\mu_{std}$ and the standard deviation $\sigma_{std}$ of the reference distribution and the mean value $\mu_{comp}$ and the standard deviation $\sigma_{comp}$ of the comparison distribution into equation (30), probability density function $f_{std}(x)$ of the reference distribution and probability density function $f_{comp}(x)$ of the comparison distribution are expressed by the following equations (35) and (36), respectively.

$$f_{std}(x) = \frac{1}{\sigma_{std}\sqrt{2\pi}} e^{\left(-\frac{(x-\mu_{std})^2}{2\sigma_{std}^2}\right)}$$ (Equation 35)

$$f_{comp}(x) = \frac{1}{\sigma_{comp}\sqrt{2\pi}} e^{\left(-\frac{(x-\mu_{comp})^2}{2\sigma_{comp}^2}\right)}$$ (Equation 36)

Calculating simultaneous equations of those equations (35) and (36), frequencies of distributions conform at two points α and β (α<β). In order to obtain the area of the range in which two normal distributions do not overlap in a region where time headway THW is shorter than the intersection point α, the intersection point α is substituted into the above equation (32) used to calculate the cumulative distribution function of the reference distribution and the above equation (33) used to calculate the cumulative distribution function of the comparison distribution. Then, the probability $F_{std}(\alpha)$ of the cumulative distribution of the reference distribution is subtracted from the probability $F_{comp}(\alpha)$ of the cumulative distribution of the comparison distribution at the intersection point α.

Degree of deviation $Dist_{diff}$ is calculated using the following equation (37).

$$-Dist_{diff} = F_{comp}(\alpha) - F_{std}(\alpha)$$ (Equation 37)

It is to be noted that the area $Dist_{corr}$ in which the two normal distributions are overlapping is calculated using the following equation (38).

$$-Dist_{corr} = 1 - Dist_{diff}$$ (Equation 38)

Thus, drive diagnosis may be carried out by comparing distribution of a plurality of data having different temporal ranges and calculating the degree of fit of distributions, i.e., the area in which the distributions overlap.

Fifth Embodiment

A driving assistance system for vehicle according to the fifth embodiment of the present invention will now be explained. The basic structure of the driving assistance system for vehicle according to the fifth embodiment is the same as that of the fourth embodiment presented in FIG. 21. Therefore, the difference from the above-described fourth embodiment will now be explained mainly.

The driving assistance system 1 for vehicle according to the fifth embodiment carries out drive diagnosis of the driver by comparing past travel data and present travel data in the case where those data fit together in traveling conditions such as time of the day and place.

Figure 32:
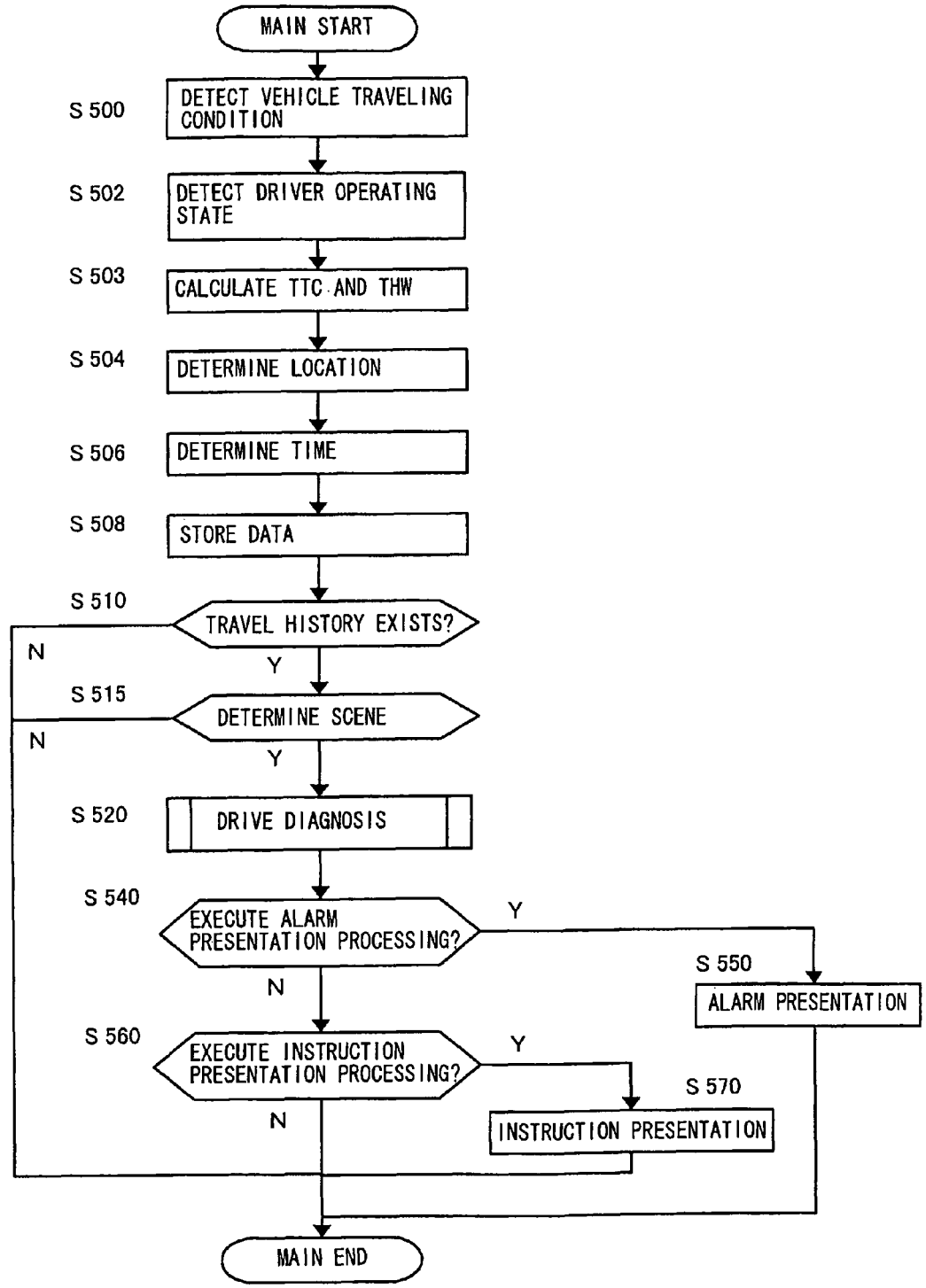
FIG. 32 A flow chart illustrating the processing procedure of the driving assistance control program achieved in a fifth embodiment FIG. 33 An illustration of the data structure of the fifth embodiment FIG. 34 A flow chart illustrating the procedure of driver operation diagnosis processing FIG. 35 An illustration of one example of visual information presentation FIG. 36 A flow chart illustrating the processing procedure of the driving assistance control program achieved in a sixth embodiment FIG. 37 A flow chart illustrating the procedure of driver operation diagnosis processing FIG. 38 An illustration of the setting method of bins FIGS. 39 (a) and (b) Illustrations of the setting method of initial values to be put in the bins FIG. 40 An illustration of degree of deviation calculation method using mode FIG. 41 A control diagram showing the driving assistance system for vehicle according to a seventh embodiment of the present invention FIG. 42 A flow chart illustrating the processing procedure of the driving assistance control program achieved in the seventh embodiment FIG. 43 A flow chart illustrating the procedure of driver operation diagnosis processing FIG. 44 An illustration of one example of visual information presentation FIG. 45 An illustration of another example of visual information presentation FIG. 46 A flow chart illustrating the processing procedure of the driving assistance control program achieved in an eighth embodiment FIG. 47 A flow chart illustrating the procedure of driver operation diagnosis processing FIG. 48 A flow chart illustrating the processing procedure of the driving assistance control program achieved in a ninth embodiment FIG. 49 A flow chart illustrating the procedure of driver operation diagnosis processing FIG. 50 A control diagram showing the driving assistance system for vehicle according to a tenth embodiment of the present invention FIG. 51 A flow chart illustrating the processing procedure of the driving assistance control program achieved in the tenth embodiment FIG. 52 A table of symbols used for steering angle entropy calculations FIG. 53 A flow chart illustrating the procedure of calculation processing of steering angle entropy FIG. 54 A table of steering angle bins FIG. 55 An example of categories of long-duration steering angle entropy calculation results FIG. 56 An example of relationship between long-duration steering angle entropy categories and contents to be informed FIG. 57 A flow chart illustrating the processing procedure of the driving assistance control program achieved in the variation 1 of the tenth embodiment FIG. 58 A flow chart illustrating the processing procedure of the driving assistance control program achieved in the variation 1 of the tenth embodiment FIG. 59 A flow chart illustrating the calculation processing procedure of a value of a reference state FIG. 60 A table of categories of steering errors FIG. 61 A frequency distribution table of steering errors FIG. 62 An example of categories of intermediate-duration steering angle entropy calculation results FIG. 63 An example of relationship between intermediate-duration steering angle entropy categories and contents to be informed FIG. 64 An example of categories of comparison results of a previous intermediate-duration steering angle entropy and a measured intermediate-duration steering angle entropy FIG. 65 A table of relationship between categories of comparison results of a previous intermediate-duration steering angle entropy and a measured intermediate-duration steering angle entropy and contents to be informed FIG. 66 An example of categories of calculation results of a steering angle error distribution a value FIG. 67 An example of relationship between categories of the steering angle error distribution a value and contents to be informed FIG. 68 A flow chart illustrating the processing procedure of the driving assistance control program achieved in the variation 2 of the tenth embodiment FIG. 69 An example of categories of short-duration steering angle entropy calculation results FIG. 70 An example of relationship between short-duration steering angle entropy categories and contents to be informed FIG. 71 A flow chart illustrating the calculation processing procedure of steering angle entropy in an eleventh embodiment FIG. 72 A flow chart illustrating the method to recursively calculate the probability of categories using steering angle estimation error data FIG. 73 A flow chart illustrating the calculation processing procedure of a value of a reference state FIG. 74 A flow chart illustrating the method to recursively obtain frequency distribution using steering angle estimation error data FIG. 75 A control diagram showing the driving assistance system for vehicle according to a twelfth embodiment of the present invention FIG. 76 A flow chart illustrating the processing procedure of the driving assistance control program achieved in the twelfth embodiment FIG. 77 A flow chart illustrating the calculation processing procedure of accelerator pedal position entropy FIG. 78 An example of categories of long-duration accelerator pedal position entropy calculation results FIG. 79 An example of relationship between long-duration accelerator pedal position entropy categories and contents to be informed FIG. 80 A flow chart illustrating the processing procedure of the driving assistance control program achieved in the variation 1 of the twelfth embodiment FIG. 81 A flow chart illustrating the processing procedure of the driving assistance control program achieved in the variation 1 of the twelfth embodiment FIG. 82 A flow chart illustrating the calculation method of αap value of a reference state FIG. 83 An example of categories of intermediate-duration accelerator pedal position entropy calculation results FIG. 84 An example of relationship between intermediate-duration accelerator pedal position entropy categories and contents to be informed FIG. 85 An example of categories of comparison results of a previous intermediate-duration accelerator pedal position entropy and a measured intermediate-duration accelerator pedal position entropy FIG. 86 An example of relationship between categories of comparison results of a previous intermediate-duration accelerator pedal position entropy and a measured intermediate-duration accelerator pedal position entropy and contents to be informed FIG. 87 An example of categories of accelerator pedal position error distribution a value calculation results FIG. 88 An example of relationship between accelerator pedal position error distribution a value categories and contents to be informed FIG. 89 A flow chart illustrating the processing procedure of the driving assistance control program achieved in the variation 2 of the twelfth embodiment FIG. 90 An example of categories of short-duration accelerator pedal position entropy calculation results FIG. 91 An example of relationship between short-duration accelerator pedal position entropy categories and contents to be informed FIG. 92 A control diagram showing the driving assistance system for vehicle according to a thirteenth embodiment of the present invention FIG. 93 A table presenting the relationship between individual indices and detection targets for drive diagnosis FIG. 94 A flow chart illustrating the processing procedure of the driving assistance control program achieved in the thirteenth embodiment

The behavior of the driving assistance system 1 for vehicle according to the fifth embodiment will now be explained in detail with reference to FIG. 32. FIG. 32 is a flow chart illustrating the procedure of driving assistance control processing performed by the controller 100 achieved in the fifth embodiment. The processing is performed continuously at regular intervals, e.g., for every 50 msec.

At first, in step S500, as the traveling conditions of the vehicle, the controller 100 obtains velocity V of the vehicle detected by the vehicle speed sensor 30 and vehicle separation D and relative vehicle velocity Vr between the vehicle and the leading vehicle detected by the laser radar 10. In step S502, as the operating states of the driver, the controller 100 obtains brake pedal operation amount detected by the brake pedal stroke sensor 60 and whether or not the turn signal lever has been operated detected by the turn signal switch 65. In step S503, in order to determine traffic scene of the vehicle described later, the controller 100 calculates time to contact TTC and time headway THW between the vehicle and the leading vehicle.

In step S504 the controller 100 determines travel location, while in step S506 the controller 100 records travel time. Then, in step S508, based on the labeling results in steps S504 and S506, the controller 100 drive stores data used to carry out drive diagnosis of the driver. The processing until data storage is basically the same as that in the fourth embodiment. However, the controller 100 determines traffic scene after determining travel history.

In the next step S510, the controller 100 determines whether or not there is a database of the road along which the vehicle is traveling at present in the traffic road database created in step S508. In other words, the controller 100 determines whether or not the vehicle has already traveled the road along which the vehicle is traveling at present and therefore past data that conform with the spatial location and range corresponding to the present location of the vehicle has been stored. If there is such a database, the flow of control proceeds to step S515, while if there is not such a database, the controller 100 terminates the processing.

In step S515, traffic scene of the vehicle is determined. When the above-described conditions (a) to (f) are all satisfied, the controller 100 determines that the traffic scene of the vehicle is a stable follow-up travel scene, and the flow of control proceeds to step S520 for the controller 100 to carry out drive diagnosis. On the other hand, in the case where any of the conditions (a) to (f) is not satisfied, the controller 100 determines that the traffic scene of the vehicle does not correspond to a particular traffic scene, does not carry out drive diagnosis, and terminates the processing.

In the following step S520, the data stored in step S508 are used to carry out drive diagnosis of the driver. Drive diagnosis is carried out based on driving characteristics of the driver in a traffic scene in which the vehicle is stably following the leading vehicle in the same travel conditions, i.e., the same spatial location and range. Driving characteristics when the vehicle is following the leading vehicle include, for instance, time headway THW of the vehicle and the leading vehicle, inverse of time headway THW, vehicle separation, inverse of vehicle separation, and so on. In the fifth embodiment, a case in which time headway THW is used is explained as an example.

Figure 33:
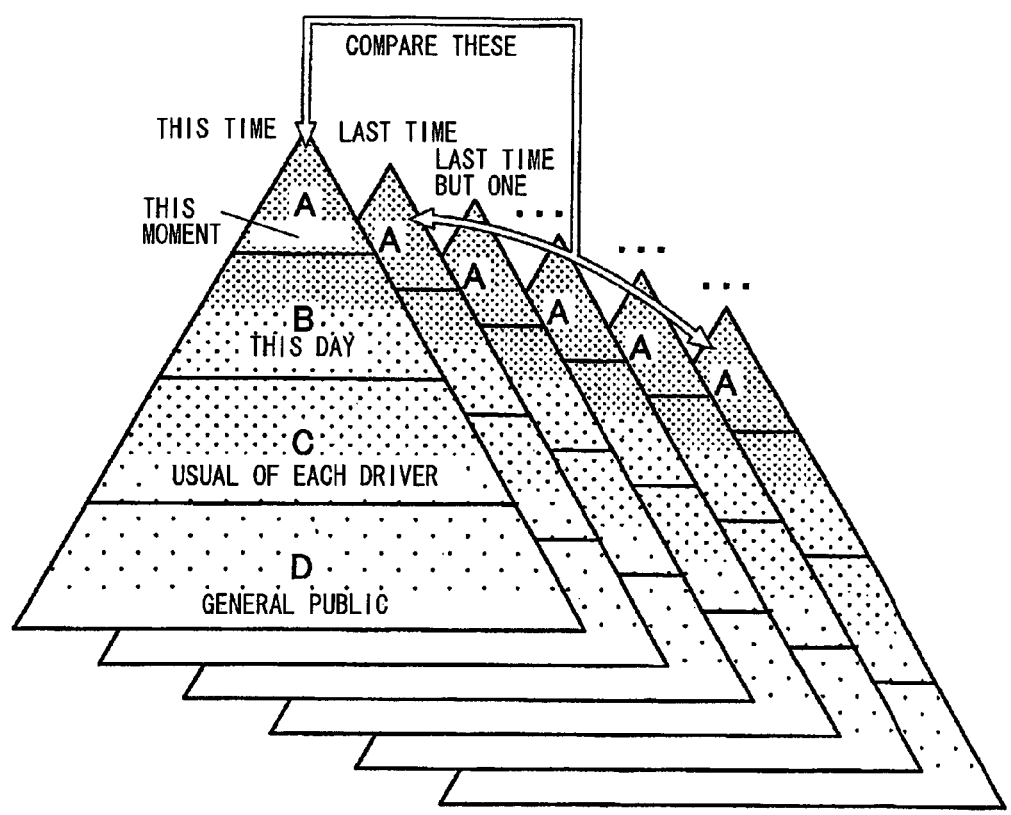

FIG. 33 illustrates the data structure of the driving assistance system 1 for vehicle achieved in the fifth embodiment. A layer A represents the amount of data of relatively short-duration "this moment", which indicates the current operating condition of the driver. A layer B represents the amount of data of "this day", indicating the operating condition of the day of the driver, which is longer than "this moment". A layer C represents the amount of data of "usual" indicating the usual operating condition of the driver, which is longer than "this day", i.e., personal characteristics. A layer D represents the amount of data of driving characteristics of "general public", which is used to compare drive operation of each driver with that of a general driver and to diagnosis the drive operation of each driver.

A lower layer has a larger amount of data. The amount of data included in each of the layers corresponds to the number of samples used to calculate the mean values of time headway THW in "this moment", "this day", and "usual". The data structure shown in FIG. 33 is achieved by varying the number of the samples. The values of data included in each of the layers are continually updated by real-time calculations explained in the fourth embodiment.

Figure 34:
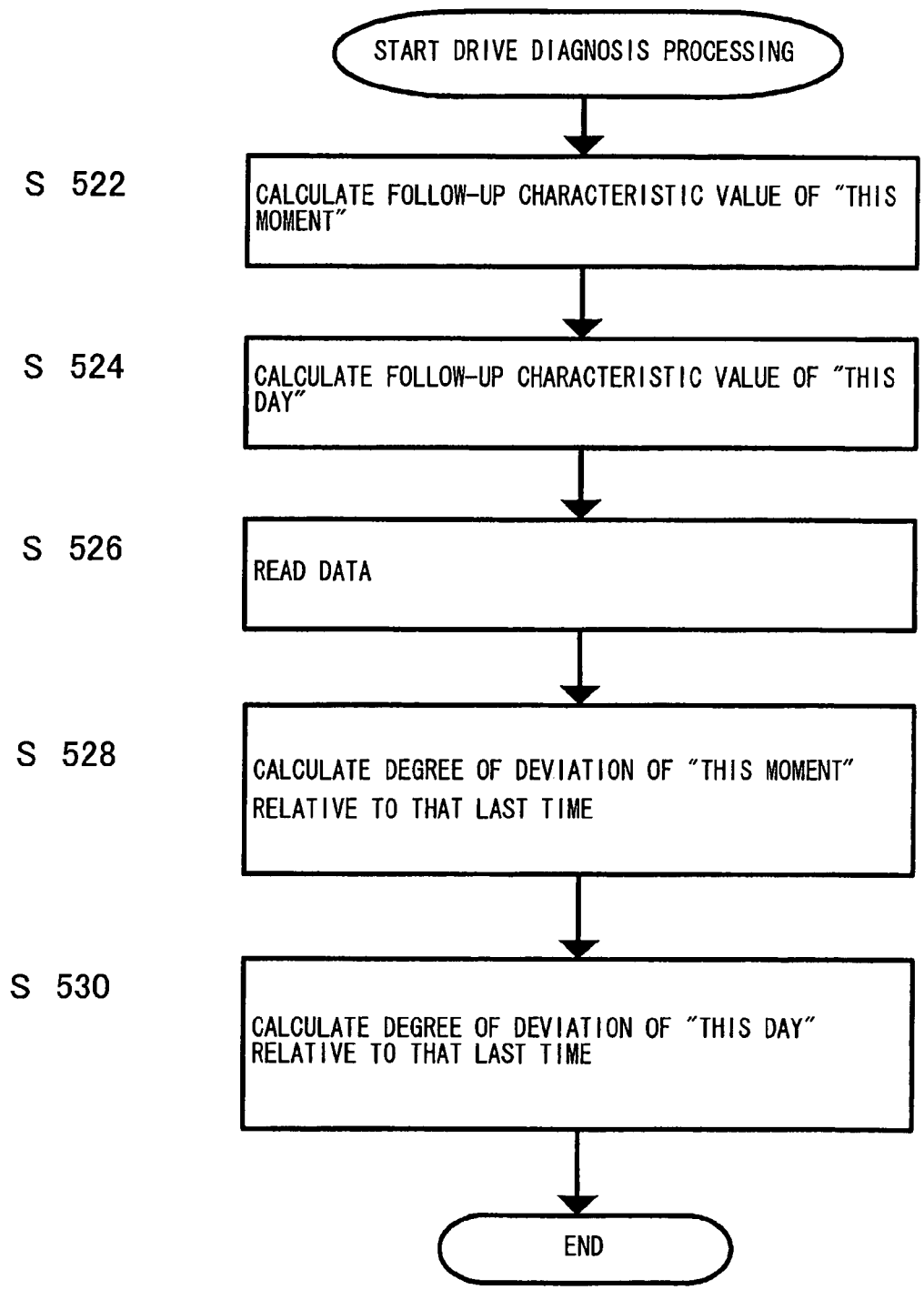

In the fifth embodiment, data of the follow-up characteristics of past travels along the same road are stored, and the controller 100 compares data of the previous travel, or all the data of past travels, with data of this time so as to determine drive operation of the driver of "this moment" and "this day". The drive diagnosis processing executed in step S520 will be explained in detail with reference to the flow chart of FIG. 34.

In step S522, in order to carry out drive diagnosis of "this moment" of the driver, the controller 100 uses the above-described equations (26) and (28) so as to calculate a follow-up characteristic value of the driver of "this moment", i.e., the mean value Mean_x(n) and the standard deviation Stdev_x(n) of time headway THW in a predetermined period of time that defines "this moment". In step S524, in order to carry out drive diagnosis of "this day" of the driver, the controller 100 uses the above-described equations (26) and (28) so as to calculate a follow-up characteristic value of the driver of "this day", i.e., the mean value Mean_x(n) and the standard deviation Stdev_x(n) of time headway THW in a predetermined period of time that defines "this day".

In step S526, the controller 100 reads past data which act as a reference used to compare the present follow-up characteristics with those of the past. Here, data of the follow-up characteristic value in the previous travel along the same road, more specifically, the mean value Mean_x(n) and the standard deviation Stdev_x(n) of time headway THW, are read from the database.

In processing after the following steps S528 and S530, drive diagnosis of the driver is carried out using the follow-up characteristic values calculated in steps S522 and S524. Here, the follow-up characteristics of the driver at present are compared with those based on the data obtained in the previous travel along the same road, so that the controller 100 diagnoses the drive operation of the driver based on how much both of the follow-up characteristics deviate. In other words, in the data structure shown in FIG. 33, for instance, the layer A of this time is compared with that of the previous time so as to carry out the drive diagnosis.

At first, in step S528, the controller 100 calculates the degree of deviation that indicates how much the follow-up characteristics of the driver of "this moment" of this time deviates from those of the previous travel. Here, the degree of deviation of "this moment" of this time relative to that of the previous travel indicates the difference between the distribution of time headway THW of "this moment" of the previous travel and that of this time. The distribution of time headway THW of "this moment" of the previous travel is used as a reference distribution, and the distribution of time headway THW of "this moment" of this time is used as a distribution of comparison target.

More specifically, the controller 100 uses the calculation method shown in FIGS. 28(a) and (b) or that shown in FIGS. 28(c) and (d) explained in the fourth embodiment so as to calculate degree of deviation $Dist_{diff}$ of "this moment" of this time relative to "this moment" of the previous travel using the above-described equation (34) or (37).

In step S530, as is the case with in step S528, the controller 100 calculates degree of deviation $Dist_{diff}$ of "this day" of this time relative to "this day" of the previous travel. It is to be noted that here the distribution of time headway THW of "this day" of the previous travel along the same road is used as a reference distribution, and the distribution of time headway THW of "this day" of this time is used as a distribution of comparison target.

Thus, after the controller 100 carries out drive diagnosis of the driver using data of past travels along the same road and data of the travel of this time, the flow of control proceeds to step S540. It is to be noted that for the sake of simplicity, degree of deviation $Dist_{diff}$ of "this moment" of this time relative to "this moment" of the previous travel will be denoted by Dist_10, and degree of deviation $Dist_{diff}$ of "this day" of this time relative to "this day" of the previous travel will be denoted by Dist_20.

In step S540, the controller 100 determines whether or not to execute alarm presentation processing based on the drive diagnosis result in step S520. Here, the controller 100 makes a decision as to whether or not degree of deviation Dist_10 of "this moment" of this time relative to "this moment" of the previous travel calculated in step S528 or degree of deviation Dist_20 of "this day" of this time relative to "this day" of the previous travel calculated in step S530 is greater than a threshold value (for example, 0.30) to present an alarm. When degree of deviation Dist_10 or Dist_20 is greater than the threshold value, the flow of control proceeds to step S550 so that the controller 100 presents the alarm to the driver. After presenting the alarm, the controller 100 terminates the processing.

For example, in the case where degree of deviation Dist_20 of "this day" with respect to the previous time is greater than the threshold value, a voice "Today, you have a vehicle separation shorter than that you usually have. Drive safe" comes out of the speaker 130 together with a beep sound. The voice information contents are set so as to inform the driver that the driver is presently having a vehicle separation shorter than that of the previous time, or so as to encourage the driver to have a vehicle separation longer than the present vehicle separation. It is to be noted that the voice information contents may vary according to the cases, i.e., the case where the degree of deviation Dist_20 of "this day" of this time relative to that of the previous time is greater than the threshold value, the case where the degree of deviation Dist_10 of "this moment" of this time relative to that of the previous time is greater than the threshold value, and the case where the both of the degrees of deviation Dist_10 and Dist_20 are greater than the threshold value.

Figure 35:
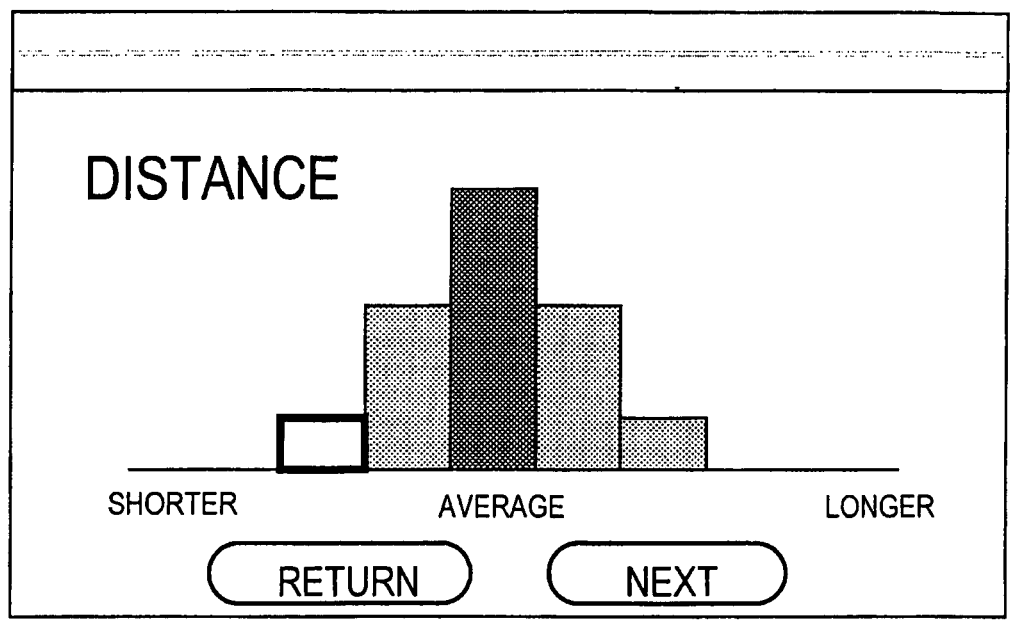

In addition, as shown in FIG. 35, the tendency of the current vehicle separation may be presented to the driver as visual information displayed on the display unit 180. In the example of display shown in FIG. 35, reference distribution (for example, distribution of vehicle separation of the previous travel, that of general public, or the like) is schematically displayed so as to inform the driver of the vehicle separation of this time of the driver in comparison with that of general public. FIG. 35 indicates that vehicle separation of the driver is shorter than the mean value of reference distribution by two grades, informing the driver of visual information that the driver is currently having a short vehicle separation.

If a negative decision is made in step S540 and the alarm is not presented, the flow of control proceeds to step S560 and the controller 100 determines whether or not to execute instruction presentation processing based on the drive diagnosis result in step S520. Here, the controller 100 makes a decision as to whether or not degree of deviation Dist_10 of "this moment" of this time relative to "this moment" of the previous time calculated in step S528 or degree of deviation Dist_20 of "this day" of this time relative to "this day" of the previous time calculated in step S530 is a negative value.

If Dist_10 or Dist_20 is a negative value and drive operation of the driver of this time has been improved compared to that of the previous time, the flow of control proceeds to step S570 and the controller 100 presents an instruction to the driver. After presenting the instruction, the controller 100 terminates the processing. For instance, as instruction presentation contents, the controller 100 outputs a display and a voice that praise the drive operation of the driver. For example, a voice "You are driving carefully. Keep it up!" comes out.

It is to be noted that although the above examples of displays and voices include an expression "vehicle separation", with which the driver is familiar, displays and voices may include an expression "time headway". Furthermore, it may be configured that the display and voice same as those in the fourth embodiment are output.

In the fifth embodiment, the controller 100 carries out drive diagnosis of the driver in the case where the vehicle is traveling along the same road. In other words, the controller 100 determines the travel condition whether or not spatial ranges conform with respect to drive operation of the driver. The controller 100 may determine the travel condition whether or not temporal ranges, e.g. period of time of travel and the like, conform with respect to drive operation. Furthermore, the controller 100 may determine the travel condition whether or not spatial ranges and temporal ranges of drive operation conform, e.g. whether or not the vehicle is traveling along the same road at the same period of time.

Thus, in the fifth embodiment explained above, safety awareness and operation preference characteristics of the driver are detected as an index for drive diagnosis. More specifically, time headway THW of the vehicle and the leading vehicle at the time at which the vehicle follows the leading vehicle is calculated. Since time headway THW indicates period of time until the vehicle reaches the present position of the leading vehicle, accurate drive diagnosis is assured in follow-up travel scene by using the time headway THW as an index indicating characteristics of the driver when the vehicle follows the leading vehicle.

Variation of the Fifth Embodiment

A plurality of data calculated/stored when the vehicle traveled along the same road in the past may be used as data of the past follow-up characteristics used as a reference for comparison of the current follow-up characteristics therewith. More specifically, data of all the past follow-up characteristic values of traveling along the same road which have been stored in the database are read and used.

When the data of the plurality of the follow-up characteristic value are processed, those data are replaced by their representative values. For example, if the mean value Mean_x (n) and the standard deviation Stdev_x(n) of time headway THW are used as follow-up characteristic values, addition theorem is used to calculate their representative values. For instance, in the case where two pairs of data obtained in the past are used, representative values of $N_1(\mu_1, \sigma_1^2)$ and $N_2(\mu_2, \sigma_2^2)$ are $N(\mu_1+\mu_2, \sigma_1^2+\sigma_2^2)$ where distribution is denoted by N, the mean value is denoted by $\mu$, and standard deviation is denoted by $\sigma$.

Sixth Embodiment

A driving assistance system for vehicle according to the sixth embodiment of the present invention will now be explained. The basic structure of the driving assistance system for vehicle according to the sixth embodiment is the same as that of the fourth embodiment presented in FIG. 21. Therefore, the difference from the above-described fourth embodiment will now be explained mainly.

The driving assistance system 1 for vehicle according to the sixth embodiment, as is the case with that according to the fourth embodiment, follow-up characteristics of the driver as the vehicle follows the leading vehicle is calculated as a probability density function. The controller 100 carries out drive diagnosis by calculating degree of deviation $Dist_{diff}$ representing the difference in a plurality of probability density distribution having been obtained in different time spans. Here, in the sixth embodiment, the controller 100 uses data of the traveling condition of the vehicle as it follows the leading vehicle and data of the operating state of the driver so as to recursively calculate the probability density function expressing the follow-up characteristics.

Figure 36:
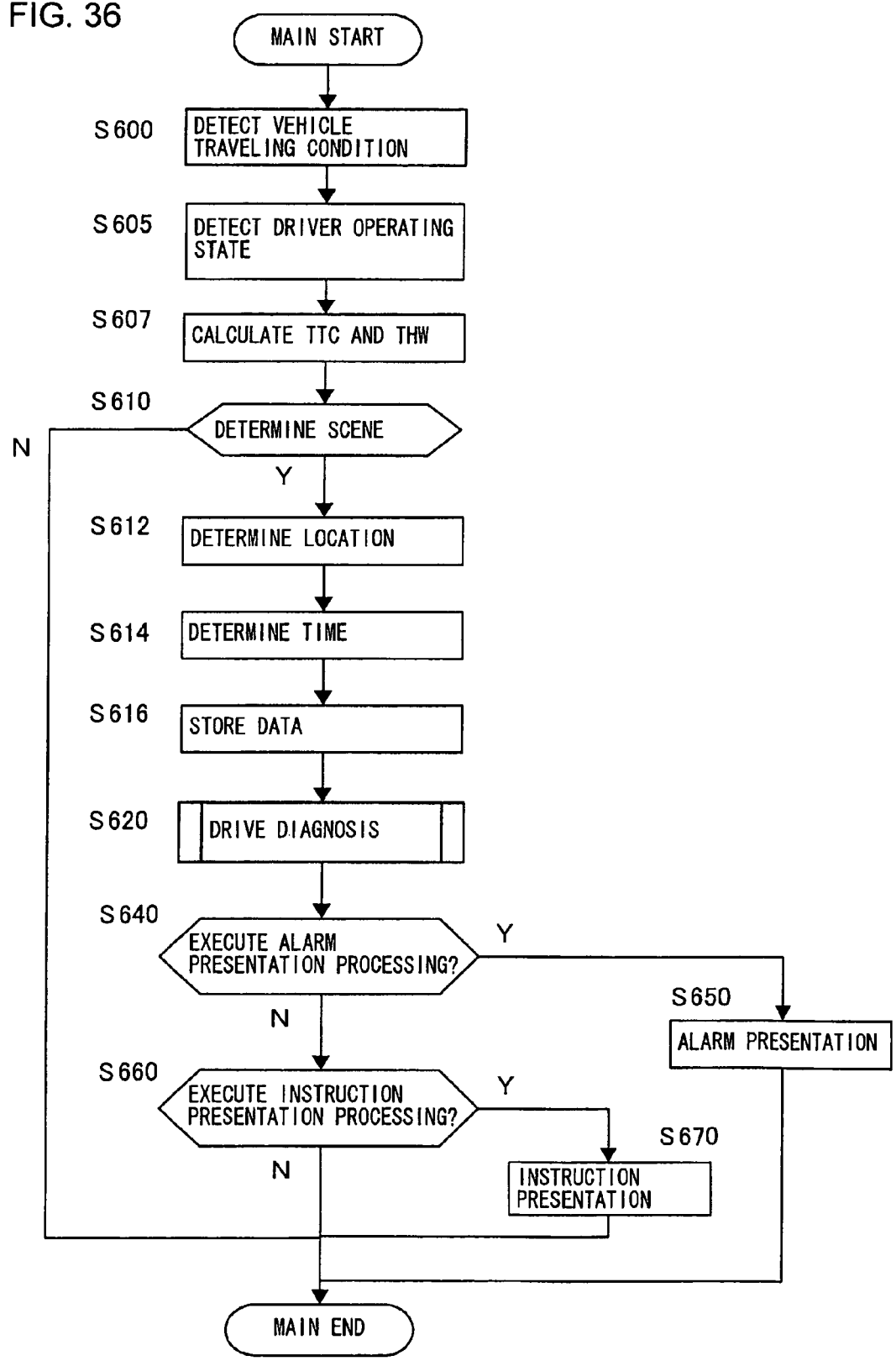

The behavior of the driving assistance system 1 for vehicle according to the sixth embodiment will now be explained in detail with reference to FIG. 36. FIG. 36 is a flow chart illustrating the procedure of driving assistance control processing performed by the controller 100 achieved in the sixth embodiment. The processing is performed continuously at regular intervals, e.g., for every 50 msec. Since the processing executed in steps S600 to S616 are the same as those executed in steps S400 to S416 of the flow chart shown in FIG. 3, explanations thereof will be omitted.

In step S620, the data stored in step S616 are used to carry out drive diagnosis of the driver. Drive diagnosis is carried out based on driving characteristics of the driver in a traffic scene in which the vehicle is stably following the leading vehicle. Driving characteristics when the vehicle is following the leading vehicle include, for instance, time headway THW of the vehicle and the leading vehicle, inverse of time headway THW, vehicle separation, inverse of vehicle separation, and so on. In the sixth embodiment, a case in which time headway THW is used is explained as an example.

The data structure of the driving assistance system 1 for vehicle is the same as that in the fourth embodiment shown in FIG. 25. A layer A represents the amount of data of relatively short-duration "this moment", which indicates the current operating condition of the driver. A layer B represents the amount of data of "this day", indicating the operating condition of the day of the driver, which is longer than "this moment". A layer C represents the amount of data of "usual" indicating the usual operating condition of the driver, which is longer than "this day", i.e., personal characteristics. A layer D represents the amount of data of driving characteristics of "general public", which is used to compare drive operation of each driver with that of a general driver and to diagnose the drive operation of each driver.

A lower layer has a larger amount of data. The amount of data included in each of the layers corresponds to the number of samples used to calculate the mean values of time headway THW in "this moment", "this day", and "usual". The data structure shown in FIG. 25 is achieved by varying the number of the samples. The values of data included in each of the layers are continually updated by real-time calculations explained below.

Figure 37:
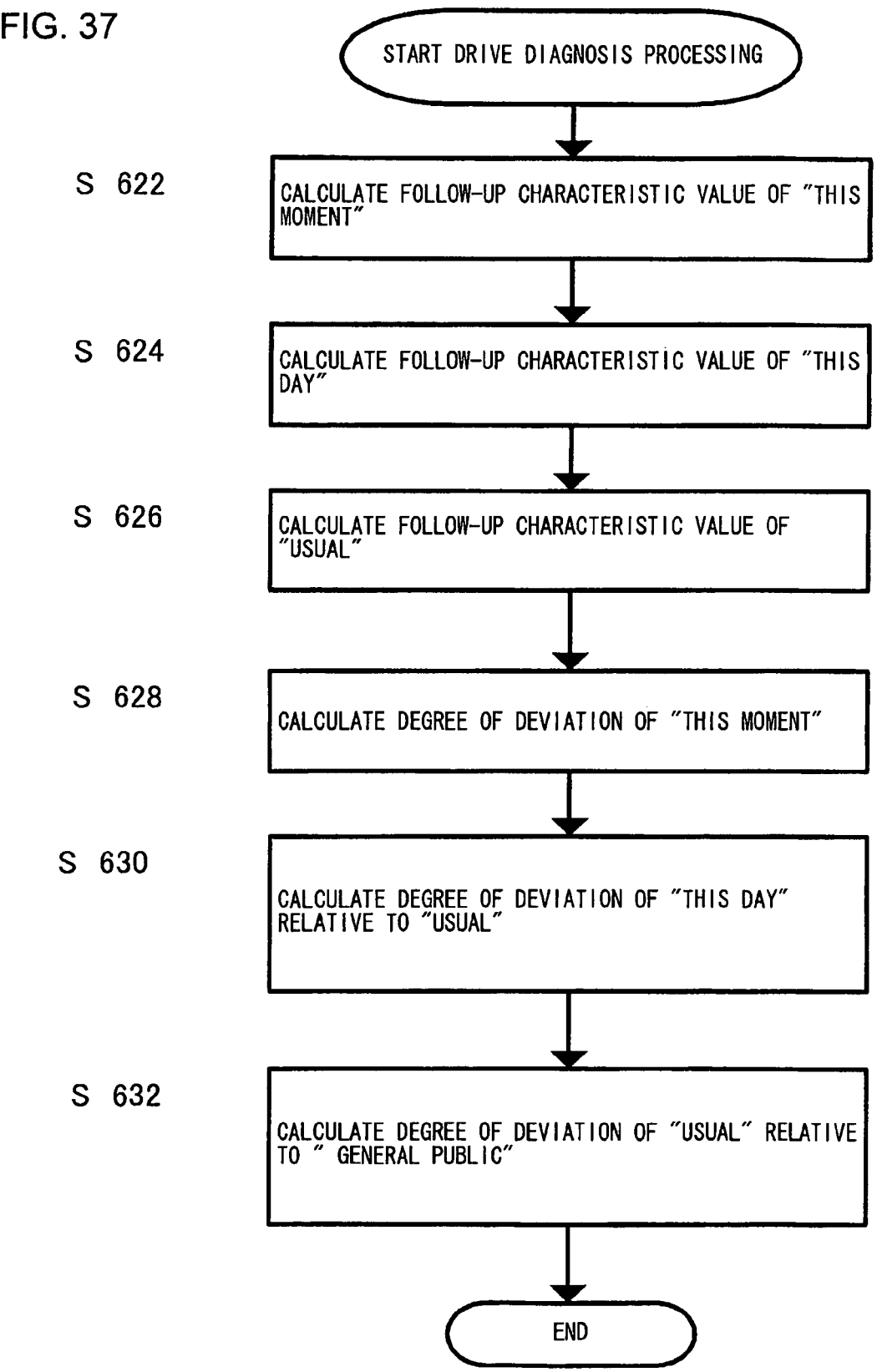

In drive diagnosis processing, the data of each of the layer A to the layer D are used to determine drive operation of the driver in different time spans, i.e., in "this moment", "this day", and "usual". The drive diagnosis processing executed in step S620 will be explained in detail with reference to the flow chart of FIG. 37.

In step S622, the controller 100 calculates a follow-up characteristic value of the driver of "this moment" so as to carry out drive diagnosis of "this moment" of the driver. As a follow-up characteristic value of the driver, the controller 100 calculates a distribution of time headway THW in a predetermined period of time that defines "this moment". Here, the predetermined time (time window) that defines "this moment" is, for example, 60 seconds, and, the distribution of time headway THW is calculated using data for 60 seconds from the past to the present detected in the stable follow-up travel scene determined in step S610.

Figure 38:
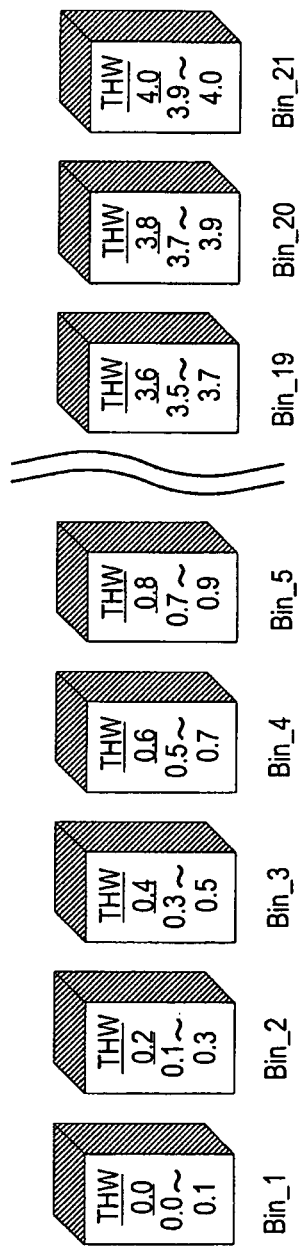

More specifically, in order to calculate distribution of time headway THW, the controller 100 recursively calculates the probability density of time headway THW in a predetermined period of time that defines "this moment". To do this, first of all, as shown in FIG. 38, a plurality of bins are prepared so as to put data of time headway THW. A total of 21 bins (arrays) are prepared, each of which is set by 0.2 from THW=0 to THW=4. In the example presented in FIG. 38, it is set that data of THW from 0.0 to 0.1 are put into the leftmost bin, THW0.0(Bin_1), and data of THW from 0.1 to 0.3 are put into the second bin from the left, THW0.2(Bin_2).

Next, predetermined values are put into each of the bins, Bin_1 to Bin_21, as an initial value.

Figure 39:
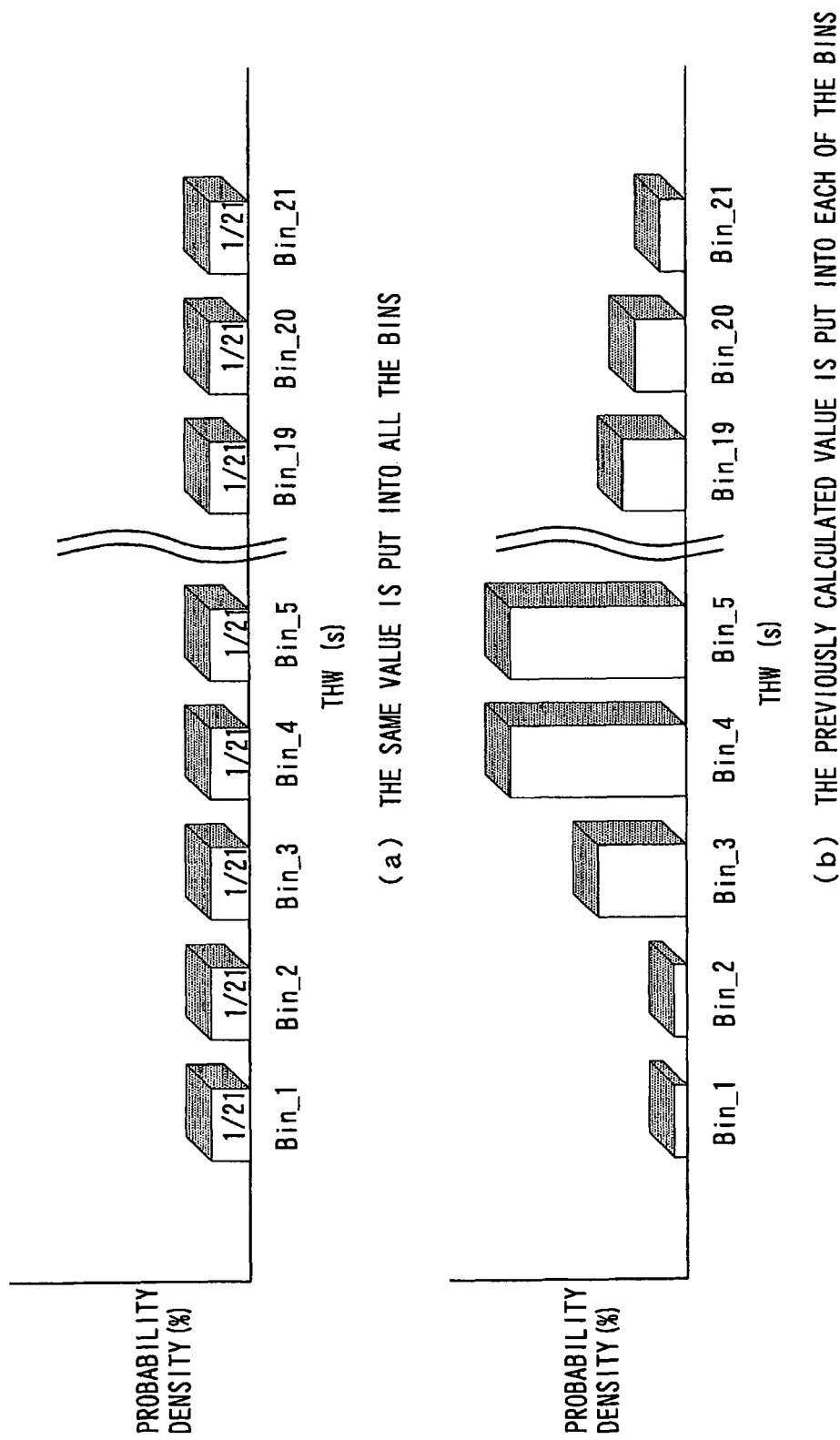

Predetermined values are set so that the sum of the predetermined values put in all the bins equals to 1. For example, as shown in FIG. 39(a), the predetermined values may be set so that the same value (½₁) is put into each of the bins Bin_1 to Bin_21 (=1/the total number of bins). However, in the case of time headway THW that shows a bell-shaped distribution having a certain value in the center thereof, as shown in FIG. 39(b), it is preferred to designate the previously calculated distribution as predetermined values. In other words, probability densities of the previously calculated distribution are designated as initial values of each of the bins Bin_1 to Bin_21. This allows distribution to be calculated more accurately. It is to be noted that the horizontal axes of FIGS. 39(a) and (b) represent time headway THW (s) and the vertical axes thereof represent probability density.

The predetermined time (time window) that defines "this moment" is, for example, 60 seconds as described above. The number of data in the set time window is denoted by N.

Next, probability density is calculated in real time.

Every time new data of time headway THW are obtained, the controller 100 determines which of the bins the new time headway THW corresponds to. There is a difference in calculation method of probability density between the bins into which new data are put and those into which new data are not put. Probability density Bin_x(n) of the bins into which new data are put is calculated using the following equation (39).

$$\text{Bin\_}x(n) = \{\text{Bin\_}x(n-1) + 1/N\} \div (1 + 1/N) \quad \text{(Equation 39)}$$

Probability density Bin_x(n) of the bins into which new data are not put is calculated using the following equation (40).

$$\text{Bin\_}x(n) = \{\text{Bin\_}x(n-1)\} \div (1 + 1/N) \quad \text{(Equation 40)}$$

Figure 40:
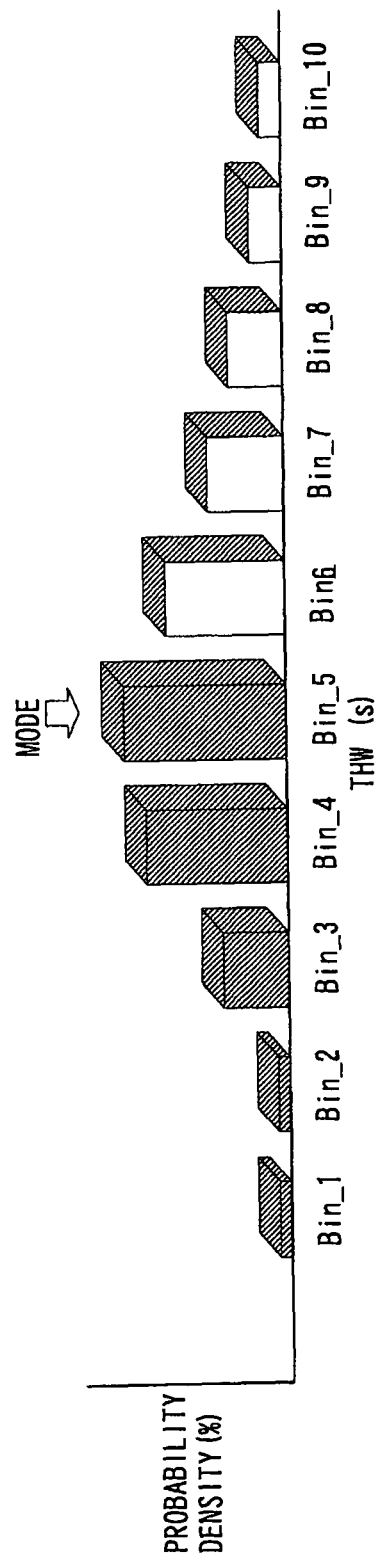

Thus, probability density of time headway THW of "this moment" is calculated in real time so as to obtain distribution of time headway THW that conforms well with the actual distribution. FIG. 40 presents an example of distribution of time headway THW. The mode of the distribution presented in FIG. 40 is at Bin_5. It is to be noted that only ten bins, Bin_1 to Bin_10, are illustrated for the sake of simplicity.

In step S624, in order to carry out drive diagnosis of "this day" of the driver, the controller 100 calculates a follow-up characteristic value of the driver of "this day", i.e., distribution of time headway THW in a predetermined period of time that defines "this day". Here, the predetermined time (time window) that defines "this day" is, for example, 360 seconds, and, as is the case with the above described "this moment", the distribution of time headway THW is calculated using data for 360 seconds from the past to the present detected in the stable follow-up travel scene determined in step S610.

In step S626, in order to carry out drive diagnosis of "usual" of the driver, the controller 100 calculates a follow-up characteristic value of the driver of "usual", i.e., distribution of time headway THW in a predetermined period of time that defines "usual". Here, the predetermined time (time window) that defines "usual" is, for example, 2160 seconds, and, using data for 2160 seconds from the past to the present detected in the stable follow-up travel scene having been determined in step S610, the controller 100 calculates the distribution of time headway THW as is the case with the above described "this moment".

In processing after the following step S628, the follow-up characteristics of the driver based on data obtained in different time spans calculated in steps S622, S624, and S626 are each compared so that the controller 100 diagnoses the drive operation of the driver based on how much both of the follow-up characteristics deviate. In other words, in the data structure shown in FIG. 25, an upper layer (e.g., the layer A) is compared with a lower layer (e.g., the layer B) so as to carry out the drive diagnosis.

At first, in step S628, the controller 100 calculates the degree of deviation that indicates how much the follow-up characteristics of the driver of "this moment" deviate from those of "this day". Here, the degree of deviation of "this moment" relative to "this day" indicates the difference between the distribution of time headway THW of "this day" and that of "this moment".

The mode of distribution of time headway THW of "this day", which is a distribution of reference, and the mode of distribution of time headway THW of "this moment", which is a distribution of comparison target, are each calculated. Then, the controller 100 calculates the probability of time headway THW that is distributed in the side where time headway THW is shorter than each of the modes of time headway THW, i.e., in the riskier direction. Probability $F_{std}$ of reference distribution and probability $F_{comp}$ of comparison distribution on the riskier side are calculated using the following equations (41) and (42), respectively.

$$F_{std} \sum_{x=1}^{x_{mode}} Bin_{std}(x) \quad \text{(Equation 41)}$$

$$F_{comp} \sum_{x=1}^{x_{mode}} Bin_{comp}(x) \quad \text{(Equation 42)}$$

Degree of deviation $Dist_{diff}$ of "this moment" relative to "this day" is calculated using the following equation (43).

$$Dist_{diff} = F_{comp} - F_{std} \quad \text{(Equation 43)}$$

It is indicated that as degree of deviation $Dist_{diff}$ increases in a positive direction, the operation of the driver of "this moment" is biased in the direction in which time headway THW is short more than that of "this day" is, i.e., in a more risky direction. It is indicated that as degree of deviation $Dist_{diff}$ increases in a negative direction, the operation of the driver of "this moment" is biased in the direction in which time headway THW is long more than that of "this day" is, i.e., in a less risky direction. Degree of deviation $Dist_{diff}$ becomes zero when the driver is always engaged in an operation with the same follow-up characteristics.

In step S628, the controller 100 also calculates degree of deviation $Dsit_{diff}$ of "this moment" relative to "usual". In this case, distribution of time headway THW of "usual" is used as a distribution of reference indicating long-duration action distribution, and distribution of time headway THW of "this moment" is used as a distribution of comparison target indicating short-duration action distribution. Then, the controller 100 uses probability $F_{std}$ of "usual" and probability $F_{comp}$ of "this moment" on the riskier side so as to calculate the degree of deviation $Dist_{diff}$ of "this moment" relative to "usual" using the above described equation (43).

Thus, in step S628, the controller 100 calculates the degree of deviation $Dist_{diff}$ of "this moment" relative to "this day", and then the flow of control proceeds to step S630. In step S630, as is the case with the processing executed in step S628, the controller 100 calculates degree of deviation $Dist_{diff}$ of "this day" relative to "usual". It is to be noted that here distribution of time headway THW of "usual" is used as a distribution of reference and distribution of time headway THW of "this day" is used as a distribution of comparison target.

In the following step S632, as is the case with the processing executed in step S628, the controller 100 calculates degree of deviation $Dist_{diff}$ of "usual" relative to "general public". It is to be noted that here distribution of time headway THW of "general public" is used as a distribution of reference and distribution of time headway THW of "usual" is used as a distribution of comparison target. An appropriate value is set in advance as a fixed value for the follow-up characteristic value of "general public", i.e., probability $F_{std}$ on the side riskier than the mode.

Thus, after drive diagnosis of the driver is carried out in step S620 using data obtained in a plurality of different time spans, the flow of control proceeds to step S640. It is to be noted that for the sake of simplicity, degree of deviation $Dist_{diff}$ of "this moment" relative to "usual" will be denoted by Dist_1a, degree of deviation $Dist_{diff}$ of "this moment" relative to "this day" will be denoted by Dist_1b, degree of deviation $Dist_{diff}$ of "this day" relative to "usual" will be denoted by Dist_2, and degree of deviation $Dist_{diff}$ of "usual" relative to "general public" will be denoted by Dist_3.

In step S640, the controller 100 determines whether or not to execute alarm presentation processing based on the drive diagnosis result in step S620. Here, the controller 100 makes a decision as to whether or not degree of deviation Dist_1a of "this moment" relative to "usual", degree of deviation Dist_1b of "this moment" relative to "this day" calculated in step S628, or degree of deviation Dist_2 of "this day" relative to "usual" calculated in step S630 is greater than a threshold value (for example, 0.30) used to determine whether or not to present an alarm. When degree of deviation Dist_1a, Dist_1b, or Dist_2 is greater than the threshold value, the flow of control proceeds to step S650 so that the controller 100 presents the alarm to the driver. The contents of the alarm presented to the driver are the same as those in the above-described fourth embodiment. After presenting the alarm, the controller 100 terminates the processing.

If a negative decision is made in step S640 and the alarm is not presented, the flow of control proceeds to step S660 and the controller 100 determines whether or not to execute instruction presentation processing based on the drive diagnosis result in step S620. Here, the controller 100 makes a decision as to whether or not degree of deviation Dist_3 of "usual" relative to "general public" calculated in step S632 is smaller than a threshold value (for example, 0.07) to present an instruction (improvement suggestion). The threshold value to present an instruction is an appropriately pre-set value within whose range the degree of deviation of the same driver substantially always falls.

If Dist_3 is smaller than the threshold value, the flow of control proceeds to step S670 and the controller 100 presents an instruction to the driver. The contents of the instruction presented to the driver are the same as those in the above-described first embodiment. After presenting the instruction, the controller 100 terminates the processing.

Thus, in the sixth embodiment explained above, safety awareness and operation preference characteristics of the driver are detected as an index for drive diagnosis. More specifically, time headway THW of the vehicle and the leading vehicle at the time at which the vehicle follows the leading vehicle is calculated. Since time headway THW indicates period of time until the vehicle reaches the present position of the leading vehicle, accurate drive diagnosis is assured in follow-up travel scene by using the time headway THW as an index indicating characteristics of the driver when the vehicle follows the leading vehicle.

Seventh Embodiment

Figure 41:
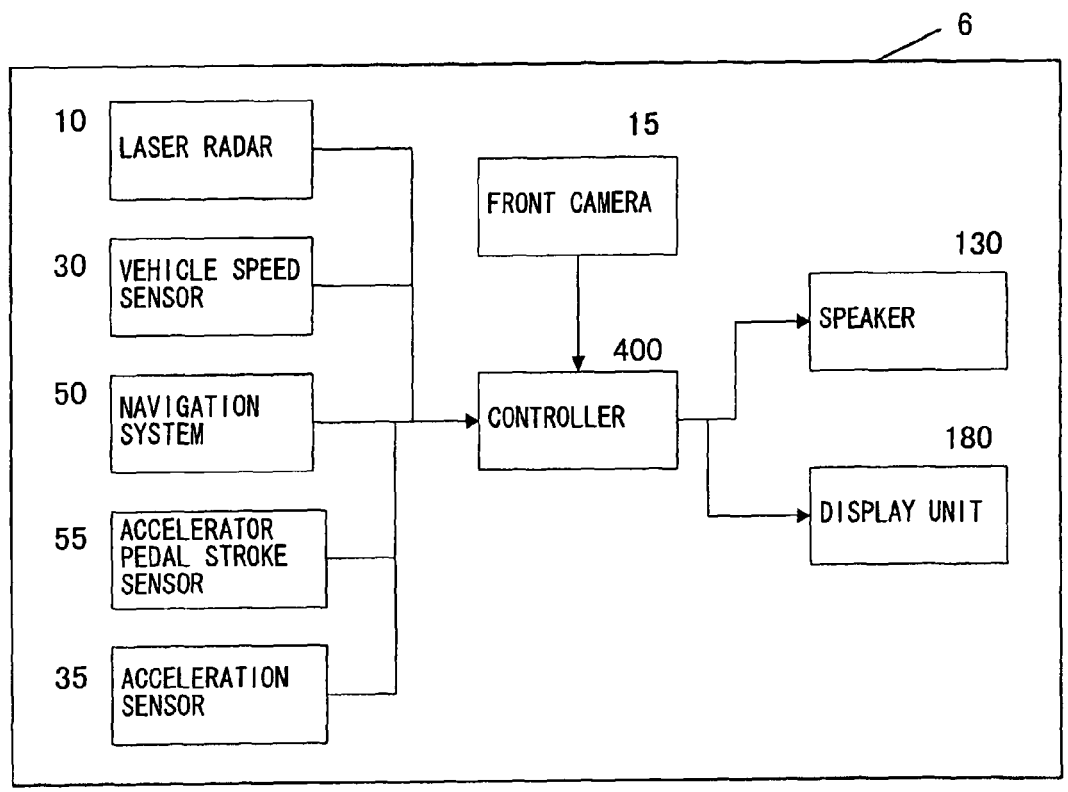

A driving assistance system for vehicle according to the seventh embodiment of the present invention will now be explained. FIG. 41 shows a control diagram showing the structure of the driving assistance system 6 for vehicle according to the seventh embodiment. In FIG. 41, the same reference numerals are assigned to units having functions identical to those in the first embodiment shown in FIG. 1, and explanations thereof will be omitted. Therefore, the difference from the first embodiment will now be explained mainly.

The driving assistance system 6 for vehicle according to the seventh embodiment includes the laser radar 10, the front camera 15, the vehicle speed sensor 30, the acceleration sensor 35, the navigation system 50, the accelerator pedal stroke sensor 55, a controller 400, the speaker 130, the display unit 180, and the like.

The front camera 15 is a small CCD camera, a CMOS camera, or the like mounted on top of the front window, which detects the traffic situation ahead as an image. The controller 400 performs image processing on an image signal received from the front camera 15 and detects lane markings and the like in a region in front of the vehicle. It is to be noted that the region detected by the front camera 15 is approximately ±30 deg horizontally with respect to the vehicle longitudinal centerline, and the front view of the road included in the region is loaded as an image. The acceleration sensor 35 is a sensor that detects longitudinal acceleration of the vehicle and outputs the detected longitudinal acceleration to the controller 400.

In the seventh embodiment, the controller 400 detects driving characteristics on start-up of the vehicle and carries out drive diagnosis using the detected driving characteristics as an index.

Figure 42:
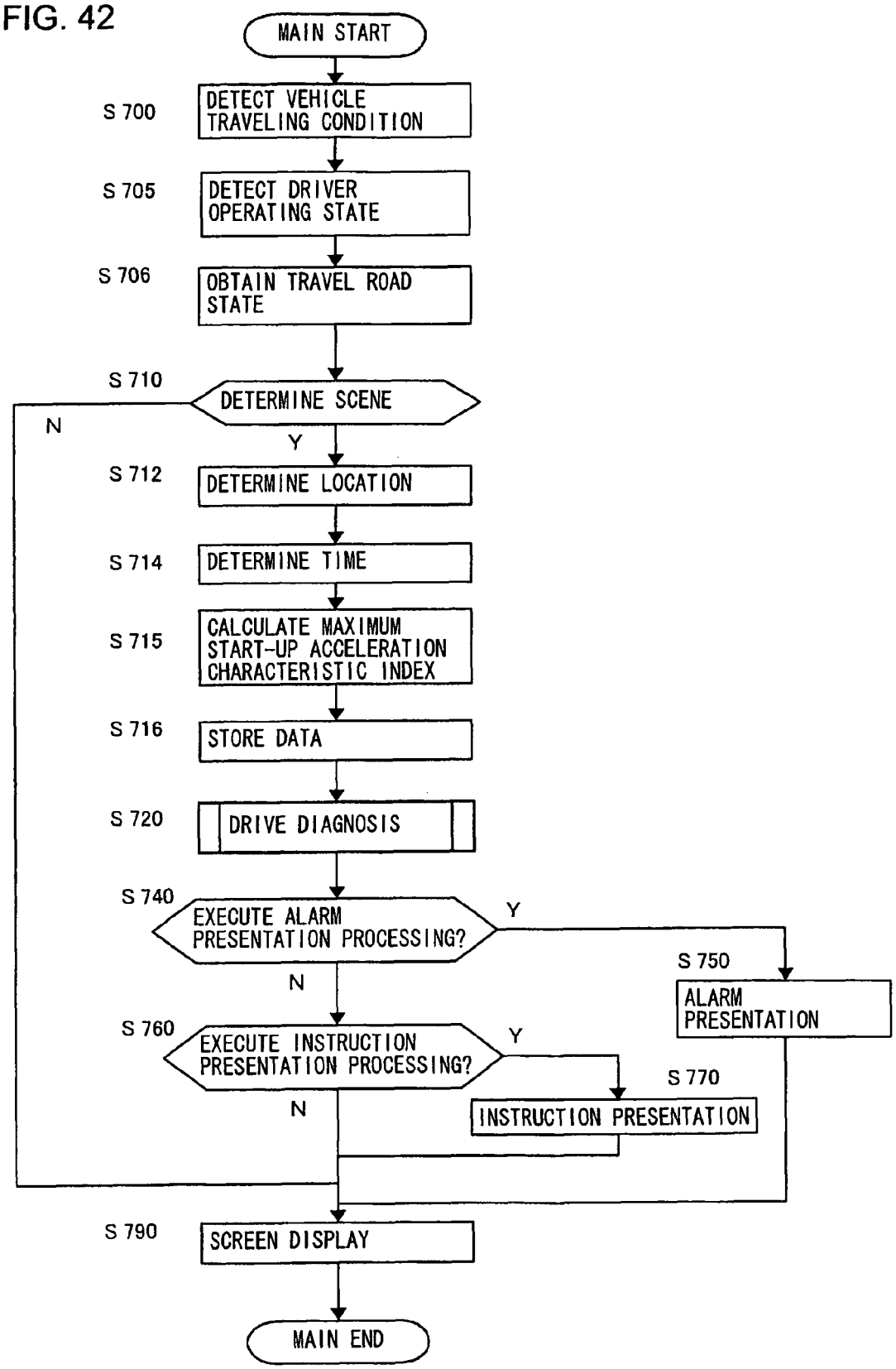

The behavior of the driving assistance system 6 for vehicle according to the seventh embodiment will now be explained in detail with reference to FIG. 42. FIG. 42 is a flow chart illustrating the procedure of driving assistance control processing performed by the controller 400 achieved in the seventh embodiment. The processing is performed continuously at regular intervals, e.g., for every 50 msec.

At first, in step S700, traveling conditions of the vehicle are detected. Here, as the traveling conditions of the vehicle, the controller 400 obtains velocity V of the vehicle detected by the vehicle speed sensor 30, the presence of a leading vehicle detected by the laser radar 10, and longitudinal acceleration xg detected by the acceleration sensor 35. The longitudinal acceleration xg is divided by 9.8 m/s$^2$ so as to calculate G-value. In addition, the longitudinal acceleration xg is time differentiated so as to calculate a jerk value. The longitudinal acceleration xg and the jerk value are major indices that represent ride quality and feeling of discomfort on start-up of the vehicle.

In step S705, operating states of the driver are detected. Here, as the operating states of the driver, the controller 400 obtains accelerator pedal operation amount detected by the accelerator pedal stroke sensor 55. In addition, the accelerator pedal operation amount is time differentiated so as to calculate an accelerator pedal operation velocity.

In step S706, condition of the road in which the vehicle is present is obtained. More specifically, the controller 400 obtains the shape of the road in which the vehicle is present by using images captured by the navigation system 50 and the front camera 15.

In step S710, the traffic scene of the vehicle is determined. The accuracy of drive diagnosis is improved by limiting conditions to vehicle traveling conditions and operating states of the driver, and, in order to reduce discomfort to the driver when information is provided to the driver in response to the drive diagnosis result, traffic scene of the vehicle is determined so that drive diagnosis is carried out solely in a particular traffic scene. More specifically, drive diagnosis is carried out exclusively in a traffic scene in which the vehicle starts to move with no obstacles ahead from a stopping state.

Examples of conditions of traffic scene of single start-up are as follows.

(a) There is no leading vehicle in the detection region of the laser radar 10

(b) The road in which the vehicle is present is substantially a straight road (R≥800 m)

(c) The vehicle has just started to move from a stopping state (vehicle velocity is 0 km/h) (for instance, equal to or less than 10 seconds after start-up)

When the conditions (a) to (c) are all satisfied, the controller 400 determines that the vehicle is in a traffic scene in which the vehicle starts up singly, and the flow of control proceeds to step S712 for the controller 400 to carry out drive diagnosis. On the other hand, in the case where any of the conditions (a) to (c) is not satisfied, the controller 400 determines that the traffic scene of the vehicle does not correspond to a particular traffic scene, does not carry out drive diagnosis, and terminates the processing.

In step S712, travel location is determined. In step S714, the present time is recorded. In step S715, the controller 400 calculates the maximum value of start-up acceleration characteristic index equal to or less than 10 seconds after the vehicle starts up from a stopping state. Start-up acceleration characteristic indices include, for example, the longitudinal acceleration xg, the G-value, the jerk value, accelerator pedal operation amount, the accelerator pedal operation velocity, and the like. Here, a case in which the longitudinal acceleration xg is used is explained as an example.

In step S716, based on the labeling results in steps S712 and S714, the controller 400 stores data used to carry out drive diagnosis of the driver. Here, for example, the present time, i.e., the time at which the vehicle traveled in the link, the travel distance, a start-up acceleration characteristic index in the link, the number of travels in the link, and the like are written in the structure for each link ID so as to create traffic road database.

Figure 43:
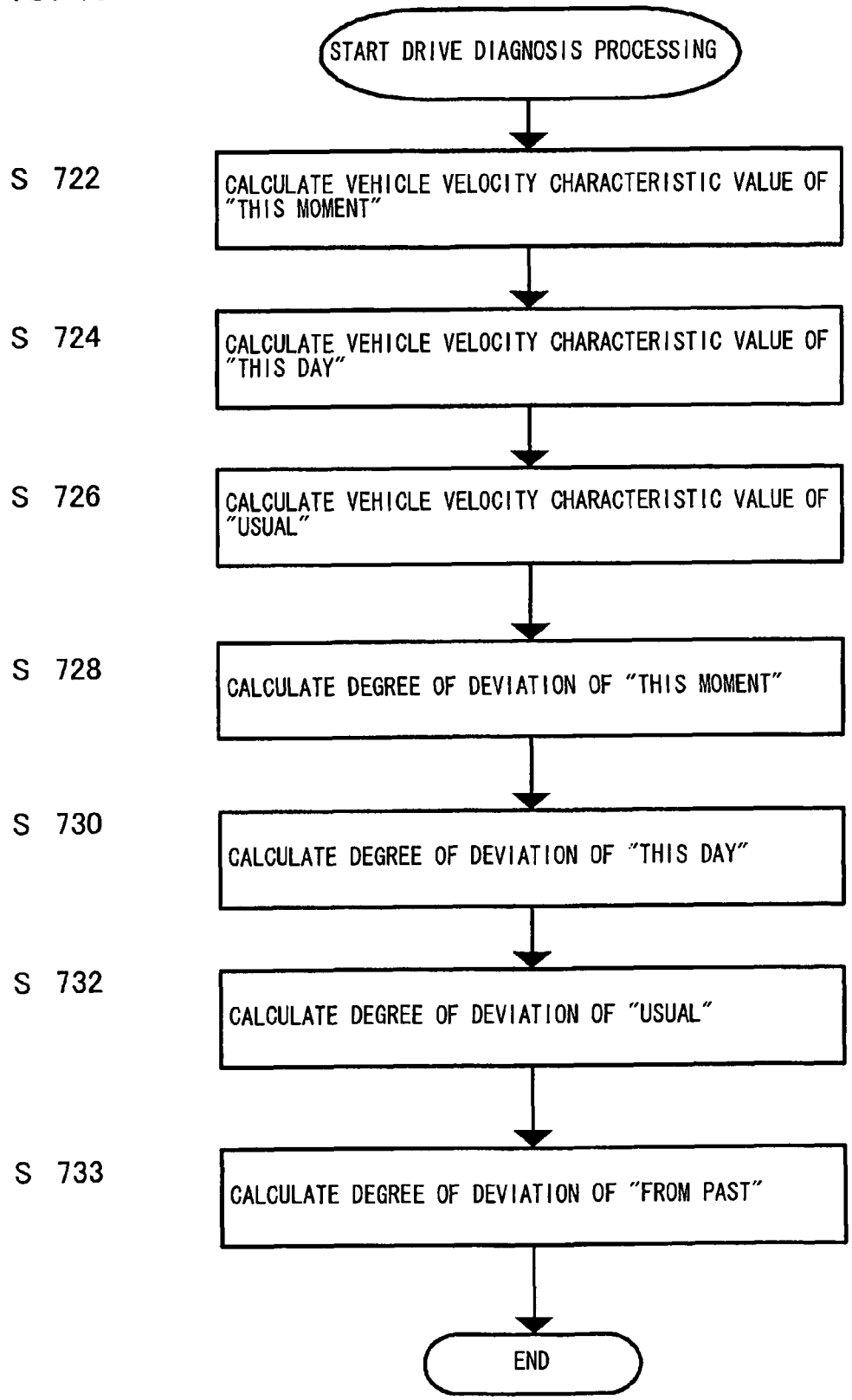

In the following step S720, the data stored in step S716 are used to carry out drive diagnosis of the driver. Drive diagnosis is carried out based on acceleration characteristics in a single start traffic scene. In drive diagnosis processing, the data of each of the layer A to the layer D of the data structure shown in FIG. 4 are used to determine drive operation of the driver in different time spans, i.e., in "this moment", "this day", and "usual". The drive diagnosis processing executed in step S720 will be explained in detail with reference to the flow chart of FIG. 43.

In step S722, start-up acceleration characteristic values of the driver of "this moment" are calculated so as to carry out drive diagnosis of "this moment" of the driver. As start-up acceleration characteristic values of the driver, the controller 400 calculates the mean value Mean_x(n) and the standard deviation Stdev_x(n) of the longitudinal acceleration xg in a predetermined period of time that defines "this moment". Here, the predetermined period of time that defines "this moment" is, for example, the latest three start-ups, and, the mean value Mean_x(n) and the standard deviation Stdev_x(n) of longitudinal acceleration xg are calculated using data (the number of data K=3) detected in the latest three start-ups. The mean value Mean_x(n) and the standard deviation Stdev_x(n) are calculated using equations (5) and (7), respectively, as is the case with the first embodiment.

In step S724, in order to carry out drive diagnosis of "this day" of the driver, the controller 400 calculates start-up acceleration characteristic values of the driver of "this day", i.e., the mean value Mean_x(n) and the standard deviation Stdev_x(n) of the longitudinal acceleration xg in a predetermined period of time which defines "this day". Here, the predetermined period of time that defines "this day" is, for instance, the latest 18 start-ups, and the mean value Mean_x(n) and the standard deviation Stdev_x(n) of the longitudinal acceleration xg are calculated using data (the number of data K=18) detected in the latest 18 start-ups.

In step S726, in order to carry out drive diagnosis of "usual" of the driver, the controller 400 calculates start-up acceleration characteristic values of the driver of "usual", i.e., the mean value Mean_x(n) and the standard deviation Stdev_x(n) of the longitudinal acceleration xg in a predetermined period of time which defines "usual". Here, the predetermined period of time that defines "usual" is, for instance, the latest 108 start-ups, and the mean value Mean_x(n) and the standard deviation Stdev_x(n) of the longitudinal acceleration xg are calculated using data (the number of data K=108) detected in the latest 108 start-ups.

More specifically, as is the case with "this moment", the equations (5) and (7) are used to calculate the mean value Mean_x(n) and the standard deviation Stdev_x(n).

In processing after the following step S728, drive diagnosis of the driver is carried out using the driving characteristic values calculated in steps S722, S724, and S726. Here, the driving characteristics of the driver based on data obtained in different time spans are each compared so as to diagnose the drive operation of the driver based on how much both of the driving characteristics deviate. In other words, in the data structure shown in FIG. 4, an upper layer (e.g., the layer A) is compared with a lower layer (e.g., the layer B) so as to carry out the drive diagnosis.

At first, in step S728, the controller 400 calculates the degree of deviation that indicates how much the driving characteristics of the driver of "this moment" deviate from those of "this day". Here, the degree of deviation of "this moment" relative to "this day" indicates the difference between the distribution of the acceleration xg of "this day" and that of "this moment". In order to calculate the degree of deviation of "this moment" relative to "this day", the distribution of the acceleration xg of "this day" is used as a reference distribution which represents a long-duration action distribution, and the distribution of the acceleration xg of "this moment" is used as a distribution of comparison target which represents a short-duration action distribution. Here, as is the case with the first embodiment, the above-described equation (13) or equation (16) is used to calculate degree of deviation $Dist_{diff}$.

Thus, after the degrees of deviation $Dist_{diff}$ of "this moment" relative to "this day" and "this moment" relative to "usual" are each calculated in step S728, the flow of control proceeds to step S730. In step S730, as is the case with processing executed in step S728, the degree of deviation $Dist_{diff}$ of "this day" relative to "usual" is calculated. It is to be noted that here, the distribution of the acceleration xg of "usual" is used as a reference distribution that represents long-duration action distribution, whilst the distribution of the acceleration xg of "this day" is used as a distribution of comparison target that represents short-duration action distribution.

In the following step S732, as is the case with processing executed in step S728, degree of deviation $Dist_{diff}$ of "usual" relative to "general public" is calculated. It is to be noted that here, the distribution of the acceleration xg of "general public" is used as a reference distribution that represents long-duration action distribution, whilst the distribution of the acceleration xg of "usual" is used as a distribution of comparison target that represents short-duration action distribution. An appropriate value is set in advance as a fixed value for the start-up acceleration characteristic values of "general public", i.e., the mean value and the standard deviation of the acceleration xg at the time of single start-up.

In step S733, the start-up acceleration characteristics of "this day" detected in the past are compared with those of this time so as to calculate degree of deviation $Dist_{diff}$ of "this time" relative to "the past". More specifically, the distribution of the acceleration xg of "this day" detected in the latest period (for instance, the previous day) is used as a reference distribution that represents long-duration action distribution, whilst the distribution of the acceleration xg of "this day" detected this time is used as a distribution of comparison target that represents short-duration action distribution, and the above-described equation (13) or equation (16) is used to calculate the degree of deviation $Dist_{diff}$.

Thus, after drive diagnosis of the driver is carried out in step S720 using data obtained in a plurality of different time spans, the flow of control proceeds to step S740. It is to be noted that for the sake of simplicity, degree of deviation $Dist_{diff}$ of "this moment" relative to "this day" will be denoted by Dist_1, degree of deviation $Dist_{diff}$ of "this day" relative to "usual" will be denoted by Dist_2, degree of deviation $Dist_{diff}$ of "usual" relative to "general public" will be denoted by Dist_3, and degree of deviation $Dist_{diff}$ of "this day of this time" relative to "this day in the past" will be denoted by Dist_4.

In step S740, the controller 400 determines whether or not to execute alarm presentation processing based on the drive diagnosis result in step S720. Here, a decision is made as to whether or not degree of deviation Dist_1 of "this moment" relative to "this day" calculated in step S728, degree of deviation Dist_2 of "this day" relative to "usual" calculated in step S730, or degree of deviation Dist_4 of "this day of this time" relative to "this day of the past" calculated in step S733 is greater than a threshold value (for instance 0.30) used to determine whether or not to execute an alarm presentation. In the case where degree of deviation Dist_1, Dist_2, or Dist_4 is greater than the threshold value, the flow of control proceeds to step S750, and the controller 400 performs an alarm presentation to the driver. After performing the alarm presentation, the controller 400 terminates the processing.

Figure 44:
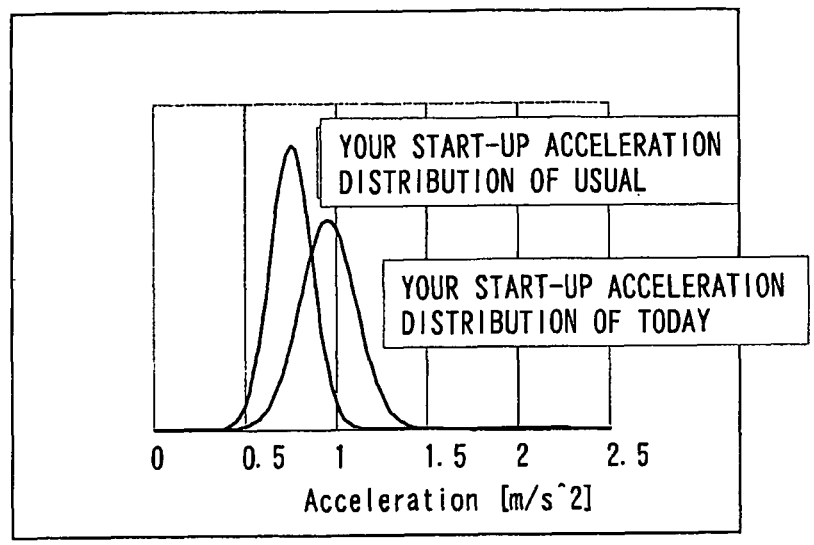

FIG. 44 shows an example of display of alarm presentation in visual information. This display enables the tendency of start-up acceleration of this day (obtained data result of intermediate-duration) to be compared with that of usual (obtained data result of long-duration). FIG. 44 indicates that acceleration of today tends to be higher than that of usual.

In the case where alarm presentation is performed in audio information, audio information is output from the speaker 130 according to degree of deviation. For instance, in the case where the degree of deviation Dist_2 of "this day" relative to "usual" is greater than the threshold value, a voice "Start-up acceleration is higher than usual" is output. In the case where the degree of deviation Dist_1 of "this moment" relative to "this day" is greater than the threshold value, a voice "Start-up acceleration is high" is output. In the case where the degree of deviation Dist_4 of "this day of this time" relative to "this day of the past" is greater than the threshold value, a voice "Start-up acceleration is higher than before" is output.

If a negative decision is made in step S740 and the alarm is not presented, the flow of control proceeds to step S760 and the controller 400 determines whether or not to execute instruction presentation processing based on the drive diagnosis result in step S720. Here, a decision is made as to whether or not degree of deviation Dist_3 of "usual" relative to "general public" calculated in step S732 is smaller than a threshold value (for example, 0.07) used to determine whether or not to present an instruction (improvement suggestion).

Figure 45:
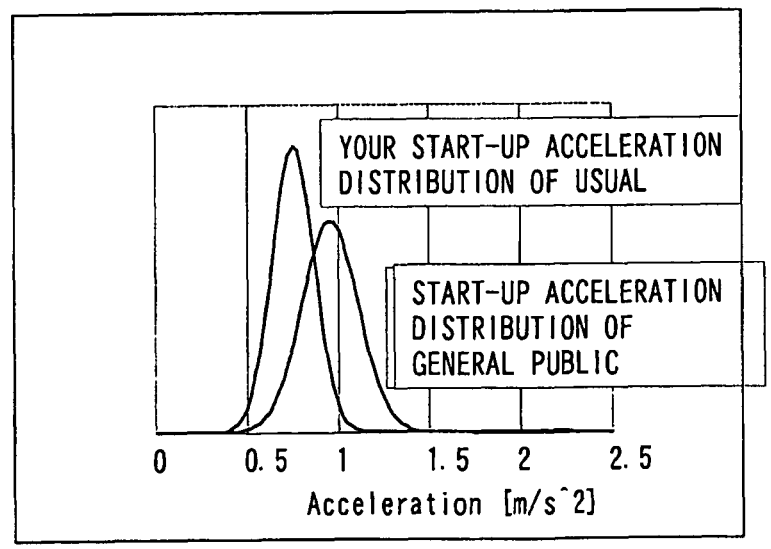

If Dist_3 is smaller than the threshold value, the flow of control proceeds to step S770, and the controller 400 presents an instruction to the driver. After presenting the instruction, the controller 400 terminates the processing. FIG. 45 shows an example of display of instruction presentation in visual information. This display enables the start-up acceleration of usual of the driver to be compared with that of general public. FIG. 45 indicates that start-up acceleration of the driver has characteristics lower than that of general public. In addition, degree of deviation Dist_3 of "usual" may be converted into a score and displayed. More specifically, a value having been obtained by reversing the sign of degree of deviation Dist_3 and by adding 50 thereto is displayed on the display unit 180 as a score of usual drive operation of the driver.

In the case where instruction presentation is performed in audio information, for example, a voice "As a result of analysis, your start-up acceleration operation is lower than that of general public" is output so as to inform the driver that the driver is apt to be engaged in starting-up at low vehicle velocity habitually and praise drive operation of the driver. In addition, a two-dimensional map shown in FIG. 9 may be used to display the drive diagnosis result.

Thus, in the seventh embodiment explained above, in addition to the advantageous effects according to the first to the sixth embodiments described above, the following operations and advantageous effects can be achieved.

Safety awareness and operation preference characteristics of the driver are detected as an index for drive diagnosis. More specifically, since the controller 400 uses the maximum value of the longitudinal acceleration xg on start-up of the vehicle, accurate drive diagnosis is carried out on start-up of the vehicle when there is no leading vehicle ahead.

Eighth Embodiment

A driving assistance system for vehicle according to the eighth embodiment of the present invention will now be explained. The basic structure of the driving assistance system for vehicle according to the eighth embodiment is the same as that of the first embodiment presented in FIG. 1. Therefore, the difference from the first embodiment will now be explained mainly. It is to be noted that the accelerator pedal stroke sensor 55 may be omitted in the driving assistance system for vehicle achieved in the eighth embodiment.

In the eighth embodiment, driving characteristics are detected when the driver depresses the brake pedal from a state in which the vehicle is following the leading vehicle, and drive diagnosis is carried out using the detected driving characteristics as an index.

Figure 46:
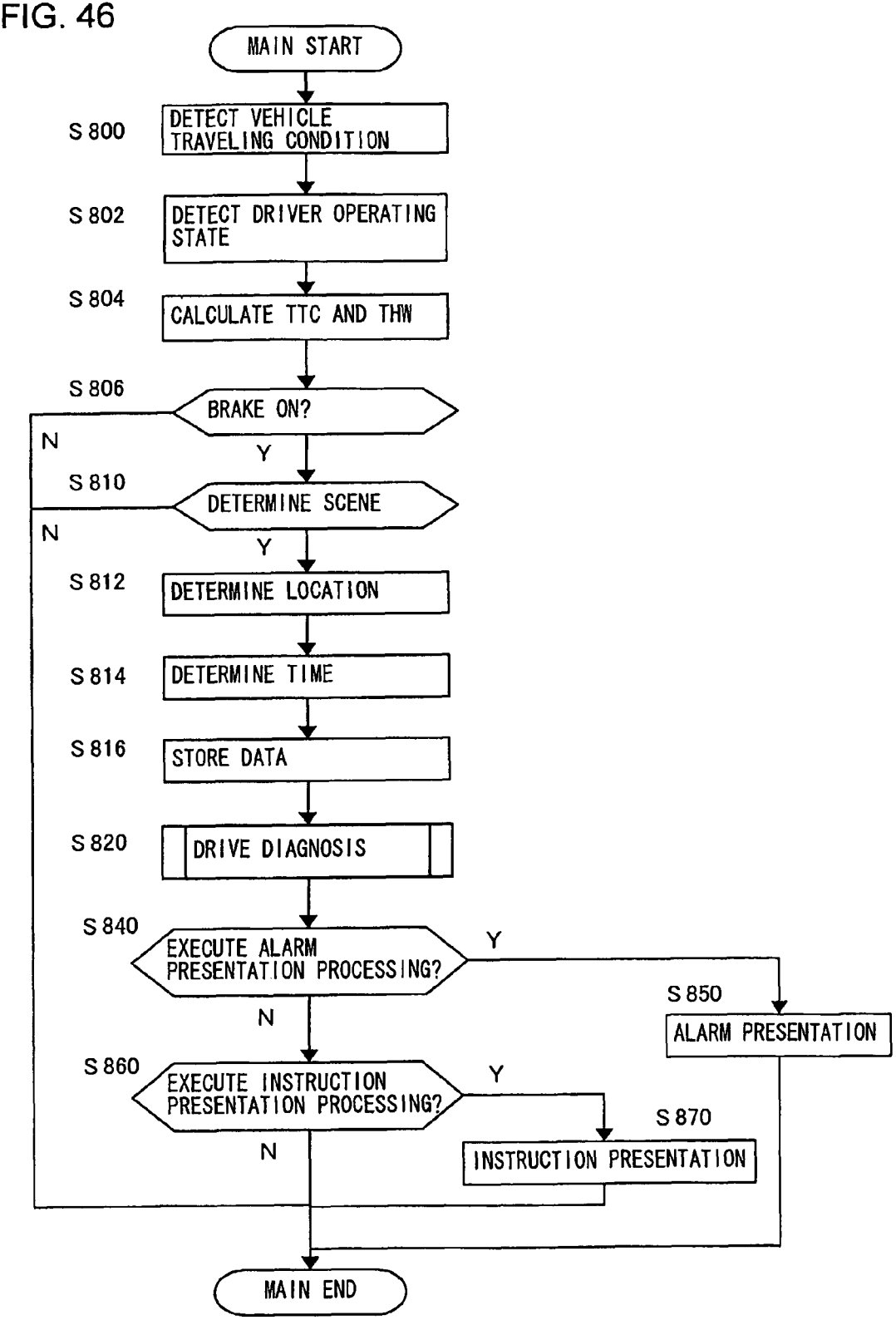

The behavior of the driving assistance system 4 for vehicle according to the eighth embodiment will now be explained in detail with reference to FIG. 46. FIG. 46 is a flow chart illustrating the procedure of driving assistance control processing performed by the controller 300 achieved in the eighth embodiment. The processing is performed continuously at regular intervals, e.g., for every 50 msec.

At first, traveling conditions of the vehicle are detected in step S800. Here, as the traveling conditions of the vehicle, the controller 350 obtains velocity V of the vehicle detected by the vehicle speed sensor 30, and vehicle separation D and relative vehicle velocity Vr between the vehicle and the leading vehicle detected by the laser radar 10. Operating states of the driver are detected in step S802. Here, as the operating states of the driver, the controller 350 obtains brake pedal operation amount detected by the brake pedal stroke sensor 60 and whether or not the turn signal lever has been operated detected by the turn signal switch 65. In step S804, in order to determine traffic scene of the vehicle described later, the above-described equations (1) and (2) are used to calculate time to contact TTC and time headway THW between the vehicle and the leading vehicle.

In step S806, a decision is made as to whether or not the brake pedal is depressed. For instance, in the case where the brake pedal operation amount is greater than zero, the controller 300 makes a decision that the brake pedal is depressed. In the case where the brake pedal is depressed, the flow of control proceeds to step S810, while in the case where the brake pedal is not depressed, the controller 300 terminates the processing. It is to be noted that in explanations given below, a state in which the brake pedal is operated by depressing it is referred to as a brake operation time.

In step S810, traffic scene of the vehicle is determined. The accuracy of drive diagnosis is improved by limiting conditions to vehicle traveling conditions and operating states of the driver, and, in order to reduce discomfort to the driver when information is provided to the driver in response to the drive diagnosis result, traffic scene of the vehicle is determined so that drive diagnosis is carried out solely in a particular traffic scene. More specifically, drive diagnosis is carried out exclusively in a traffic scene in which the driver is operating the brake pedal in a state where the vehicle is stably following the same leading vehicle.

Examples of conditions of stable follow-up travel scenes are as follows.

(a) The vehicle is following the same leading vehicle (For example, the difference between the current vehicle separation and the previously measured vehicle separation is less than 4 meters)

(b) The vehicle is not approaching rapidly (For example, time to contact TTC is more than 10 seconds)

(c) Time headway THW is less than a predetermined value (For example, time headway THW is less than four seconds)

(d) There is no turn signal lever operation performed by the driver (For example, there is no ON signal received from the turn signal switch 65)

(e) The above states (a) to (d) remain (For example, for five seconds or more)

When the conditions (a) to (e) are all satisfied, the controller 300 determines that the traffic scene of the vehicle is a stable follow-up travel scene, and the flow of control proceeds to step S812 for the controller 300 to carry out drive diagnosis. On the other hand, in the case where any of the conditions (a) to (e) is not satisfied, the controller 300 determines that the traffic scene of the vehicle does not correspond to a particular traffic scene, does not carry out drive diagnosis, and terminates the processing. It is to be noted that conditions in which the controller 300 determines whether or not the traffic scene of the vehicle is a stable follow-up travel scene are not limited to the above conditions (a) to (e). In addition, another detection means may detect whether or not the brake has been operated and whether or not the turn signal lever has been operated.

In step S812, travel location is determined. In step S814, the present time is recorded. In step S816, based on the labeling results in steps S812 and S814, the controller 300 stores data used to carry out drive diagnosis of the driver. Here, for example, the present time, i.e., the time at which the vehicle traveled in the link, the travel distance, a driving characteristic index in the link, the number of travels in the link, and the like are written in the structure for each link ID so as to create traffic road database. In the eighth embodiment, the minimum value of time to contact TTC (minimum time to contact) calculated at the time of brake operation is used as a physical quantity that represents driving characteristics of the driver.

In the following step S820, the data stored in step S816 are used to carry out drive diagnosis of the driver. Drive diagnosis is carried out based on driving characteristics of the driver when the driver is depressing the brake pedal in a stable follow-up travel. Driving characteristics at the time of brake operation include time headway THW of the vehicle and the leading vehicle, inverse of time headway 1/THW, vehicle separation D, inverse of vehicle separation, and so on. Here, a case in which the minimum time to contact TTC when the driver is depressing the brake pedal is used is explained as an example.

Figure 47:
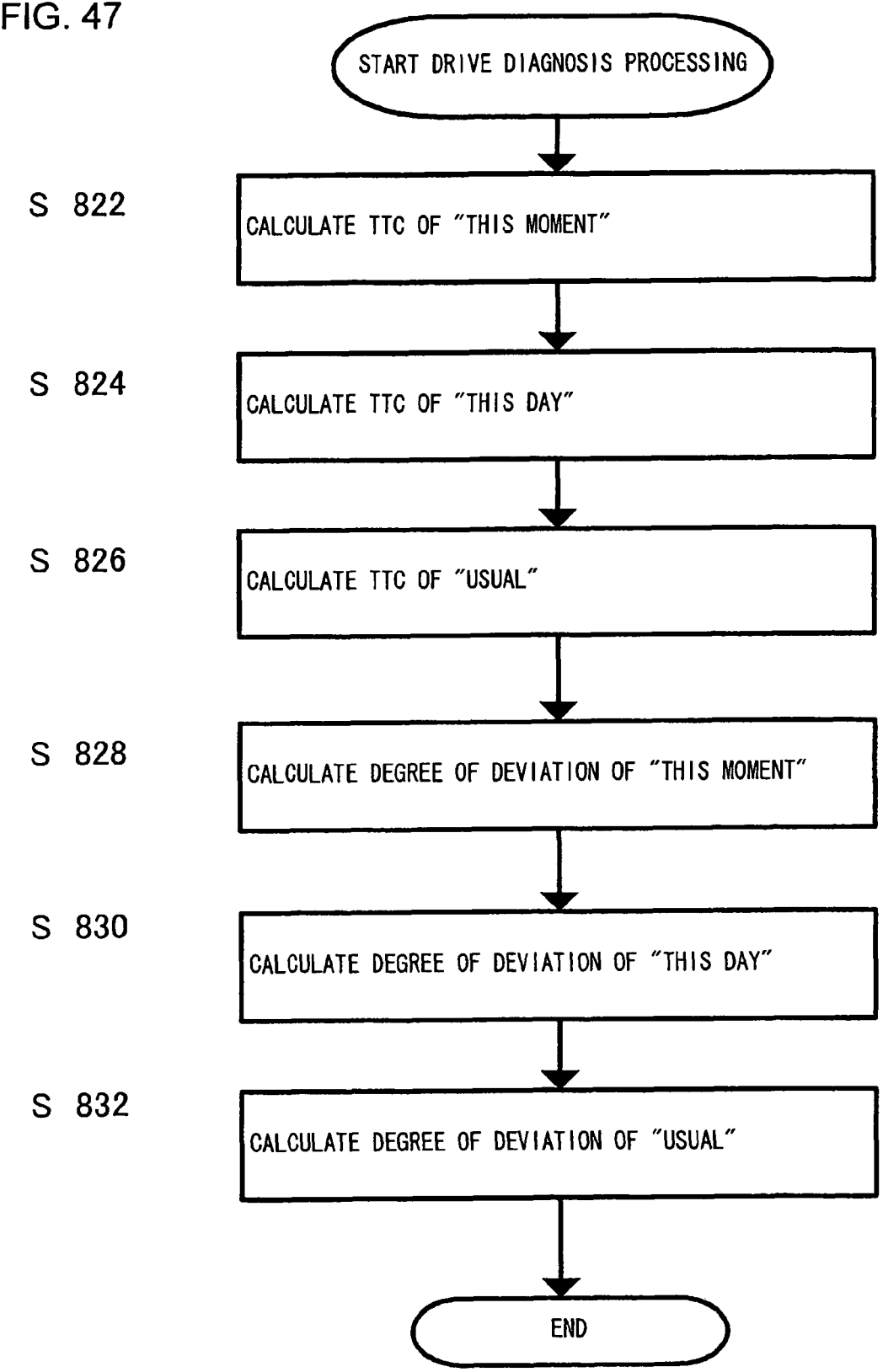

In drive diagnosis processing, the data of each of the layer A to the layer D of the data structure shown in FIG. 4 are used to determine drive operation of the driver in different time spans, i.e., in "this moment", "this day", and "usual". The drive diagnosis processing executed in step S820 will be explained in detail with reference to the flow chart of FIG. 47.

In step S822, driving characteristic values of the driver of "this moment" are calculated so as to carry out drive diagnosis of "this moment" of the driver. As driving characteristic values of the driver, the controller 300 calculates the mean value Mean_x(n) and the standard deviation Stdev_x(n) of the minimum time to contact TTC at the time of brake operation in a predetermined period of time that defines "this moment". Here, the predetermined period of time that defines "this moment" is, for example, 60 seconds, and, the mean value Mean_x(n) and the standard deviation Stdev_x(n) of the minimum time to contact TTC are calculated using data for 60 seconds from the past to the present detected at the time of brake operation in the stable follow-up traveling condition determined in step S810. The mean value Mean_x(n) and the standard deviation Stdev_x(n) are calculated using equations (5) and (7), respectively, as is the case with the seventh embodiment.

In step S824, in order to carry out drive diagnosis of "this day" of the driver, the controller 300 calculates driving characteristic values of the driver of "this day", i.e., the mean value Mean_x(n) and the standard deviation Stdev_x(n) of the minimum time to contact TTC at the time of brake operation in a predetermined period of time which defines "this day". Here, the predetermined period of time that defines "this day" is, for instance, 360 seconds, and the mean value Mean_x(n) and the standard deviation Stdev_x(n) of the minimum time to contact TTC are calculated using data for 360 seconds from the past to the present detected at the time of brake operation in the stable follow-up traveling condition determined in step S810.

More specifically, as is the case with "this moment", the equations (5) and (7) are used to calculate the mean value Mean_x(n) and the standard deviation Stdev_x(n). Here, the number of data K=1800, where the predetermined time for "this day" is 360 seconds and the number of samplings is 5 Hz.

In step S826, in order to carry out drive diagnosis of "usual" of the driver, the controller 300 calculates follow-up characteristic values of the driver of "usual", i.e., the mean value Mean_x(n) and the standard deviation Stdev_x(n) of the minimum time to contact TTC at the time of brake operation in a predetermined period of time which defines "usual". Here, the predetermined period of time that defines "usual" is, for instance, 2160 seconds, and the mean value Mean_x(n) and the standard deviation Stdev_x(n) of the minimum time to contact TTC are calculated using data for 2160 seconds from the past to the present detected at the time of brake operation in the stable follow-up travel scene determined in step S810.

More specifically, as is the case with "this moment", the equations (5) and (7) are used to calculate the mean value Mean_x(n) and the standard deviation Stdev_x(n). Here, the number of data K=10800, where the predetermined time for "usual" is 2160 seconds and the number of samplings is 5 Hz.

In processing after the following step S828, drive diagnosis of the driver is carried out using the driving characteristic values calculated in steps S822, S824, and S826. Here, the driving characteristics of the driver based on data obtained in different time spans are each compared so as to diagnose the drive operation of the driver based on how much both of the driving characteristics deviate. In other words, in the data structure shown in FIG. 4, an upper layer (e.g., the layer A) is compared with a lower layer (e.g., the layer B) so as to carry out the drive diagnosis.

At first, in step S828, the controller 300 calculates the degree of deviation that indicates how much the driving characteristics of the driver of "this moment" deviate from those of "this day". Here, the degree of deviation of "this moment" relative to "this day" indicates the difference between the distribution of the minimum time to contact TTC at the time of brake operation of "this day" and that of "this moment". In order to calculate the degree of deviation of "this moment" relative to "this day", the distribution of the minimum time to contact TTC at the time of brake operation of "this day" is used as a reference distribution which represents a long-duration action distribution, and the distribution of the minimum time to contact TTC at the time of brake operation of "this moment" is used as a distribution of comparison target which represents a short-duration action distribution.

Here, as is the case with the first embodiment, the above-described equation (13) or equation (16) is used to calculate degree of deviation $Dist_{diff}$. In addition, degree of deviation $Dsit_{diff}$ of "this moment" relative to "usual" is calculated. In this case, distribution of the minimum time to contact TTC at the time of brake operation of "usual" is used as a reference distribution that represents long-duration action distribution, while distribution of the minimum time to contact TTC at the time of brake operation of "this moment" is used as a distribution of comparison target that represents short-duration action distribution. Then, probability $F_{std}(x)$ of cumulative distribution of "usual" and probability $F_{comp}(x)$ of cumulative distribution of "this moment" are used to calculate degree of deviation $Dist_{diff}$ of "this moment" relative to "usual" using the above-described equation (13) or equation (16).

Thus, after the degrees of deviation $Dist_{diff}$ of "this moment" relative to "this day" and "this moment" relative to "usual" are each calculated in step S828, the flow of control proceeds to step S830. In step S830, as is the case with processing executed in step S828, the degree of deviation $Dist_{diff}$ of "this day" relative to "usual" is calculated. It is to be noted that here, the distribution of the minimum time to contact TTC at the time of brake operation of "usual" is used as a reference distribution that represents long-duration action distribution, whilst the distribution of the minimum time to contact TTC at the time of brake operation of "this day" is used as a distribution of comparison target that represents short-duration action distribution.

In the following step S832, as is the case with processing executed in step S828, degree of deviation $Dist_{diff}$ of "usual" relative to "general public" is calculated. It is to be, noted that here, the distribution of the minimum time to contact TTC at the time of brake operation of "general public" is used as a reference distribution that represents long-duration action distribution, whilst the distribution of the minimum time to contact TTC at the time of brake operation of "usual" is used as a distribution of comparison target that represents short-duration action distribution. An appropriate value is set in advance as a fixed value for the driving characteristic values of "general public", i.e., the mean value and the standard deviation of the minimum time to contact TTC at the time of brake operation.

Thus, after drive diagnosis of the driver is carried out in step S820 using data obtained in a plurality of different time spans, the flow of control proceeds to step S840. It is to be noted that for the sake of simplicity, degree of deviation $Dist_{diff}$ of "this moment" relative to "usual" will be denoted by Dist_1a, degree of deviation $Dist_{diff}$ of "this moment" relative to "this day" will be denoted by Dist_1b, degree of deviation $Dist_{diff}$ of "this day" relative to "usual" will be denoted by Dist_2, and degree of deviation $Dist_{diff}$ of "usual" relative to "general public" will be denoted by Dist_3.

In step S840, the controller 300 determines whether or not to execute alarm presentation processing based on the drive diagnosis result in step S820. Here, a decision is made as to whether or not degree of deviation Dist_1a of "this moment" relative to "usual" or degree of deviation Dist_1b of "this moment" relative to "this day" calculated in step S828 or degree of deviation Dist_2 of "this day" relative to "usual" calculated in step S830 is greater than a threshold value (for instance 0.30) used to determine whether or not to execute an alarm presentation. In the case where degree of deviation Dist_1 or Dist_2 is greater than the threshold value, the flow of control proceeds to step S850, and the controller 300 performs an alarm presentation to the driver. After performing the alarm presentation, the controller 300 terminates the processing.

For example, in the case where degree of deviation Dist_2 of "this day" relative to "usual" is greater than the threshold value, a voice "You have some delay in your brake operation" comes out of the speaker 130 together with a beep sound. The voice information contents are set so as to inform the driver that the driver presently has some delay in the brake pedal operation, or so as to encourage the driver to have a swift brake operation. It is to be noted that the actual voice information is not limited to that. In the case where degree of deviation Dist_1a of "this moment" relative to "usual" or degree of deviation Dist_1b of "this moment" relative to "this day" is greater than the threshold value, too, pre-set appropriate voice information comes out.

If a negative decision is made in step S840 and the alarm is not presented, the flow of control proceeds to step S860 and the controller 300 determines whether or not to execute instruction presentation processing based on the drive diagnosis result in step S820. Here, a decision is made as to whether or not degree of deviation Dist_3 of "usual" relative to "general public" calculated in step S832 is smaller than a threshold value (for example, 0.07) used to determine whether or not to present an instruction (improvement suggestion).

If Dist_3 is smaller than the threshold value, the flow of control proceeds to step S870, and the controller 300 presents an instruction to the driver. After presenting the instruction, the controller 300 terminates the processing. For instance, as instruction presentation contents, the controller 300 outputs a display and a voice that praise the drive operation of the driver. For example, degree of deviation Dist_3 of "usual" is converted into a score and displayed. More specifically, a value having been obtained by reversing the sign of degree of deviation Dist_3 and by adding 50 thereto is displayed on the display unit 180 as a score of usual drive operation of the driver. In other words, a driver who has some delay in brake operation scores 50 points or less, whilst a good driver who is engaged in a prompt, stable brake operation scores 50 points or more. It is to be noted that the score is expressed in a range from 0 to 100: if a score obtained by converting degree of deviation Dist_3 is greater than 100, the score displayed to the driver is 100 points, while a score obtained by converting degree of deviation Dist_3 is smaller than 0, the score displayed to the driver is 0 points.

It is to be noted that the improvement may be suggested in voice. Thus, the controller 300 outputs a display and a voice so as to inform the driver that the follow-up driving characteristics of the driver is better than those of general public driver and encourage the driver to keep up the good operation or improve his operation. In addition, a two-dimensional map shown in FIG. 9 may be used to display the drive diagnosis result.

Thus, in the eighth embodiment explained above, in addition to the advantageous effects according to the first to the seventh embodiments described above, the following operations and advantageous effects can be achieved.

Risk tolerance of the driver is detected as an index for drive diagnosis. More specifically, the controller 300 uses the minimum value of time to contact TTC of the vehicle and the leading vehicle at the time when the brake operation is performed. Time to contact TTC represents period of time until the vehicle and the leading vehicle contact together when the velocity V of the vehicle and the relative vehicle velocity Vr are constant. By figuring out to what extent time to contact TTC is reduced in the case where the driver performs brake operation from a state in which the vehicle is following the leading vehicle and using the same as an index indicating characteristics of the driver, accurate drive diagnosis is carried out with respect to the case in which brake operation is performed in a follow-up travel scene.

Ninth Embodiment

A driving assistance system for vehicle according to the ninth embodiment of the present invention will now be explained. The basic structure of the driving assistance system for vehicle according to the ninth embodiment is the same as that of the first embodiment presented in FIG. 1. Therefore, the difference from the first embodiment will now be explained mainly. It is to be noted that the accelerator pedal stroke sensor 55 may be omitted in the driving assistance system for vehicle achieved in the ninth embodiment.

In the ninth embodiment, driving characteristics when the vehicle passes the leading vehicle are detected, and drive diagnosis is carried out using the detected driving characteristics as an index.

Figure 48:
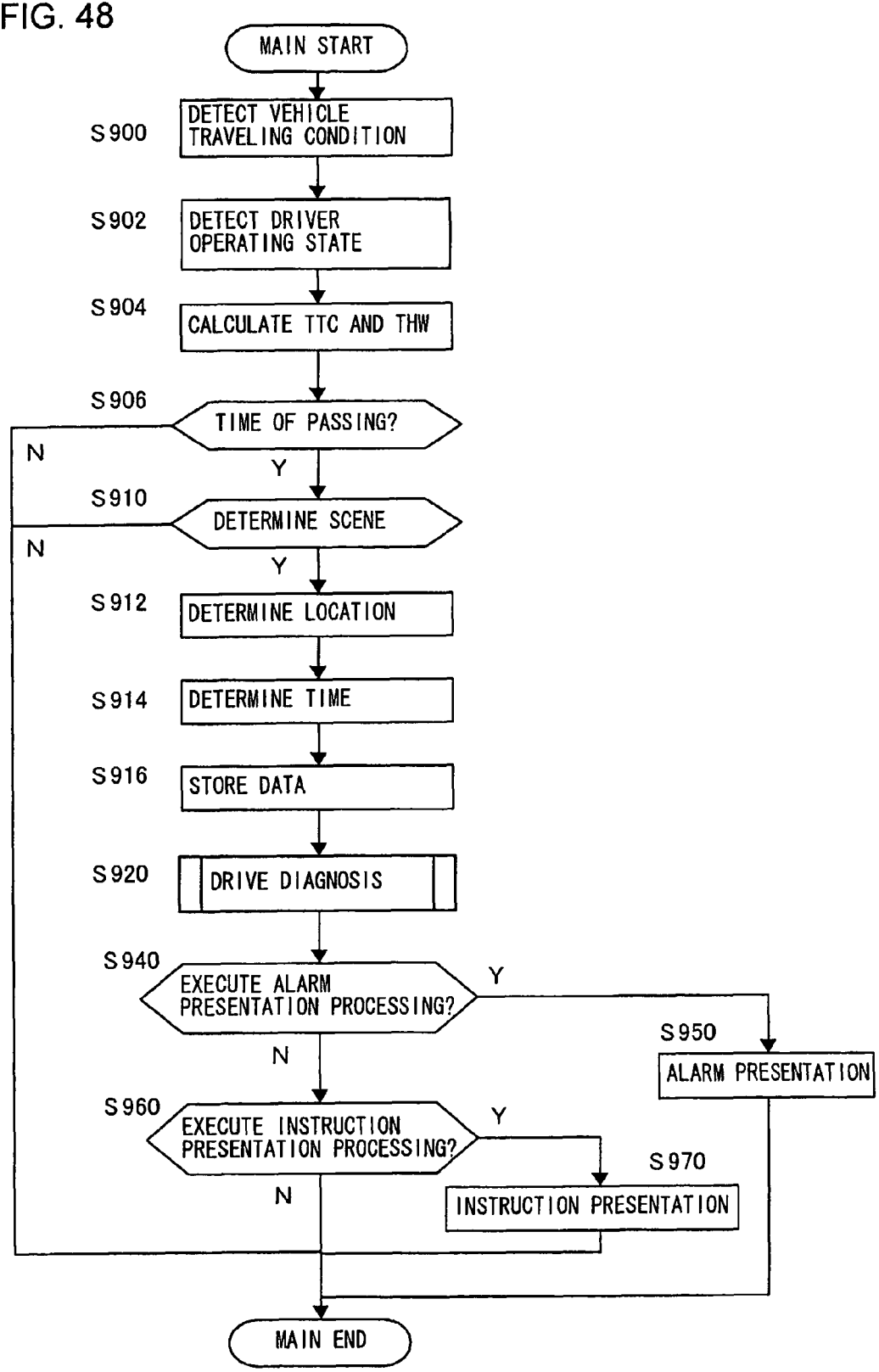

The behavior of the driving assistance system 4 for vehicle according to the ninth embodiment will now be explained in detail with reference to FIG. 48. FIG. 48 is a flow chart illustrating the procedure of driving assistance control processing performed by the controller 300 achieved in the ninth embodiment. The processing is performed continuously at regular intervals, e.g., for every 50 msec.

At first, in step S900, traveling conditions of the vehicle are detected. Here, as the traveling conditions of the vehicle, the controller 300 obtains velocity V of the vehicle detected by the vehicle speed sensor 30, and vehicle separation D and relative vehicle velocity Vr between the vehicle and the leading vehicle detected by the laser radar 10. In addition, information of the road along which the vehicle travels is obtained from the navigation system 50. In step S902, operating states of the driver are detected. Here, as the operating states of the driver, the controller 300 obtains brake pedal operation amount detected by the brake pedal stroke sensor 60, and whether or not the turn signal lever has been operated detected by the turn signal switch 65. In step S904, in order to determine traffic scene of the vehicle described later, the controller 300 uses the above-described equations (1) and (2) so as to calculate time to contact TTC and time headway THW of the vehicle and leading vehicle ahead.

In step S906, a decision is made as to whether or not the vehicle is being engaged in a passing operation. More specifically, a decision is made as to whether or not the vehicle is in a state where the turn signal lever is operated, and the vehicle is accelerating and passing front obstacles when the vehicle is traveling along a road with two or more lanes each way. For instance, it is detected from road information obtained from the navigation system 50 that the vehicle is traveling along a road with two or more lanes each way, and, in the case where the turn signal lever is operated, the controller 300 makes a decision that the vehicle is being engaged in a passing operation. In the case where the vehicle is being engaged in a passing operation, the flow of control proceeds to step S910, while in the case where the vehicle is not being engaged in a passing operation, the controller 300 terminates the processing.

In step S910, the traffic scene of the vehicle is determined. The accuracy of drive diagnosis is improved by limiting conditions to vehicle traveling conditions and operating states of the driver, and, in order to reduce discomfort to the driver when information is provided to the driver in response to the drive diagnosis result, traffic scene of the vehicle is determined so that drive diagnosis is carried out solely in a particular traffic scene. More specifically, drive diagnosis is carried out exclusively in a traffic scene in which passing operation is performed from a state in which the vehicle is stably following the same leading vehicle.

Examples of conditions of stable follow-up travel scenes are as follows.

(a) The vehicle is following the same leading vehicle (For example, the difference between the current vehicle separation and the previously measured vehicle separation is less than 4 meters)

(b) The vehicle is not approaching rapidly (For example, time to contact TTC is more than 10 seconds)

(c) Time headway THW is less than a predetermined value (For example, time headway THW is less than four seconds)

(d) There is no brake operation performed by the driver (For example, the brake pedal operation amount is substantially zero)

(e) The above states (a) to (d) remain (For example, for five seconds or more)

When the conditions (a) to (e) are all satisfied, the controller 300 determines that the traffic scene of the vehicle is a stable follow-up travel scene, and the flow of control proceeds to step S912 for the controller 300 to carry out drive diagnosis. On the other hand, in the case where any of the conditions (a) to (e) is not satisfied, the controller 300 determines that the traffic scene of the vehicle does not correspond to a particular traffic scene, does not carry out drive diagnosis, and terminates the processing. It is to be noted that conditions in which the controller 300 determines whether or not the traffic scene of the vehicle is a stable follow-up travel scene are not limited to the above conditions (a) to (e). In addition, another detection means may detect whether or not the brake has been operated and whether or not the turn signal lever has been operated.

In step S912, travel location is determined. In step S914, the present time is recorded. In step S916, based on the labeling results in steps S912 and S914, the controller 300 stores data used to carry out drive diagnosis of the driver. Here, for example, the present time, i.e., the time at which the vehicle traveled in the link, the travel distance, a driving characteristic index in the link, the number of travels in the link, and the like are written in the structure for each link ID so as to create traffic road database. In the ninth embodiment, the minimum value of vehicle separation D (minimum vehicle separation) detected at the time of passing operation is used as a physical quantity that represents driving characteristics of the driver.

In the following step S920, the data stored in step S916 are used to carry out drive diagnosis of the driver. Drive diagnosis is carried out based on driving characteristics of the driver when the driver is passing the leading vehicle in a stable follow-up travel. Driving characteristics at the time of passing include time headway THW of the vehicle and the leading vehicle, inverse of time headway 1/THW, vehicle separation D, inverse of vehicle separation, and so on. Here, a case in which the minimum vehicle separation D when the driver is passing the leading vehicle is used is explained as an example.

More specifically, the controller 300 uses a vehicle separation between the vehicle and the leading vehicle that is present in the lane in which the vehicle has been traveling before a lane change. It is to be noted that the controller 300 may use a vehicle separation between the vehicle and the leading vehicle that is traveling in the lane in which the vehicle is traveling after a lane change.

Figure 49:
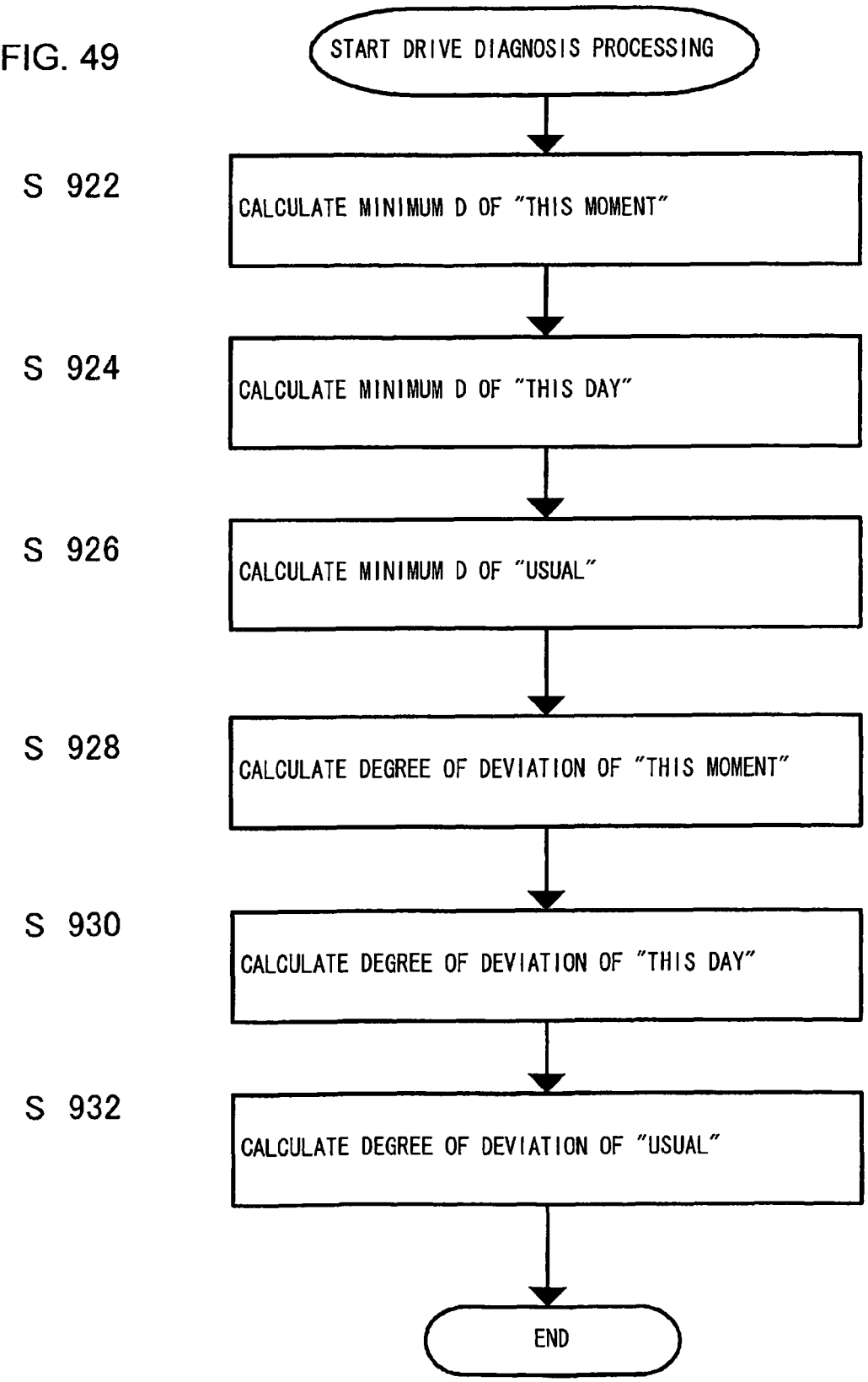

In drive diagnosis processing, the data of each of the layer A to the layer D of the data structure shown in FIG. 4 are used to determine drive operation of the driver in different time spans, i.e., in "this moment", "this day", and "usual". The drive diagnosis processing executed in step S920 will be explained in detail with reference to the flow chart of FIG. 49.

In step S922, driving characteristic values of the driver of "this moment" are calculated so as to carry out drive diagnosis of "this moment" of the driver. As driving characteristic values of the driver, the controller 300 calculates the mean value Mean_x(n) and the standard deviation Stdev_x(n) of the minimum vehicle separation D at the time of passing in a predetermined period of time that defines "this moment". Here, the predetermined period of time that defines "this moment" is, for example, 60 seconds, and, the mean value Mean_x(n) and the standard deviation Stdev_x(n) of the minimum vehicle separation D are calculated using data for 60 seconds from the past to the present detected at the time of passing in the stable follow-up traveling condition determined in step S910. The mean value Mean_x(n) and the standard deviation Stdev_x(n) are calculated using equations (5) and (7), respectively, as is the case with the first embodiment.

In step S924, in order to carry out drive diagnosis of "this day" of the driver, the controller 300 calculates driving characteristic values of the driver of "this day", i.e., the mean value Mean_x(n) and the standard deviation Stdev_x(n) of the minimum vehicle separation D at the time of passing in a predetermined period of time which defines "this day". Here, the predetermined period of time that defines "this day" is, for instance, 360 seconds, and the mean value Mean_x(n) and the standard deviation Stdev_x(n) of the minimum vehicle separation D are calculated using data for 360 seconds from the past to the present detected at the time of passing in the stable follow-up traveling condition determined in step S910.

More specifically, as is the case with "this moment", the equations (5) and (7) are used to calculate the mean value Mean_x(n) and the standard deviation Stdev_x(n). Here, the number of data K=1800, where the predetermined time for "this day" is 360 seconds and the number of samplings is 5 Hz.

In step S926, in order to carry out drive diagnosis of "usual" of the driver, the controller 300 calculates follow-up characteristic values of the driver of "usual", i.e., the mean value Mean_x(n) and the standard deviation Stdev_x(n) of the minimum vehicle separation D at the time of passing in a predetermined period of time which defines "usual". Here, the predetermined period of time that defines "usual" is, for instance, 2160 seconds, and the mean value Mean_x(n) and the standard deviation Stdev_x(n) of the minimum vehicle separation D are calculated using data for 2160 seconds from the past to the present detected at the time of passing in the stable follow-up travel scene determined in step S910.

More specifically, as is the case with "this moment", the equations (5) and (7) are used to calculate the mean value Mean_x(n) and the standard deviation Stdev_x(n). Here, the number of data K=10800, where the predetermined time for "usual" is 2160 seconds and the number of samplings is 5 Hz.

In processing after the following step S928, drive diagnosis of the driver is carried out using the driving characteristic values calculated in steps S922, S924, and S926. Here, the driving characteristics of the driver based on data obtained in different time spans are each compared so as to diagnose the drive operation of the driver based on how much both of the driving characteristics deviate. In other words, in the data structure shown in FIG. 4, an upper layer (e.g., the layer A) is compared with a lower layer (e.g., the layer B) so as to carry out the drive diagnosis.

At first, in step S928, the controller 300 calculates the degree of deviation that indicates how much the driving characteristics of the driver of "this moment" deviate from those of "this day". Here, the degree of deviation of "this moment" relative to "this day" indicates the difference between the distribution of the minimum vehicle separation D at the time of passing of "this day" and that of "this moment". In order to calculate the degree of deviation of "this moment" relative to "this day", the distribution of the minimum vehicle separation D at the time of passing of "this day" is used as a reference distribution which represents a long-duration action distribution, and the distribution of the minimum vehicle separation D at the time of passing of "this moment" is used as a distribution of comparison target which represents a short-duration action distribution.

Here, as is the case with the first embodiment, the above-described equation (13) or equation (16) is used to calculate degree of deviation $Dist_{diff}$. In addition, degree of deviation $Dsit_{diff}$ of "this moment" relative to "usual" is calculated. In this case, distribution of the minimum vehicle separation D at the time of passing of "usual" is used as a reference distribution that represents long-duration action distribution, while distribution of the minimum vehicle separation D at the time of passing of "this moment" is used as a distribution of comparison target that represents short-duration action distribution. Then, probability $F_{std}(x)$ of cumulative distribution of "usual" and probability $F_{comp}(x)$ of cumulative distribution of "this moment" are used to calculate degree of deviation $Dist_{diff}$ of "this moment" relative to "usual" using the above-described equation (13) or equation (16).

Thus, after the degrees of deviation $Dist_{diff}$ of "this moment" relative to "this day" and "this moment" relative to "usual" are each calculated in step S928, the flow of control proceeds to step S930. In step S930, as is the case with processing executed in step S928, the degree of deviation $Dist_{diff}$ of "this day" relative to "usual" is calculated. It is to be noted that here, the distribution of the minimum vehicle separation D at the time of passing of "usual" is used as a reference distribution that represents long-duration action distribution, whilst the distribution of the minimum vehicle separation D at the time of passing of "this day" is used as a distribution of comparison target that represents short-duration action distribution.

In the following step S932, as is the case with processing executed in step S928, degree of deviation $Dist_{diff}$ of "usual" relative to "general public" is calculated. It is to be noted that here, the distribution of the minimum vehicle separation D at the time of passing of "general public" is used as a reference distribution that represents long-duration action distribution, whilst the distribution of the minimum vehicle separation D at the time of passing of "usual" is used as a distribution of comparison target that represents short-duration action distribution. An appropriate value is set in advance as a fixed value for the driving characteristic values of "general public", i.e., the mean value and the standard deviation of the minimum vehicle separation D at the time of passing.

Thus, after drive diagnosis of the driver is carried out in step S920 using data obtained in a plurality of different time spans, the flow of control proceeds to step S940. It is to be noted that for the sake of simplicity, degree of deviation $Dist_{diff}$ of "this moment" relative to "usual" will be denoted by $Dist\_1a$, degree of deviation $Dist_{diff}$ of "this moment" relative to "this day" will be denoted by $Dist\_1b$, degree of deviation $Dist_{diff}$ of "this day" relative to "usual" will be denoted by $Dist\_2$, and degree of deviation $Dist_{diff}$ of "usual" relative to "general public" will be denoted by $Dist\_3$.

In step S940, the controller 300 determines whether or not to execute alarm presentation processing based on the drive diagnosis result in step S920. Here, a decision is made as to whether or not degree of deviation $Dist\_1a$ of "this moment" relative to "usual" or degree of deviation $Dist\_1b$ of "this moment" relative to "this day" calculated in step S928 or degree of deviation $Dist\_2$ of "this day" relative to "usual" calculated in step S930 is greater than a threshold value (for instance 0.30) used to determine whether or not to execute an alarm presentation. In the case where degree of deviation $Dist\_1a$, $Dist\_1b$, or $Dist\_2$ is greater than the threshold value, the flow of control proceeds to step S950, and the controller 300 performs an alarm presentation to the driver. After performing the alarm presentation, the controller 300 terminates the processing.

For example, in the case where degree of deviation $Dist\_2$ of "this day" relative to "usual" is greater than the threshold value, a voice "You are apt to get too close to the leading vehicle ahead at the time of passing" comes out of the speaker 130 together with a beep sound. The voice information contents are set so as to inform the driver that the vehicle is apt to get too close to the leading vehicle ahead at the time of passing it, and so as to encourage the driver to have a vehicle separation longer than that at the time of passing. It is to be noted that the actual voice information is not limited to that. In the case where degree of deviation $Dist\_1a$ of "this moment" relative to "usual" or degree of deviation $Dist\_1b$ of "this moment" relative to "this day" is greater than the threshold value, too, pre-set appropriate voice information comes out.

If a negative decision is made in step S940 and the alarm is not presented, the flow of control proceeds to step S960 and the controller 300 determines whether or not to execute instruction presentation processing based on the drive diagnosis result in step S920. Here, a decision is made as to whether or not degree of deviation $Dist\_3$ of "usual" relative to "general public" calculated in step S932 is smaller than a threshold value (for example, 0.07) used to determine whether or not to present an instruction (improvement suggestion).

If $Dist\_3$ is smaller than the threshold value, the flow of control proceeds to step S970, and the controller 300 presents an instruction to the driver. After presenting the instruction, the controller 300 terminates the processing. For instance, as instruction presentation contents, the controller 300 outputs a display and a voice that praise the drive operation of the driver. For example, degree of deviation $Dist\_3$ of "usual" is converted into a score and displayed. More specifically, a value having been obtained by reversing the sign of degree of deviation $Dist\_3$ and by adding 50 thereto is displayed on the display unit 180 as a score of usual drive operation of the driver. In other words, a driver who is apt to get too close to the leading vehicle ahead at the time of passing scores 50 points or less, whilst a good driver who is engaged in a safe passing operation scores 50 points or more. It is to be noted that the score is expressed in a range from 0 to 100: if a score obtained by converting degree of deviation $Dist\_3$ is greater than 100, the score displayed is 100 points, while a score obtained by converting degree of deviation $Dist\_3$ is smaller than 0, the score displayed is 0 points.

It is to be noted that the improvement may be suggested in voice. Thus, the controller 300 outputs a display and a voice so as to inform the driver that the follow-up driving characteristics of the driver is better than those of general public driver and encourage the driver to keep up the good operation or improve his operation. In addition, a two-dimensional map shown in FIG. 9 may be used to display the drive diagnosis result.

Thus, in the ninth embodiment explained above, in addition to the advantageous effects according to the first to the eighth embodiments described above, the following operations and advantageous effects can be achieved.

Risk tolerance of the driver is detected as an index for drive diagnosis. More specifically, the controller 300 uses the minimum value of vehicle separation D between the vehicle and the leading vehicle at the time of the passing. As an index to represent characteristics of the driver, the controller 300 uses the degree to which the vehicle is getting close to the leading vehicle when the driver operates the turn signal switch and intentionally passes the leading vehicle. This allows drive diagnosis to be accurately carried out in a passing scene.

Tenth Embodiment

Figure 50:
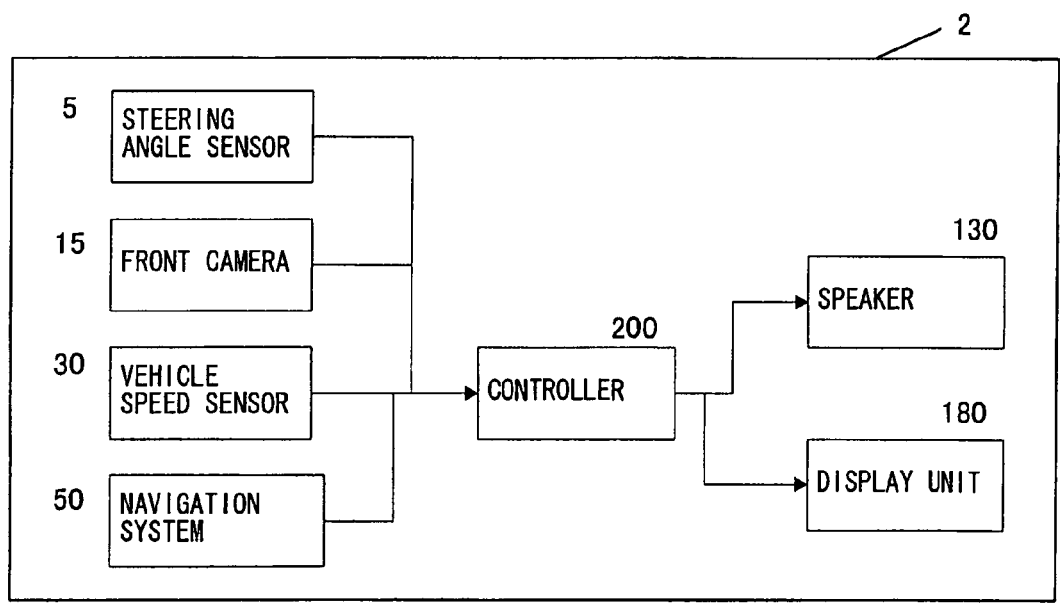

A driving assistance system for vehicle according to the tenth embodiment of the present invention will now be explained. FIG. 50 shows a control diagram showing the structure of a driving assistance system 2 for vehicle according to the tenth embodiment.

At first, the structure of the driving assistance system 2 for vehicle will explained.

A steering angle sensor 8 is an angle sensor mounted in the vicinity of, for example, a steering column or a steering wheel (not shown), which detects steering angle by steering of the driver from rotation of a steering shaft. The detected steering angle is output to a controller 200.

A front camera 15 is a small CCD camera, a CMOS camera, or the like mounted on top of the front window, which detects the traffic situation ahead as an image. The controller 200 performs image processing on an image signal received from the front camera 15 and detects lane markings and the like in a region in front of the vehicle. It is to be noted that the region detected by the front camera 15 is approximately ±30 deg horizontally with respect to the vehicle longitudinal centerline, and the front view of the road included in the region is loaded as an image.

The vehicle speed sensor 30 measures the number of wheel revolutions and the number of revolutions of the output side of the transmission so as to detect the vehicle speed thereof, and outputs the detected speed thereof to the controller 200.

The navigation system 50, including a GPS receiver, a map database, a display monitor, and the like, is a system to perform a path search, a routing assistance, and the like. Based on current location of the vehicle obtained via the GPS receiver and road information stored in the map database, the navigation system 50 obtains information on the class, the width, and the like of the road along which the vehicle travels.

The controller 200, which is an electronic control unit constituted by a CPU and CPU peripheral components such as a ROM and a RAM, controls the overall driving assistance system 2 for vehicle. Based on signals received from the steering angle sensor 8, the front camera 15, the vehicle speed sensor 30, the navigation system 50, and the like, the controller 200 analyzes driving characteristics of the driver and carries out drive diagnosis. Then, based on the drive diagnosis result, the controller 200 provides the driver with information. Information provided to the driver includes alarm to the driver, improvement suggestion of the drive operation, and the like. Control contents of the controller 200 are described in detail later.

The speaker 130 is used to provide the driver with information in a beep sound or in a voice, in response to a signal from the controller 200. The display unit 180 is used to display an alarm or improvement suggestion to operation of the driver, in response to a signal from the controller 200. For example, the display monitor of the navigation system 50, a combination meter, and the like can be used as the display unit 180.

Next, the behavior of the driving assistance system 2 for vehicle according to the tenth embodiment will be explained, beginning with the outline thereof.

Based on traveling conditions of the vehicle and drive operation of the driver, the controller 200 of the driving assistance system 2 for vehicle carries out drive diagnosis of the driver, and, in response to the drive diagnosis result, alerts the driver and suggests the driver to improve the drive operation. More specifically, the controller 200 uses a steering angle signal so as to detect unstable state of drive operation and carries out drive diagnosis of the driver. In the tenth embodiment, unstable state of drive operation is detected using steering entropy method, which is a method to calculate the instability of drive operation of the driver from smoothness of steering operation (steering angle).

Then, if the drive diagnosis result indicates that the driver is engaging in risky driving more than he usually is, i.e., if the drive operation of the driver is deviated into a riskier state, the controller 200 alerts the driver so as to inform the driver thereof before the drive operation of the driver goes into a high-risk state. On the other hand, if the drive diagnosis result indicates that the drive operation of the driver is better than the standard of general public, the controller 200 provides the driver with information so as to encourage safer driving or suggest improvement.

Thus, the driving assistance system 2 for vehicle achieved in the tenth embodiment includes three functions, i.e., a function to detect the drive operation of the driver by drive diagnosis, a function to alert the driver in response to the detected result, and a function to give an improvement suggestion to the driver in response to the detected result. Accordingly, the driving assistance system 2 for vehicle allows and encourages the driver to see his own driving characteristics objectively, and provides the driver with an advice depending upon the driving characteristics so that the driver can learn a driving method to reduce the risk.

The steering entropy method will be explained here.

In general, in a state where the driver is not concentrating attention on the operation, period of time during which the driver does not steer becomes longer than period of time during normal operation in which the driver concentrates on the operation, and large steering angle errors are accumulated. Accordingly, amount of steering adjustment becomes great when the driver focuses his attention back on the operation. The steering entropy method focuses on this characteristic and uses $\alpha$ value as a characteristic value and steering angle entropy Hp, which has been calculated with reference to $\alpha$ value. Unstable state of drive operation relative to reference is detected by comparing steering angle entropy used as a reference with steering angle entropy calculated based on the measured steering angle.

It is to be noted that $\alpha$ value is the 90 percentile (range of a distribution in which 90% of steering errors are included) that is calculated by obtaining the difference between a steering error in a given period of time based on time series data of the steering angle, i.e., an estimated value of steering angle on the assumption that the steering is operated smoothly, and the actual steering angle, and by measuring the distribution (variation) of the steering errors.

A steering entropy value, i.e., Hp value, represents fuzziness (uncertainty) of steering error distribution. Similarly to α value, Hp value becomes small when steering is operated stably and smoothly, while it becomes great when steering is operated awkwardly and unstably. Hp value is corrected by α value and can be used as a driver instability unaffected by skills or habit of the driver.

In the tenth embodiment, a steering entropy calculated using steering error distribution of general driver group is used as a reference state. Then, steering angle entropy is calculated using the measured steering error distribution of the driver, and drive diagnosis is carried out by detecting unstable state of the drive operation which the driver basically has.

It is to be noted that since steering error is affected by road alignment and load condition of the driver, it is necessary that the reference steering error distribution is measured when the driver is in an unloaded condition. Therefore, in the tenth embodiment, in order to be less likely to be affected by those factors, steering error distribution is obtained using steering angle data having been obtained in traveling along a road alignment which is virtually a straight road and based on steering angle data having been measured during long period of time.

Figure 51:
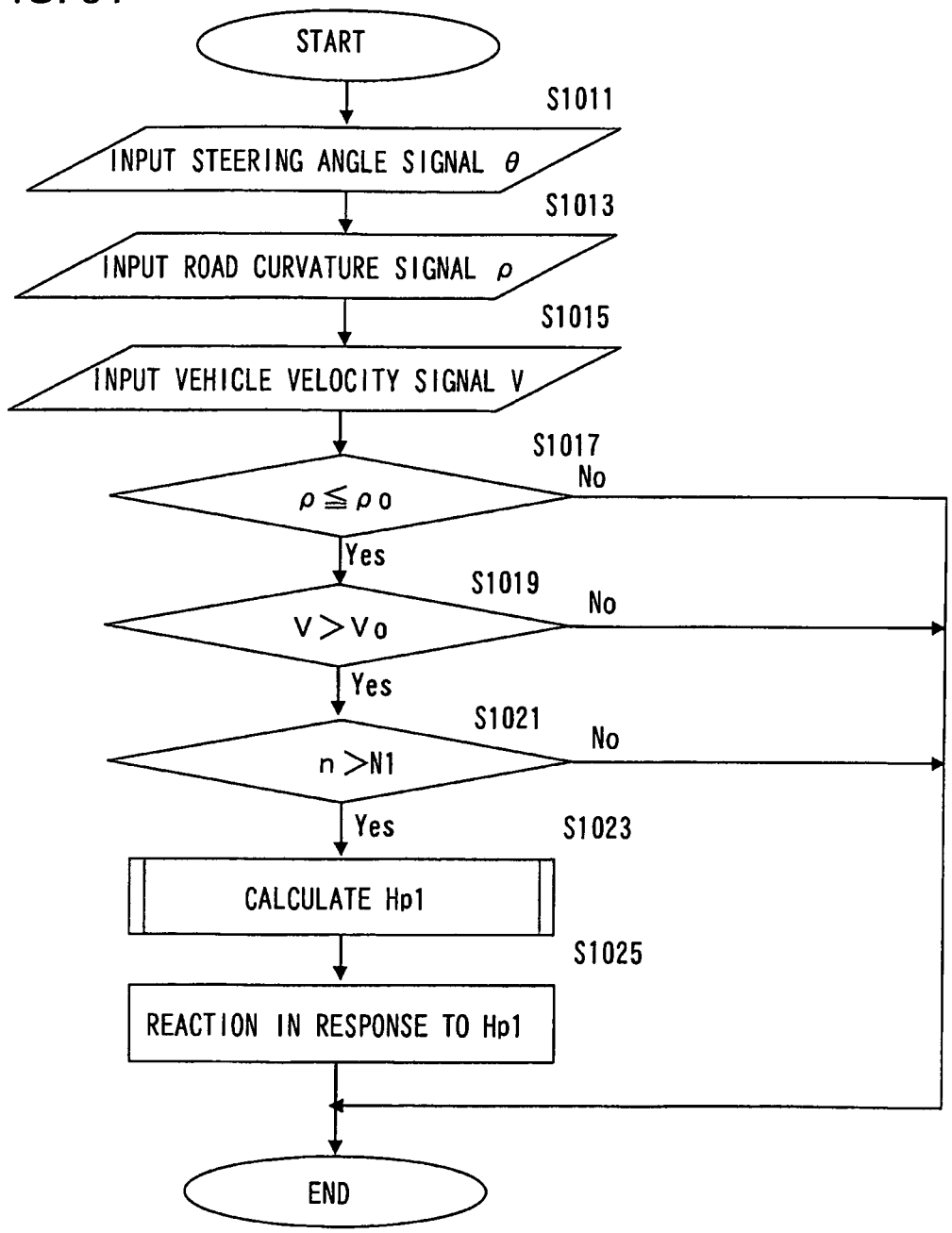

The behavior of the driving assistance system 2 for vehicle according to the tenth embodiment will now be explained in detail with reference to FIG. 51. FIG. 51 is a flow chart illustrating the procedure of driving assistance control processing performed by the controller 200 achieved in the tenth embodiment. The processing is performed continuously at regular intervals, e.g., for every 50 msec.

In step S1011, the controller 200 reads a steering angle signal θ detected by the steering angle sensor 8. In step S1013, the controller 200 reads a road curvature signal ρ of a road along which the vehicle travels. Here, the road curvature signal ρ of a road along which the vehicle travels can be obtained using, for instance, road curvature data or road alignment information included in a road map database of the navigation system 50. Alternatively, road curvature may be calculated from lane markings detected by performing image processing on a front image of the vehicle having been captured by the front camera 15. In step S1015, the controller 200 reads a vehicle velocity signal V of the vehicle detected by the vehicle speed sensor 30.

In the following steps S1017 and S1019, a decision is made as to whether or not to calculate steering angle entropy. More specifically, in step S1017, a decision is made as to whether or not the road curvature signal ρ read in step S1013 is smaller than a road curvature predetermined value ρo for making a decision that the vehicle is traveling along a straight road. When the road curvature signal ρ is equal to or less than the predetermined value ρo, the controller 200 determines that the vehicle is traveling along a straight road, and the flow of control proceeds to step S1019. When ρ>ρo, the controller 200 terminates the processing.

In step S1019, a decision is made as to whether or not the vehicle velocity signal V having been read in step S1015 is greater than a predetermined value Vo. The predetermined value Vo is a threshold value used to determine whether or not the vehicle is traveling along a road other than urban roads or the like which have many obstacles at a stable vehicle velocity, and for example Vo=60 km/h. When the vehicle velocity signal V is greater than the predetermined value Vo, the flow of control proceeds to step S1011. When the vehicle velocity signal V is equal to or less than the predetermined Vo, the controller 200 terminates the processing.

In step S1021, a decision is made as to whether or not the number of samples n of steering angle signal θ measured under the conditions that the road curvature signal ρ is equal to or less than the predetermined value ρo and the velocity V of the vehicle is greater than the predetermined value Vo is greater than a predetermined value N1. Here, the predetermined value N1 is a threshold value used to determine whether or not sufficient amount of long-duration data have been obtained so as to be less likely to be affected by load condition of the driver, and, for example, N1=100,000. It is to be noted that 100,000 data are predicted to be obtained by traveling during approximately three weeks. When the number of samples n is greater than the predetermined value N1, the flow of control proceeds to step S1023, and when the number of samples n is equal to or less than the predetermined value N1, the controller 200 terminates the processing.

In step S1023, a steering angle entropy Hp1 is calculated using the steering angle signal θ measured during a long period of time (hereinafter referred to as long-duration steering angle entropy). The long-duration steering angle entropy Hp1 is a value that represents unstable state of drive operation that the driver basically has, and is a usual instability of the driver.

FIG. 52 shows special symbols used to calculate steering angle entropy and the names thereof. A steering angle smoothing value θn-tilde is a steering angle that is less affected by quantization noise. An estimated value θn-hat of steering angle is a value obtained by estimating the steering angle at the time of sampling on the assumption that the steering has been operated smoothly. As the following equation (44) expresses, the estimated value θn-hat of steering angle is obtained by performing a second-order Taylor expansion with respect to the steering angle smoothing value θn-tilde.

$$\hat{\theta}_n = \tilde{\theta}_{n-1} + (t_n - t_{n-1})\left(\frac{\tilde{\theta}_{n-1} - \tilde{\theta}_{n-2}}{t_{n-1} - t_{n-2}}\right) + \frac{(t_n - t_{n-1})}{2}\left(\frac{\theta_{n-1}\tilde{\theta}_{n-2}}{t_{n-1} - t_{n-2}} - \frac{\tilde{\theta}_{n-2}\tilde{\theta}_{n-3}}{t_{n-2} - t_{n-3}}\right)$$

(Equation 44)

In equation (44), to denotes sampling time of a steering angle θn.

In order to reduce the effects of quantization noise, the steering angle smoothing value θn-tilde is calculated using the following equation (45) as the mean value of three adjacent steering angles θn.

$$\tilde{\theta}_{n-k} = \frac{1}{3}\sum_{i=-1}^{1} \theta_{n-k+l+i}$$

(Equation 45)

In equation (45), l denotes the number of samples of steering angle θn included in 150 msec providing that the steering angle smoothing value θn-tilde is calculated at time intervals of 150 msec, which is the minimum time interval at which a human can intermittently, manually operates.

When sampling interval of the steering angle θn is denoted by Ts, the number of samples l is expressed by the following equation (46).

$$l = \text{round}(0.15/Ts)$$

(Equation 46)

In equation (45), the smoothing value θn-tilde is calculated by (k*1) assuming values k=1, 2, 3, based on a total of three steering angles θn, i.e., a steering angle at 150 msec intervals and those adjacent thereto. Accordingly, based on such smoothing value θn-tilde, the calculated estimated value θn-hat is calculated using the steering angles θ obtained at 150 msec intervals substantially.

A steering error en at the time of sampling is calculated using the following equation (47) as the difference between the estimated value θn-hat of steering angle on the assumption that steering has been operated smoothly and the actual steering angle θn.

$$e_n \theta_n - \hat{\theta}_n \qquad \text{(Equation 47)}$$

It is to be noted that the steering error en is calculated only on the steering angles θn for each 150 msec, namely the minimum time interval at which a human can operates intermittently.

Figure 53:
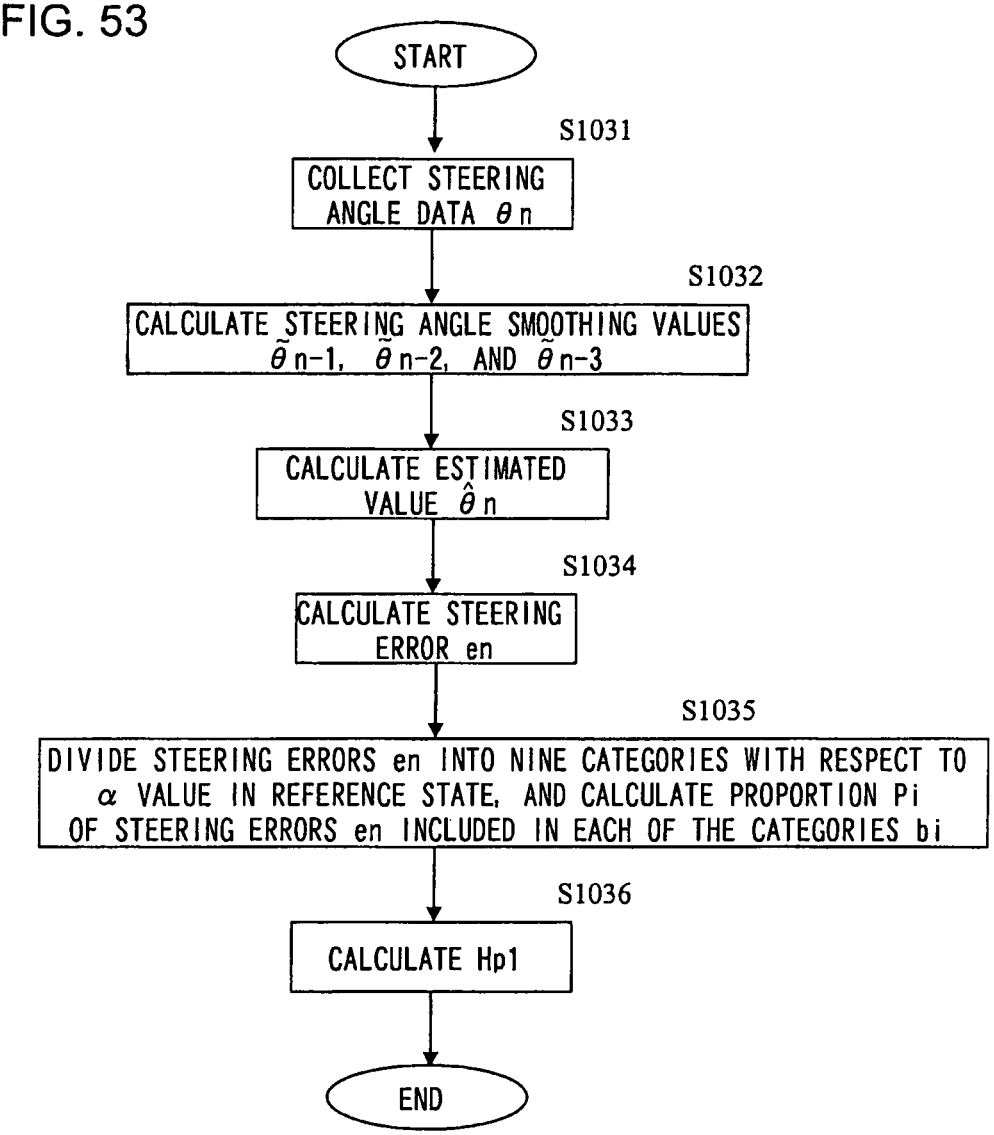

With reference to those terms, calculation processing of the long-duration steering angle entropy Hp1 will explained using the flow chart of FIG. 53.

In step S1031, the controller 200 collects time series data of n steering angle signals θn measured at the sampling interval Ts under the conditions of the above-described road curvature and vehicle velocity. The sampling interval Ts is, for instance, 50 msec.

In step S1032, using the above equation (45), three steering angle smoothing values θn-tilde are calculated using three adjacent steering angles θn at 150 msec intervals. The three steering angle smoothing values θn-tilde are expressed by the following equation (48).

$$\tilde{\theta}_{n-1} = \frac{1}{3}(\theta_{n-4} + \theta_{n-3} + \theta_{n-2}) \qquad \text{(Equation 48)}$$

$$\tilde{\theta}_{n-2} = \frac{1}{3}(\theta_{n-7} + \theta_{n-6} + \theta_{n-5})$$

$$\tilde{\theta}_{n-3} = \frac{1}{3}(\theta_{n-10} + \theta_{n-9} + \theta_{n-8})$$

In step S1033, using the above equation (44), the estimated value θn-hat of steering angle is calculated using the three steering angle smoothing values θn-tilde calculated in step 1032. The estimated value θn-hat is expressed by the following equation (49).

$$\hat{\theta} = \tilde{\theta}_{n-1} + T_s \cdot \frac{\tilde{\theta}_{n-1} - \tilde{\theta}_{n-2}}{T_s} + \qquad \text{(Equation 49)}$$

$$\frac{T_s}{2}\left(\frac{\tilde{\theta}_{n-1} - \tilde{\theta}_{n-2}}{T_s} - \frac{\tilde{\theta}_{n-2} - \tilde{\theta}_{n-3}}{T_s}\right)$$

$$= \tilde{\theta}_{n-1} + (\tilde{\theta}_{n-1} - \tilde{\theta}_{n-2}) +$$

$$\frac{1}{2}\{(\tilde{\theta}_{n-1} - \tilde{\theta}_{n-2}) - (\tilde{\theta}_{n-2} - \tilde{\theta}_{n-3})\}$$

In step S1034, using the above equation (47), the steering error en is calculated using the estimated value θn-hat of steering angle calculated in step S1033 and the actual steering angle signal θn.

In step S1035, as shown in FIG. 54, the steering errors en calculated in step S1034 are divided into nine categories, b1 to b9, with respect to α value (=αo) in reference state, and a probability Pi of the frequency of the steering error en included in each of the categories bi relative to all the frequencies is calculated. Here, α value (=αo) in reference state is pre-set based on steering angle signal of the general driver group (drivers of general public) and is stored in a memory of the controller 200. Then, the category bi is set when the controller 200 executes the program shown in FIG. 51.

In the following step S1036, using the following equation (50), the long-duration steering angle entropy Hp1 is calculated using the probability Pi calculated in step S1035.

$$H_P = \sum_{i=1}^{9} (-P_i \log_9 P_i) \qquad \text{(Equation 50)}$$

It is to be noted that the 'p' of the long-duration steering angle entropy Hp1 indicates that the steering angle entropy follows a probability distribution P={Pi}.

The long-duration steering angle entropy Hp1 value, which represents degrees of steepness of distribution of the steering error en, is calculated by base-9 logarithm so that the Hp1 value is 1 when the steering error en is included equally in each of the categories bi. It is to be noted that since the categories are set so that 90% of all the frequencies fall on the central three categories, b4 to b6, of distribution of the steering error en, the Hp1 value will not be 1 in a reference state.

As the long-duration steering angle entropy Hp1 is small, degrees of steepness of distribution of the steering error en is large and the distribution of the steering error en is kept in a certain range. Namely, it indicates that the steering is operated smoothly and the operation is in a stable state. On the other hand, as the long-duration steering angle entropy Hp1 value is large, degrees of steepness of distribution of the steering error en is small, and distribution of the steering error en varies. In other words, it indicates that the steering is operated awkwardly and the operation is in an unstable state.

Thus, after the long-duration steering angle entropy Hp1 is calculated in step S1023, the flow of control proceeds to step S1025. In step S1025, the controller 200 presents an alarm or an instruction (improvement suggestion) to the driver depending on the long-duration steering angle entropy Hp1. As the long-duration steering angle entropy Hp1 is greater, the instability of drive operation is greater compared to the average steering angle entropy of the general driver group (general public).

Figure 55:
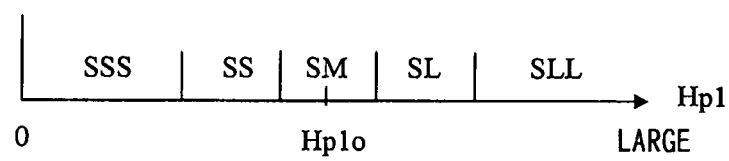

Therefore, as, for instance, shown in FIG. 55, the magnitudes of the long-duration steering angle entropy Hp1 are divided into five levels (SSS, SS, SM, SL, and SLL), and the controller 200 informs the driver of the level of the magnitude of the calculated long-duration steering angle entropy Hp1. It is to be noted that the five levels are set appropriately so that the average steering angle entropy of the general driver group (general public) falls on the center level SM in the category shown in FIG. 55.

FIG. 56 presents an example of contents to be informed according to the category result of the long-duration steering angle entropy Hp1. In the case where the long-duration steering angle entropy Hp1 is categorized into the level SLL, the controller 200 displays a text conveying a message "The instability of operation is great" on the display monitor of the display unit 180. In the case where the long-duration steering angle entropy Hp1 is categorized into the level SL, the controller 200 displays a text conveying a message "The instability of operation is slightly great". In the case where the long-duration steering angle entropy Hp1 is categorized into the level SM, which is equal to the average steering angle entropy of the general driver group, the controller 200 displays a text conveying a message "The instability of operation is average". In the case where the long-duration steering angle entropy Hp1 is categorized into the level SS, the controller 200 displays a text conveying a message "The instability of operation is slightly small". In the case where the long-duration steering angle entropy Hp1 is categorized into the level SSS, the controller 200 displays a text conveying a message "The instability of operation is small". It is to be noted that the contents to be informed shown in FIG. 56 may be provided to the driver through voices that come out of the speaker 130.

Thus, in the tenth embodiment explained above, in addition to the advantageous effects according to the first to the ninth embodiments described above, the following operations and advantageous effects can be achieved.

Control performance of driving operation by the driver is detected as an index for drive diagnosis. More specifically, the steering angle entropy Hp that represents the instability of steering operation by the driver is calculated using steering angle. This allows drive diagnosis to be carried out accurately with respect to horizontal drive operation of the vehicle. Control performance of driving operation by the driver is detected as an index for drive diagnosis. More specifically, the steering angle entropy Hp that represents the instability of steering operation by the driver is calculated using steering angle. This allows drive diagnosis to be carried out accurately with respect to horizontal drive operation of the vehicle.

Variation 1 of the Tenth Embodiment

Here, long-duration steering angle entropy Hp1 calculated using steering angle error distribution of the driver measured during a long period of time is designated as a reference state. Then, drive diagnosis is carried out by calculating steering angle entropy using steering error distribution of the driver measured during an intermediate period of time, and by detecting deviation from unstable state of drive operation that the driver basically has.

Figure 57:
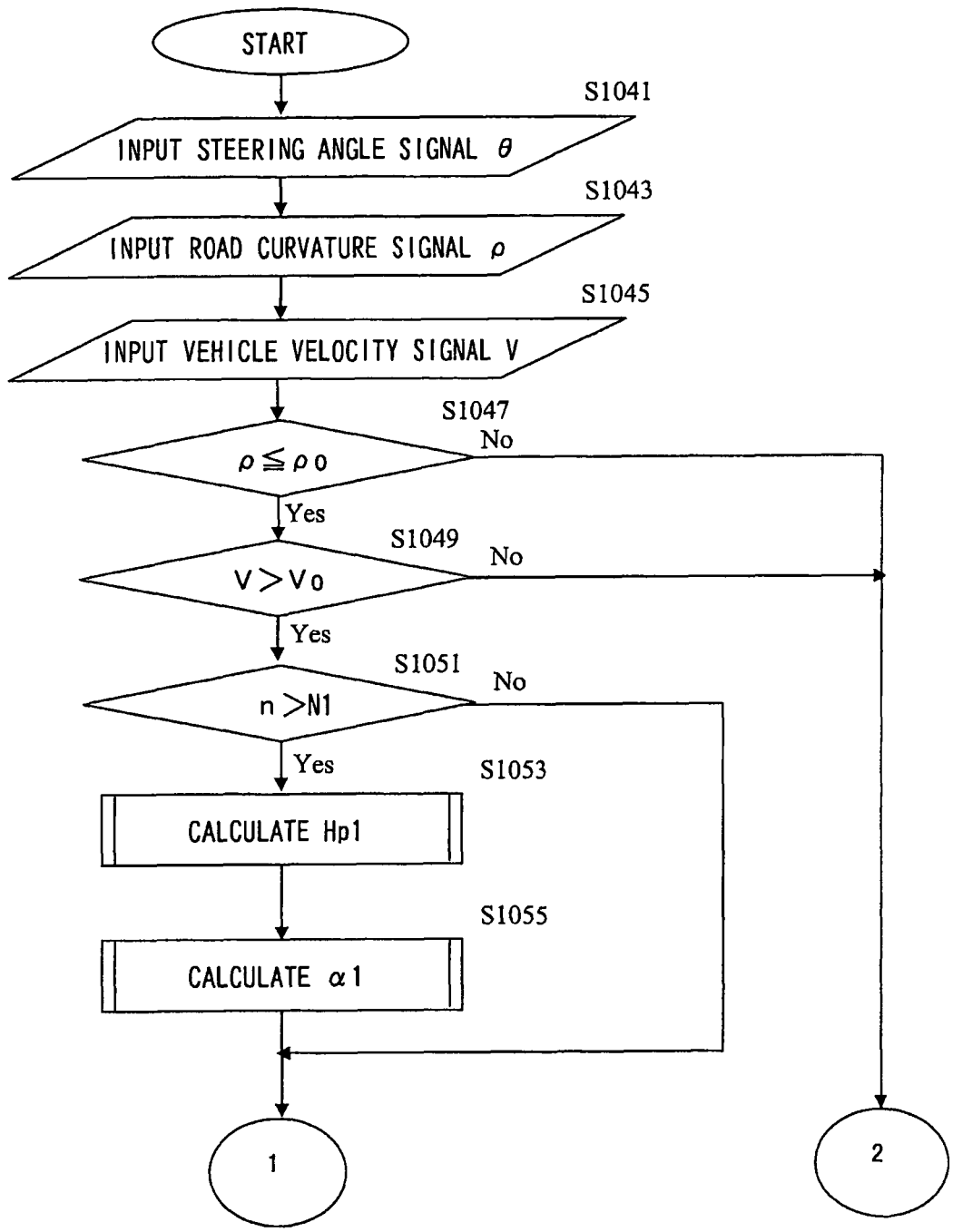
Figure 58:
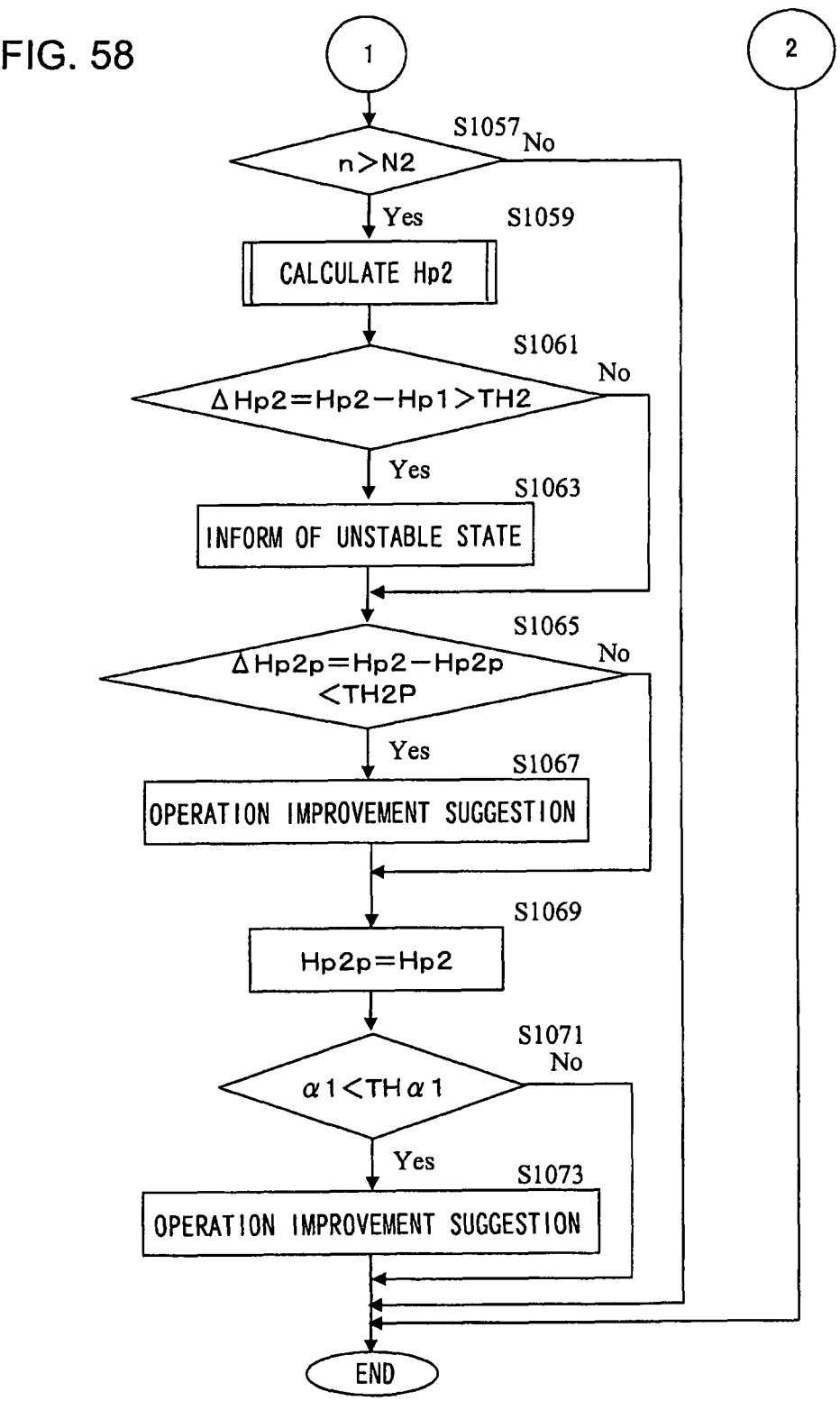

The behavior of the driving assistance system 2 for vehicle according to a variation 1 of the tenth embodiment will now be explained in detail with reference to FIGS. 57 and 58. FIGS. 57 and 58 are flow charts illustrating the procedure of driving assistance control processing performed by the controller 200 achieved in the variation 1 of the tenth embodiment. The processing is performed continuously at regular intervals, e.g., for every 50 msec. Since the processing executed in steps S1041 to S1053 are the same as those executed in steps S1011 to S1023 in the flow chart shown in FIG. 51, explanations thereof will be omitted. However, in the case where a decision is made that the number of samples n is equal to or less than the predetermined value N1 in step S1051, the controller 200 does not terminate the processing so that the flow of control proceeds to step S1057 in FIG. 58.

Figure 59:
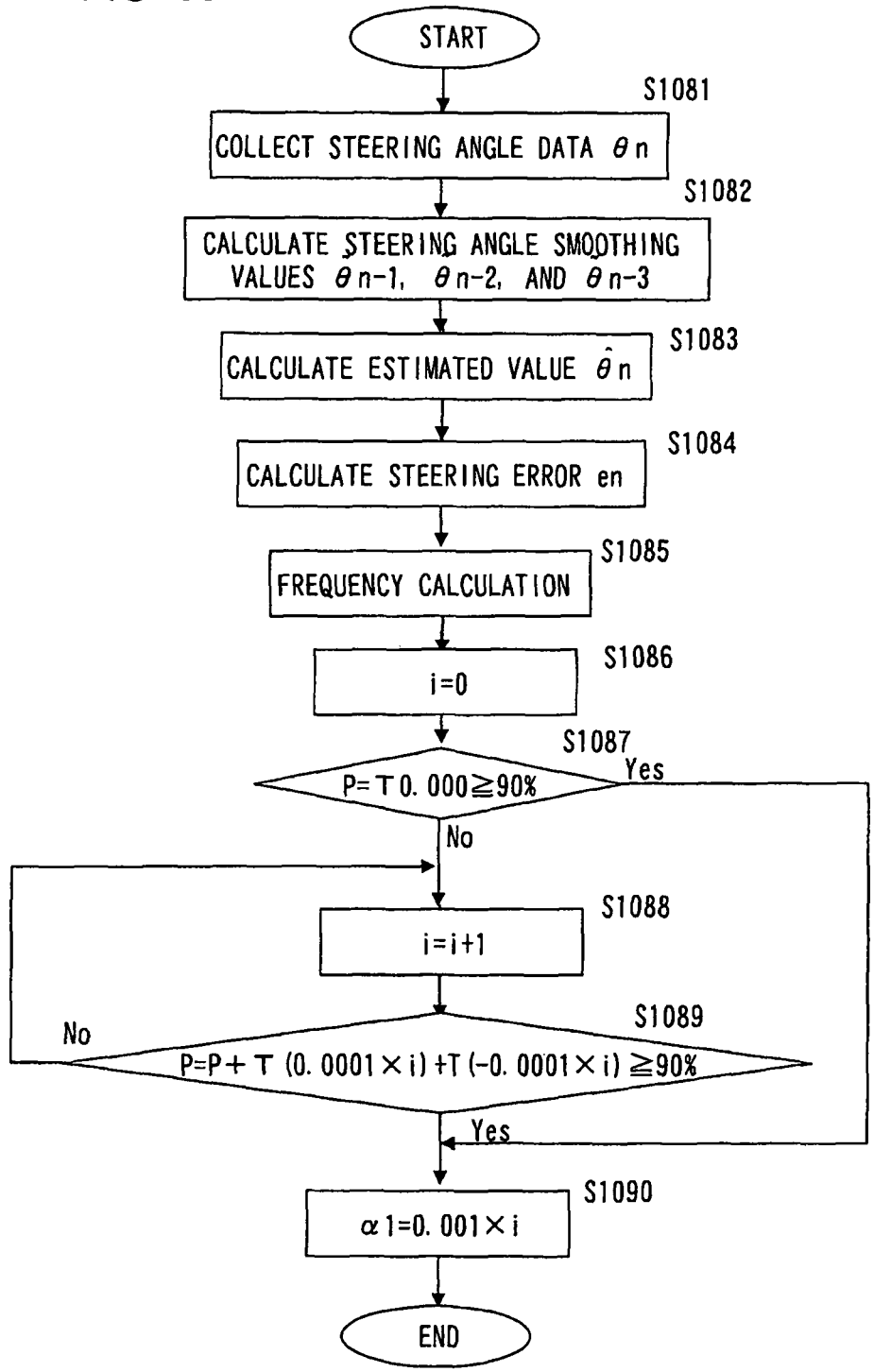

After the controller 200 calculates the long-duration steering angle entropy Hp1, which represents the reference state, in step S1053, the controller 200 calculates α value used to calculate intermediate-duration steering angle entropy in step S1055. Here, a personal α value of the driver (hereinafter referred to as α1 value) is calculated using the steering angle signal θ measured during a long period of time. This processing will be explained with reference to the flow chart of FIG. 59.

In step S1081, the controller 200 collects time series data of n steering angle signals θn measured at the sampling interval Ts under the conditions of the above-described road curvature and vehicle velocity. The sampling interval Ts is, for instance, 50 msec. In step S1082, using the above equation (45), three steering angle smoothing values θn-tilde are calculated using three adjacent steering angles θn at 150 msec intervals.

In step S1083, using the above equation (44), the estimated value θn-hat of steering angle is calculated using the three steering angle smoothing values θn-tilde calculated in step S1082. In step S1084, using the above equation (47), the steering error en is calculated using the estimated value θn-hat of steering angle and the actual steering angle signal θn calculated in step S1083.

Figure 61:
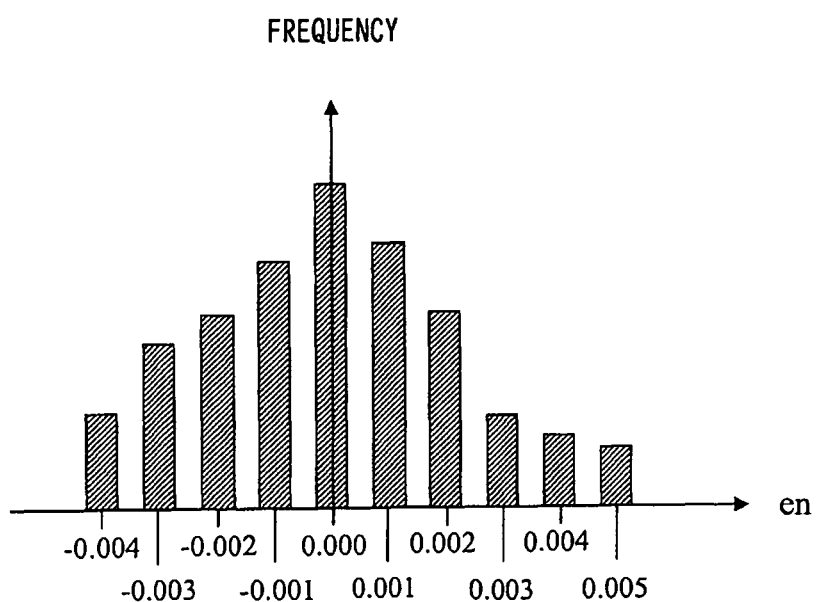

In the following step S1085, frequency of the steering errors en is counted per predetermined steering error. The predetermined steering error is determined in view of resolution of the steering angle sensor 8. Here, as shown, for example, in FIG. 60, the steering errors en are categorized per 0.001 rad. FIG. 61 presents an example of frequency distribution of the steering errors en. In step S1086, 0 is assigned to i, which represents the category of steering errors.

In step S1087, a decision is made as to whether or not the probability P of frequency T0.000 when the steering error en=0.000 rad is equal to or greater than 90% relative to all the frequencies of all the steering errors. In the case where the probability P of frequency T0.000 is equal to or greater than 90%, the flow of control proceeds to step S1090. In this case, since i=0, therefore α1=0.000 rad. If a negative decision is made in step S1087, the flow of control proceeds to step S1088. In step S1088, i is incremented by 1 so as to set it (i+1).

In step S1089, a decision is made as to whether or not the probability P of frequency (T0.000+T0.001+T−0.001) of steering errors en from −0.001 rad to +0.001 rad, which is an expanded category for steering error, relative to all the frequencies of all the steering errors is equal to or greater than 90%. In the case where the probability P is equal to or greater than 90%, the flow of control proceeds to step S1090. In this case, since i=1, therefore α1=0.001. If a negative decision is made in step S1089, the flow of control returns to step S1088, i is incremented again and the decision-making in step S1089 is repeated.

Thus, after the α1 value is calculated in step S1055, the flow of control proceeds to step S1057 of FIG. 58. In step S1057, a decision is made as to whether or not the number of samples n of steering angle signals θ measured under the condition that the road curvature signal ρ is equal to or less than the predetermined value ρo and the velocity V of the vehicle is greater than the predetermined value Vo is greater than a predetermined value N2. Here, the predetermined value N2 is a threshold value used to determine whether or not sufficient intermediate-duration (e.g., traveling during approximately one day) data used to make a decision as to deviation from the usual drive operation of the driver have been obtained, and, for example, N2=7200. In the case where the number of samples n is greater than the predetermined value N2, the flow of control proceeds to step S1059, while in the case where the number of samples n is equal to or less than the predetermined value N2, the controller 200 terminates the processing.

In step S1059, an intermediate-duration steering angle entropy Hp2 is calculated using steering angle signal θ measured during an intermediate period of time. The intermediate-duration steering angle entropy Hp2 is a value calculated using steering angle signal θ measured during an intermediate period of time with the steering angle signal θ measured during a long period of time being used as a reference state. The intermediate-duration steering angle entropy Hp2 is a value that represents deviation (gap) from the unstable state of drive operation that the driver basically has. The intermediate-duration steering angle entropy Hp2 is calculated in the same method as the long-duration steering angle entropy Hp1, which is explained with reference to the flow chart of FIG. 53, is. However, the personal α1 value of the driver calculated in step S1055 is used as α value.

In step S1061, the controller 200 calculates the difference ΔHp2 (=Hp2−Hp1) between the long-duration steering angle entropy Hp1 calculated in step S1053 and the intermediate-duration steering angle entropy Hp2 calculated in step S1059. Then, the calculated difference ΔHp2 is used to make a decision as to drive operation unstable state. It can be regarded that as the intermediate-duration steering angle entropy Hp2 is greater relative to the long-duration steering angle entropy Hp1, the instability of drive operation has become greater compared to the instability of operation that the driver basically has. Accordingly, for example, in the case where the difference ΔHp2 in steering angle entropy is greater than a predetermined value TH2, the controller 200 makes a decision that the drive operation is in an unstable state, the flow of control proceeds to step S1063.

In step S1063, it is informed that the drive operation of the driver is in an unstable state. Here, as, for example, shown in FIG. 62, the difference ΔHp2 in steering angle entropy is divided into two levels (D2P and D2PP) according to the magnitude of the difference ΔHp2 in steering angle entropy in the region equal to or greater than the predetermined value TH2. Then, the controller 200 informs the driver of the level that corresponds to the difference ΔHp2 in steering angle entropy calculated in step S1061.

Figures 62, 63:
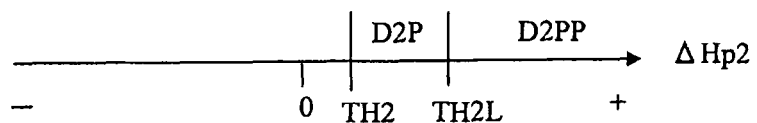

FIG. 63 presents an example of contents to be informed according to the category result of the difference ΔHp2 in steering angle entropy. In the case where the difference ΔHp2 is categorized into the level D2PP, which is greater than a predetermined value TH2L (>TH2), the controller 200 displays a text conveying a message "The instability of operation is greater than it usually is" on the display monitor of the display unit 180. In the case where the difference ΔHp2 is categorized into the level D2P, which is greater than the predetermined value TH2, the controller 200 displays a text conveying a message "The instability of operation is slightly greater than it usually is". It is to be noted that the contents to be informed shown in FIG. 63 may be provided to the driver through a voice that comes out of the speaker 130.

If a negative decision is made in step S1061, the controller 200 skips notification processing of unstable state in step S1063. Thus, after detecting deviation from unstable state of usual drive operation and informing the driver thereof, in processing after step S1065 the controller 200 informs the driver of change in the instability of drive operation during an intermediate period of time based on comparison result of the past and the present intermediate-duration steering angle entropies. More specifically, the controller 200 compares the intermediate-duration steering angle entropy calculated in the past (hereinafter referred to as Hp2p) with the latest intermediate-duration steering angle entropy Hp2 so as to detect change in the instability of drive operation during an intermediate period of time and inform the driver thereof.

At first, in step S1065, the controller 200 calculates the difference ΔHp2p between the past intermediate-duration steering angle entropy Hp2p that has been calculated in the past with respect to the same driver and has been stored and the latest intermediate-duration steering angle entropy Hp2 calculated in step S1059. Then, the calculated difference ΔHp2p is used to make a decision as to change in instability of drive operation. It can be regarded that as the latest intermediate-duration steering angle entropy Hp2 is smaller relative to the past intermediate-duration steering angle entropy Hp2p, i.e., as the difference ΔHp2p is negative in sign and greater in value, the instability of drive operation has changed in the decremental direction compared to that of the past. Therefore, for instance, in the case where the difference ΔHp2p in steering angle entropy is smaller than a predetermined value TH2p, the controller 200 makes a decision that the instability of drive operation has become reduced, and the flow of control proceeds to step S1067.

In step S1067, the controller 200 informs that the instability of drive operation of the driver has become smaller and the steering operation has become smoother (operation improvement suggestion). Here, as, for example, shown in FIG. 64, the difference ΔHp2p in steering angle entropy is divided into two levels (D2PM and D2PMM) according to the magnitude of the difference ΔHp2p in steering angle entropy in the region smaller than the predetermined value TH2P. Then, the controller 200 informs the driver of the level that corresponds to the difference ΔHp2p in steering angle entropy calculated in step S1065.

Figures 64, 65:
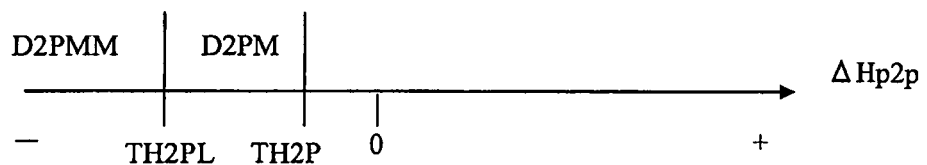

FIG. 65 presents an example of contents to be informed according to the category result of the difference ΔHp2p in steering angle entropy. In the case where the difference ΔHp2p is categorized into the level D2PM, which is smaller than the predetermined value TH2P, the controller 200 displays a text conveying a message "The instability of operation is slightly smaller than it was before" on the display monitor of the display unit 180. In the case where the difference ΔHp2p is categorized into the level D2PMM, which is smaller than a predetermined value TH2PL (<TH2P), the controller 200 displays a text conveying a message "The instability of operation is smaller than it was before". It is to be noted that the contents to be informed shown in FIG. 65 may be provided to the driver through a voice that comes out of the speaker 130.

If a negative decision is made in step S1065, the controller 200 skips operation improvement suggestion processing in step S1067, and the flow of control proceeds to step S1069. In step S1069, the intermediate-duration steering angle entropy Hp2 calculated in step S1059 is set as the past intermediate-duration steering angle entropy Hp2p in preparation for the next processing.

In processing after step S1071, the controller 200 uses the personal α1 value of the driver calculated based on the long-duration steering angle signal θ of the driver so as to perform operation improvement suggestion to the driver. As described above, the α1 value is the 90 percentile calculated in distribution of steering error calculated based on the long-duration steering angle signal data of the driver. Therefore, the α1 value is a factor that represents distribution of long-duration steering error of the driver.

In step S1071, the α1 value calculated in step S1055 is compared with a predetermined value THα1. In the case where the long-duration α1 value of the driver is smaller than the predetermined value THα1, the instability of drive operation of the driver is small. Then, if the α1 value is smaller than the predetermined value THα1, the flow of control proceeds to step S1073.

In step S1073, the controller 200 informs that the instability of drive operation of the driver is small and the steering is operated smoothly (operation improvement suggestion). Here, as, for example, shown in FIG. 66, the α1 value is divided into two levels (α1S and α1SS) according to the α1 value in the region smaller than the predetermined value THα1. Then, the controller 200 informs the driver of the level that corresponds to the α1 value calculated in step S1055.

Figures 66, 67:
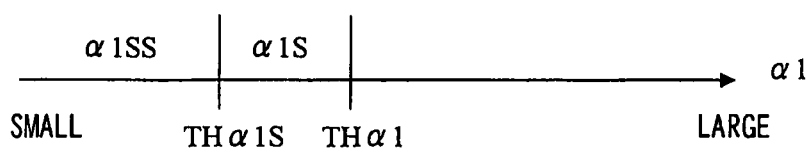

FIG. 67 presents an example of contents to be informed according to the category result of the α1 value. In the case where the α1 value is categorized into the level α1S, which is smaller than the predetermined value THα1, the controller 200 displays a text conveying a message "The instability of operation is slightly small" on the display monitor of the display unit 180. In the case where the α1 value is categorized into the level α1SS, which is smaller than a predetermined value THα1S (<THα1), the controller 200 displays a text conveying a message "The instability of operation is small". It is to be noted that the contents to be informed shown in FIG. 67 may be provided to the driver through a voice that comes out of the speaker 130.

Thus, the controller 200 terminates the processing. It is to be noted that if a negative decision is made in step S1071, the controller 200 skips operation of improvement suggestion processing in step S1073 and terminates the processing.

Variation 2 of the Tenth Embodiment

Here, long-duration steering angle entropy Hp1 calculated using steering angle error distribution of the driver measured during a long period of time is designated as a reference state. Then, drive diagnosis is carried out by calculating steering angle entropy using steering error distribution of the driver measured during a short period of time, and by detecting short-duration deviation from unstable state of drive operation that the driver basically has.

Figure 68:
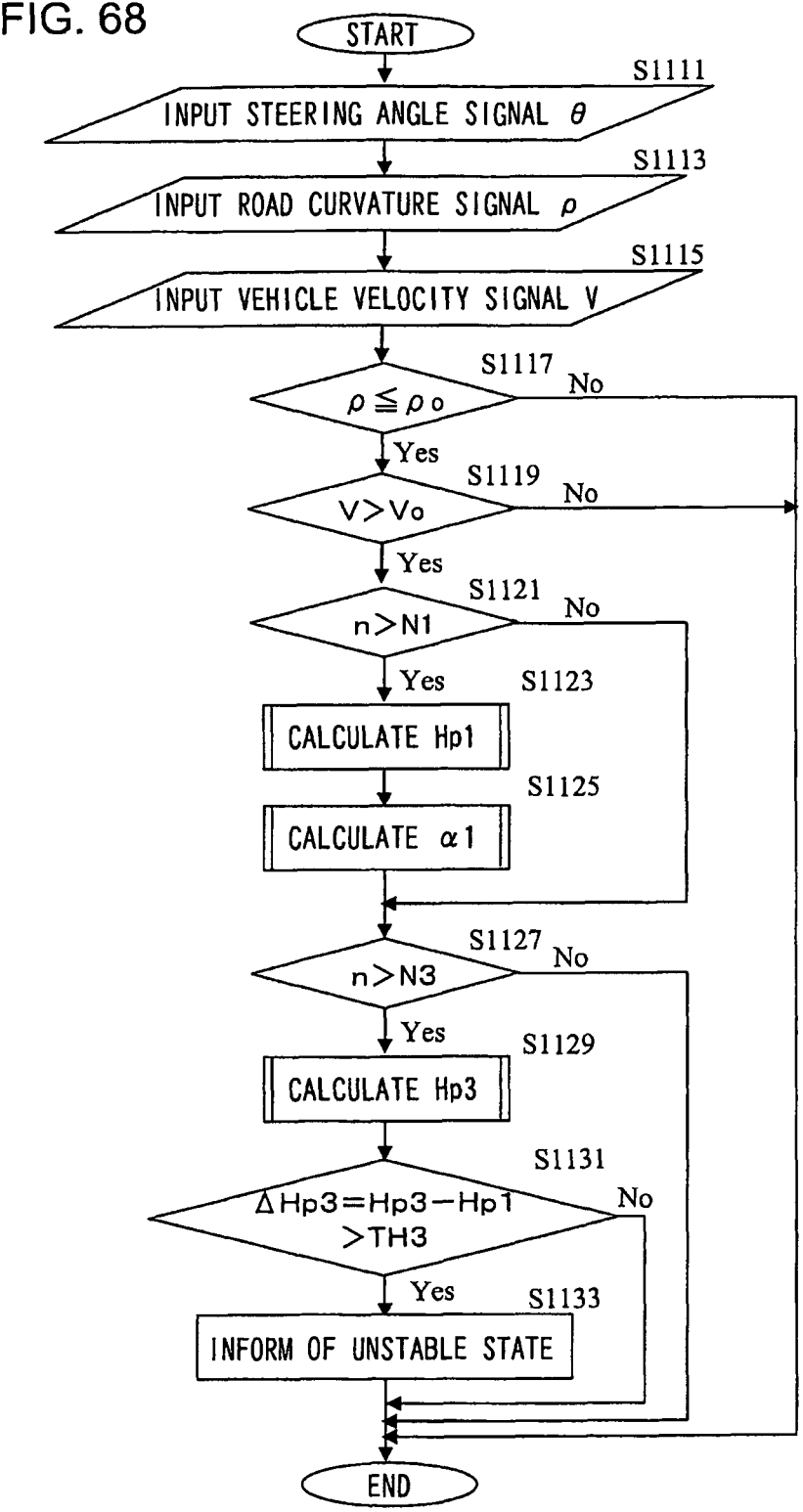

The behavior of the driving assistance system 2 for vehicle according to a variation 2 of the tenth embodiment will now be explained in detail with reference to FIG. 68. FIG. 68 is a flow chart illustrating the procedure of driving assistance control processing performed by the controller 200 achieved in the variation 2 of the tenth embodiment. The processing is performed continuously at regular intervals, e.g., for every 50 msec. Since the processing executed in steps S1111 to S1125 are the same as those executed in steps S1041 to S1055 in the flow chart shown in FIG. 57, explanations thereof will be omitted.

After the α1 value is calculated in step S1125, the flow of control proceeds to step S1127. In step S1127, a decision is made as to whether or not the number of samples n of steering angle signals θ measured under the condition that the road curvature signal ρ is equal to or less than the predetermined value ρo, and the velocity V of the vehicle is greater than the predetermined value Vo is greater than a predetermined value N3. Here, the predetermined value N3 is a threshold value used to determine whether or not short-duration (e.g., traveling during approximately five minutes) data used to make a decision as to short-duration deviation from the usual drive operation of the driver have been obtained, and, for example, N3=1200. In the case where the number of samples n is greater than the predetermined value N3, the flow of control proceeds to step S1129, while in the case where the number of samples n is equal to or less than the predetermined value N3, the controller 200 terminates the processing.

In step S1129, a short-duration steering angle entropy Hp3 is calculated using steering angle signal θ measured during a short period of time. The short-duration steering angle entropy Hp3 is a value calculated using steering angle signal θ measured during a short period of time with the steering angle signal θ measured during a long period of time being used as a reference state. The short-duration steering angle entropy Hp3 is a value that represents short-duration deviation (gap) from the unstable state of drive operation that the driver basically has. The short-duration steering angle entropy Hp3 is calculated in the same method as the long-duration steering angle entropy Hp1, which is explained with reference to the flow chart of FIG. 53, is. However, the personal α1 value of the driver calculated in step S1125 is used as α value.

In step S1131, the controller 200 calculates the difference ΔHp3 (=Hp3−Hp1) between the long-duration steering angle entropy Hp1 calculated in step S1123 and the short-duration steering angle entropy Hp3 calculated in step S1129. Then, the calculated difference ΔHp3 is used to make a decision as to drive operation unstable state. It can be regarded that as the short-duration steering angle entropy Hp3 is greater relative to the long-duration steering angle entropy Hp1, the instability of drive operation at present has become greater compared to the instability of operation that the driver basically has. Accordingly, for example, in the case where the difference ΔHp3 in steering angle entropy is greater than a predetermined value TH3, the controller 200 makes a decision that the drive operation is in an unstable state, the flow of control proceeds to step S1133.

In step S1133, it is informed that the present drive operation of the driver is in an unstable state. Here, as, for example, shown in FIG. 69, the difference ΔHp3 in steering angle entropy is divided into two levels (D3P and D3PP) according to the magnitude of the difference ΔHp3 in steering angle entropy in the region equal to or greater than the predetermined value TH3. Then, the controller 200 informs the driver of the level that corresponds to the difference ΔHp3 in steering angle entropy calculated in step S1131.

Figures 69, 70:
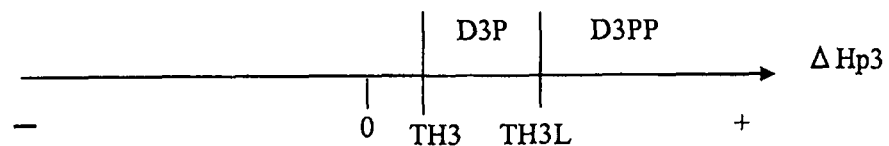

FIG. 70 presents an example of contents to be informed according to the category result of the difference ΔHp3 in steering angle entropy. In the case where the difference ΔHp3 is categorized into the level D3PP, which is greater than a predetermined value TH3L (>TH3), the controller 200 displays a text conveying a message "The instability of operation is great" on the display monitor of the display unit 180. In the case where the difference ΔHp3 is categorized into the level D3P, which is greater than the predetermined value TH3, the controller 200 displays a text conveying a message "The instability of operation is slightly great". It is to be noted that the contents to be informed shown in FIG. 70 may be provided to the driver through a voice that comes out of the speaker 130.

Thus, the controller 200 terminates the processing. It is to be noted that if a negative decision is made in step S1131, the controller 200 skips notification processing of unstable state in step S1133 and terminates the processing.

Eleventh Embodiment

A driving assistance system for vehicle according to the eleventh embodiment of the present invention will now be explained. The basic structure of the driving assistance system for vehicle according to the eleventh embodiment is the same as that of the tenth embodiment presented in FIG. 50. Therefore, the difference from the tenth embodiment and the variations 1 and 2 thereof will now be explained mainly.

In the driving assistance system 2 for vehicle according to the eleventh embodiment, as in the above-described tenth embodiment, steering angle entropy is calculated using steering angle signal so as to detect unstable state of drive operation and carry out drive diagnosis of the driver. Then, if the drive diagnosis result indicates that the driver is engaging in risky driving more than he usually is, i.e., if the drive operation of the driver is deviated into a riskier state, the controller 200 alerts the driver so as to inform the driver thereof before the drive operation of the driver goes into a high-risk state. On the other hand, if the drive diagnosis result indicates that the drive operation of the driver is better than the standard of general public, the controller 200 provides the driver with information so as to encourage safer driving or suggest operation improvement.

Here, in order to calculate steering angle entropy, it is required to make a decision as to which of the categories of the reference distribution divided into nine estimation error of steering angle belongs to and to calculate the probability of each of the categories. In addition, in order to calculate α value (the above-described α1), it is required to calculate frequency distribution of steering error. Since those processing are preformed on all the data of the number of samples, it is necessary to prepare as many buffer memories as the number of data in advance.

Therefore, in the eleventh embodiment, the probability of each of the categories is recursively calculated so that even if it is necessary to temporarily store the latest long-duration steering angle data the probability of each of the categories is calculated using a small amount of memory.

Figure 71:
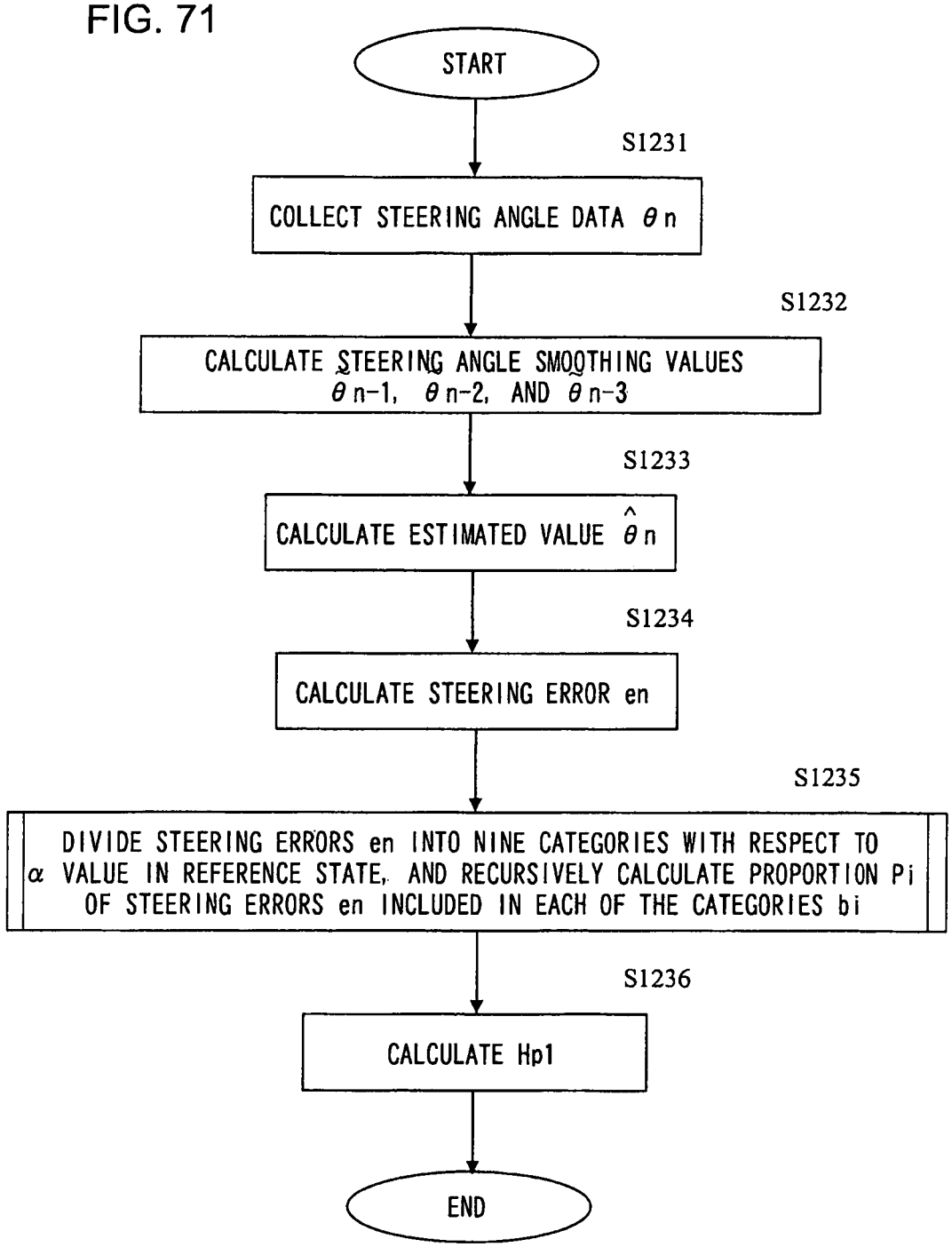

The procedure of calculation processing of the long-duration steering angle entropy Hp1 in the driving assistance system 2 for vehicle achieved in the eleventh embodiment will now be explained with reference to the flow chart of FIG. 71. This processing is executed in step S1023 of the flow chart of FIG. 51 explained in the tenth embodiment. Since the processing executed in steps S1231 to S1234 are the same as those executed in step S1031 to S1034 of FIG. 53, explanations thereof will be omitted.

Figure 72:
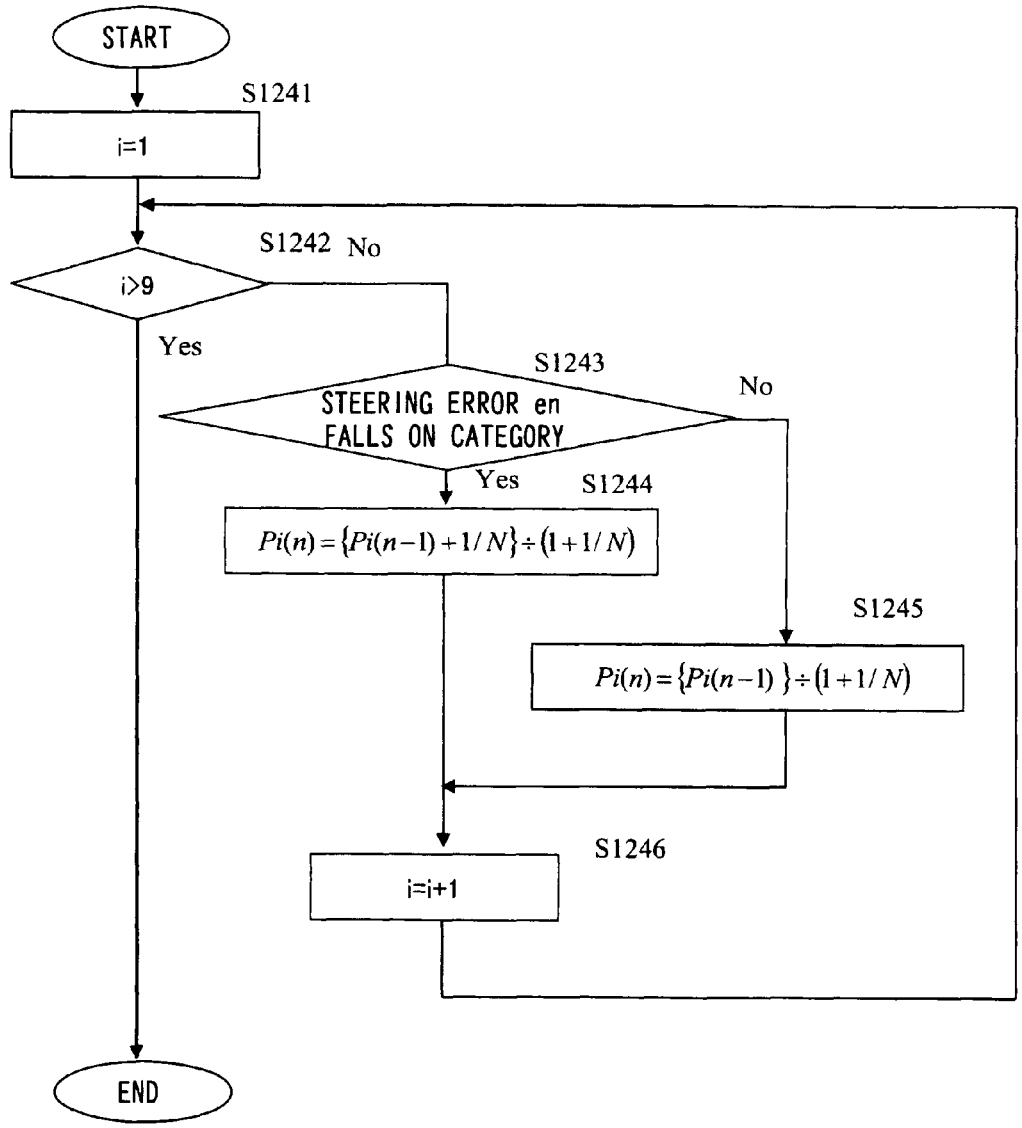

In step S1235, as shown in FIG. 54, the steering errors en calculated in step S1234 are divided into nine categories, b1 to b9, with respect to α value (=αo) in reference state, and a probability Pi of the frequency of the steering error en included in each of the categories bi relative to all the frequencies is recursively calculated. Here, α value (=αo) in reference state is pre-set based on steering angle signal of the general driver group (drivers of general public) and is stored in the memory of the controller 200. A decision-making as to the category into which the steering error en is allocated and a method to recursively calculate the probability Pi of each of the categories will be explained with reference to the flow chart of FIG. 72.

At first, in step S1241, 1 is assigned to i, which represents the category of steering errors. In step S1242, the controller 200 makes a decision as to whether or not i is greater than 9. If i>9, the controller 200 determines that calculations of the probability Pi of each of the nine categories have completed, and terminates the processing. If i≤9, the flow of control proceeds to step S1243 so that the probability Pi of each of the categories is calculated.

In step S1243, the controller 200 makes a decision as to whether or not the steering error en calculated in step S1234 falls on the target category bi. If the steering error falls on the category bi, the flow of control proceeds to step S1244. In step S1244, probability Pi(n) of the steering error en included in the category bi is calculated using the following equation (51), where the number of data is denoted by N.

$$Pi(n)=\{Pi(n-1)+1/N\}\div(1+1/N) \quad \text{(Equation 51)}$$

On the other hand, if the steering error does not fall on the category bi, the flow of control proceeds to step S1245, and the probability Pi(n) of the steering error en included in the category bi is calculated using the following equation (52).

$$Pi(n)=\{Pi(n-1)\}\div(1+1/N) \quad \text{(Equation 52)}$$

In step S1246, (i+1) is set as i. Then, the flow of control returns to step S1242, and the processing of steps S1243 to S1246 are repeated until the probabilities Pi of all the nine categories are calculated.

Thus, after the probability Pi of steering error en included in each of the categories bi is recursively calculated in step S1235, the flow of control proceeds to step S1236. In step S1236, using the above-described equation (50), the long-duration steering angle entropy Hp1 is calculated using the probability Pi calculated in step S1235. This terminates the calculation processing of the long-duration steering angle entropy Hp1.

Figure 73:
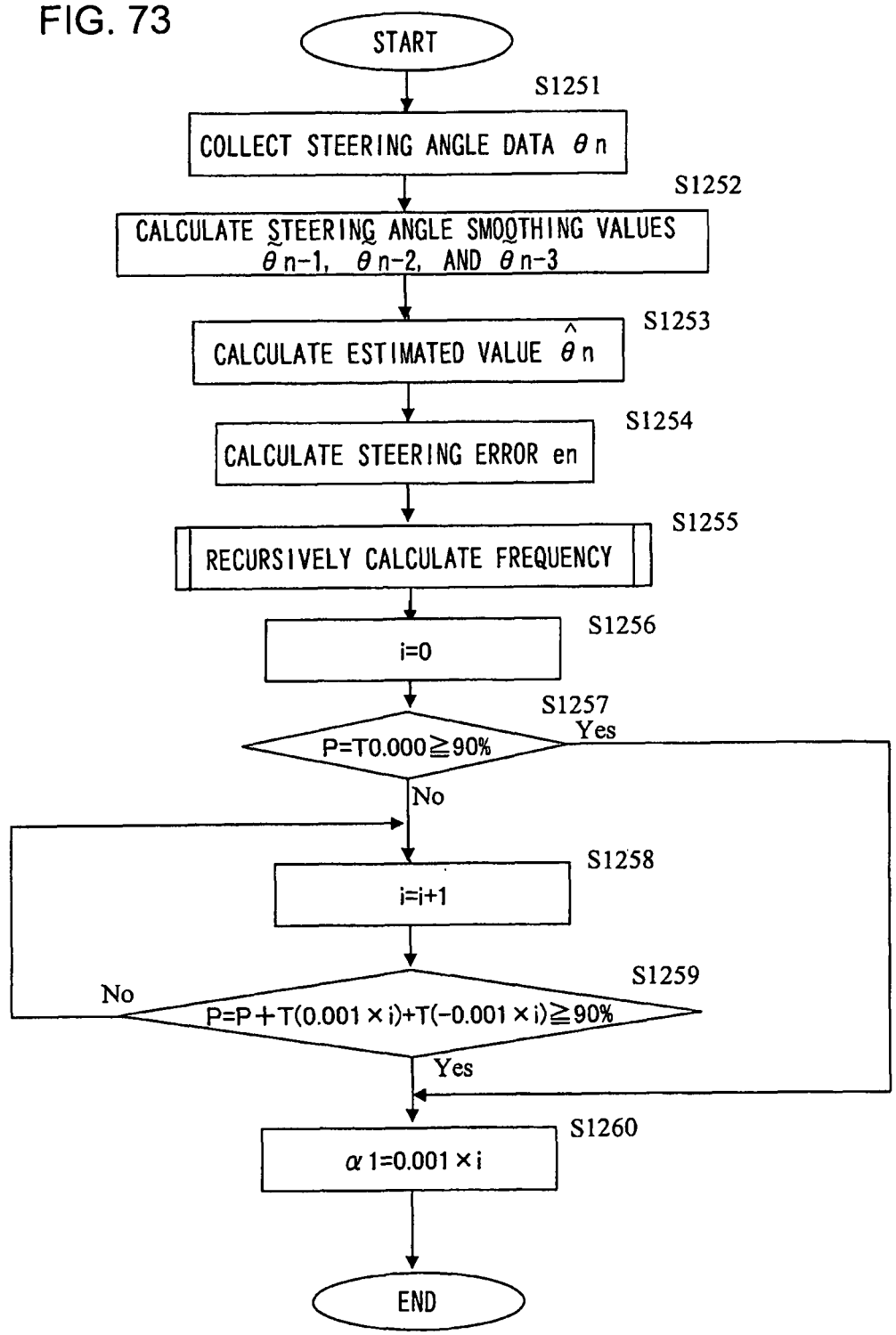

Next, in order to calculate the α1 value explained in the variation 1 of the tenth embodiment, a method to recursively perform frequency calculation will be explained. The procedure of calculation processing for the α1 value in the driving assistance system 2 for vehicle achieved in the eleventh embodiment will now be explained with reference to the flow chart of FIG. 73. This processing is executed in step S1055 of the flow chart of FIG. 57 explained in the variation 1 of the tenth embodiment. Since the processing executed in steps S1251 to S1254 are the same as those executed in step S1081 to S1084 of FIG. 59, explanations thereof will be omitted.

Figure 74:
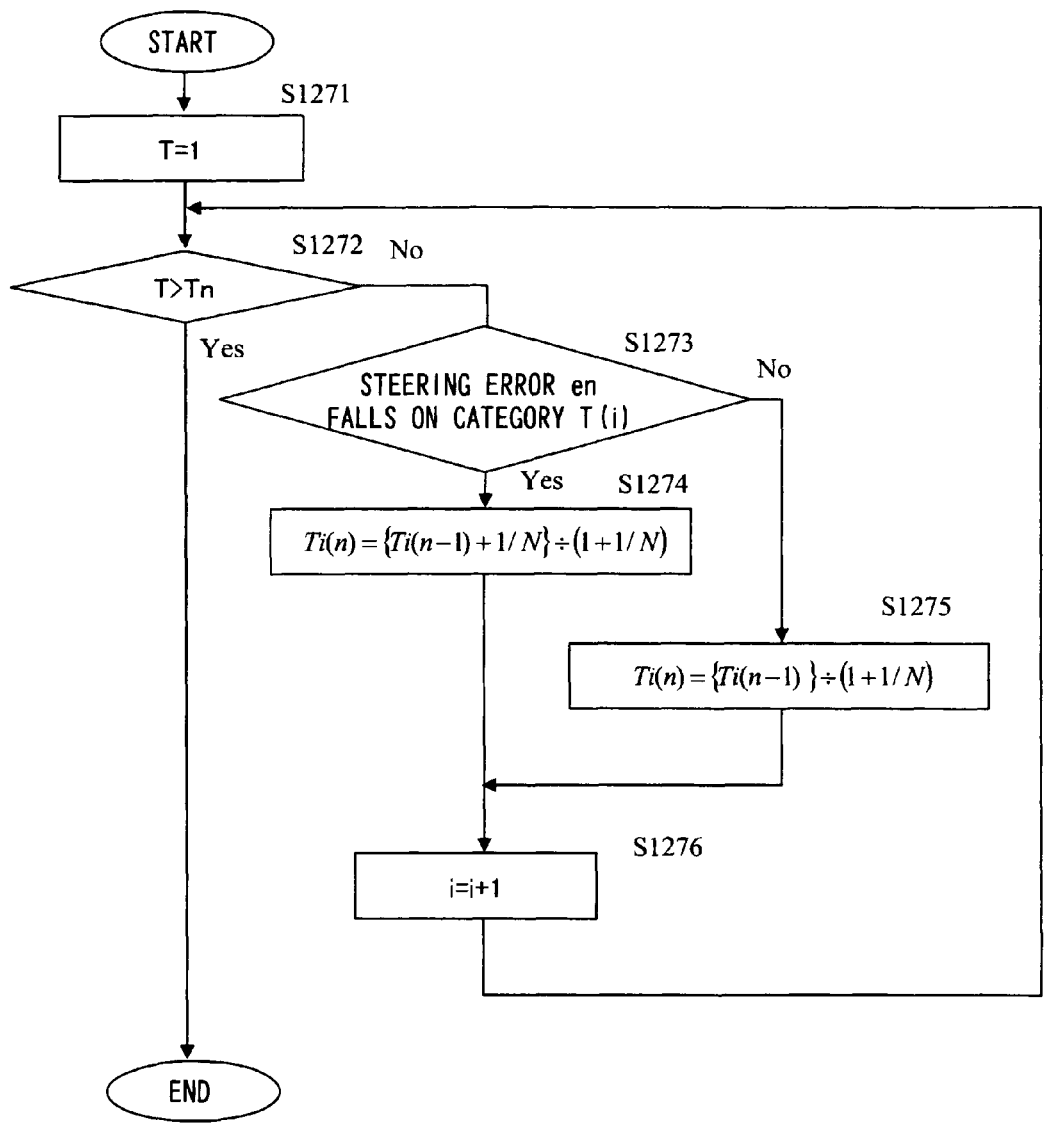

In step S1255, the frequency of steering error en per predetermined steering error is recursively calculated. The processing here will be explained with reference to the flow chart of FIG. 74.

In step S1271, 1 is assigned to T, which represents the category of frequency distribution of steering error. In step S1272, a decision is made as to whether or not T is greater than the number Tn of all the categories. The number Tn of all the categories is, for instance, 40, and each of the categories is set by 0.001. If T>Tn and frequency calculation is completed in all the categories, the processing terminates. If T≤Tn, the flow of control proceeds to step S1273 so that a frequency Ti(n) of each of the categories is calculated.

In step S1273, a decision is made as to whether or not the steering error en calculated in step S1254 falls on the targeted category Ti. If the steering error falls on the category Ti, the flow of control proceeds to step S1274. In step S1274, the frequency Ti(n) of steering error en included in the category Ti is calculated using the following equation (53), where the number of data is denoted by N.

$$Ti(n)=\{Ti(n-1)+1/N\}\div(1+1/N) \quad \text{(Equation 53)}$$

On the other hand, if the steering error does not fall on the category Ti, the flow of control proceeds to step S1275, and the frequency Ti(n) of the steering error en included in the category Ti is calculated using the following equation (54).

$$Ti(n)=\{Ti(n-1)\}\div(1+1/N) \quad \text{(Equation 54)}$$

In step S1276, (i+1) is set as i. Then, the flow of control returns to step S1272, and the processing of steps S1273 to S1276 are repeated until the frequencies Ti of all the categories Tn are calculated.

Thus, after the frequency distribution is recursively calculated in step S1255, the flow of control proceeds to step S1256. In processing after step S1256, similar to the above-described variation 1 of the tenth embodiment, α1 value is calculated using the frequency distribution calculated in step S1255.

As explained above, amount of memory necessary for data storage can be reduced by recursively calculating the steering angle entropy Hp, and, since the number of calculation steps is reduced, calculation processing can be simplified. In addition, the steering angle entropy Hp is allowed to be calculated in real time.

Twelfth Embodiment

Figure 75:
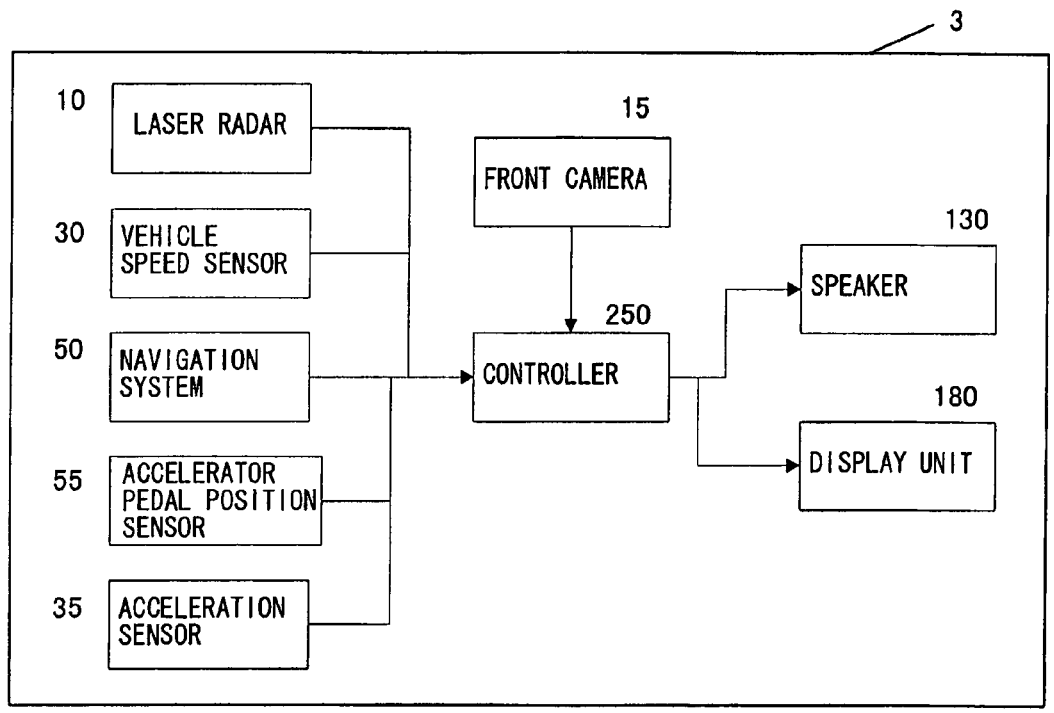

A driving assistance system for vehicle according to the twelfth embodiment of the present invention will now be explained. FIG. 75 shows a control diagram showing the structure of the driving assistance system 3 for vehicle according to the twelfth embodiment. In the twelfth embodiment, the same reference numerals are assigned to units having functions identical to those in the above-described tenth embodiment, and explanations thereof will be omitted. Therefore, the difference from the tenth embodiment will now be explained mainly.

The driving assistance system 3 for vehicle includes the laser radar 10, the front camera 15, the vehicle speed sensor 30, an acceleration sensor 35, the navigation system 50, an accelerator pedal position sensor 55, a controller 250, the speaker 130, and the display unit 180.

The laser radar 10, mounted to a front grille, bumper, or the like of the vehicle, propagates infrared light pulses horizontally so as to scan the region ahead of the vehicle. The laser radar 10 measures the reflected radiation of the infrared light pulses having been reflected by a plurality of obstacles ahead (usually, the rear end of the leading vehicle ahead) and detects a vehicle separation or a distance to the plurality of obstacles and a relative velocity from arrival time of the reflected radiation. The detected vehicle separation and the relative velocity are output to the controller 250. The fore region scanned by the laser radar 10 is about ±6 deg to each side of an axis parallel to the vehicle longitudinal centerline, and the objects existing in the range are detected.

The acceleration sensor 35 is a sensor that detects longitudinal acceleration of the vehicle and outputs the detected longitudinal acceleration to the controller 250. The accelerator pedal position sensor 55 is a sensor that detects the depression amount of an accelerator pedal (not illustrated) (accelerator pedal position). The accelerator pedal position sensor 55 detects accelerator pedal position, for instance, having been converted to angle of rotation of servomotor through a link mechanism and outputs it to the controller 250.

The controller 250, which is an electronic control unit constituted by a CPU and CPU peripheral components such as a ROM and a RAM, controls the overall driving assistance system 3 for vehicle. Based on signals received from the laser radar 10, the front camera 15, the vehicle speed sensor 30, the acceleration sensor 35, the navigation system 50, the accelerator pedal position sensor 55, and the like, the controller 250 analyzes driving characteristics of the driver and carries out drive diagnosis. Then, based on the drive diagnosis result, the controller 250 provides the driver with information. Information provided to the driver includes alarm to the driver, improvement suggestion of the drive operation, and the like. Control contents of the controller 250 are described in detail later.

Next, the behavior of the driving assistance system 3 for vehicle according to the twelfth embodiment will be explained, beginning with the outline thereof.

Based on traveling conditions of the vehicle and drive operation of the driver, the controller 250 of the driving assistance system 3 for vehicle carries out drive diagnosis of the driver, and, in response to the drive diagnosis result, alerts the driver and suggests the driver to improve the drive operation. More specifically, the controller 250 uses an accelerator pedal position signal so as to detect unstable state of drive operation and carries out drive diagnosis of the driver. In the twelfth embodiment, the steering entropy method used in the above-described tenth and the eleventh embodiments is applied to accelerator pedal operation so as to detect unstable state of drive operation. Although the steering entropy method is a method using steering angle with respect to lateral control of the vehicle, in the twelfth embodiment unstable state of longitudinal drive operation of the vehicle is detected using an accelerator pedal position signal with respect to longitudinal control of the vehicle.

Then, if the drive diagnosis result indicates that the driver is engaging in risky driving more than he usually is, i.e., if the drive operation of the driver is deviated into a riskier state, the controller 100 alerts the driver so as to inform the driver thereof before the drive operation of the driver goes into a high-risk state. On the other hand, if the drive diagnosis result indicates that the drive operation of the driver is better than the standard of general public, the controller 100 provides the driver with information so as to encourage safer driving or suggest improvement.

The α value (hereinafter referred to as αap value) used the twelfth embodiment is the 90 percentile (range of a distribution in which 90% of accelerator pedal position errors are included) that is calculated by obtaining the difference between an pedal operation error in a given period of time based on time series data of the accelerator pedal position, i.e., an estimated value of accelerator pedal position on the assumption that the accelerator pedal is smoothly operated, and the actual accelerator pedal position, and by measuring the distribution (variation) of the accelerator pedal position errors.

An accelerator pedal position entropy value (hereinafter referred to as Hp_ap) represents fuzziness (uncertainty) of accelerator pedal position error distribution. Similarly to αap value, Hp_ap value becomes small when the accelerator pedal is operated stably and smoothly, while it becomes great when steering is operated awkwardly and unstably. Hp_ap value is corrected by αap value and can be used as a driver the instability unaffected by skills or habit of the driver.

In the twelfth embodiment, an accelerator pedal position entropy calculated using accelerator pedal position error distribution of general driver group is used as a reference state. Then, accelerator pedal position entropy is calculated using the measured accelerator pedal position error distribution of the driver, and drive diagnosis is carried out by detecting unstable state of the drive operation which the driver basically has.

It is to be noted that since accelerator pedal position is affected by road alignment, the relationship with the leading vehicle, load condition of the driver, and the like, it is necessary that the reference accelerator pedal position error distribution is measured when the driver is in an unloaded condition. Therefore, in the twelfth embodiment, in order to be less likely to be affected by those factors, accelerator pedal position distribution is obtained using accelerator pedal position data in a scene in which the vehicle travels along a road alignment which is virtually a straight road at a constant velocity and based on accelerator pedal position data having been measured during long period of time.

Figure 76:
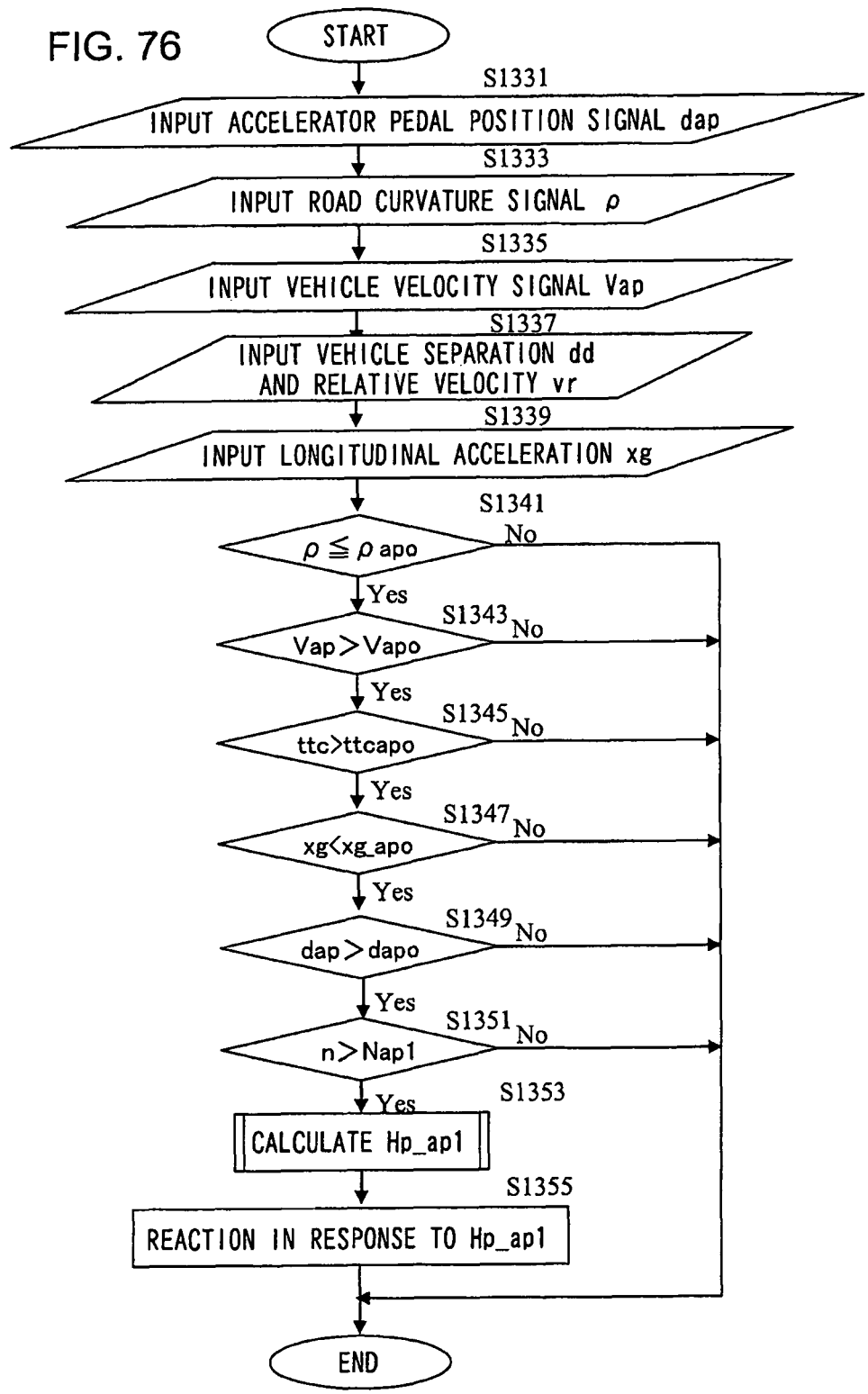

The behavior of the driving assistance system 3 for vehicle according to the twelfth embodiment will now be explained in detail with reference to FIG. 76. FIG. 76 is a flow chart illustrating the procedure of driving assistance control processing performed by the controller 250 achieved in the twelfth embodiment. The processing is performed continuously at regular intervals, e.g., for every 50 msec.

In step S1331, the controller 250 reads an accelerator pedal position signal dap detected by the accelerator pedal position sensor 55. In step S1333, the controller 250 reads a road curvature signal ρ of a road along which the vehicle travels. In step 1335 the controller 250 reads a vehicle velocity signal Vap of the vehicle detected by the vehicle speed sensor 30. In step S1337, the controller 250 reads a vehicle separation dd and a relative velocity vr with the obstacles ahead of the vehicle, more specifically the leading vehicle, detected by the laser radar 10. In step S1339, the controller 250 reads a longitudinal acceleration xg of the vehicle detected by the acceleration sensor 35.

In the following steps S1341 to S1349, a decision is made as to whether or not to calculate accelerator pedal position entropy. More specifically, in step S1341, a decision is made as to whether or not the road curvature signal ρ read in step S1333 is smaller than a road curvature predetermined value ρapo for making a decision that the vehicle is traveling along a straight road. When the road curvature signal ρ is equal to or less than the predetermined value ρapo, the controller 250 determines that the vehicle is traveling along a straight road, and the flow of control proceeds to step S1343. When ρ>ρapo, the controller 250 terminates the processing.

In step S1343, a decision is made as to whether or not the vehicle velocity signal Vap having been read in step S1335 is greater than a predetermined value Vapo. The predetermined value Vapo is a threshold value used to determine whether or not the vehicle is traveling along where the vehicle can travel along at a constant velocity such as an expressway, and for example Vapo=60 km/h. When the vehicle velocity signal Vap is greater than the predetermined value Vapo, the flow of control proceeds to step S1345. When the vehicle velocity signal V is equal to or less than the predetermined Vapo, the controller 250 terminates the processing.

In step S1345, at first, a time to contact ttc of the vehicle relative to the leading vehicle is calculated using the vehicle separation dd and the relative velocity vr read in step S1337. The time to contact ttc represents a duration of time until the vehicle and the leading vehicle contact when the velocity Vap of the vehicle and the relative vehicle velocity vr are constant. The time to contact ttc is calculated using the following equation (55).

$$ttc=dd/vr \quad \text{(Equation 55)}$$

Then, the calculated time to contact ttc is compared with a predetermined value ttcapo using equation (55). The predetermined value ttcapo is a threshold value used to determine whether or not the vehicle is following the leading vehicle with the time to contact ttc kept sufficiently. If the time to contact ttc is greater than the predetermined value ttcapo and the vehicle is following the leading vehicle, the flow of control proceeds to step S1347. If ttc≤ttcap, the controller 250 terminates the processing.

In step S1347, the longitudinal acceleration xg calculated in step S1339 is compared with a predetermined value xg_apo. The predetermined value xg_apo is a threshold value used to make a decision as to whether or not the vehicle is traveling at a substantially constant velocity. If xg<xg_apo and the controller 250 determines that the vehicle is traveling at a substantially constant velocity, the flow of control proceeds to step S1349, while if xg≥xg_apo, the controller 250 terminates the processing.

In step S1349, the accelerator pedal position dap calculated in step S1331 is compared with an predetermined value dapo. The predetermined value dapo is a threshold value used to determine as to whether or not the driver is depressing the accelerator pedal. If dap>dapo and the controller 250 determines that the driver is operating the accelerator pedal, the flow of control proceeds to step S1351, while if dap≤dapo, the controller 250 terminates the processing.

In step S1351, a decision is made as to whether or not the number of samples n of the accelerator pedal position signal dap measured under the above-described conditions is greater than a predetermined value Nap1. Here, the predetermined value Nap1 is a threshold value used to determine whether or not sufficient amount of long-duration data have been obtained so as to be less likely to be affected by load condition of the driver, and for example Nap1=100,000. It is to be noted that 100,000 data are predicted to be obtained by traveling during approximately three weeks. When the number of samples n is greater than the predetermined value Nap1, the flow of control proceeds to step S1353, and when the number of samples n is equal to or less than the predetermined value Nap1, the controller 250 terminates the processing.

In step S1353, an accelerator pedal position entropy Hp_ap1 is calculated using the accelerator pedal position signal dap measured during a long period of time (hereinafter referred to as long-duration accelerator pedal position entropy). The long-duration accelerator pedal position entropy Hp_ap1 is a value that represents unstable state of drive operation that the driver basically has, and is a usual instability of the driver. It is to be noted that the accelerator pedal position entropy Hp_ap1 is calculated basically in the same method as the above-described steering angle entropy Hp is. However, in the explanations below, a smoothing value of the accelerator pedal position is denoted by dapn-tilde, an estimated value of the accelerator pedal position is denoted by dapn-hat, and an accelerator pedal position error is denoted by e_apn.

Figure 77:
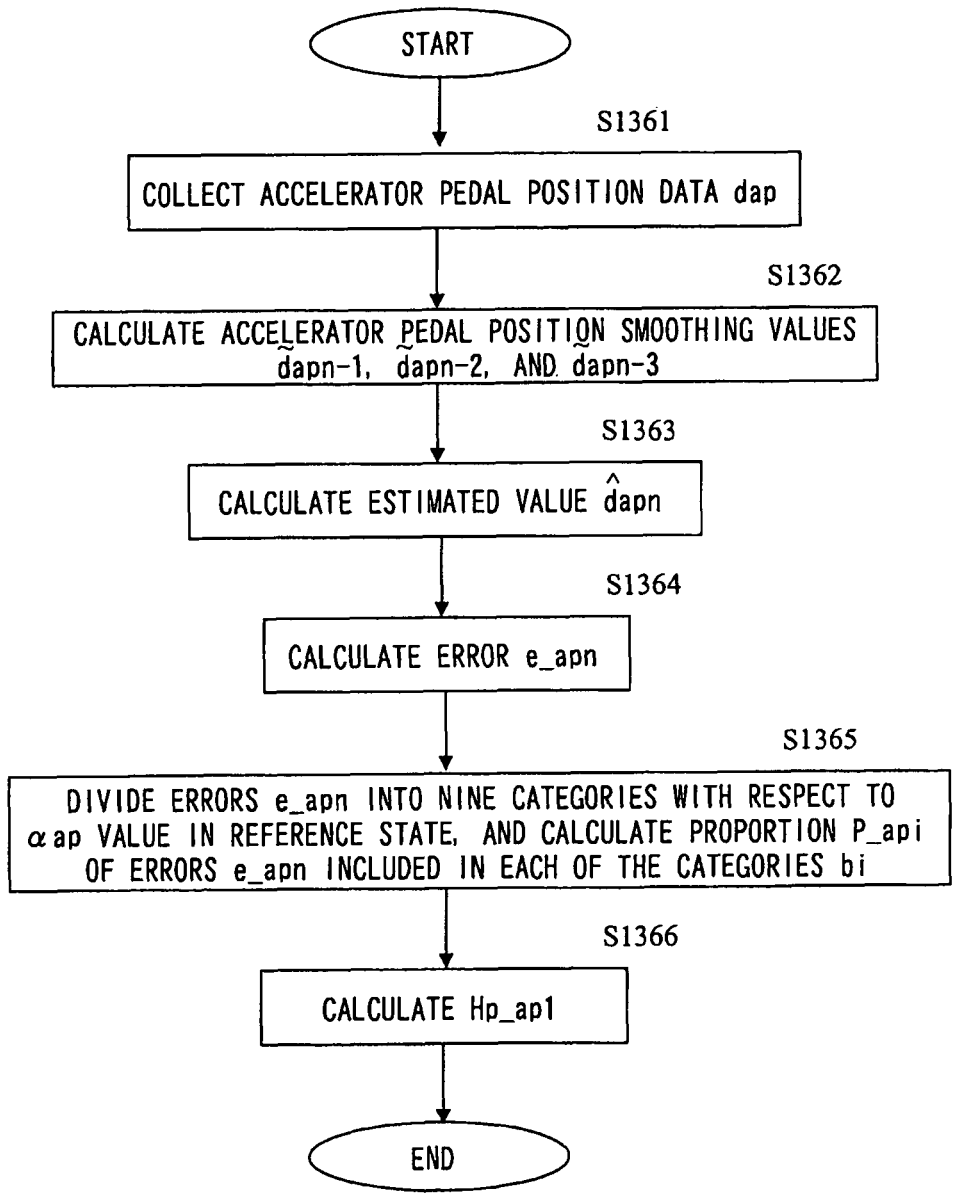

The calculation processing of the long-duration accelerator pedal position entropy Hp_ap1 will be explained with reference to the flow chart of FIG. 77. In step S1361, the controller 250 collects time series data of n accelerator pedal position signals dapn measured at the sampling interval Ts under the above-described conditions. The sampling interval Ts is, for instance, 50 msec.

In step S1362, using the above equation (45), three accelerator pedal position smoothing values dapn-tilde are calculated using three adjacent accelerator pedal positions dapn at 150 msec intervals. In step S1363, using the above equation (44), an estimated value dapn-hat of accelerator pedal position is calculated using the three accelerator pedal position smoothing values dapn-tilde calculated in step S1362. In step S1364, using the above equation (47), an accelerator pedal position error e_apn is calculated using the estimated value dapn-hat of accelerator pedal position calculated in step S1363 and the actual accelerator pedal position signal dapn.

In step S1365, as shown in FIG. 54, the accelerator pedal position error e_apn calculated in step S1364 are divided into nine categories, b1 to b9, with respect to α value (=αo_ap) in reference state, and a probability Pi of the frequency of the accelerator pedal position error e_apn included in each of the categories bi relative to all the frequencies is calculated. Here, α value (=αo_ap) in reference state is pre-set based on accelerator pedal position signal of the general driver group (drivers of general public) and is stored in a memory of the controller 250. Then, the category bi is set when the controller 200 executes the program shown in FIG. 76.

In the following step S1366, using the following equation (50), the long-duration accelerator pedal position entropy Hp_ap1 is calculated using the probability Pi calculated in step S1365.

As the long-duration accelerator pedal position entropy Hp_ap1 is small, degrees of steepness of distribution of the accelerator pedal position error e_apn is large and the distribution of the accelerator pedal position error e_apn is kept in a certain range. Namely, it indicates that the accelerator pedal is operated smoothly and the operation is in a stable state. On the other hand, as the long-duration accelerator pedal position entropy Hp_ap1 value is large, degrees of steepness of distribution of the accelerator pedal position error e_apn is small, and distribution of the accelerator pedal position error e_apn varies. In other words, it indicates that the accelerator pedal is operated awkwardly and the operation is in an unstable state.

Thus, after the long-duration accelerator pedal position entropy Hp_ap1 is calculated in step S1353, the flow of control proceeds to step S1355. In step S1355, the controller 250 presents an alarm or an instruction (improvement suggestion) to the driver depending on the long-duration accelerator pedal position entropy Hp_ap1. As the long-duration accelerator pedal position entropy Hp_ap1 is greater, the instability of drive operation is greater compared to the average accelerator pedal position entropy of the general driver group (general public).

Figures 78, 79:
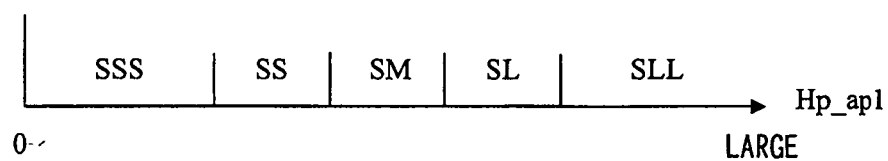

Therefore, as, for instance, shown in FIG. 78, the magnitudes of the long-duration accelerator pedal position entropy Hp_ap1 are divided into five levels (SSS, SS, SM, SL, and SLL), and the controller 250 informs the driver of the level of the magnitude of the calculated long-duration accelerator pedal position entropy Hp_ap1. It is to be noted that the five levels are set appropriately so that the average accelerator pedal position entropy of the general driver group (general public) falls on the center level SM in the category shown in FIG. 78.

FIG. 79 presents an example of contents to be informed according to the category result of the long-duration accelerator pedal position entropy Hp_ap1. In the case where the long-duration accelerator pedal position entropy Hp_ap1 is categorized into the level SLL, the controller 250 displays a text conveying a message "The instability of operation is great" on the display monitor of the display unit 180. In the case where the long-duration accelerator pedal position entropy Hp_ap1 is categorized into the level SL, the controller 250 displays a text conveying a message "The instability of operation is slightly great". In the case where the long-duration accelerator pedal position entropy Hp_ap1 is categorized into the level SM, which is equal to the average accelerator pedal position entropy of the general driver group, the controller 250 displays a text conveying a message "The instability of operation is average". In the case where the long-duration accelerator pedal position entropy Hp_ap1 is categorized into the level SS, the controller 250 displays a text conveying a message "The instability of operation is slightly small". In the case where the long-duration accelerator pedal position entropy Hp_ap1 is categorized into the level SSS, the controller 250 displays a text conveying a message "The instability of operation is small". It is to be noted that the contents to be informed shown in FIG. 79 may be provided to the driver through voices that come out of the speaker 130.

Thus, in the twelfth embodiment explained above, in addition to the advantageous effects according to the first to the eleventh embodiments described above, the following operations and advantageous effects can be achieved.

Control performance of driving operation by the driver is detected as an index for drive diagnosis. More specifically, the accelerator pedal position entropy Hp_ap, which represents the instability of accelerator pedal operation by the driver, is calculated using the amount of accelerator pedal operation. This allows drive diagnosis to be carried out accurately with respect to longitudinal drive operation of the vehicle.

Variation 1 of the Twelfth Embodiment

Here, long-duration accelerator pedal position entropy Hp_ap1 calculated using accelerator pedal position error distribution of the driver measured during a long period of time is designated as a reference state. Then, drive diagnosis is carried out by calculating accelerator pedal position entropy using accelerator pedal position error distribution of the driver measured during an intermediate period of time, and by detecting deviation from unstable state of drive operation that the driver basically has.

Figure 80:
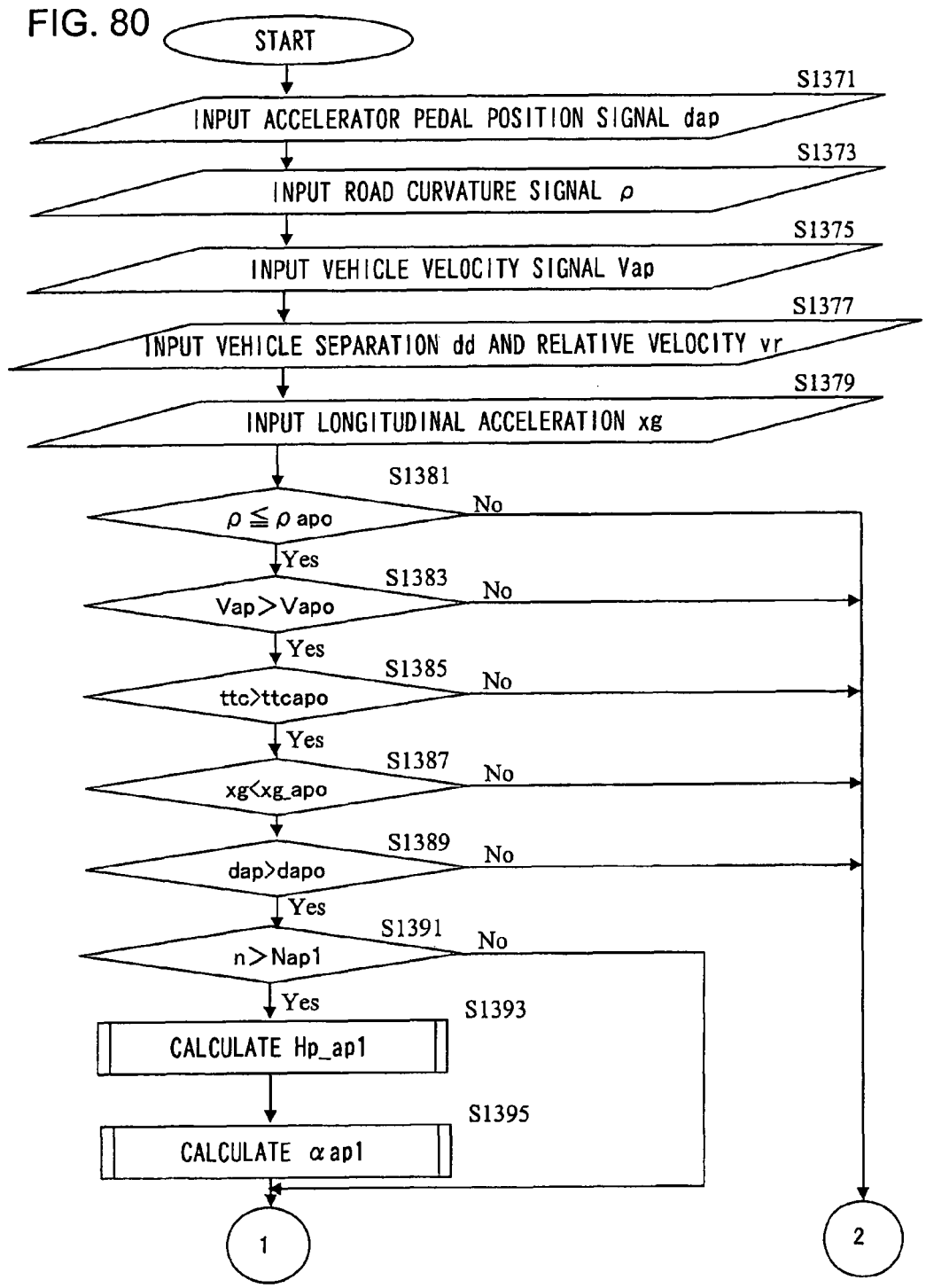
Figure 81:
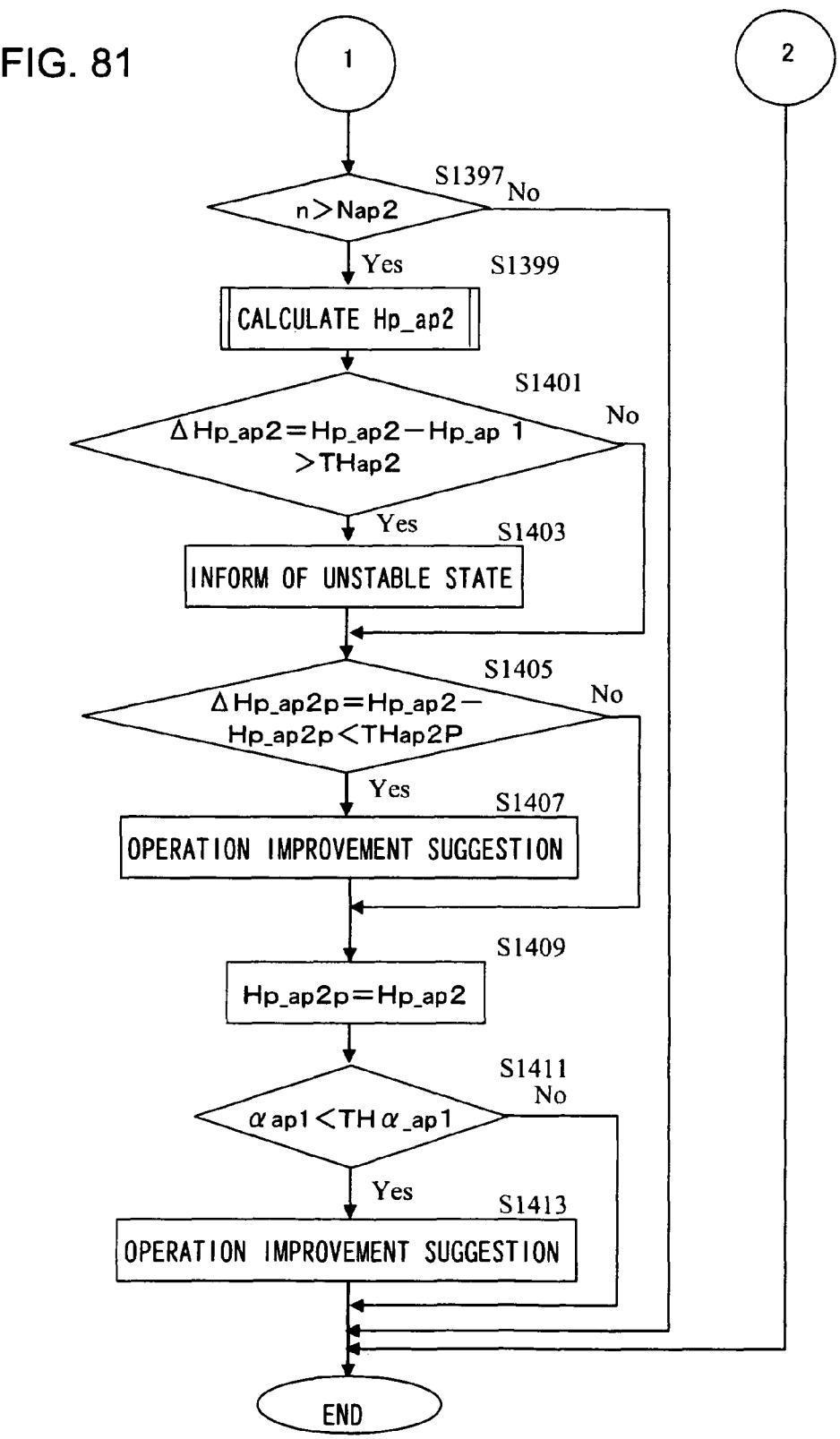

The behavior of the driving assistance system 3 for vehicle according to a variation 1 of the twelfth embodiment will now be explained in detail with reference to FIGS. 80 and 81. FIGS. 80 and 81 are flow charts illustrating the procedure of driving assistance control processing performed by the controller 250 achieved in the variation 1 of the twelfth embodiment. The processing is performed continuously at regular intervals, e.g., for every 50 msec. Since the processing executed in steps S1371 to S1393 are the same as those executed in steps S1331 to S1353 in the flow chart shown in FIG. 76, explanations thereof will be omitted. However, in the case where a decision is made that the number of samples n is equal to or less than the predetermined value Nap1 in step S1391, the controller 250 does not terminate the processing so that the flow of control proceeds to step S1397 in FIG. 81.

Figure 82:
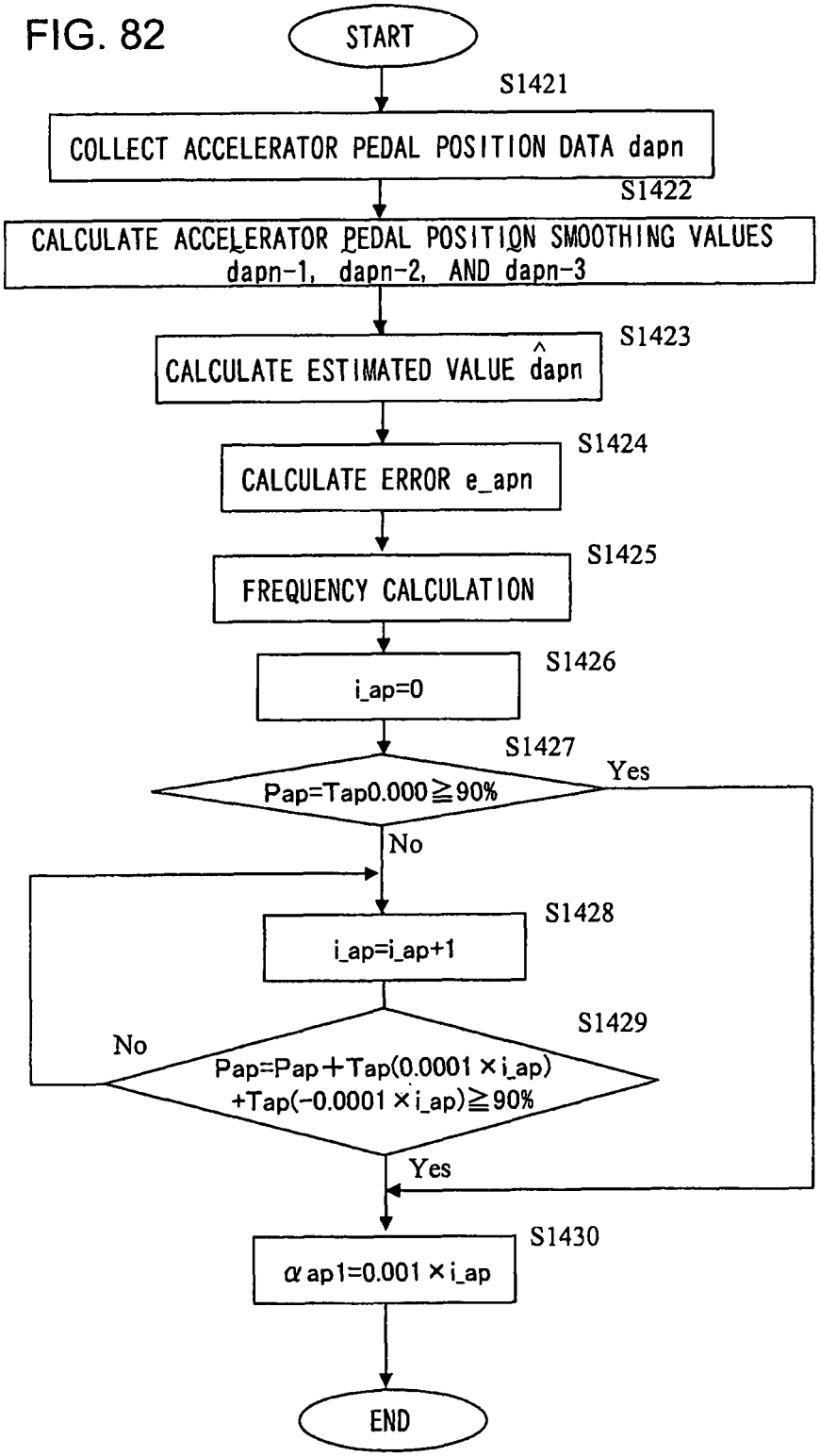

In step S1393, after calculating the long-duration accelerator pedal position entropy Hp_ap1, which represents reference state, in step S1395 the controller 250 calculates α value used to calculate intermediate-duration accelerator pedal position entropy. Here, the personal α value (hereinafter referred to as αap1 value) of the driver is calculated using the accelerator pedal position dap measured during a long period of time. The processing here will be explained with reference to the flow chart of FIG. 82.

In step S1421, the controller 250 collects time series data of n accelerator pedal positions dapn measured at the sampling interval Ts under the above-described conditions. The sampling interval Ts is, for instance, 50 msec. In step S1422, using the above equation (45), three accelerator pedal position smoothing values dapn-tilde are calculated using three adjacent accelerator pedal positions dapn at 150 msec intervals.

In step S1423, using the above equation (44), the estimated value dapn-hat of accelerator pedal position is calculated using three accelerator pedal position smoothing values dapn-tilde calculated in step S1422. In step S1424, using the above equation (47), the accelerator pedal position error e_apn is calculated using the estimated value dapn-hat of accelerator pedal position calculated in step S1423 and the actual accelerator pedal position signal dapn.

In the following step S1425, frequency of the accelerator pedal position error e_apn is counted per predetermined accelerator pedal position error. The predetermined accelerator pedal position error is determined in view of resolution of the accelerator pedal position sensor 55. Here, as shown, for example, in the table of FIG. 60 used to calculate steering error distribution, the accelerator pedal position errors e_apn are categorized per 0.001. In step S1426, 0 is assigned to i_ap, which represents the category of accelerator pedal position error.

In step S1427, a decision is made as to whether or not the probability Pap of frequency Tap0.000 when the accelerator pedal position error e_apn=0.000 is equal to or greater than 90% relative to all the frequencies of all the accelerator pedal position errors. In the case where the probability Pap of frequency Tap0.000 is equal to or greater than 90%, the flow of control proceeds to step S1430. In this case, since i_ap=0, therefore αap1=0.000. If a negative decision is made in step S1427, the flow of control proceeds to step S1428. In step S1428, i_ap is incremented by 1 so as to set it (i_ap+1).

In step S1429, a decision is made as to whether or not the probability Pap of frequency (Tap0.000+Tap0.001+Tap−0.001) of accelerator pedal position errors e_apn from −0.001 to +0.001, which is an expanded category for accelerator pedal position error, relative to all the frequencies of all the accelerator pedal position errors is equal to or greater than 90%. In the case where the probability Pap is equal to or greater than 90%, the flow of control proceeds to step S1430. In this case, since i_ap=1, therefore αap1=0.001. If a negative decision is made in step S1429, the flow of control returns to step S1428, i_ap is incremented again and the decision-making in step S1429 is repeated.

Thus, after the α_ap1 value is calculated in step S1395, the flow of control proceeds to step S1397 of FIG. 81. In step S1397, a decision is made as to whether or not the number of samples n of accelerator pedal positions dap measured under the above condition is greater than a predetermined value Nap2. Here, the predetermined value Nap2 is a threshold value used to determine whether or not sufficient intermediate-duration (e.g., traveling during approximately one day) data used to make a decision as to deviation from the usual drive operation of the driver have been obtained, and, for example, Nap2=7200. In the case where the number of samples n is greater than the predetermined value Nap2, the flow of control proceeds to step S1399, while in the case where the number of samples n is equal to or less than the predetermined value Nap2, the controller 250 terminates the processing.

In step S1399, an intermediate-duration steering angle entropy Hp_ap2 is calculated using accelerator pedal position signal dap measured during an intermediate period of time. The intermediate-duration steering angle entropy Hp_ap2 is a value calculated using accelerator pedal position signal dap measured during an intermediate period of time with the long-duration accelerator pedal position entropy Hp_ap1 using accelerator pedal position signal dap measured during a long period of time being used as a reference state. The intermediate-duration steering angle entropy Hp_ap2 is a value that represents deviation (gap) from the unstable state of drive operation that the driver basically has. The intermediate-duration accelerator pedal position entropy Hp_ap2 is calculated in the same method as the long-duration accelerator pedal position entropy Hp_ap1, which is explained with reference to the flow chart of FIG. 77, is. However, the personal αap1 value of the driver calculated in step S1395 is used as α value.

In step S1401, the controller 250 calculates the difference ΔHp_ap2 (=Hp_ap2−Hp_ap1) between the long-duration accelerator pedal position entropy Hp_ap1 calculated in step S1393 and the intermediate-duration accelerator pedal position entropy Hp_ap2 calculated in step S1399. Then, the calculated difference ΔHp_ap2 is used to make a decision as to drive operation unstable state. It can be regarded that as the intermediate-duration accelerator pedal position entropy Hp_ap2 is greater relative to the long-duration accelerator pedal position entropy Hp_ap1, the instability of drive operation has become greater compared to the instability of operation that the driver basically has. Accordingly, for example, in the case where the difference ΔHp_ap2 in accelerator pedal position entropy is greater than a predetermined value THap2, the controller 250 makes a decision that the drive operation is in an unstable state, the flow of control proceeds to step S1403.

In step S1403, it is informed that the drive operation of the driver is in an unstable state. Here, as, for example, shown in FIG. 83, the difference ΔHp_ap2 in accelerator pedal position entropy is divided into two levels (D2Pap and D2PPap) according to the magnitude of the difference ΔHp_ap2 in accelerator pedal position entropy in the region equal to or greater than the predetermined value THap2. Then, the controller 250 informs the driver of the level that corresponds to the difference ΔHp_ap2 in accelerator pedal position entropy calculated in step S1401.

Figures 83, 84:
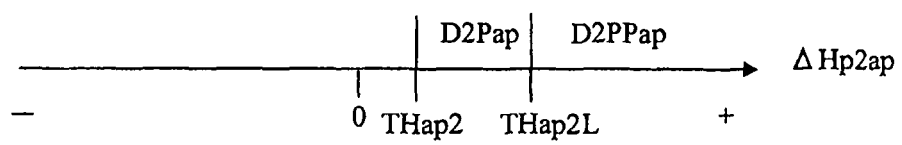

FIG. 84 presents an example of contents to be informed according to the category result of the difference ΔHp_ap2 in accelerator pedal position entropy. In the case where the difference ΔHp_ap2 is categorized into the level D2PPap, which is greater than a predetermined value THap2L (>THap2), the controller 250 displays a text conveying a message "The instability of operation is greater than it usually is" on the display monitor of the display unit 180. In the case where the difference ΔHp_ap2 is categorized into the level D2Pap which is greater than the predetermined value THap2, the controller 250 displays a text conveying a message "The instability of operation is slightly greater than it usually is". It is to be noted that the contents to be informed shown in FIG. 84 may be provided to the driver through a voice that comes out of the speaker 130.

If a negative decision is made in step S1401, the controller 250 skips notification processing of unstable state in step S1403. Thus, after detecting deviation from unstable state of usual drive operation and informing the driver thereof, in processing after step S1405 the controller 250 informs the driver of change in the instability of drive operation during an intermediate period of time based on comparison result of the past and the present intermediate-duration accelerator pedal position entropies. More specifically, the controller 250 compares the intermediate-duration accelerator pedal position entropy calculated in the past (hereinafter referred to as Hp_ap2p) with the latest intermediate-duration accelerator pedal position entropy Hp_ap2 so as to detect change in the instability of drive operation during an intermediate period of time and inform the driver thereof.

At first, in step S1405, the controller 250 calculates the difference ΔHp_ap2p between the past intermediate-duration accelerator pedal position entropy Hp_ap2p that has been calculated in the past with respect to the same driver and has been stored and the latest intermediate-duration accelerator pedal position entropy Hp_ap2 calculated in step S1399. Then, the calculated difference ΔHp_ap2p is used to make a decision as to change in instability of drive operation. It can be regarded that as the latest intermediate-duration accelerator pedal position entropy Hp_ap2 is smaller relative to the past intermediate-duration accelerator pedal position entropy Hp_ap2p, i.e., as the difference ΔHp_ap2p is negative in sign and greater in value, the instability of drive operation has changed in the decremental direction compared to that of the past. Therefore, for instance, in the case where the difference ΔHp_ap2p in accelerator pedal position entropy is smaller than a predetermined value THap2P, the controller 250 makes a decision that instability of drive operation has become reduced, and the flow of control proceeds to step S1407.

In step S1407, the controller 250 informs that the instability of drive operation of the driver has become smaller and the accelerator pedal operation has become smoother (operation improvement suggestion). Here, as, for example, shown in FIG. 85, the difference ΔHp_ap2p in accelerator pedal position entropy is divided into two levels (D2PMap and D2PMMap) according to the magnitude of the difference ΔHp_ap2p in accelerator pedal position entropy in the region smaller than the predetermined value THap2P. Then, the controller 250 informs the driver of the level that corresponds to the difference ΔHp_ap2p in accelerator pedal position entropy calculated in step S1405.

Figures 85, 86:

FIG. 86 presents an example of contents to be informed according to the category result of the difference ΔHp_ap2p in accelerator pedal position entropy. In the case where the difference ΔHp_ap2p is categorized into the level D2PMap, which is smaller than the predetermined value THap2P, the controller 250 displays a text conveying a message "The instability of operation is slightly smaller than it was before" on the display monitor of the display unit 180. In the case where the difference ΔHp_ap2p is categorized into the level D2PMMap, which is smaller than a predetermined value THap2PL (<THap2P), the controller 250 displays a text conveying a message "The instability of operation is smaller than it was before". It is to be noted that the contents to be informed shown in FIG. 86 may be provided to the driver through a voice that comes out of the speaker 130.

If a negative decision is made in step S1405, the controller 250 skips operation improvement suggestion processing in step S1407, and the flow of control proceeds to step S1409. In step S1409, the intermediate-duration accelerator pedal position entropy Hp_ap2 calculated in step S1399 is set as the past intermediate-duration accelerator pedal position entropy Hp_ap2p in preparation for the next processing.

In processing after step S1411, the controller 250 uses the personal αap1 value of the driver calculated based on the long-duration accelerator pedal position signal dap of the driver so as to perform operation improvement suggestion to the driver. As described above, the αap1 value is the 90 percentile calculated in distribution of accelerator pedal position error calculated based on the long-duration accelerator pedal position signal data of the driver. Therefore, the αap1 value is a factor that represents distribution of long-duration accelerator pedal position error of the driver.

In step S1411, the αap1 value calculated in step S1430 is compared with a predetermined value THαap1. In the case where the long-duration αap1 value of the driver is smaller than the predetermined value THαap1, the instability of drive operation of the driver is small. Then, if the αap1 value is smaller than the predetermined value THαap1, the flow of control proceeds to step S1413.

In step S1413, the controller 250 informs that the instability of drive operation of the driver is small and the accelerator pedal is operated smoothly (operation improvement suggestion). Here, as, for example, shown in FIG. 87, the αap1 value is divided into two levels (α1apS and α1apSS) according to the αap1 value in the region smaller than the predetermined value THαap1. Then, the controller 250 informs the driver of the level that corresponds to the αap1 value calculated in step S1430.

Figures 87, 88:
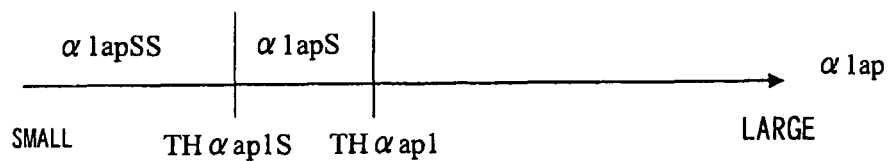

FIG. 88 presents an example of contents to be informed according to the category result of the αap1 value. In the case where the αap1 value is categorized into the level α1apS, which is smaller than the predetermined value THαap1, the controller 250 displays a text conveying a message "The instability of operation is slightly small" on the display monitor of the display unit 180. In the case where the αap1 value is categorized into the level α1apSS, which is smaller than a predetermined value THαap1S (<THαap1), the controller 250 displays a text conveying a message "The instability of operation is small". It is to be noted that the contents to be informed shown in FIG. 88 may be provided to the driver through a voice that comes out of the speaker 130.

Thus, the controller 250 terminates the processing. It is to be noted that if a negative decision is made in step S1411, the controller 250 skips operation improvement suggestion processing in step S1413 and terminates the processing.

Variation 2 of the Twelfth Embodiment

Here, long-duration accelerator pedal position entropy Hp_ap1 calculated using accelerator pedal position error distribution of the driver measured during a long period of time is designated as a reference state. Then, drive diagnosis is carried out by calculating accelerator pedal position entropy using accelerator pedal position error distribution of the driver measured during a short period of time, and by detecting short-duration deviation from unstable state of drive operation that the driver basically has.

Figure 89:
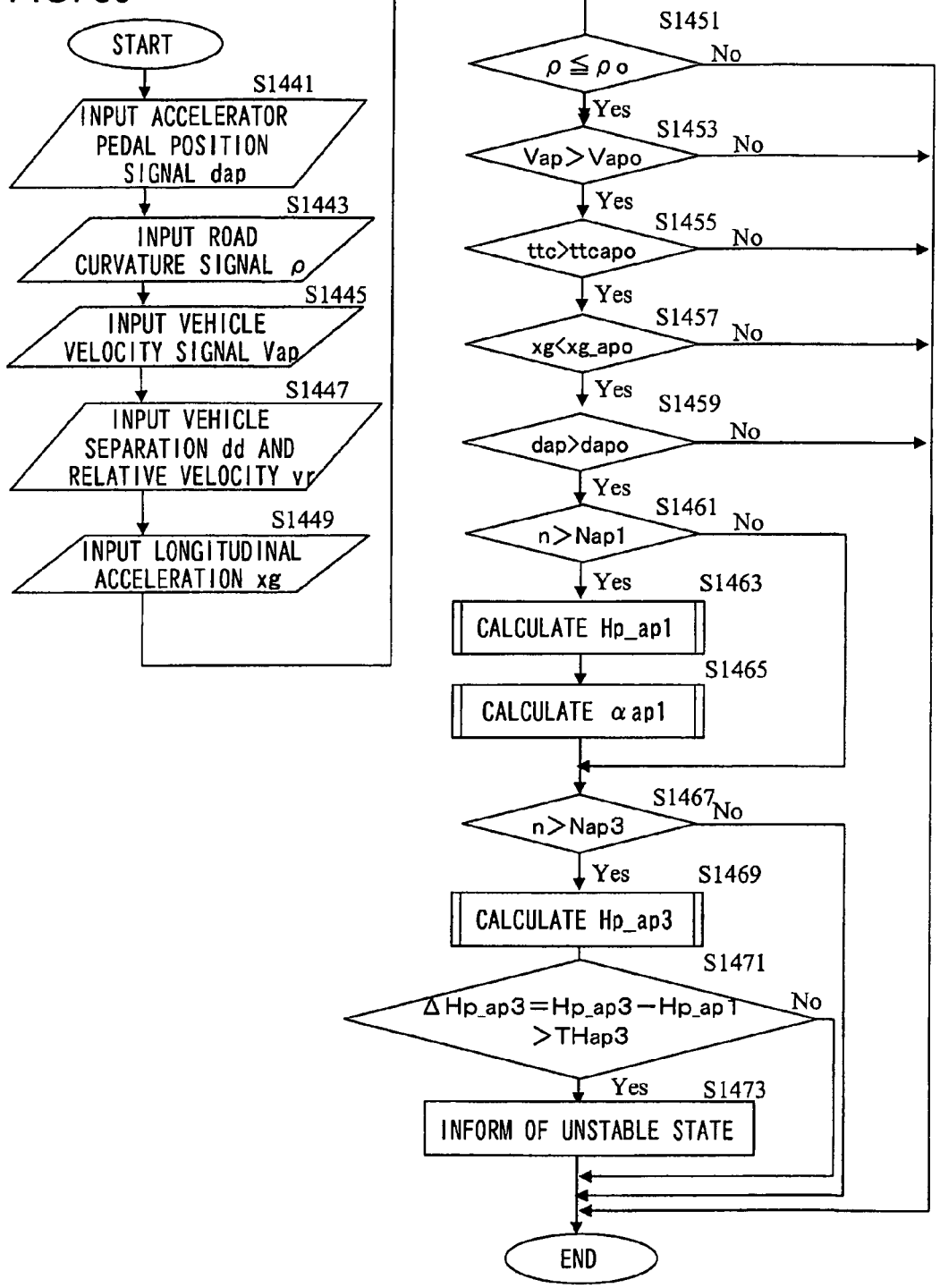

The behavior of the driving assistance system 3 for vehicle according to a variation 2 of the twelfth embodiment will now be explained in detail with reference to FIG. 89. FIG. 89 is a flow chart illustrating the procedure of driving assistance control processing performed by the controller 250 achieved in the variation 2 of the twelfth embodiment. The processing is performed continuously at regular intervals, e.g., for every 50 msec. Since the processing executed in steps S1441 to S1465 are the same as those executed in steps S1371 to S1395 in the flow chart shown in FIG. 80, explanations thereof will be omitted.

After the αap1 value is calculated in step S1465, the flow of control proceeds to step S1467. In step S1467, a decision is made as to whether or not the number of samples n of accelerator pedal position signals dap measured under the above condition is greater than a predetermined value Nap3. Here, the predetermined value Nap3 is a threshold value used to determine whether or not short-duration (e.g., traveling during approximately five minutes) data used to make a decision as to short-duration deviation from the usual drive operation of the driver have been obtained, and, for example, Nap3=1200. In the case where the number of samples n is greater than the predetermined value Nap3, the flow of control proceeds to step S1469, while in the case where the number of samples n is equal to or less than the predetermined value Nap3, the controller 250 terminates the processing.

In step S1469, a short-duration accelerator pedal position entropy Hp_ap3 is calculated using accelerator pedal position signal dap measured during a short period of time. The short-duration accelerator pedal position entropy Hp_ap3 is a value calculated using accelerator pedal position signal dap measured during a short period of time with accelerator pedal position error distribution using the accelerator pedal position signal dap measured during a long period of time being used as a reference state. The short-duration accelerator pedal position entropy Hp_ap3 is a value that represents short-duration deviation (gap) from the unstable state of drive operation that the driver basically has. The short-duration accelerator pedal position entropy Hp_ap3 is calculated in the same method as the long-duration accelerator pedal position entropy Hp_ap1, which is explained with reference to the flow chart of FIG. 77, is. However, the personal αap1 value of the driver calculated in step S1465 is used as α value.

In step S1471, the controller 250 calculates the difference ΔHp_ap3 (=Hp_ap3−Hp_ap1) between the long-duration accelerator pedal position entropy Hp_ap1 calculated in step S1463 and the short-duration accelerator pedal position entropy Hp_ap3 calculated in step S1469. Then, the calculated difference ΔHp_ap3 is used to make a decision as to drive operation unstable state. It can be regarded that as the short-duration accelerator pedal position entropy Hp_ap3 is greater relative to the long-duration accelerator pedal position entropy Hp_ap1, the instability of drive operation at present has become greater compared to the instability of operation that the driver basically has. Accordingly, for example, in the case where the difference ΔHp_ap3 in accelerator pedal position entropy is greater than a predetermined value THap3, the controller 250 makes a decision that the drive operation is in an unstable state, the flow of control proceeds to step S1473.

In step S1473, it is informed that the present drive operation of the driver is in an unstable state. Here, as, for example, shown in FIG. 90, the difference ΔHp_ap3 in accelerator pedal position entropy is divided into two levels (D3Pap and D3PPap) according to the magnitude of the difference ΔHp_ap3 in accelerator pedal position entropy in the region equal to or greater than the predetermined value THap3. Then, the controller 250 informs the driver of the level that corresponds to the difference ΔHp_ap3 in accelerator pedal position entropy calculated in step S1471.

Figures 90, 91:
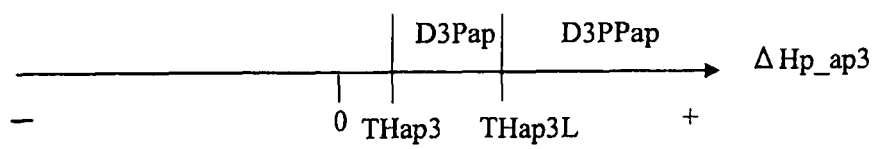

FIG. 91 presents an example of contents to be informed according to the category result of the difference ΔHp_ap3 in accelerator pedal position entropy. In the case where the difference ΔHp_ap3 is categorized into the level D3PPap, which is greater than a predetermined value THap3L (>THap3), the controller 250 displays a text conveying a message "The instability of operation is great" on the display monitor of the display unit 180. In the case where the difference ΔHp_ap3 is categorized into the level D3Pap, which is greater than the predetermined value THap3, the controller 250 displays a text conveying a message "The instability of operation is slightly great". It is to be noted that the contents to be informed shown in FIG. 91 may be provided to the driver through a voice that comes out of the speaker 130.

Thus, the controller 250 terminates the processing. It is to be noted that if a negative decision is made in step S1471, the controller 250 skips notification processing of unstable state in step S1473 and terminates the processing.

Thirteenth Embodiment

Figure 92:
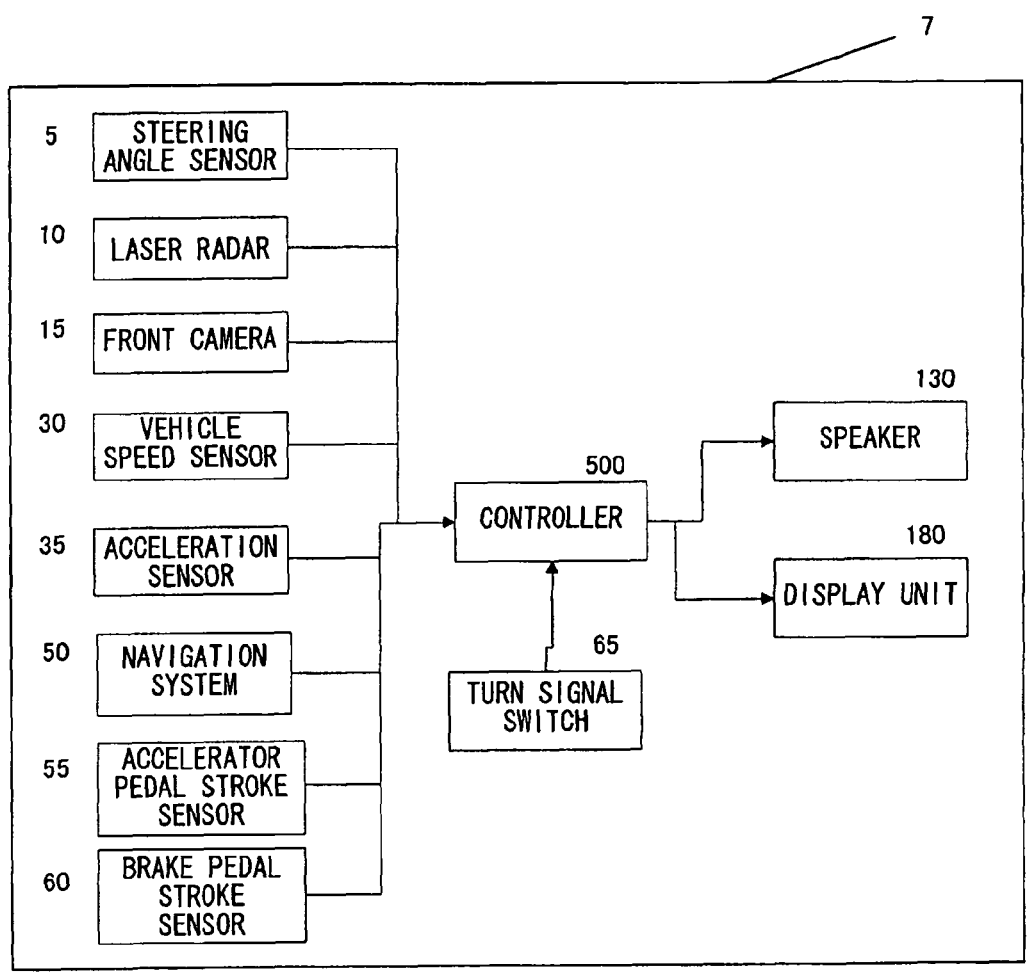

A driving assistance system for vehicle according to the thirteenth embodiment of the present invention will now be explained with reference to the drawings. FIG. 92 is a control diagram showing the structure of a driving assistance system 7 for vehicle according to the thirteenth embodiment of the present invention. In FIG. 92, the same reference numerals are assigned to components identical to those in the above-described first to the twelfth embodiments. Therefore, the difference from the first to the twelfth embodiments will now be explained mainly.

As shown in FIG. 92, the driving assistance system 7 for vehicle includes the steering angle sensor 8, the laser radar 10, the front camera 15, the vehicle speed sensor 30, the acceleration sensor 35, the navigation system 50, the accelerator pedal stroke sensor 55, the brake pedal stroke sensor 60, the turn signal switch 65, a controller 500, the speaker 130, and the display unit 180.

Based on signals received from the steering angle sensor 8, the laser radar 10, the front camera 15, the vehicle speed sensor 30, the acceleration sensor 35, the navigation system 50, the accelerator pedal stroke sensor 55, the brake pedal stroke sensor 60, the turn signal switch 65, and the like, the driving assistance system 7 for vehicle analyzes driving characteristics of the driver and comprehensively detects characteristics of perception, determination, and operation of the driver so as to carry out drive diagnosis.

More specifically, as an index for drive diagnosis, as shown in FIG. 93, risk perception characteristics of the driver, safety awareness and operation preference characteristics of the driver, risk tolerance of the driver, and control performance of driving operation by the driver are detected, and a comprehensive decision is made as to detection results by these indices so as to carry out drive diagnosis. Then, based on the drive diagnosis result, information such as alarm to the driver and improvement suggestion of driving operation are provided.

Figure 94:
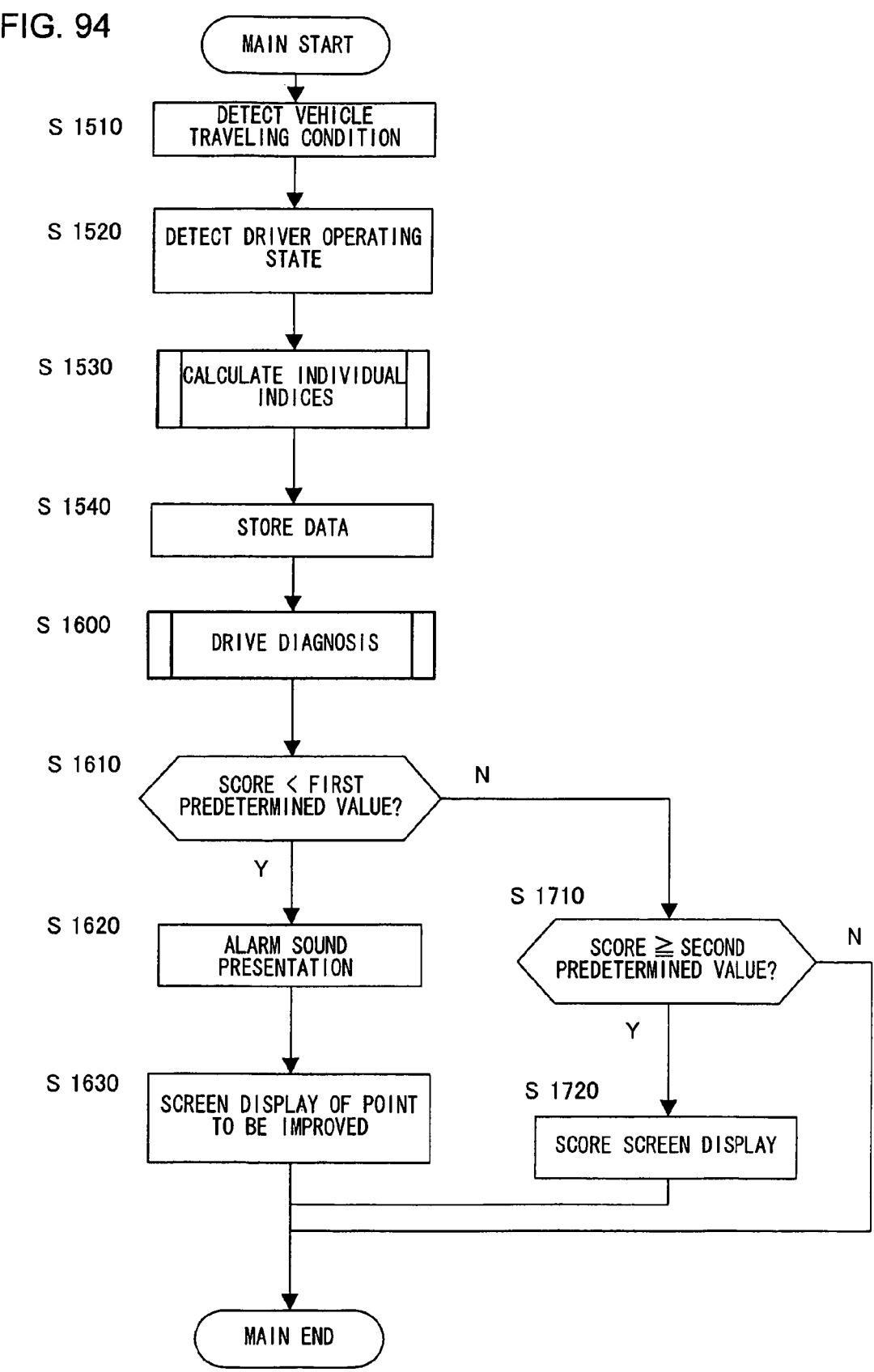

The behavior of the driving assistance system 7 for vehicle according to the thirteenth embodiment will now be explained in detail with reference to FIG. 94. FIG. 94 is a flow chart illustrating the procedure of driving assistance control processing performed by the controller 500 achieved in the thirteenth embodiment. The processing is performed continuously at regular intervals, e.g., for every 50 msec.

At first, in step S1510, traveling condition of the vehicle is detected. Here, as the traveling condition of the vehicle, the controller 500 obtains velocity V of the vehicle detected by the vehicle speed sensor 30, vehicle separation D and relative vehicle velocity Vr between the vehicle and the leading vehicle detected by the laser radar 10, the distance to a lane marking obtained from an image captured by the front camera 15, and the like. In step S1520, operating states of the driver are detected. Here, as the operating states of the driver, the controller 500 obtains accelerator pedal operation amount detected by the accelerator pedal stroke sensor 55, brake pedal operation amount detected by the brake pedal stroke sensor 60, whether or not the turn signal lever has been operated detected by the turn signal switch 65, and steering angle detected by the steering angle sensor 8.

In step S1530, based on vehicle traveling condition obtained in step S1510 and operating state of the driver obtained in step S1520, individual indices for carrying out drive diagnosis are calculated. As the individual indices, as shown in FIG. 93, the controller 500 calculates distribution of time to contact TTC at the accelerator pedal off time, distribution of time to lane crossing TLC at the time of steering adjustment, vehicle velocity distribution at the time of single traveling, distribution of time headway THW in a follow-up travel scene, the maximum acceleration at the time of start-up, distribution of the minimum time to contact TTC at the time of braking, the minimum vehicle separation at the time of passing, smoothness of steering (steering angle entropy), and stability of accelerator pedal operation (accelerator pedal position entropy). These indices represent characteristics of perception, determination, and operation in driving process of the driver, respectively.

Distribution of time to contact TTC at the accelerator pedal off time, which is data that represent risk perception characteristics of the driver, can be calculated based on vehicle separation D between the vehicle and the leading vehicle as explained in the first embodiment. Distribution of time to lane crossing TLC at the time of steering adjustment, which is also data that represent risk perception characteristics of the driver, can be calculated based on lane lateral position of the vehicle as explained in the second embodiment.

Vehicle velocity distribution at the time of single traveling, which is data that represent safety awareness and operation preference characteristics of the driver, can be calculated based on velocity V of the vehicle as explained in the third embodiment. Distribution of time headway THW in a follow-up travel scene, which is also data that represent safety awareness and operation preference characteristics of the driver, can be calculated based on vehicle separation D between the vehicle and the leading vehicle as explained in the fourth to the sixth embodiments. The maximum acceleration at the time of start-up, which is also data that represent safety awareness and operation preference characteristics of the driver, can be calculated based on acceleration and deceleration of the vehicle as explained in the seventh embodiment.

Distribution of the minimum time to contact TTC at the time of braking, which is data that represent risk tolerance of the driver, can be calculated based on vehicle separation D between the vehicle and the leading vehicle as explained in the eighth embodiment. The minimum vehicle separation at the time of passing, which is also data that represent risk tolerance of the driver, can be calculated based on vehicle separation between the vehicle and the leading vehicle ahead as explained in the ninth embodiment.

Smoothness of steering (steering angle entropy), which is data that represent control performance of driving operation by the driver, can be calculated based on steering angle as explained in the tenth and the eleventh embodiments. Stability of accelerator pedal operation (accelerator pedal position entropy), which is also data that represent control performance of driving operation by the driver, can be calculated based on accelerator pedal operation amount as explained in the twelfth embodiment.

In step S1540, the individual indices calculated in step S1530 are each stored.

In step S1600, drive diagnosis of the driver is comprehensively carried out from the individual indices calculated in step S1530. At first, as explained in the first to the twelfth embodiments, current distribution (data distribution of "this moment" or "this day" of comparison target) is compared with usual distribution (data distribution of "usual" of reference) for each of the individual indices. Then, degree of deviation is calculated by designating distribution deviating on riskier side relative to the usual state as negative and designating distribution deviating on less risky side relative to the usual state as positive. Degree of deviation is designated as zero when the distribution of the index completely fits to the usual distribution and is scored so that degree of deviation falls within a range of ±10.

In addition, a composite index is calculated by weighting in a predetermined manner for each of the individual indices and calculating the sum of the products of the weight and the score of each of the degrees of deviation. It is to be noted that the weights are equally set upon each of the individual indices. However, they may be set individually in view of degree of influence on actual vehicle behavior. In this case, indices related to determination (vehicle velocity distribution at the time of single traveling, distribution of time headway THW in a follow-up travel scene, the maximum acceleration at the time of start-up, distribution of the minimum time to contact TTC at the time of braking, and the minimum vehicle separation at the time of passing) are weighted more than those related to perception (distribution of time to contact TTC at the accelerator pedal off time and distribution of time to lane crossing TLC at the time of steering adjustment) are. Furthermore, indices related to operation (smoothness of steering and stability of accelerator pedal operation are weighted more than those related to perception and those related to determination.

Lastly, the sum of the products of the weight and each of the scores is divided by a possible maximum score and is normalized by multiplying by 10 so that the composite index falls within a range of ±10.

In the following step S1610, the score of the composite index calculated in step S1600 is compared with a first predetermined value so as to determine whether or not to execute alarm presentation processing. The first predetermined value used to determine whether or not to present an alarm is, for instance, −3 points. In the case where the score of the composite index is equal to or smaller than the first predetermined value, a positive decision is made in step S1610 and the flow of control proceeds to step S1620. In step S1620, an alarm sound is output from the speaker 130 so as to inform the driver that the driving operation of the driver comprehensively deviates into a riskier state. More specifically, alarm presentation is performed in a beep sound or in a voice so as to effectively convey the operational characteristics to the driver so as to prevent the operation from being in a risky state.

In addition, in step S1630, the controller 500 selects one index having the lowest score from all the individual indices and displays the selected index on the display screen of the display unit 180 as a point to be improved. This alerts the driver to the point to be improved, which the driver should be particularly concerned of during operation.

If a negative decision is made in step S1610, the flow of control proceeds to step S1710 so as to compare the score of the composite index calculated in step S1600 with a second predetermined value. The second predetermined value used to determine whether or not to present improvement suggestion is, for instance, +3 points. In the case where the score of the composite index is equal to or greater than the second predetermined value, a positive decision is made in step S1710 and the flow of control proceeds to step S1720. In the case where the score of the composite index is equal to or greater than the second predetermined value, it is indicated that the result of drive diagnosis of the driver is good, i.e., the driver is engaged in a stable, good operation. Accordingly, in step S1720, the score of the composite index, as well as a message, for example, "You are driving properly", is displayed on the display screen of the display unit 180. It is to be noted that in the case where a negative decision is made in step S1710, improvement suggestion is not performed. Thus, the controller 500 terminates the processing.

The following operations and advantageous effects can be achieved in the thirteenth embodiment explained above.

(1) As an index for drive diagnosis, the driving assistance system 7 for vehicle comprehensively detects characteristics of perception, determination, and operation of the driver. This allows the driving assistance system 7 for vehicle to comprehensively determine whether or not the driver is engaged in a good operation so as to carry out accurate drive diagnosis.

(2) As an index for drive diagnosis, the driving assistance system 7 for vehicle uses indices that make a comprehensive decision as to (a) distribution of degree of closeness at the time of releasing the accelerator pedal while the vehicle is approaching the leading vehicle (e.g., time to contact TTC), or distribution of degree of closeness to a lane boundary at the time of steering adjustment performed while the vehicle is approaching the lane boundary (e.g., time to lane crossing TLC), (b) distribution of velocity V of the vehicle in a state in which there is no leading vehicle, distribution of time headway THW between the vehicle and the leading vehicle while the vehicle is following the leading vehicle, or distribution of acceleration of the vehicle at the time of start-up from a stopping state, (c) distribution of degree of closeness between the vehicle and the leading vehicle at the time of performing a brake operation while the vehicle is approaching the leading vehicle (e.g., time to contact TTC), or distribution of the minimum vehicle separation D at the time of passing the leading vehicle from a follow-up state, and (d) smoothness of steering operation (steering angle entropy), or smoothness of accelerator pedal operation (accelerator pedal position entropy). This allows the driving assistance system 7 for vehicle to comprehensively determine whether or not the driver is engaged in a good operation.

It is to be noted that in the first to the thirteenth embodiments explained above, it is configured that after drive diagnosis is carried out, according to the drive diagnosis result, alarm presentation processing or improvement suggestion processing is carried out. However, the driving assistance system for vehicle achieved in the present invention is not limited thereto, and the driving assistance system for vehicle may be configured so as to exclusively carry out drive diagnosis from traveling conditions and drive operations. In this case, it may be configured, for instance, that drive diagnosis result is presented only when the driver desires so, or that drive diagnosis result is transmitted to a base station that collects the data.

In the first to the thirteenth embodiments explained above, the laser radar 10, the front camera 15, the vehicle speed sensor 30, the acceleration sensor 35, and the navigation system 50 may function as traveling condition detection means; the steering angle sensor 8, the accelerator pedal stroke sensor 55, the brake pedal stroke sensor 60, and the turn signal switch 65 may function as drive operation detection means; the controllers 100, 200, 250, 300, 350, 400, and 500 may function as drive diagnosis means and information setting means; and the speaker 130 and the display unit 180 may function as information provision means. It is to be noted that traveling condition detection means and drive operation detection means are not limited thereto, and, for example, another type of radar may be used in place of the laser radar 10. Moreover, it may be configured that, as a information provision means, either one of the speaker 130 or the display unit 180 may be used. It is to be noted that the above explanations are examples, and considerations of the present invention are not limited to or constrained by the correspondence relationship between the above embodiments and the claims.

The invention claimed is:

1. A driving assistance system for vehicle, comprising:
   a traveling condition detection unit that detects a traveling condition of a vehicle;
   a drive operation detection unit that detects a drive operation by a driver;
   a drive diagnosis unit that detects, as an index for drive diagnosis, a distribution of a parameter representing safety awareness and operation preference characteristics of the driver based upon the traveling condition detected by the traveling condition detection unit and the drive operation detected by the drive operation detection unit, and diagnoses a drive operation of the driver from the detected index;
   an information setting unit that comprises a processor to evaluate a drive diagnosis result by the drive diagnosis unit in accordance with evaluation criteria so as to set a content of information provision to the driver, with the evaluation criteria including a first evaluation criterion based upon an operating condition of that day of the driver and a second evaluation criterion based upon a usual operating condition of the driver, wherein the usual operating condition is an operating condition of the driver over a greater period of time than that of the operating condition of that day, and the amount of data corresponding to the usual operating condition is greater than that of the operating condition of that day; and
   an information provision unit that is controlled by the processor of the information setting unit to perform information provision to the driver with a content set by the information setting unit, wherein:
      the information setting unit evaluates the drive diagnosis result with the evaluation criteria, and, depending upon an evaluation result, sets an alarm or an operation improvement suggestion as the content of information provision, wherein the operation improvement suggestion praises improvement of the driver operation of the driver.

2. A driving assistance system for vehicle according to claim 1, wherein
   the drive diagnosis unit uses a single index so as to carry out drive diagnosis; and
   the information setting unit compares a drive diagnosis result using the single index with the evaluation criteria so as to set the content of information provision.

3. A driving assistance system for vehicle according to claim 1, wherein
   the evaluation criteria further include a third evaluation criterion based upon an operating condition of a general driver.

4. A driving assistance system for vehicle according to claim 1, wherein
   the information setting unit sets an alarm when the drive diagnosis result falls below a first evaluation criterion value based on the evaluation criteria and sets an operation improvement suggestion when the drive diagnosis result exceeds a second evaluation criterion value based on the evaluation criteria.

5. A driving assistance system for vehicle according to claim 1, wherein
   the drive diagnosis unit detects, as the distribution of the parameter representing the safety awareness and operation preference characteristics of the driver, any of a distribution of velocity of the vehicle in a state in which there is no leading vehicle, a distribution of time headway between the vehicle and a leading vehicle while the vehicle is following the leading vehicle, and a distribution of acceleration of the vehicle at a time of start-up from a stopping state.

6. A vehicle comprising a driving assistance system for vehicle according to claim 1.

7. A driving assistance method for vehicle comprising:
   detecting a traveling condition of a vehicle;
   detecting a drive operation by a driver;
   detecting, as an index for drive diagnosis, a distribution of a parameter representing safety awareness and operation preference characteristics of the driver based upon the traveling condition and the drive operation that have been detected, and diagnosing an operation of the driver from the detected index;
   evaluating, via a processor, a drive diagnosis result with an evaluation criteria so as to set a content of information provision to the driver, with the evaluation criteria including a first evaluation criterion based upon an operating condition of that day of the driver and a second evaluation criterion based upon a usual operating condition of the driver, wherein the usual operating condition is an operating condition of the driver over a greater period of time than that of the operating condition of that day, and the amount of data corresponding to the usual operating condition is greater than that of the operating condition of that day; and
   performing information provision to the driver with the set content through control by the processor, wherein:
      in evaluation of the drive diagnosis, the drive diagnosis result is evaluated with the evaluation criteria and depending upon an evaluation result, an alarm or an operation improvement suggestion is set as the content of information provision, wherein the operation improvement suggestion praises improvement of the driver operation of the driver.

8. A driving, assistance system for vehicle, comprising:
   a traveling condition detection unit that detects a traveling condition of a vehicle;
   a drive operation detection unit that detects a drive operation by a driver;
   a drive diagnosis unit that detects, as an index for drive diagnosis, smoothness and/or stability of the drive operation based upon the traveling condition detected by the traveling condition detection unit and the drive operation detected by the drive operation detection unit, and diagnoses a drive operation of the driver from the detected index;

an information setting unit that comprises a processor to evaluate a drive diagnosis result by the drive diagnosis unit in accordance with evaluation criteria so as to set a content of information provision to the driver, with the evaluation criteria including a first evaluation criterion based upon an operating condition of that day of the driver and a second evaluation criterion based upon a usual operating condition of the driver, wherein the usual operating condition is an operating condition of the driver over a greater period of time than that of the operating condition of that day, and the amount of data corresponding to the usual operating condition is greater than that of the operating condition of that day; and an information provision unit that is controlled by the processor of the information setting unit to perform information provision to the driver with a content set by the information setting unit, wherein:

the information setting unit evaluates the drive diagnosis result with the evaluation criteria, and, depending upon an evaluation result sets an alarm or an operation improvement suggestion as the content of information provision, wherein the operation improvement suggestion praises improvement of the driver operation of the driver.

* * * * *